(12) United States Patent
Watabe et al.

(10) Patent No.: US 8,582,414 B2
(45) Date of Patent: *Nov. 12, 2013

(54) INFORMATION STORAGE MEDIUM, RECORDING METHOD, AND RECORDING APPARATUS

(75) Inventors: Kazuo Watabe, Yokohama (JP); Hideo Ando, Hino (JP); Sumitaka Maruyama, Yokohama (JP); Yutaka Kashihara, Chigasaki (JP); Akihito Ogawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/045,680

(22) Filed: Mar. 11, 2011

(65) Prior Publication Data

US 2011/0158060 A1 Jun. 30, 2011

Related U.S. Application Data

(62) Division of application No. 11/668,835, filed on Jan. 30, 2007, now Pat. No. 7,924,691.

(30) Foreign Application Priority Data

Jan. 31, 2006 (JP) .................... 2006-023924
Apr. 28, 2006 (JP) .................... 2006-126241

(51) Int. Cl.
*G11B 7/24* (2013.01)
*G11B 7/007* (2006.01)

(52) U.S. Cl.
USPC .................. 369/275.1; 369/94; 369/30.03

(58) Field of Classification Search
USPC .................. 369/94, 275.1–275.4
See application file for complete search history.

(56) References Cited

U.S. PATENT DOCUMENTS

| 6,656,560 | B2 | 12/2003 | Yamamoto et al. |
| 2003/0059122 | A1 | 3/2003 | Boon |
| 2004/0085877 | A1* | 5/2004 | Lee et al. .................. 369/53.37 |
| 2004/0196776 | A1 | 10/2004 | Yoshida et al. |
| 2005/0007941 | A1* | 1/2005 | Lee et al. .................. 369/275.4 |
| 2005/0068865 | A1 | 3/2005 | Kawakami et al. |

(Continued)

FOREIGN PATENT DOCUMENTS

| JP | 2002-245625 | 8/2002 |
| JP | 2005-18815 | 1/2005 |
| JP | 2007-149194 | 6/2007 |

*Primary Examiner* — Joseph Feild
*Assistant Examiner* — Andrew Sasinowski
(74) *Attorney, Agent, or Firm* — Oblon, Spivak, McClelland, Maier & Neustadt, L.L.P.

(57) ABSTRACT

According to one embodiment, an information storage medium in which layer 0 and layer 1 are arranged from a read surface, a system lead-in area, data lead-in area, data area, and middle area are arranged from an inner circumference of the layer 0, and a system lead-out area, data lead-out area, data area, and middle area are arranged from an inner circumference of the layer 1. A guard track zone is arranged on a side of the data area in the data lead-out area, and a reference code zone, R physical format information zone, recording management zone, and drive test zone are arranged in the data lead-in area of the layer 0 and padding of the guard track zone of the data lead-out area is performed after padding of the drive test zone of data lead-in area and recording of the recording management zone.

5 Claims, 63 Drawing Sheets

(56) References Cited

U.S. PATENT DOCUMENTS

| | | | |
|---|---|---|---|
| 2005/0105427 A1* | 5/2005 | Cookson et al. | 369/47.31 |
| 2005/0128917 A1* | 6/2005 | Ogawa et al. | 369/59.23 |
| 2005/0141377 A1 | 6/2005 | Yamanaka | |
| 2005/0147002 A1 | 7/2005 | Hwang et al. | |
| 2005/0213481 A1* | 9/2005 | Ando et al. | 369/275.3 |
| 2005/0219995 A1 | 10/2005 | Morita et al. | |
| 2005/0270966 A1 | 12/2005 | Yamamoto et al. | |
| 2006/0018241 A1 | 1/2006 | Shingai et al. | |

* cited by examiner

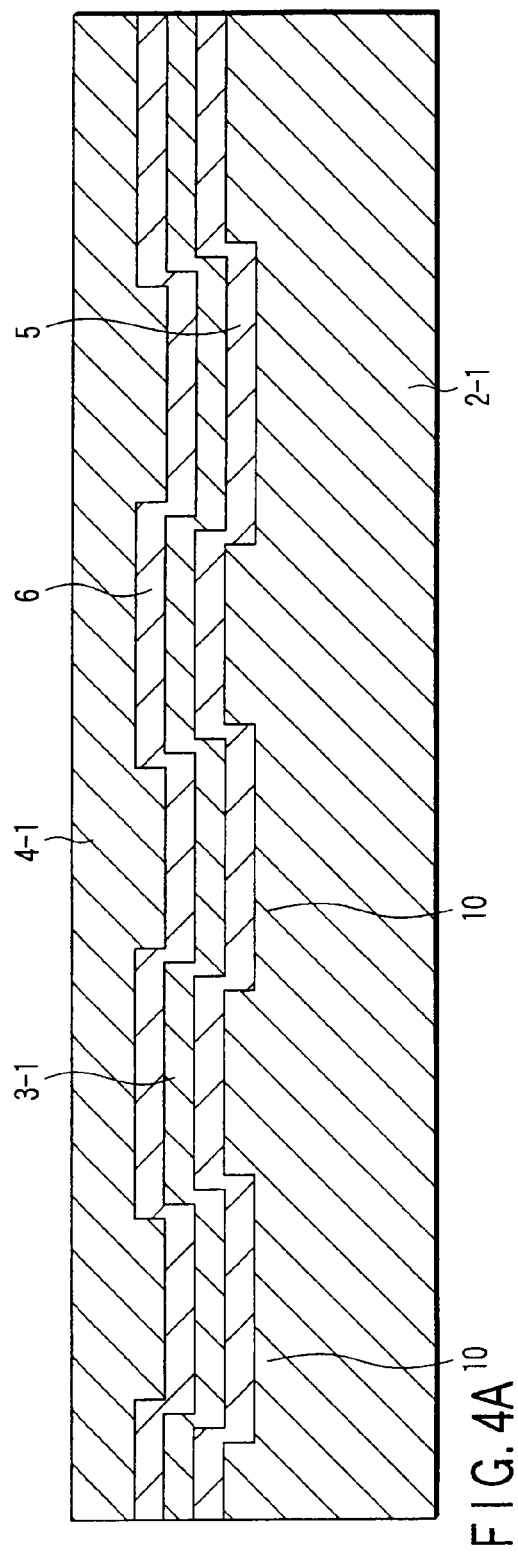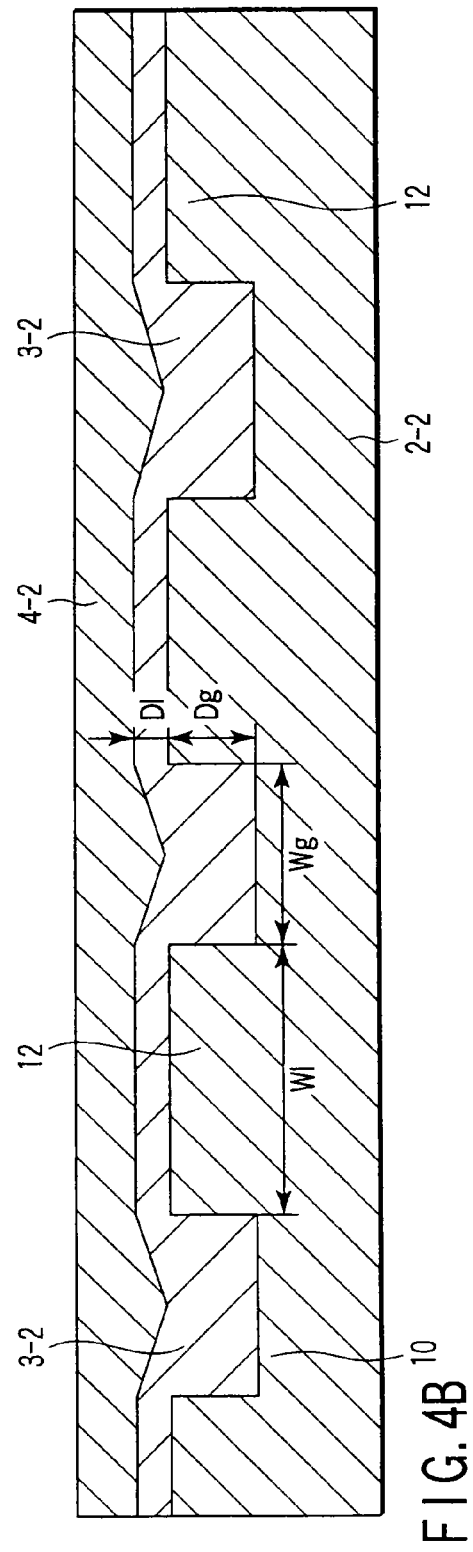

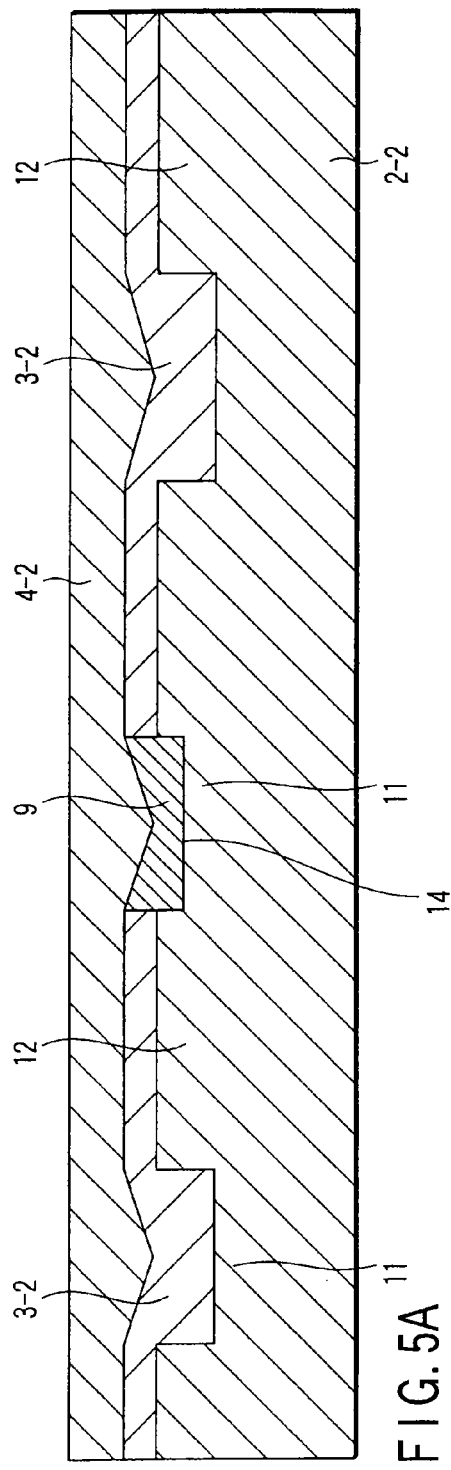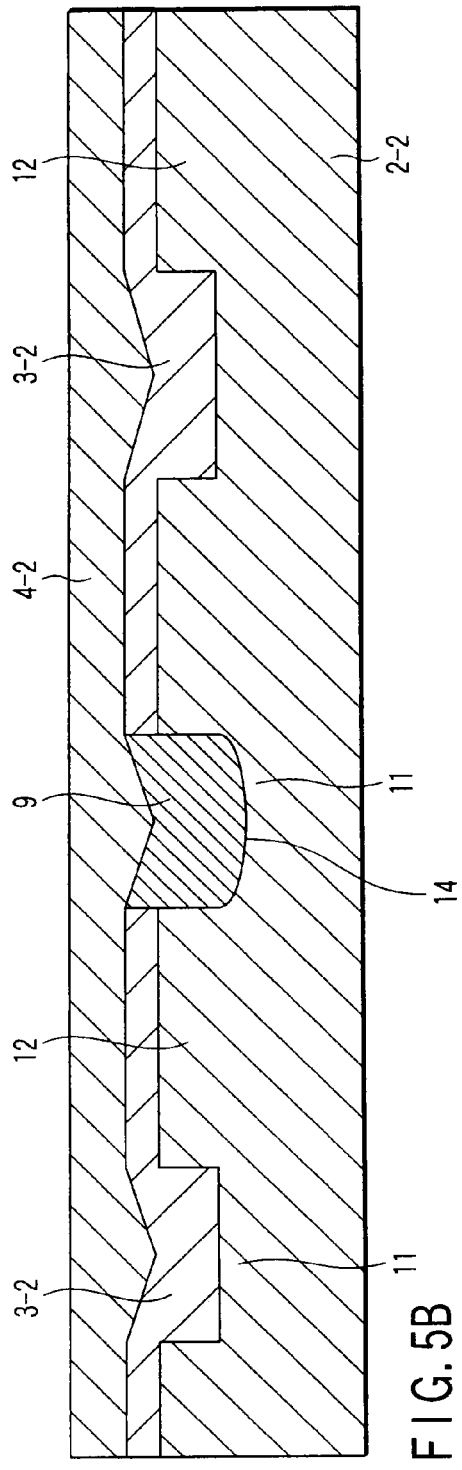

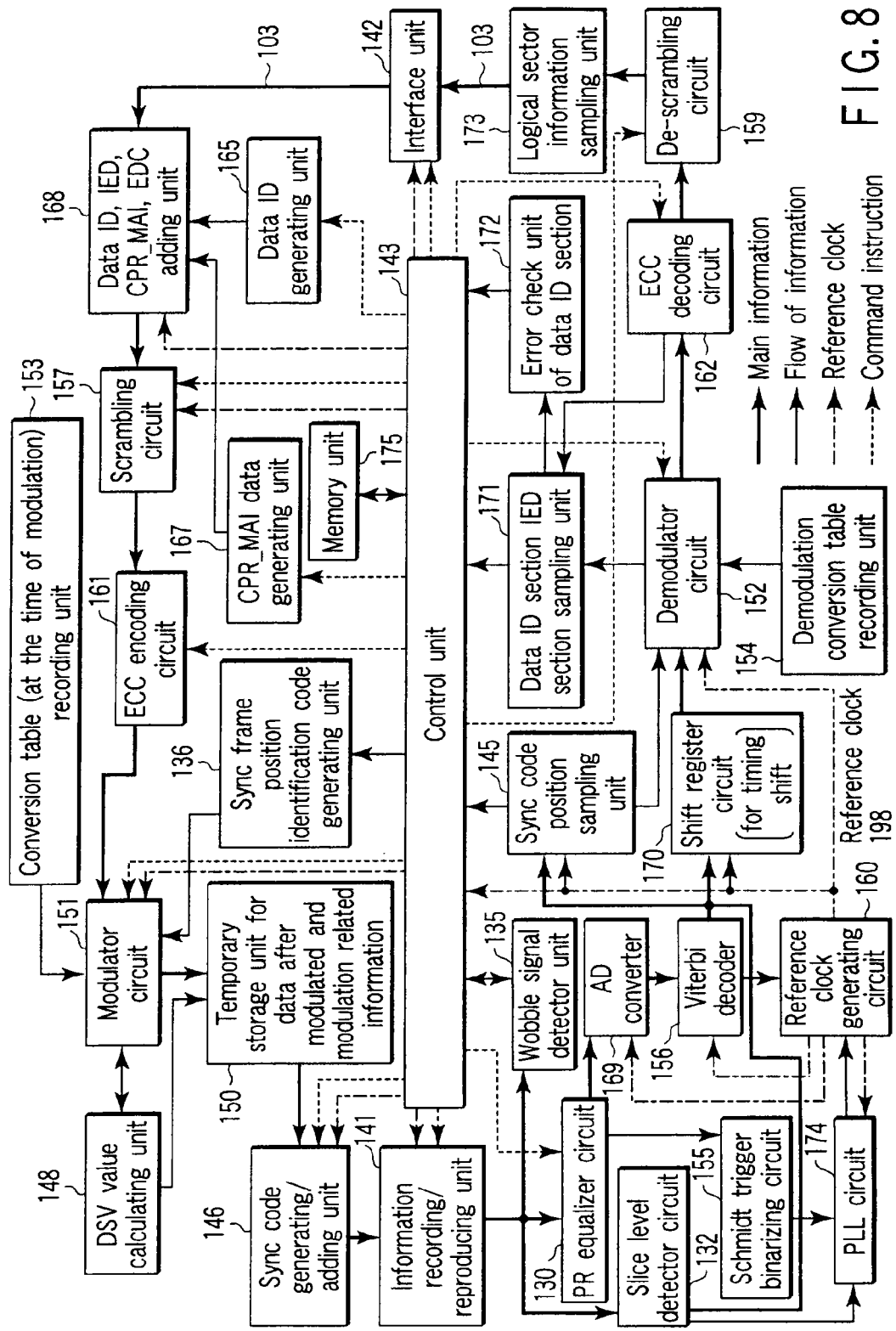
F I G. 8

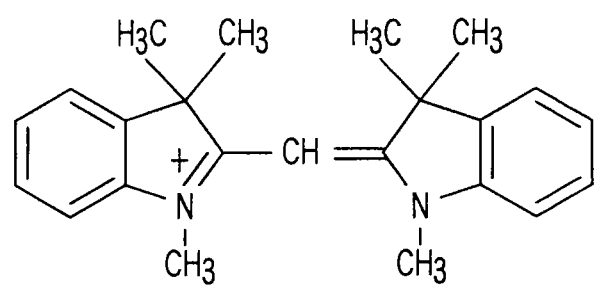
F I G. 13

FIG. 16A

| Data lead-in area DTLDI | Spare area SPA | Bordered area BRDA #1 | Border-out BRDO | Data area DTA | | Original data lead-out area DTLDO |
|---|---|---|---|---|---|---|
| | | | | User data additionally recordable area | 205 | |

FIG. 16B

| Data lead-in area DTLDI | Spare area SPA | Bordered area BRDA #1 | Border zone BRDZ | | Bordered area BRDA #2 | Data area DTA | | Extended drive test zone EDRTZ | Original data lead-out area DTLDO |
|---|---|---|---|---|---|---|---|---|---|
| | | | Border-out BRDO | Border-in BRDI | | User data additionally recordable area | 205 | | |

FIG. 16C

| Data lead-in area DTLDI | Spare area SPA | Bordered area BRDA #1 | Border zone BRDZ | | Bordered area BRDA #2 | Border zone BRDZ | | Bordered area BRDA #3 | New data lead-out area NDTLDO | | | Original data lead-out area DTLDO |
|---|---|---|---|---|---|---|---|---|---|---|---|---|
| | | | Border-out BRDO | Border-in BRDI | | Border-out BRDO | Border-in BRDI | | Terminator area TRM | Use inhibited area | Extended drive test zone EDRTZ | |

Start position address of each area → η  901  θ  902  κ  911  903

FIG. 16D

| Contents of information | Copy of RMD CRMD#0 | Copy of RMD CRMD#1 | ... | Copy of RMD CRMD#4 | Reserved area | Border stop block STB | Reserved area | Update physical format information U_PFI#1 | ... | Update physical format information U_PFI#6 | Recording management zone RMZ in border zone | Reserved area |
|---|---|---|---|---|---|---|---|---|---|---|---|---|
| Size used | One physical segment block size = 32 | One physical segment block size = 32 | ... | One physical segment block size = 32 | — | One physical segment block size = 32 | — | One physical segment block size = 32 | ... | One physical segment block size = 32 | M+1 physical segment block size = 32×(M×1) physical sectors | — |
| Relative physical segment block number | 0 | 1 | ... | 4 | 5~18 | 19 | 20~N | N+1 | ... | N+6 | N+7~N+M+7 | N+M+8 |

Border-out BRDO ← → Border-in BRDI

Border zone BRDZ

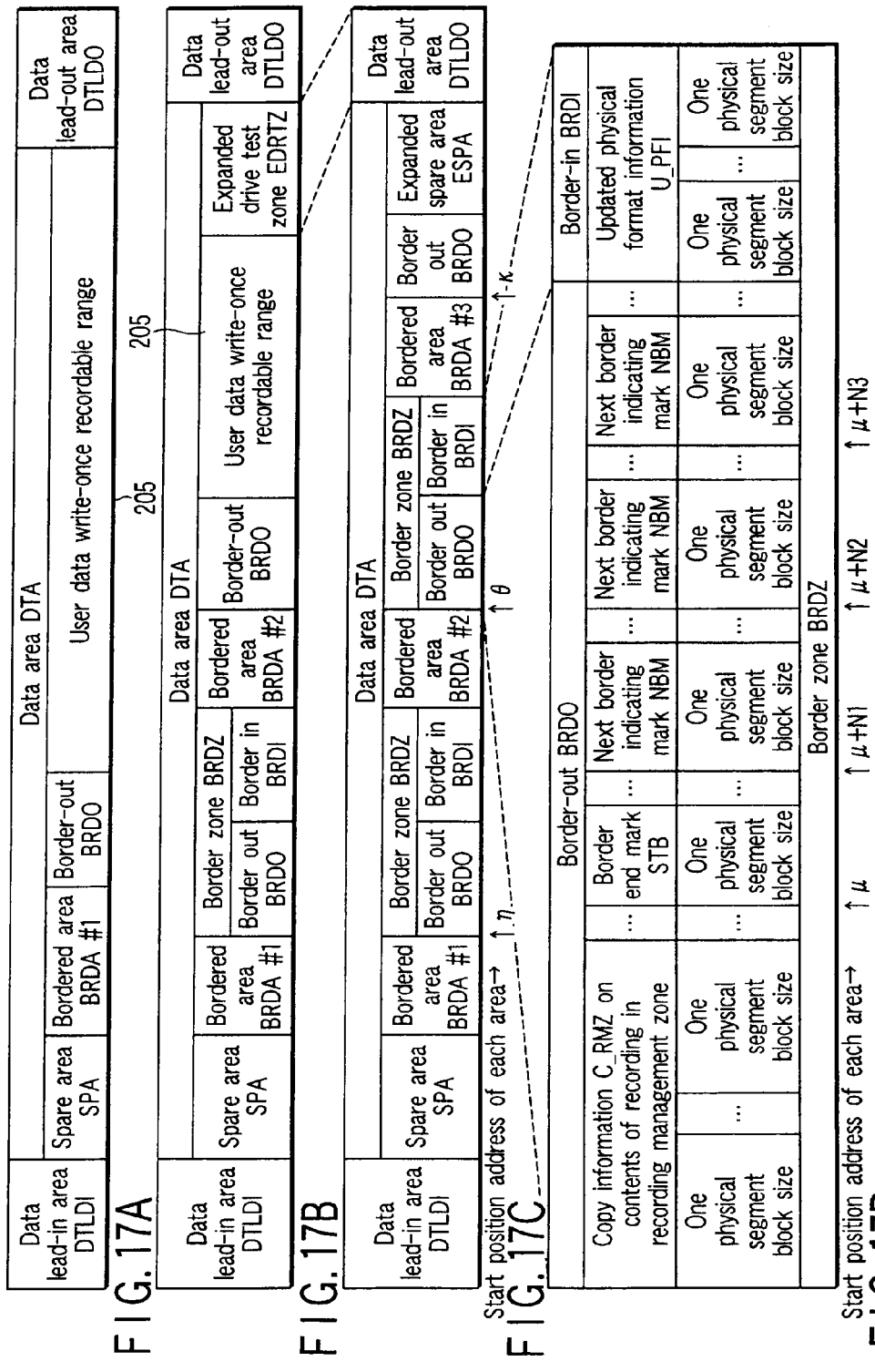

FIG. 18A

| System lead-in area SYLDI | | | | | Connection area CNA | | | Data lead-in area DTLDI | | | Data area DTA |
|---|---|---|---|---|---|---|---|---|---|---|---|
| Initial zone INZ | Buffer zone 1 BFZ1 | Control data zone 1 CDZ | Buffer zone 2 BFZ2 | Connection zone CNZ | Guard track zone 1 GTZ1 | Disk test zone DKTZ | Drive test zone DRTZ | Guard track zone 2 GTZ2 | Recording management zone RMZ | R-physical information zone RIZ | Reference code recording zone RCZ |

FIG. 18B

| ... | Control data zone CDZ | ... |
|---|---|---|
| ... | Physical format information PFI | Disc manufacture related information DMI |

| R-physical information zone RIZ | |
|---|---|
| Disc manufacture related information DMI | R-physical format information R_PFI |

FIG. 18C

| Disc manufacture related information DMI | | |
|---|---|---|
| Information relating disc manufacture country name | Disc manufacturer country information | Other disc manufacture related information |
| 251 | 252 | 253 |

| Information name | Physical format information PFI or R-format information R_PFI | | | |
|---|---|---|---|---|
| Type of recording information | Common information in DVD family | Common information in HD DVD family | Type of each specification and version specific information | Contents of information which can be set specific to each revision |
| Byte location | 0 – 31 | 32 – 127 | 128 – 511 | 512 – 2047 |
| | 261 | 262 | 263 | 264 |

FIG. 18D

| Byte position | 0 – 16 | 17 – 31 |
|---|---|---|
| Type of recording information | Information which can be recorded common to all of read-only type, rewritable-type, and write-once type | Information recorded common to rewritable type and write-once type (not recorded in read-only type) |
| | 267 | 268 |

| | Physical format information PFI | | | R physical format information R_PFI | Updated physical format information U_PFI |
|---|---|---|---|---|---|
| | Read-only type information storage medium | Rewritable type information storage medium | Recordable (write-once) type information storage medium | | |
| | "00h" | "00h" | "00h" | | |
| Start position information of data area (physical sector number or ECC block number) | "00h" | Start position information of data area DTA in land area (physical sector number or ECC block number) | Start position information of data area (physical sector number or ECC block number) | Start position information of data area (physical sector number) | Start position information of data area (physical sector number) |
| | "00h" | "00h" | "00h" | "00h" | "00h" |
| End position information of data area (physical sector number or ECC block number) | "00h" | End position information of data area DTA in land area (physical sector number or ECC block number) | Last position information of write-once possible range in user data [position immediately before ζ point in FIG. 37E] (physical sector number or ECC block number) | Physical sector number indicating lastly recorded position in last R zone in corresponding bordered area | Physical sector number indicating lastly recorded position in last R zone in corresponding bordered area |
| | "00h" | "00h" | "00h" | "00h" | "00h" |
| Last address information in layer 0 (physical sector number or ECC block number) | | Differential value of start position information between land area and groove area (physical sector number or ECC block number) | "00h" | "00h" | "00" |

FIG. 19

Explanation of updating condition of recording position management data RMD

| 1 | When medium state information in RMD field "0" is changed |
|---|---|
| 2 | When start position information of any one of border-out BRDO in RMD field "3" is changed or when recording position management zone RMZ number is changed |
| 3 | When any one of information described below in RMD field "4" is changed<br>• Total number of number of undesignated R zones, number of open R zones, and number of complete R zones<br>• Number information of first open type R zone<br>• Number information of second open type R zone |
| 4 | When difference between "physical sector number LRA representing final recording position in R zone" recorded in the latest recording position management data RMD and "physical sector number PSN at position which is actually present at present and finally recorded in R zone" exceeds 8192 *Note1<br>Here, updating is not performed when unrecorded position (Reserved area 273) in FIG. 26B) in recording position management zone RMZ is equal or smaller than 4 physical segment blocks (4_64 KB) |

* Note 1: RMD need not be updated in period in which series of recording processes are performed to recordable information storage medium

| IPW | Modulation area | | Wobble data unit #0 | Non-modulation area | |
|---|---|---|---|---|---|
| | NPW | IPW | | NPW | IPW |
| 6 wobbles | 4 wobbles | 6 wobbles | | 68 wobbles | 6 wobbles |

| Non-modulation area | Modulation area | | Wobble data unit #0 | Non-modulation area |
|---|---|---|---|---|
| NPW | NPW | IPW | | NPW |
| 42 wobbles | 4 wobbles | 6 wobbles | | 26 wobbles |

| Modulation area | | | | | Wobble data units #1~#11 | Non-modulation area |
|---|---|---|---|---|---|---|
| IPW | Address bit #2 | IPW | Address bit #1 | IPW | Address bit #0 | NPW |
| 4 wobbles | 4 wobbles | 4 wobbles | 4 wobbles | 4 wobbles | 4 wobbles | 68 wobbles |

| Non-modulation area | Modulation area | | | | | Wobble data units #1~#11 | Non-modulation area |
|---|---|---|---|---|---|---|---|
| NPW | NPW | Address bit #2 | IPW | Address bit #1 | IPW | Address bit #0 | NPW |
| 42 wobbles | 4 wobbles | 4 wobbles | 4 wobbles | 4 wobbles | 4 wobbles | 4 wobbles | 26 wobbles |

| Wobble sync area | Wobble address information | | | | | | |
|---|---|---|---|---|---|---|---|
| | Reserved area 604 | Physical segment address 601 | Zone address 602 | Parity information 605 | Groove track address 606 | Land track address 607 | Unity area 608 610 |
| 3 bits | 3 address bits | 6 address bits | 5 bits | 1 address bit | 12 bits | 12 bits | 9 address bits |
| 580 | 721 | 722 | | | | | |

FIG. 24B

| Wobble sync area | Wobble address information | | | | | |
|---|---|---|---|---|---|---|
| | Type identification information 721 | Layer number information 722 | Reserved area 723 | Physical segment sequence information 724 | Data segment address (number) (ECC block address) 725 | CRC code 726 | Unity area 609 610 |
| 3 bits | 1 bit | 1 bit | 1 bit | 3 address bits | 18 address bits | 9 bits | 15 address bits |
| 580 | | | | | | | |

FIG. 24C

| Wobble sync area | Wobble address information | | | |
|---|---|---|---|---|
| | Segment information 727 | Physical segment block address 728 | Physical segment sequence information 724 | CRC code 726 | Unity area 609 610 |
| 3 bits | 3 address bits | 18 address bits | 3 address bits | 9 bits | 15 address bits |
| 580 | | | | | |

FIG. 24D

| Type identification information 721 | Reserved area 723 |
|---|---|
| 1 bit | 1 bit |

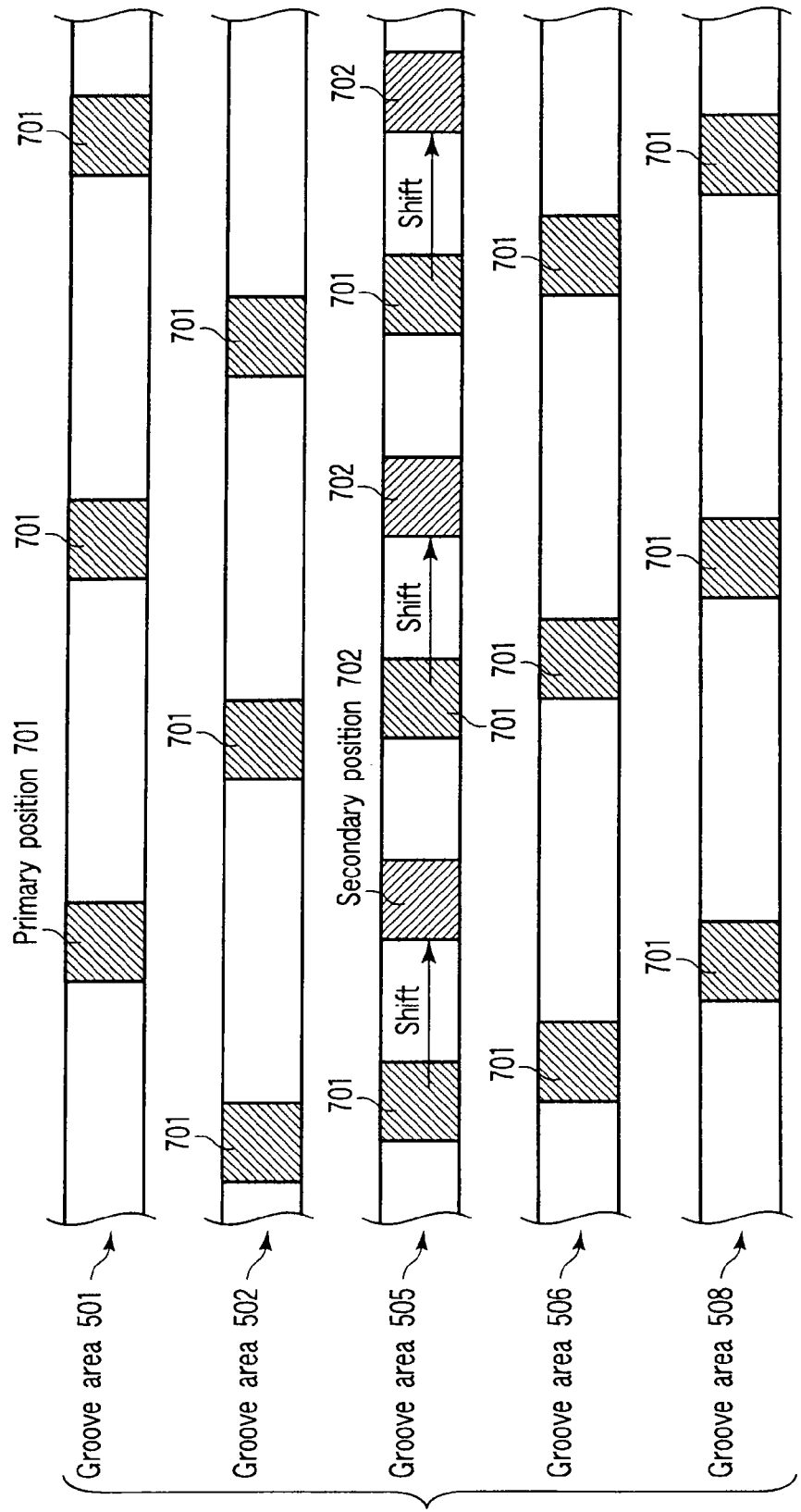
F I G. 25

| Sync field | Address field | | | | | | | | | | | Unity field | | | | | |
|---|---|---|---|---|---|---|---|---|---|---|---|---|---|---|---|---|---|
| | 711 | | | | | 712 | | | | | | | | 713 | | | |
| 0 | 1 | 2 | 3 | 4 | 5 | 6 | 7 | 8 | 9 | 10 | 11 | 12 | 13 | 14 | 15 | 16 |

F I G. 26A

| P | P | P | P | P | P | P | P | P | P | P | U | U | U | U | U |
|---|---|---|---|---|---|---|---|---|---|---|---|---|---|---|---|

All of the physical segment is filled with primary positions

F I G. 26B

| S | S | S | S | S | S | S | S | S | S | S | U | U | U | U | U |
|---|---|---|---|---|---|---|---|---|---|---|---|---|---|---|---|

All of the physical segment is filled with secondary positions

F I G. 26C

| P | P | P | P | P | S | S | S | S | S | S | U | U | U | U | U |
|---|---|---|---|---|---|---|---|---|---|---|---|---|---|---|---|

Primary positions and secondary positions are mixed in the physical segment

F I G. 26D

| S | S | P | P | P | P | P | S | S | S | S | U | U | U | U | U |
|---|---|---|---|---|---|---|---|---|---|---|---|---|---|---|---|

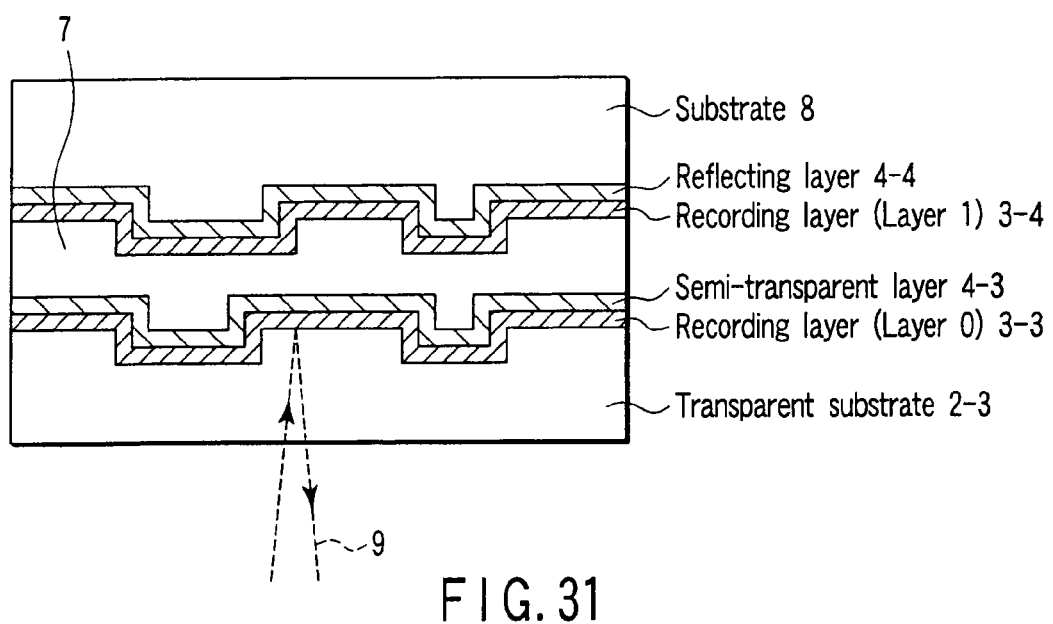
F I G. 31

A PSN on layer 0 and the corresponding recordable physical sectors on layer 1

M, $\overline{M}$ : PSN
$r_M$ : The nominal radius at PSN M
$A_M$ : The clearance in terms of physical sectors at the radius $r_M$
Cl : The clearance to prevent the influence of the other layer The clearance in the number of physical sectors

| M | | $r_M$ [mm] | | $A_M$ |
|---|---|---|---|---|
| 04 0000h | 07 09FFh | 24.61 | 29.09 | 3700h |
| 07 0A00h | 16 84FFh | 26.09 | 32.61 | 4400h |
| 16 8500h | 29 6FFh | 32.61 | 39.13 | 5200h |
| 29 7000h | 3F CAFFh | 39.13 | 45.65 | 5F00h |
| 3F CB00h | 59 95FFh | 45.65 | 52.17 | 6000h |
| 59 9600h | | 52.17 | | 7900h |

| Parameter | | Single layer | Dual layer |
|---|---|---|---|
| User available recording capacity | | 15Gbytes/side | 30Gbytes/side |
| Wavelength in use | | 405nm | 405nm |
| NA value of objective lens | | 0.65 | 0.65 |
| Data bit length | (A) | 0.306μm | 0.306μm |
| | (B) | 0.153μm | 0.153μm |
| Channel bit length | (A) | 0.204μm | 0.204μm |
| | (B) | 0.102μm | 0.102μm |
| Minimum mark/pit length (2T) | (A) | 0.408μm | 0.408μm |
| | (B) | 0.204μm | 0.204μm |
| Maximum mark/pit length (13T) | (A) | 2.652μm | 2.652μm |
| | (B) | 1.326μm | 1.326μm |
| Track pitches | (A) | 0.68μm | 0.68μm |
| | (B) | 0.40μm | 0.40μm |
| Physical address setting method | (B) | Wobble address | Wobble address |
| Outer diameter of information storage medium | | 120mm | 120mm |
| Total thickness of information storage medium | | 1.20mm | 1.20mm |
| Diameter of center hole | | 15.0mm | 15.0mm |
| Inner diameter of data area DTA | | 24.1mm | 24.6mm (Layer 0) 24.7mm (Layer 1) |
| Outer diameter of data area DTA | | 58.0mm | 58.1mm |
| Sector size | | 2048bytes | 2048bytes |
| ECC (Error Correction Code) | | Reed-Solomon product code RS(208,192,17)×RS(182,172,11) | Reed-Solomon product code RS(208,192,17)×RS(182,172,11) |
| ECC block size | | 32 physical sectors | 32 physical sectors |
| Modulation method | | ETM,RLL(1,10) | ETM,RLL(1,10) |
| Error-correctable error length | | 7.1mm | 7.1mm |
| Linear velocity | | 6.61m/s | 6.61m/s |
| Channel bit transfer rate | (A) | 32.40Mbps | 32.40Mbps |
| | (B) | 64.80Mbps | 64.80Mbps |
| User data transfer rate | (A) | 18.28Mbps | 18.28Mbps |
| | (B) | 36.55Mbps | 36.55Mbps |

(A) Means numerical value in system lead-in area SYLDI and system lead-out area SYLDO (B) Means numerical value in data lead-in area DTLDI, data area DTA, middle area, and data lead-out area DTLDO

FIG. 36

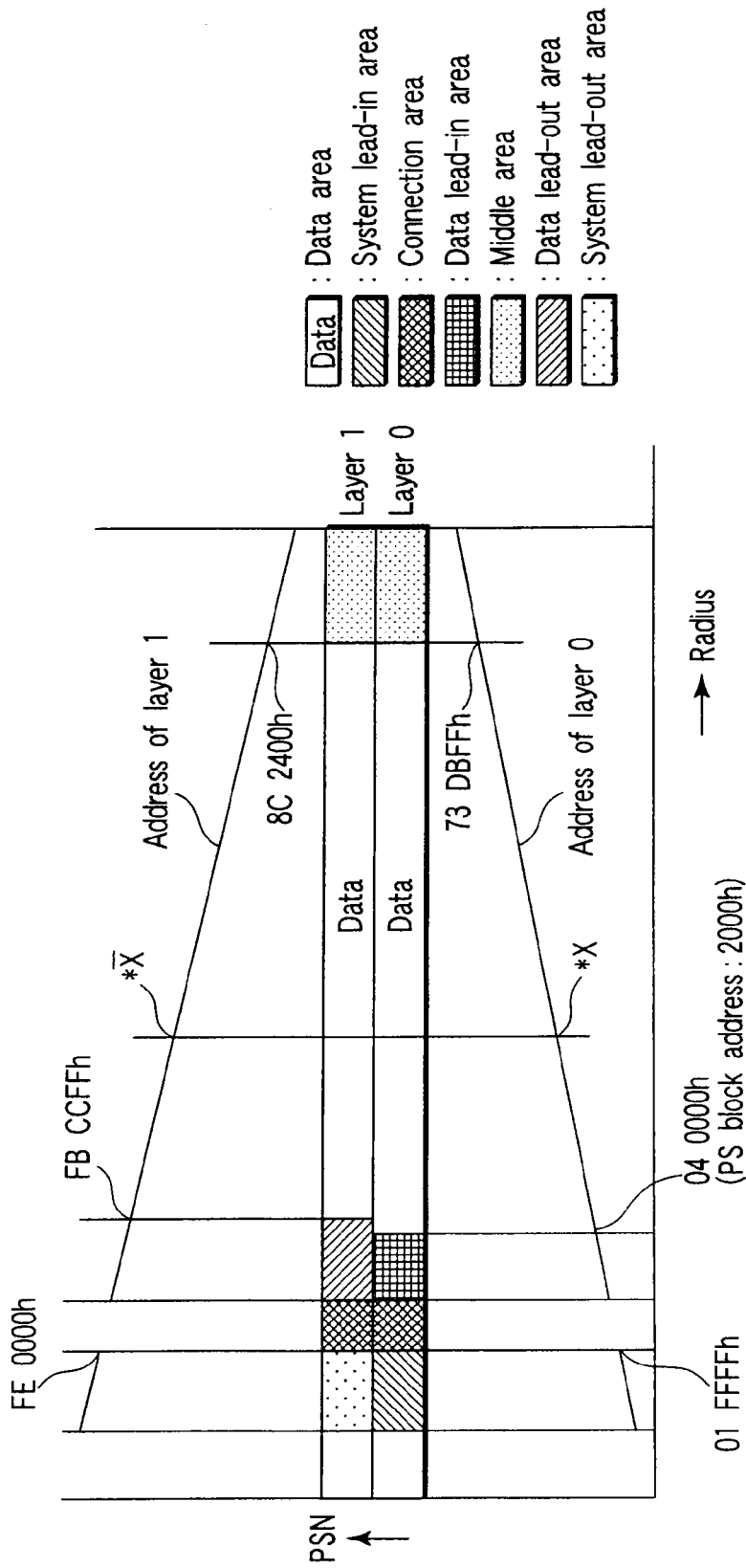
F I G. 40

Layout of address field in WAP

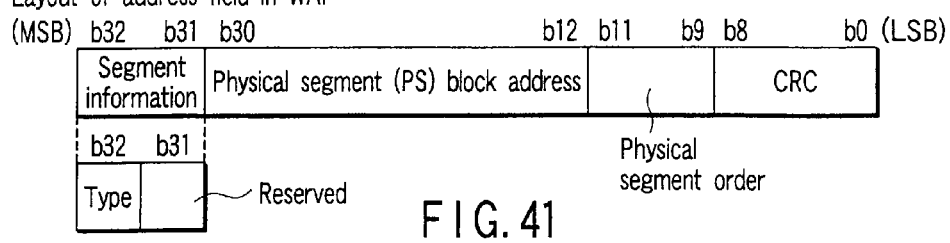

FIG. 41

Primary WDU in SYNC field

| IPW | NPW | IPW | NPW |
|---|---|---|---|
| 6 wobbles | 4 wobbles | 6 wobbles | 68 wobbles |

FIG. 42

Primary WDU in address field

| IPW | bit 2 | bit 1 | bit 0 | NPW |
|---|---|---|---|---|
| 4 wobbles | 4 wobbles | 4 wobbles | 4 wobbles | 68 wobbles |

FIG. 43

Secondary WDU in SYNC field

| NPW | IPW | NPW | IPW | NPW |
|---|---|---|---|---|
| 42 wobbles | 6 wobbles | 4 wobbles | 6 wobbles | 26 wobbles |

FIG. 44

Secondary WDU in address field

| NPW | IPW | bit 2 | bit 1 | bit 0 | NPW |
|---|---|---|---|---|---|
| 42 wobbles | 4 wobbles | 4 wobbles | 4 wobbles | 4 wobbles | 26 wobbles |

FIG. 45

WDU in unity field

| NPW |
|---|
| 84 wobbles |

FIG. 46

Physical format information

| BP | Contents |
|---|---|
| 0 | Book type and part version |
| 1 | Disc size and maximum transfer rate of the disc |
| 2 | Disc structure |
| 3 | Recording density |
| 4 to 15 | Data area allocation |
| 16 | BCA descriptor |
| 17 | Revision number of maximum recording speed |
| 18 | Revision number of minimum recording speed |
| 19 to 25 | Revision number table |
| 26 | Class |
| 27 | Extended part version |
| 28 to 31 | reserved |
| 32 | Actual number of maximum reading speed |
| 33 | Layer format table |
| 34 to 127 | reserved |
| 128 | Mark polarity descriptor |
| 129 | Velocity |
| 130 | Rim intensity in tangential direction |
| 131 | Rim intensity in radial direction |
| 132 | Read power |
| 133 | Actual number of minimum recording speed |
| 134 | Actual number of 2nd recording speed |
| 135 | Actual number of 3rd recording speed |
| 136 | Actual number of 4th recording speed |
| 137 | Actual number of 5th recording speed |
| 138 | Actual number of 6th recording speed |
| 139 | Actual number of 7th recording speed |
| 140 | Actual number of 8th recording speed |
| 141 | Actual number of 9th recording speed |
| 142 | Actual number of 10th recording speed |
| 143 | Actual number of 11th recording speed |
| 144 | Actual number of 12th recording speed |
| 145 | Actual number of 13th recording speed |
| 146 | Actual number of 14th recording speed |
| 147 | Actual number of 15th recording speed |
| 148 | Actual number of maximum recording speed |
| 149 | Reflectivity of data area for layer 0 |
| 150 | Push-pull signal for layer 0 |
| 151 | On track signal for layer 0 |
| 152 | Reflectivity of data area for layer 1 |
| 153 | Push-pull signal for layer 1 |
| 154 | On track signal for layer 1 |
| 155 to 2047 | reserved |

FIG. 50  Note: BP 0 to BP 31 comprise the common data used for the DVD family.
BP 32 to BP 2047 area used for unique information for each book.

Data area allocation

| BP | Contents |
|---|---|
| 4 | 00h |
| 5 to 7 | Start PSN of the data area (04 0000h) |
| 8 | 00h |
| 9 to 11 | Maximum PSN of data recordable area (FB CCFFh) |
| 12 | 00h |
| 13 to 15 | End PSN on Layer 0 (73 DBFFh) |

F I G. 51

Data structure of the recording management data

| Relative PSN | |
|---|---|
| 0 | reserved |
| 1 | RMD field0 |
| 2 | RMD field1 |
| : | : |
| 22 | RMD field21 |
| 23 ... 31 | reserved |

F I G. 53

RMD field0

| BP | Contents |
|---|---|
| 0 to 1 | RMD format |
| 2 | Disc status |
| 3 | Reserved |
| 4 to 21 | Unique disc ID |
| 22 to 33 | Data area allocation |
| 34 to 45 | Renewed data area allocation |
| 46 to 47 | Padding status |
| 48 to 51 | Last recorded PSN of Terminator |
| 52 to 99 | Drive test zone allocation |
| 100 to 2047 | reserved |

F I G. 54

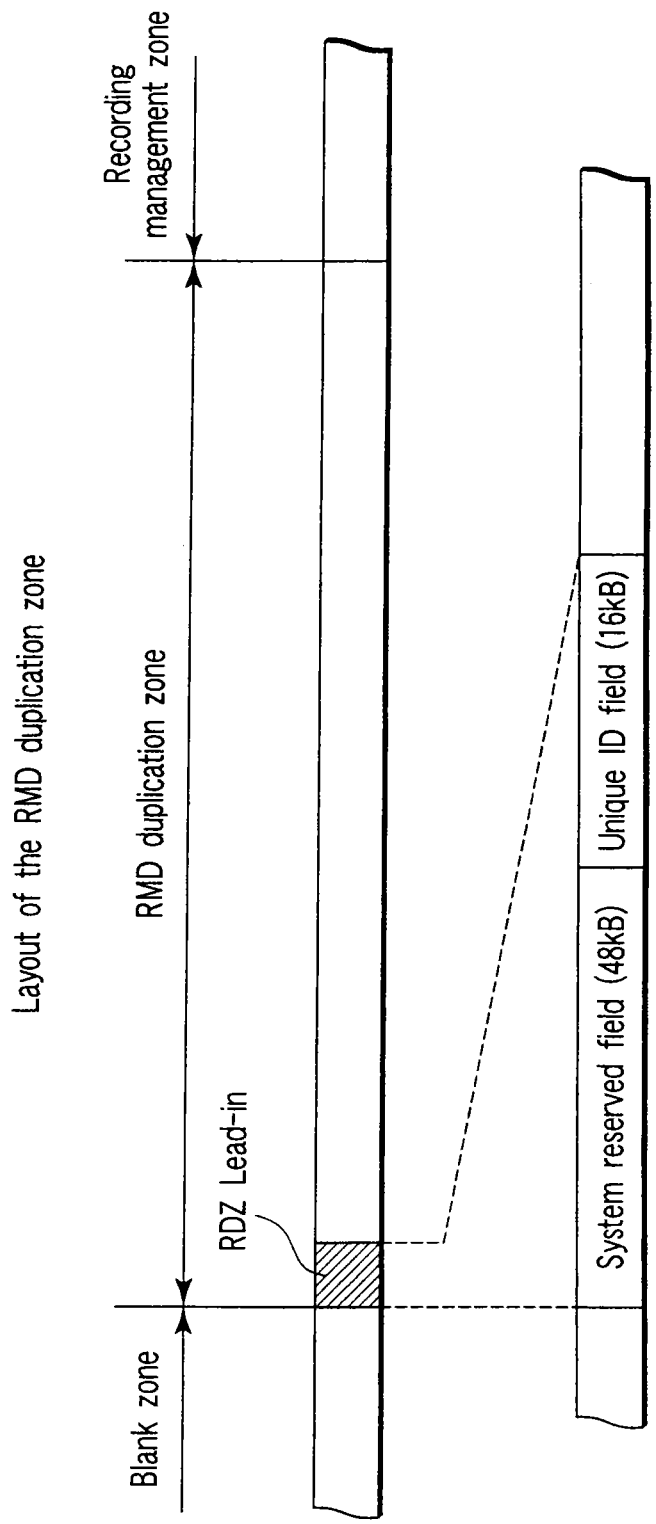
F I G. 52

Data area allocation

| BP | Contents |
|---|---|
| 22 | 00h |
| 23 to 25 | Start PSN of the data area (04 0000h) |
| 26 | 00h |
| 27 to 29 | Maximum PSN of data recordable area (FB CCFFh) |
| 30 | 00h |
| 31 to 33 | End PSN on layer 0 (73 DBFFh) |

FIG. 55

Renewed data area allocation

| BP | Contents |
|---|---|
| 34 | Renewal descriptor |
| 35 to 37 | Start PSN of the data area (04 0000h) |
| 38 | 00h |
| 39 to 41 | Maximum PSN on data recordable area |
| 42 | 00h |
| 43 to 45 | End PSN on layer 0 |

FIG. 56

| BP | Contents |
|---|---|
| 52 to 55 | Start PSN of inner drive test zone on layer 0 (03 8100h) |
| 56 to 59 | Size of inner drive test zone on layer 0 (4B00h) |
| 60 to 63 | Start PSN of inner drive test zone on layer 1 (FC E600h) |
| 64 to 67 | Size of inner drive test zone on layer 1 (4B00h) |
| 68 to 71 | Start PSN of outer drive test zone on layer 0 (75 1000h) |
| 72 to 75 | Size of outer drive test zone on layer 0 (3C00h) |
| 76 to 79 | Start PSN of outer drive test zone on layer 1 (8B 6F00h) |
| 80 to 83 | Size of outer drive test zone on layer 1 (3C00h) |
| 84 to 87 | Start PSN of extra drive test zone on layer 0 |
| 88 to 91 | Size of extra drive test zone on layer 0 (3C00h) |
| 92 to 95 | Start PSN of extra drive test zone on layer 1 |
| 96 to 99 | Size of extra drive test zone on layer 1 (3C00h) |

FIG. 57

RMD Field1

| BP | | Contents |
|---|---|---|
| 0 to 31 | #1 | Drive manufacture ID (described by binary code) |
| 32 to 47 | | Serial number (described by ASCII code) |
| 48 to 63 | | Model number (described by ASCII code) |
| 64 to 71 | | Time stamp |
| 72 to 75 | | Inner drive test zone address for layer 0 |
| 76 to 79 | | Outer drive test zone address for layer 0 |
| 80 to 103 | | Running OPC information |
| 104 to 105 | | DSV (Digital sum value) |
| 106 | | Test zone usage descriptor |
| 107 | | reserved |
| 108 to 111 | | Inner drive test zone address for layer 1 |
| 112 to 115 | | Outer drive test zone address for layer 1 |
| 116 to 119 | | Additional drive test zone for layer 0 |
| 120 to 123 | | Additional drive test zone for layer 1 |
| 124 to 127 | | reserved |
| 128 to 191 | | Drive specific data |
| 192 to 255 | | reserved |
| 256 to 287 | #2 | Drive manufacture ID (described by binary code) |
| 288 to 303 | | Serial number (described by ASCII code) |
| 304 to 319 | | Model number (described by ASCII code) |
| 320 to 327 | | Time stamp |
| 328 to 331 | | Inner drive test zone address for layer 0 |
| 332 to 335 | | Outer drive test zone address for layer 0 |
| 336 to 359 | | Running OPC information |
| 360 to 361 | | DSV |
| 362 | | Test zone usage descriptor |
| 363 | | reserved |
| 364 to 367 | | Inner drive test zone address for layer 1 |
| 368 to 371 | | Outer drive test zone address for layer 1 |
| 372 to 375 | | Additional drive test zone for layer 0 |
| 376 to 379 | | Additional drive test zone for layer 1 |
| 380 to 383 | | reserved |
| 384 to 447 | | Drive specific data |
| 448 to 511 | | reserved |

FIG. 58

| BP | | Contents |
|---|---|---|
| 512 to 543 | #3 | Drive manufacture ID (described by binary code) |
| 544 to 559 | | Serial number (described by ASCII code) |
| 560 to 575 | | Model number (described by ASCII code) |
| 576 to 583 | | Time stamp |
| 584 to 587 | | Inner drive test zone address for layer 0 |
| 588 to 591 | | Outer drive test zone address for layer 0 |
| 592 to 615 | | Running OPC information |
| 616 to 617 | | DSV |
| 618 | | Test zone usage descriptor |
| 619 | | reserved |
| 620 to 623 | | Inner drive test zone address for layer 1 |
| 624 to 627 | | Outer drive test zone address for layer 1 |
| 628 to 631 | | Additional drive test zone for layer 0 |
| 632 to 635 | | Additional drive test zone for layer 1 |
| 636 to 639 | | reserved |
| 640 to 703 | | Drive specific data |
| 704 to 767 | | reserved |
| 768 to 799 | #4 | Drive manufacture ID (described by binary code) |
| 800 to 815 | | Serial number (described by ASCII code) |
| 816 to 831 | | Model number (described by ASCII code) |
| 832 to 839 | | Time stamp |
| 840 to 843 | | Inner drive test zone address for layer 0 |
| 844 to 847 | | Outer drive test zone address for layer 0 |
| 848 to 871 | | Running OPC information |
| 872 to 873 | | DSV |
| 874 | | Test zone usage descriptor |
| 875 | | reserved |
| 876 to 879 | | Inner drive test zone address for layer 1 |
| 880 to 883 | | Outer drive test zone address for layer 1 |
| 884 to 887 | | Additional drive test zone for layer 0 |
| 888 to 891 | | Additional drive test zone for layer 1 |
| 892 to 895 | | reserved |
| 896 to 959 | | Drive specific data |
| 960 to 1023 | | reserved |
| 1024 to 2047 | | reserved |

FIG. 59

RMD field4

| BP | Contents |
|---|---|
| 0 to 1 | Invisible Rzone number |
| 2 to 3 | First Open Rzone number |
| 4 to 5 | Second Open Rzone number |
| 6 to 15 | reserved |
| 16 to 19 | Start PSN of Rzone #1 |
| 20 to 23 | Last recorded PSN of Rzone #1 |
| 24 to 27 | Start PSN of Rzone #2 |
| 28 to 31 | Last recorded PSN of Rzone #2 |
| ⋮ | |
| 2040 to 2043 | Start PSN of Rzone #254 |
| 2044 to 2047 | Last recorded PSN of Rzone #254 |

FIG. 60

RMD field5 to field21

| BP | Contents |
|---|---|
| 0 to 3 | Start PSN of Rzone #n |
| 4 to 7 | Last recorded PSN of Rzone #n |
| 8 to 11 | Start PSN of Rzone #n+1 |
| 12 to 15 | Last recorded PSN of Rzone #n+1 |
| ⋮ | |
| 2044 to 2047 | Last recorded PSN of Rzone #n+255 |

FIG. 61

Structure of a PS block in a R-physical format information zone
Relative PSN

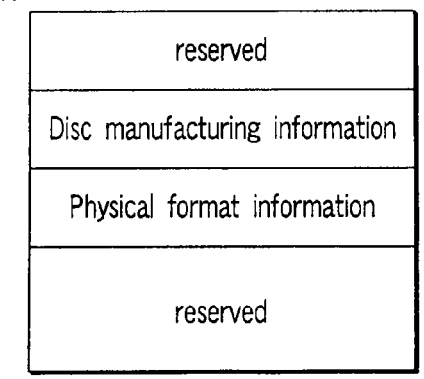

FIG. 62

Physical format information

| BP | Contents |
|---|---|
| 0 | Book type and part version |
| 1 | Disc size and maximum transfer rate of the disc |
| 2 | Disc structure |
| 3 | Recording density |
| 4 to 15 | Data area allocation |
| 16 | BCA descriptor |
| 17 | Revision number of maximum recording speed |
| 18 | Revision number of minimum recording speed |
| 19 to 25 | Revision number table |
| 26 | Class |
| 27 | Extended part version |
| 28 to 31 | reserved |
| 32 | Actual number of maximum reading speed |
| 33 | Layer format table |
| 34 to 127 | reserved |
| 128 | Mark polarity descriptor |
| 129 | Velocity |
| 130 | Rim intensity in tangential direction |
| 131 | Rim intensity in radial direction |
| 132 | Read power |
| 133 | Actual number of minimum recording speed |
| 134 | Actual number of 2nd recording speed |
| 135 | Actual number of 3rd recording speed |
| 136 | Actual number of 4th recording speed |
| 137 | Actual number of 5th recording speed |
| 138 | Actual number of 6th recording speed |
| 139 | Actual number of 7th recording speed |
| 140 | Actual number of 8th recording speed |
| 141 | Actual number of 9th recording speed |
| 142 | Actual number of 10th recording speed |
| 143 | Actual number of 11th recording speed |
| 144 | Actual number of 12th recording speed |
| 145 | Actual number of 13th recording speed |
| 146 | Actual number of 14th recording speed |
| 147 | Actual number of 15th recording speed |
| 148 | Actual number of maximum recording speed |
| 149 | Reflectivity of data area for layer 0 |
| 150 | Push-pull signal for layer 0 |
| 151 | On track signal for layer 0 |
| 152 | Reflectivity of data area for layer 1 |
| 153 | Push-pull signal for layer 1 |
| 154 | On track signal for layer 1 |
| 155 to 2047 | reserved |

FIG. 63   Note: BP 0 to BP 31 comprise the common data used for the DVD family.
BP 32 to BP 2047 area reserved for each book.

Data area allocation

| BP | Contents |
|---|---|
| 4 | 00h |
| 5 to 7 | Start PSN of the data area (04 0000h) |
| 8 | 00h |
| 9 to 11 | Last recorded PSN of last Rzone |
| 12 | 00h |
| 13 to 15 | End PSN on layer 0 |

The number of physical sectors in (extra) guard track zone

| End PSN of data area on layer 0 (X) | 05 FE00h to 1E 0DFFh | 1E 0E00h to 42 1BFFh | 42 1C00h to 73 DBFFh |
|---|---|---|---|
| Y (on layer 0) | 00 D300h | 01 0100h | 01 3400h |
| Z (on layer 1) | 00 4A00h | 00 6000h | 00 7900h |

Schematic of 2 adjacent tracks
Layer 0
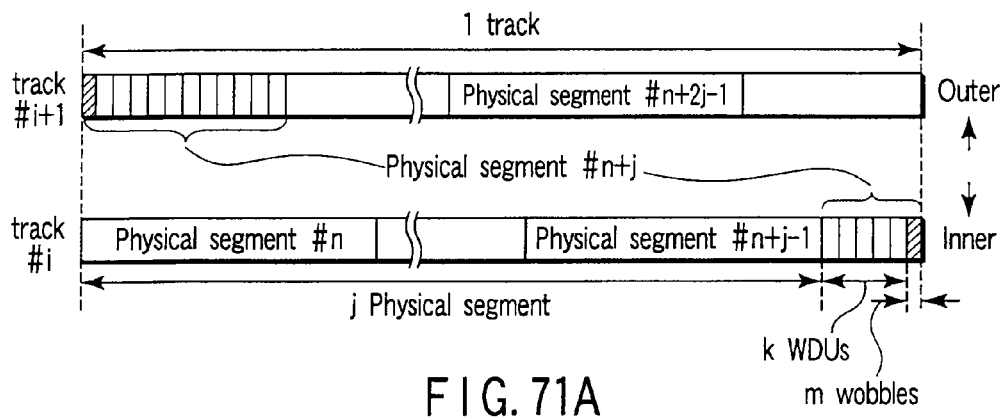
F I G. 71A
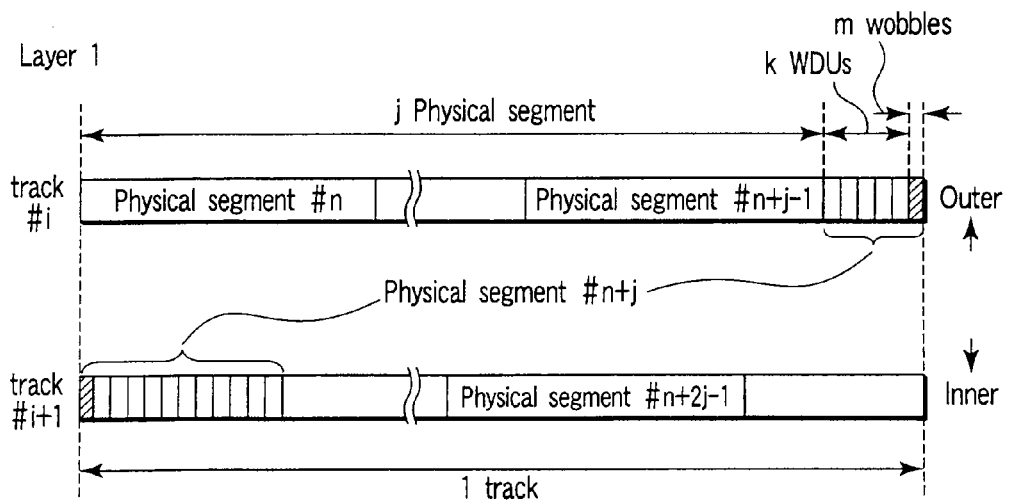
F I G. 71B

| Start PSN (X+1) of middle area of layer 0 | 05 FE00h — 1E 0DFFh | | 1E 0E00h — 42 1BFFh | | 42 1C00h — 73 DC00h | |
|---|---|---|---|---|---|---|
| End PSN (α) of data area | <X-D300h | ≥X-D300h | <X-10100h | ≥X-10100h | <X-13400h | ≥X-13400h |
| End PSN of terminator of layer 0 | α+D300h | X | α+10100h | X | α+13400h | X |
| Start PSN of terminator of layer 1 | $\overline{α+4A00h}$ | $\overline{X}$ | $\overline{α+6000h}$ | $\overline{X}$ | $\overline{α+7900h}$ | $\overline{X}$ |

F I G. 72

Type selection for track #i+1
Case that type1 physical segments are selected in the track #i+1
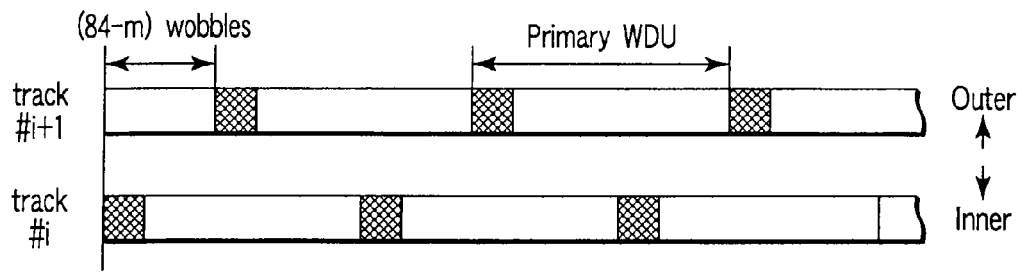
F I G. 73A
Case that type2 physical segments are selected in the track #i+1
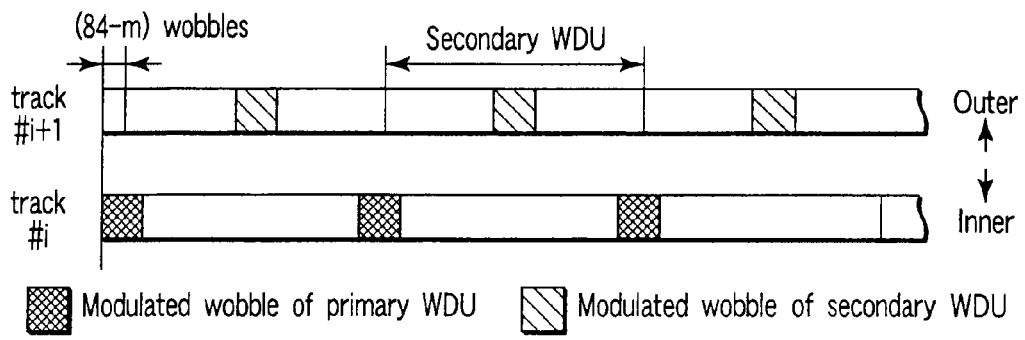
F I G. 73B

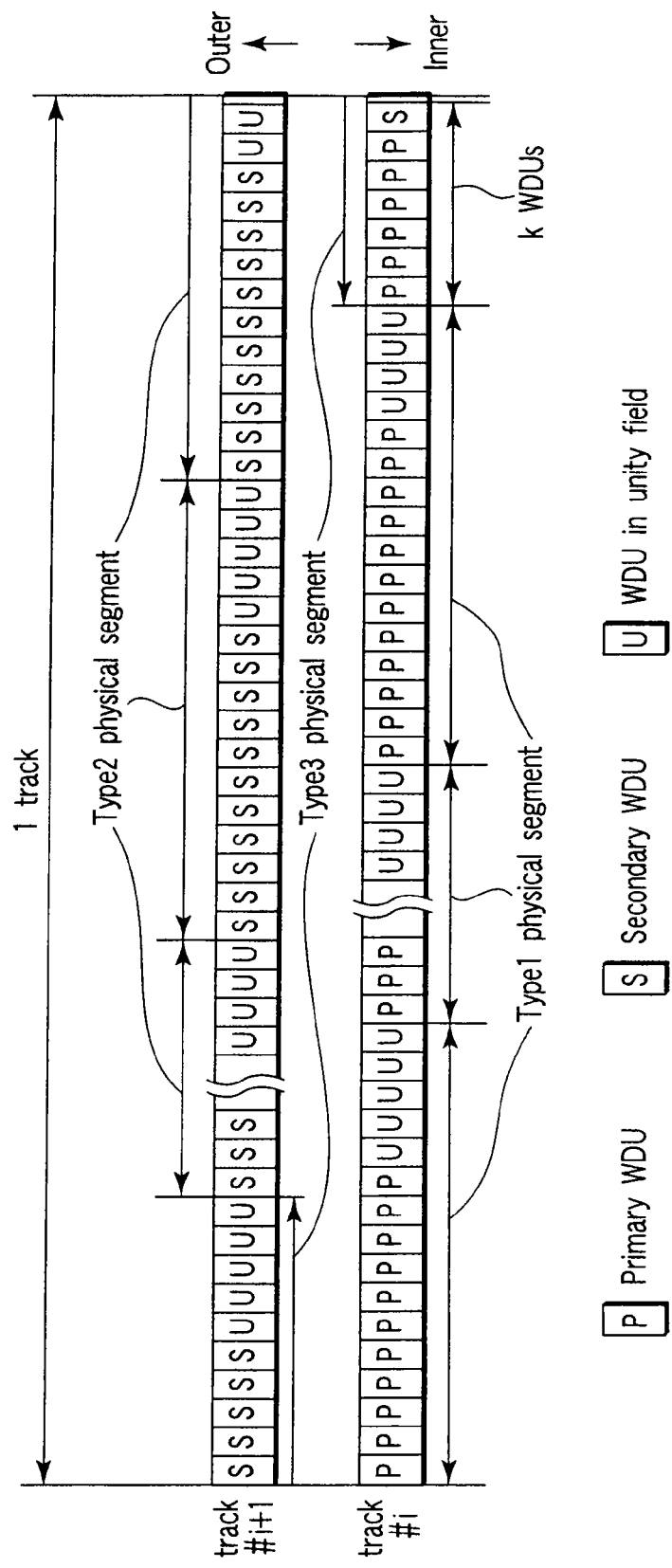
F I G. 74

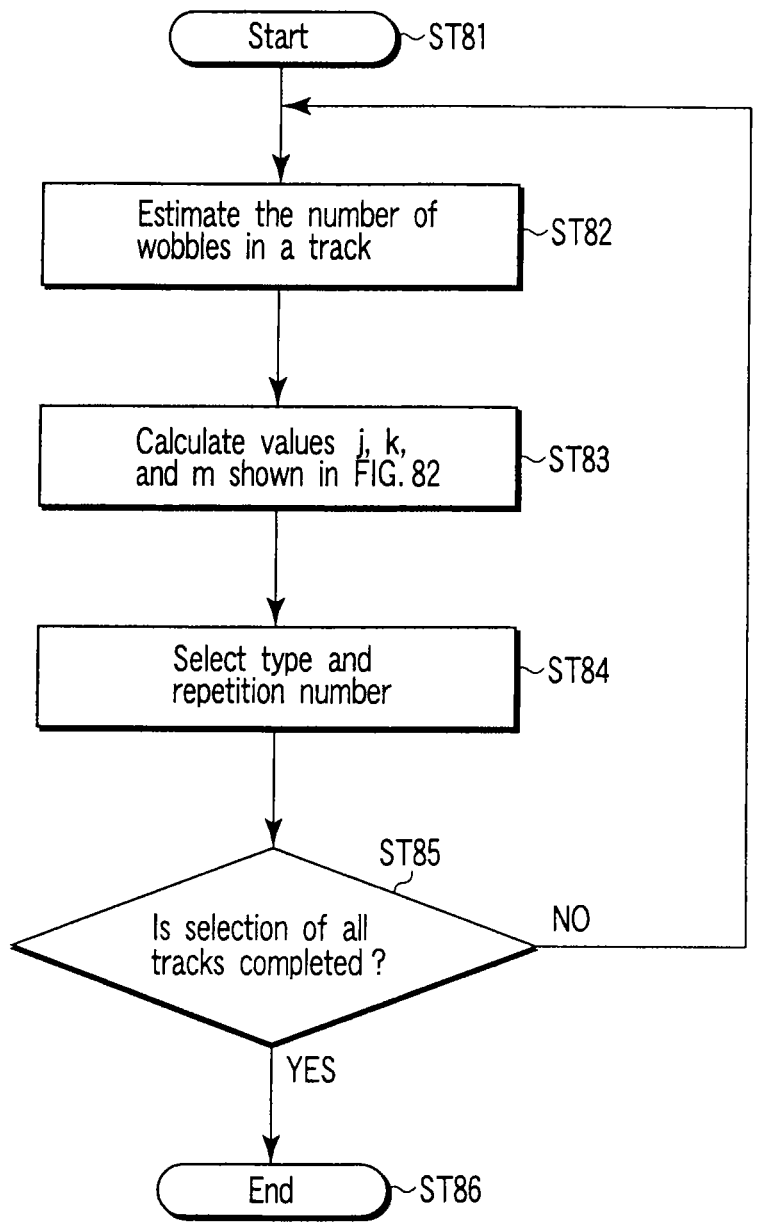
F I G. 75

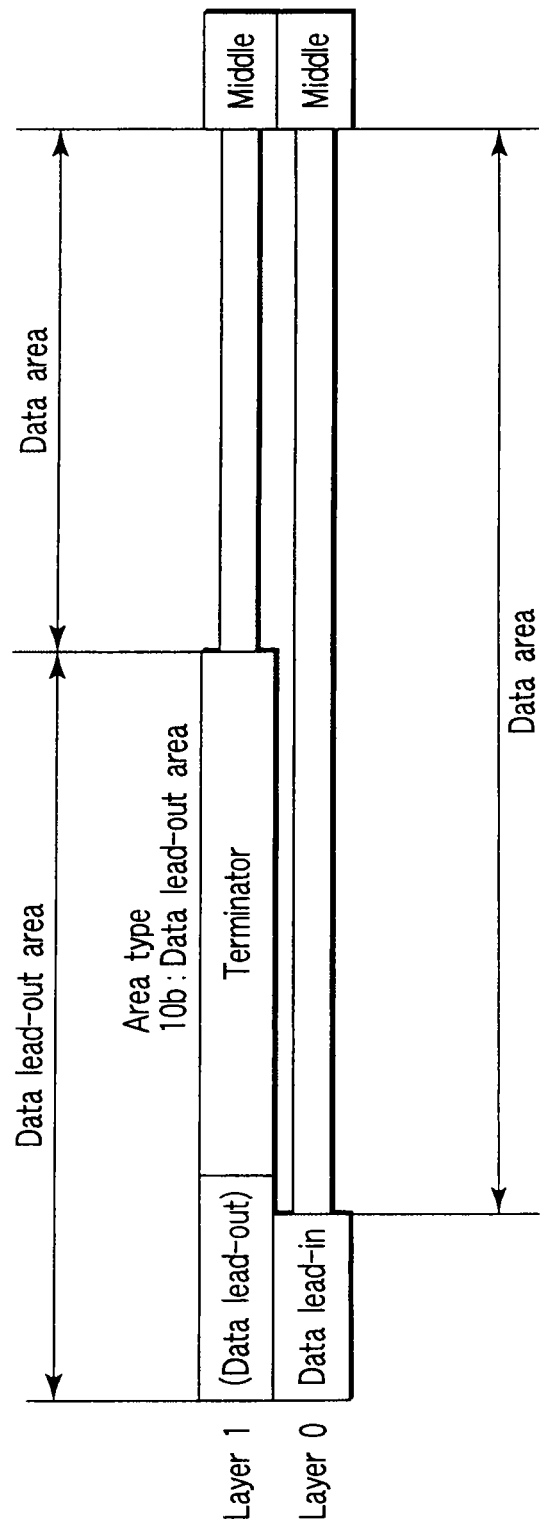
F I G. 77

INFORMATION STORAGE MEDIUM, RECORDING METHOD, AND RECORDING APPARATUS

CROSS-REFERENCE TO RELATED APPLICATIONS

This application is a divisional of U.S. application Ser. No. 11/668,835, filed Jan. 30, 2007 and claims the benefit of priority from Japanese Patent Applications No. 2006-023924, filed Jan. 31, 2006; and No. 2006-126241, filed Apr. 28, 2006, the entire contents of each of which are incorporated herein by reference.

BACKGROUND

1. Field

One embodiment of the invention relates to an information storage medium such as a recordable optical disc, a recording method, and a recording apparatus.

2. Description of the Related Art

In recent years, a digital versatile disc (DVD) has been practically used as a large-capacity optical disc. As a recordable DVD, a recordable DVD-R, a rewritable DVD-RW, and a DVD-RAM have been standardized. Once information is recorded on a recordable disc DVD-R, a recorded area cannot be rewritten. A conventional recordable DVD-R includes a power calibration area (PCA), a recording management area (RMA), and a data recording area (DA) in which an actual recording process is executed from the inner circumference side (for example, see Jpn. Pat. Appln. KOKAI Publication No. 2002-245625 (paragraphs 0041 to 0052, FIG. 1)).

Furthermore, the data recording area DA includes a lead-in area in which recording parameter information and the like to be read when recording data is reproduced from a data area, a data area in which the recording data is recorded, and a lead-out area in which end information or the like to be read when reproducing of the recording data recorded in the data area is ended is recorded. The lead-in area is an area in which recording parameter information or the like is recorded before data is recorded in the data area. The lead-out area is an area in which end information is recorded before recording of recording data on an entire DVD is completed. The capacity of each area is predetermined and unchangeable.

When information is recorded on such a DVD (recording is performed from the inner circumference side of the data area), test recording is performed in the PCA area first. In this test recording, because the characteristics of optical discs of the same type vary depending on manufacturers and because of temperatures of a use environment, an operational environment of a laser, and the like, an optimal recording waveforms vary. Therefore, parameters (intensities, pulse widths, and the like) of the recording waveforms used when information is recorded on the optical disc are adjusted by a result of the test recording.

Thereafter, management information and user data are recorded in the RMA area and the data area, respectively. The management information includes information or the like representing a specific recorded area (record-end position) in the data area. Depending on the progress of recording of user data, the management information is updated into the latest management information. Since the part cannot be rewritten on the recordable DVD once information is recorded, a remaining capacity of the RMA area decreases each time the management information is updated. Depending on a method of updating management information, before recording in the entire area of the data area is completed, the RMA area may not have any more unrecorded areas. When the RMA area does not have an unrecorded area, the management information cannot be updated. Therefore, a recording operation for the data area must be stopped.

On the other hand, in the DVD device described above, a recording waveform changes. Depending on a recording position on a disc, an optimum recording waveform changes due to a change in temperature or aging. In order to adjust the recording waveform depending on these changes, in the DVD device, test recording is performed in the PCA area to adjust parameters of the recording waveform. Like the updating of the management information, each time the test recording is performed, the remaining capacity of the PCA area decreases. Depending on ways of executing the test recording, the PCA area may not have any more unrecorded areas before recording in the entire area of the data area is completed. When there is no unrecorded area in the PCA area, a recording operation must be stopped, or the user data and the management information must be recorded without adjusting the recording waveform. Sufficiently reliable information cannot be reproduced from a part on which the information is recorded with an unadjusted recording waveform.

In order to prevent shortage of the RMA area or shortage of the PCA area, the large capacity of the RMA area or the PCA area may be reserved in advance. However, in this case, the capacity of the data area reduces. As a result, even though the unrecorded areas in the RMA area and the PCA area sufficiently remain, the capacity of the data area may not be large enough.

On the other hand, in order to increase a recording capacity, the standards of a next-generation DVD in which the diameter of a beam spot is narrowed by shortening the wavelength of a laser beam or increasing a numerical aperture NA to increase a recording capacity have been proposed. As a method of increasing a recording capacity, a single-sided multilayer storage medium is also proposed. That is, in addition to the narrowing down of the beam spot, a plurality of recording layers are formed on one side of a disc, an objective lens is moved in an optical-axis direction to focus the beam on the respective layers, so that recording and reproducing can be performed on the respective recording layers (for example, see Jpn. Pat. Appln. KOKAI Publication No. 2004-206849 (paragraphs 0036 to 0041, FIG. 1)).

The single-sided multilayer storage medium has a problem called interlayer crosstalk which does not occur in a single-sided single-layer storage medium. For descriptive simplification, a dual layer medium will be exemplified. On a single-sided dual layer storage medium, a laser beam is focused on the respective layers from a single read surface. A layer which is close to the read surface is called layer 0, and a layer which is far from the read surface is called layer 1. When the beam is focused on each layer, some laser beam is irradiated on a layer except for a target layer. Therefore, a reflected beam from the layer except for the target layer is mixed with a reproducing signal at the time of reproducing, interlayer crosstalk occurs. The interlayer crosstalk causes a problem not only at the time of reproducing but also at the time of recording.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 4A and 4B are exemplary views each showing comparison of shapes of recording films formed in a pre-pit area or a pre-groove area 10 in the phase shift recording film and the organic dye recording film;

FIGS. 5A and 5B are exemplary views each showing a specific plastic deformation state of a transparent substrate 2-2 at a position of a recording mark 9 in a write-once type information storage medium using a conventional organic dye material;

FIG. 8 is an exemplary view illustrating one embodiment of an information recording/reproducing apparatus according to the present invention;

FIG. 13 is an exemplary general structural formula of a cyanine dye utilized for a cation portion of the "L-H" recording film;

FIGS. 16A, 16B, 16C and 16D are exemplary views each showing another embodiment which is different from FIGS. 17A, 17B, 17C and 17D are exemplary views each illustrating a structure of a border area in the write-once type information storage medium;

FIGS. 18A, 18B, 18C and 18D are exemplary views each showing an internal data structure of a control data zone CDZ and an R physical information zone RIZ;

FIG. 19 is an exemplary view showing a comparison of the contents of detailed information recorded in allocation place information on a data area DTA;

FIG. 20 is an exemplary view showing an update condition of recording position management data RMD;

FIGS. 23A, 23B, 23C and 23D are exemplary views illustrating a comparison in positional relationship between a wobble sync pattern and an inside of a wobble data unit;

FIGS. 24A, 24B, 24C, and 24D are exemplary view relating to an internal data structure of wobble address information in a write-once type information storage medium;

FIG. 25 is an exemplary view illustrating a setting location of a modulation area on the write-once type information storage medium;

FIGS. 26A, 26B, 26C and 26D are exemplary views each illustrating a setting location of a modulation area in a physical segment on the write-once type information storage medium;

FIG. 31 shows an exemplary sectional view of a dual layer recordable disc according to a second embodiment of the present invention;

FIG. 36 shows an exemplary view showing general parameters of write-once recording medium;

FIG. 40 shows an exemplary view showing the physical sector layout and numbering;

FIG. 41 shows an exemplary view showing the layout of address field in WAP (Wobble Address in Periodic position);

FIG. 42 shows an exemplary view showing the primary WDU (Wobble Data Unit) in sync field;

FIG. 43 shows an exemplary view showing the primary WDU in address field;

FIG. 44 shows an exemplary view showing the secondary WDU in sync field;

FIG. 45 shows an exemplary view showing the secondary WDU in address field;

FIG. 46 shows an exemplary view showing the WDU in unity field;

FIG. 50 shows an exemplary view showing the physical format information;

FIG. 51 shows an exemplary view showing the data area allocation;

FIG. 52 shows an exemplary view showing the layout of the RMD (Recording Management Data) duplication zone;

FIG. 53 shows an exemplary view showing the data structure of the recording management data;

FIG. 54 shows an exemplary view showing the RMD field 0;

FIG. 55 shows an exemplary view showing the data area allocation;

FIG. 56 shows an exemplary view showing the renewed data area allocation;

FIG. 57 shows an exemplary view showing the drive test zone;

FIG. 58 shows an exemplary view showing the RMD field 1 (part 1);

FIG. 59 shows an exemplary view showing the RMD field 1 (part 2);

FIG. 60 shows an exemplary view showing the RMD field 4;

FIG. 61 shows an exemplary view showing the RMD field 5 to RMD field 21;

FIG. 62 shows an exemplary view showing the structure of a physical sector block in a R-physical format information zone;

FIG. 63 shows an exemplary view showing the physical format information;

FIGS. 71A and 71B show exemplary views showing the schematic of two adjacent tracks;

FIG. 72 shows an exemplary view showing start PSN and end PSN of the terminator;

FIGS. 73A and 73B show exemplary views showing a type selection for track #i+1;

FIG. 74 shows an exemplary view showing an example of the case that the type3 physical segment is selected;

FIG. 75 shows an exemplary view showing an example of the procedure to select the type of the physical segment;

FIG. 77 shows an exemplary view showing the example of final area structure for recording user data on Layer 1;

DETAILED DESCRIPTION

Various embodiments according to the invention will be described hereinafter with reference to the accompanying drawings. In general, according to one embodiment of the invention, an information recording method which records information on an information storage medium in which layer 0 and layer 1 are sequentially arranged as recording layers from a read surface; a system lead-in area, a data lead-in area, a data area, and a middle area are sequentially arranged from an inner circumference of the layer 0; a system lead-out area, a data lead-out area, a data area, and a middle area are sequentially arranged from an inner circumference of the layer 1; a guard track zone is arranged on a side of the data area in the data lead-out area; and a reference code zone, an R physical format information zone, a recording management zone, and a drive test zone are arranged in the data lead-in area of the layer 0 corresponding to the guard track zone, the method comprises padding of the guard track zone of the data lead-out area is performed after padding of the drive test zone of data lead-in area and recording of the recording management zone, the reference code zone of the data lead-in area, and the R physical format information zone of the data lead-in area.

Hereinafter, embodiments of a recording medium and a method for recording and reproducing the recording medium according to the invention will be described with reference to the accompanying drawings.

Summary of Characteristics and Advantageous Effect of the Invention

1) Relationship between track pitch/bit pitch and optimal recording power:

Conventionally, in the case of a principle of recording with a substrate shape change, if a track pitch is narrowed, a "cross-write" or a "cross-erase" occurs, and if bit pitches are narrowed, an inter-code crosstalk occurs. As in the present embodiment, since a principle of recording without a substrate shape change is devised, it becomes possible to achieve high density by narrowing track pitches/bit pitches. In addition, at the same time, in the above described principle of recording, recording sensitivity is improved, enabling high speed recording and multi-layering of a recording film because optimal recording power can be lowly set.

Figure 1A:
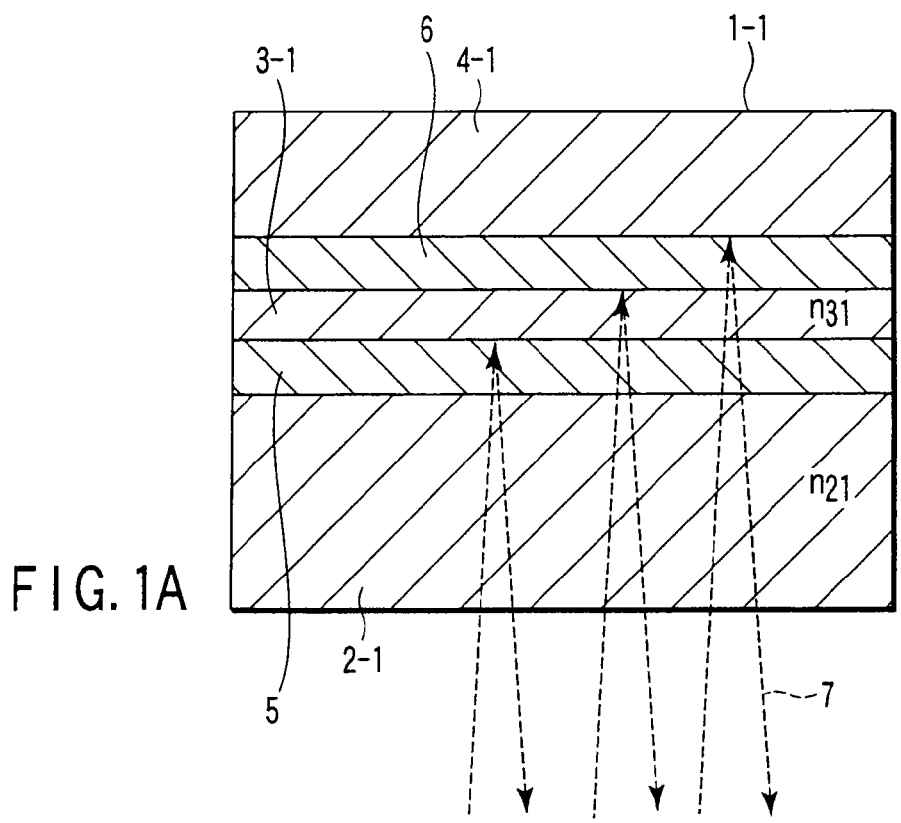
FIGS. 1A and 1B are exemplary views showing a standard phase shift recording film structure and an organic dye recording film structure.
Figure 1B:
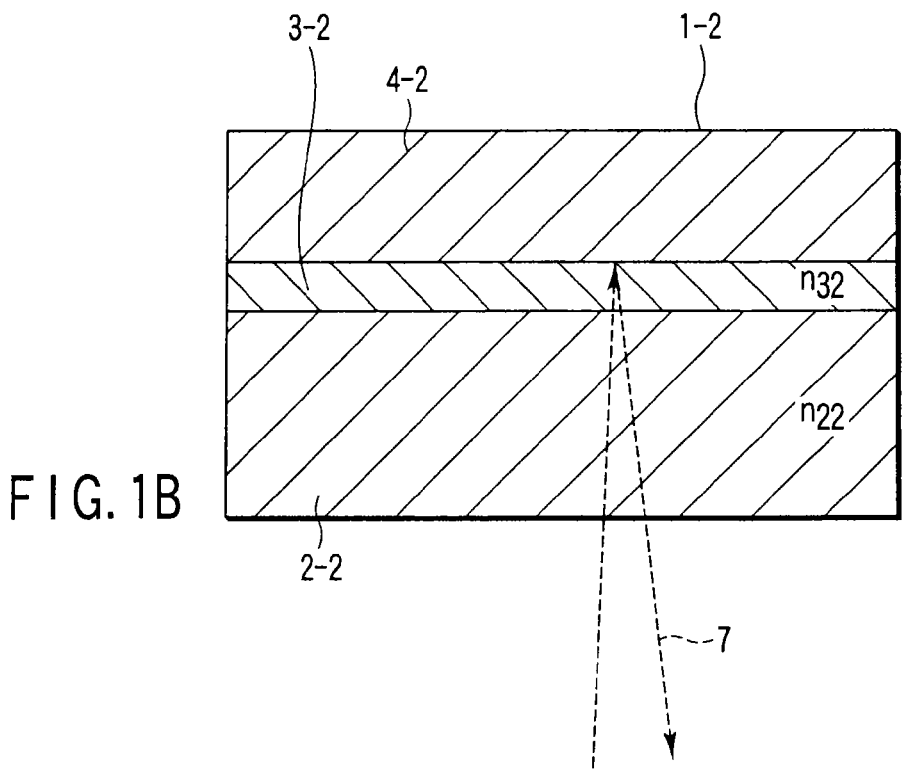

2) In optical recording with a wavelength of 620 nm or less, an ECC block is composed of a combination of a plurality of small ECC blocks and each item of data ID information in two sectors is disposed in a small ECC block which is different from another:

According to the invention, as shown in FIG. 1B, a local optical characteristic change in a recording layer 3-2 is a principle of recording, and thus, an arrival temperature in the recording layer 3-2 at the time of recording is lower than that in the conventional principle of recording due to plastic deformation of a transparent substrate 2-2 or due to thermal decomposition or gasification (evaporation) of an organic dye recording material. Therefore, a difference between an arrival temperature and a recording temperature in a recording layer 3-2 at the time of playback is small. In the present embodiment, an interleaving process between small ECC blocks and data ID allocation are contrived in one ECC block, thereby improving reproduction reliability in the case where a recording film is degraded at the time of repetitive playback.

3) Recording is carried out by light having a wavelength which is shorter than 620 nm, and a recorded portion has a higher reflection factor than a non-recording portion:

Under the influence of absorption spectrum characteristics of a general organic dye material, under the control of light having a wavelength which is shorter than 620 nm, the light absorbance is significantly lowered, and recording density is lowered. Therefore, a very large amount of exposure is required to generate a substrate deformation which is a principle of recording in a conventional DVD-R. By employing an "Low to High (hereinafter, abbreviated to as L-H) organic dye recording material" whose reflection factor is increased more significantly than that of an unrecorded portion in a portion (recording mark) recorded as in the present embodiment, a substrate deformation is eliminated by forming a recording mark using a "discoloring action due to dissociation of electron coupling", and recording sensitivity is improved.

4) "L-H" organic dye recording film and PSK/FSK modulation wobble groove:

Wobble synchronization at the time of playback can be easily obtained, and reproduction reliability of a wobble address is improved.

5) "L-H" organic dye recording film and reproduction signal modulation degree rule:

A high C/N ratio relating to a reproduction signal from a recording mark can be ensured, and reproduction reliability from the recording mark is improved.

6) Light reflection factor range in "L-H" organic dye recording film and mirror section:

A high C/N ratio relating to a reproduction signal from a system lead-in area SYLDI can be ensured and high reproduction reliability can be ensured.

7) "L-H" organic dye recording film and light reflection factor range from unrecorded area at the time of on-track:

A high C/N rate relating to a wobble detection signal in an unrecorded area can be ensured, and high reproduction reliability relevant to wobble address information can be ensured.

8) "L-H" organic dye recording film and wobble detection signal amplitude range:

A high C/N ratio relating to a wobble detection signal can be ensured and high reproduction reliability relevant to wobble address information can be ensured.

<<Table of Contents>>

Chapter 0: Description of Relationship between Wavelength and the Present Embodiment Wavelength used in the present embodiment.

Chapter 1: Description of Combination of Constituent Elements of Information Storage Medium in the Present Embodiment:

Chapter 2: Description of Difference in reproduction signal between Phase Change Recording Film and Organic Dye Recording Film 2-1) Difference in Principle of Recording/Recording Film and Difference in Basic Concept Relating to Generation of Reproduction Signal . . . . Definition of $\lambda_{max\ write}$ 2-2) Difference of Light Reflection Layer Shape in Pre-pit/Pre-groove Area Optical reflection layer shape (difference in spin coating and sputtering vapor deposition) and influence on a reproduction signal.

Chapter 3: Description of Characteristics of Organic Dye Recording Film in the Present Embodiment 3-1) Problem(s) relevant to achievement of high density in write-once type recording film (DVD-R) using conventional organic dye material 3-2) Description of basic characteristics common to organic dye recording films in the present embodiment:

Lower limit value of recording layer thickness, channel bit length/track pitch in which advantageous effect is attained in the invention, repetitive playback enable count, optimal reproduction power, Rate between groove width and land width . . . Relationship with wobble address format Relationship in recording layer thickness between groove section and land section Technique of improving error correction capability of recording information and combination with PRML 3-3) Recording characteristics common to organic dye recording films in the present embodiment Upper Limit Value of Optimal Recording Power 3-4) Description of characteristics relating to a "High to Low (hereinafter, abbreviated to as H-L)" recording film in the present embodiment:

Upper limit value of reflection factor in unrecorded layer

Relationship between a value of $\lambda_{max\ write}$ and a value of $\lambda l_{max}$ (absorbance maximum wavelength at unrecorded/recorded position)

Relative values of reflection factor and degree of modulation at unrecorded/recorded position and light absorption values at reproduction wavelength . . . n·k range Relationship in upper limit value between required resolution characteristics and recording layer thickness Chapter 4: Description of Reproducing Apparatus or Recording/Reproducing Apparatus and Recording Condition/Reproducing Circuit 4-1) Description of structure and characteristics of reproducing apparatus or recording/reproducing apparatus in the present embodiment: Use wavelength range, NA value, and RIM intensity 4-2) Description of reproducing circuit in the present embodiment 4-3) Description of recording condition in the present embodiment Chapter 5: Description of Specific Embodiments of Organic Dye Recording Film in the Present Embodiment 5-1) Description of characteristics relating to "L-H" recording film in the present embodiment Principle of recording and reflection factor and degree of modulation at unrecorded/recorded position 5-2) Characteristics of light absorption spectra relating to "L-H" recording film in the present embodiment:

Condition for setting maximum absorption wavelength $\lambda_{max\ write}$, value of $Al_{405}$ and a value of $Ah_{405}$ 5-3) Anion portion: Azo metal complex+cation portion: Dye 5-4) Use of "copper" as azo metal complex+main metal:

Light absorption spectra after recorded are widening in an "H-L" recording film, and are narrowed in an "L-H" recording film.

Upper limit value of maximum absorption wavelength change amount before and after recording:

A maximum absorption wavelength change amount before and after recording is small, and absorbance at a maximum absorption wavelength changes.

Chapter 6: Description Relating to Pre-groove shape/pre-pit shape in coating type organic dye recording film and on light reflection layer interface 6-1) Light reflection layer (material and thickness):

Thickness range and passivation structure . . . Principle of recording and countermeasures against degradation (Signal is degraded more easily than substrate deformation or than cavity)

6-2) Description relating to pre-pit shape in coating type organic dye recording film and on light reflection layer interface:

Advantageous effect achieved by widening track pitch/channel bit pitch in system lead-in area:

Reproduction signal amplitude value and resolution in system lead-in area:

Rule on step amount at land portion and pre-pit portion in light reflection layer 4-2:

6-3) Description relating to pre-groove shape in coating type organic dye recording film and on light reflection layer interface:

Rule on step amount at land portion and pre-groove portion in light reflection layer 4-2:

Push-pull signal amplitude range:

Wobble signal amplitude range (combination with wobble modulation system)

Chapter 7: Description of First Next-Generation Optical Disc: HD DVD System (Hereinafter, Referred to as H Format):

Principle of recording and countermeasure against reproduction signal degradation (Signal is degraded more easily than substrate deformation or than cavity):

Error Correction Code (ECC) structure, PRML (Partial Response Maximum Likelihood) System:

Relationship between a wide flat area in the groove and wobble address format.

In the write-once recording, overwriting is carried out in a VFO area which is non-data area.

Influence of DC component change in overwrite area is reduced. In particular, advantageous effect on "L-H" recording film is significant.

Now, a description of the present embodiment will be given here.

Chapter 0: Description of Relationship between Use Wavelength and the Present Embodiment As a write-once type optical disc obtained by using an organic dye material for a recording medium, there has been commercially available a CD-R disc using a recording/reproducing laser light source wavelength of 780 nm and a DVD-R disc using a recording/reproducing laser light beam wavelength of 650 nm. Further, in a next-generation write-once type information storage medium having achieved high density, it is proposed that a laser light source wavelength for recording or reproducing, which is close to 405 nm (namely, in the range of 355 nm to 455 nm), is used in either of H format (D1) and B format (D2). In a write-once type information storage medium using an organic dye material, recording/reproducing characteristics sensitively changes due to a slight change of a light source wavelength. In principle, density is increased in inverse proportion to a square of a laser light source wavelength for recording/reproducing, and thus, it is desirable that a shorter laser light source wavelength be used for recording/reproducing. However, for the above described reason, an organic dye material utilized for a CD-R disc or a DVD-R disc cannot be used as a write-once type information storage medium for 405 nm. Moreover, because 405 nm is close to an ultraviolet ray wavelength, there can easily occur a disadvantage that a recording material "which can be easily recorded with a light beam of 405 nm", is easily changed in characteristics due to ultraviolet ray irradiation, lacking a long period stability. Characteristics are significantly different from each other depending on organic dye materials to be used, and thus, it is difficult to determine the characteristics of these dye materials in general.

As an example, the foregoing characteristics will be described by way of a specific wavelength. With respect to an organic dye recording material optimized with a light beam of 650 nm in wavelength, the light to be used becomes shorter than 620 nm, recording/reproducing characteristics significantly change. Therefore, in the case where a recording/reproducing operation is carried out with a light beam which is shorter than 620 nm in wavelength, there is a need for new development of an organic dye material which is optimal to a light source wavelength of recording light or reproducing light. An organic dye material of which recording can be easily carried out with a light beam shorter than 530 nm in wavelength easily causes characteristic degradation due to ultraviolet ray irradiation, lacking long period stability. In the present embodiment, a description will be given with respect to an embodiment relevant to an organic recording material suitable to use in close to 405 nm. Namely, a description will be given with respect to an embodiment relating to an organic recording material which can be stably used in the range of 355 nm to 455 nm in consideration of a fluctuation of a light emitting wavelength which depends on manufacturers of semiconductor laser light sources. That is, the scope of the present embodiment corresponds to a light beam which is adapted to a light source of 620 nm in wavelength, and desirably, which is shorter than 530 nm in wavelength (ranging from 355 nm to 455 nm in a definition in the narrowest range).

In addition, the optical recording sensitivity due to light absorption spectra of an organic dye material is also influenced by a recording wavelength. An organic dye material suitable for long period stability is easily reduced in light absorbance relevant to a light beam which is shorter than 620 nm in wavelength. In particular, the light absorbance is significantly lowered with respect to a light beam which is shorter than 620 nm in wavelength, and in particular, is drastically reduced with respect to a light beam which is shorter than 530 nm in wavelength. Therefore, in the case where recording is carried out with a laser light beam ranging from 355 nm to 455 nm in wavelength, which is the severest condition, recording sensitivity is impaired because the light absorbance is low, and there is a need for a new design employing a new principle of recording as shown in the present embodiment.

The size of a focusing spot used for recording or reproducing application is reduced in proportion to a wavelength of a light beam to be used. Therefore, from only a standpoint of the focusing spot size, in the case where a wavelength is reduced to the above described value, an attempt is made to reduce a track pitch or channel bit length by a wavelength component with respect to a current DVD-R disc (use wavelength: 650 nm) which is a conventional technique. However, as described later in "3-2-A] Scope requiring application of technique according to the present embodiment", as long as a principle of recording in a conventional write-once type information storage medium such as a DVD-R disc is used, there is a problem that a track pitch or a channel bit length cannot be reduced. A track pitch or a channel bit length can be reduced in proportion to the above described wavelength by utilizing a technique devised in the present embodiment described below.

Chapter 1: Description of Combination of Constituent Elements of Information Storage Medium in the Present Embodiment In the present embodiment, there exists a great technical feature in that an organic recording medium material (organic dye material) adapted to a light source of 620 nm or less in wavelength has been devised. Such an organic recording medium (organic dye material) has a unique characteristic (Low to High characteristic) that a light reflection factor increases in a recording mark, which does not exist in a conventional CD-R disc or a DVD-R disc. Therefore, a technical feature of the present embodiment and a novel effect attained thereby occurs in a structure, dimensions, or format (information recording format) combination of the information storage medium which produces more effectively the characteristics of the organic recording material (organic dye materials) shown in the present embodiment. The information storage medium in the present embodiment has the following constituent elements:

A] an organic dye recording film;

B] a pre-format (such as pre-groove shape/dimensions or pre-pit shape/dimensions);

C] a wobble condition (such as wobble modulation method and wobble change shape, wobble amplitude, and wobble allocating method); and D] a format (such as format for recording data which is to be recorded or which has been recorded in advance in information storage medium).

Specific embodiments of constituent elements are as follows:

A1) maximum absorption wavelength $\lambda_{max}$

A2) recording mark polarity

A3) azo metal complex+Cu

A4) azo metal complex: anion+dye: cation

A5) arbitrary coat-type recording film

B1) pre-groove shape (for track pitch)

B2) pre-pit shape (for track pitch)

B3) arbitrary groove shape and arbitrary pit shape

C1) PSK

C2) FSK

C3) STW

C4) arbitrary modulation system

C5) wobble amplitude amount

C6) arbitrary amplitude amount

D1) write-once recording method

D2) H format

D3) B format

D4) another format

D5) arbitrary recording method and a format in a write-once medium.

Hereinafter, a description will be given with respect to a combination state of individual embodiments at a stage of explaining the embodiments. With respect to constituent elements, which do not specify a combination, it denotes that the following characteristics are employed:

A5) an arbitrary coat-type recording film;

B3) an arbitrary groove shape and an arbitrary pit shape;

C4) an arbitrary modulation system;

C6) an arbitrary amplitude amount; and

D5) an arbitrary recording method and a format in a write-once medium.

Chapter 2: Description of Difference in Reproduction Signal Between Phase Change Recording Film and Organic Dye Recording Film 2-1) Difference in Principle of Recording/Recording Film and Difference in Basic Concept Relating to Generation of Reproduction Signal FIG. 1A shows a standard phase change recording film structure (mainly used for a rewritable-type information storage medium), and FIG. 1B shows a standard organic dye recording film structure (mainly used for a write-once type information storage medium). In the description of the present embodiment, a whole recording film structure excluding transparent substrates 2-1 and 2-2 shown in FIGS. 1A and 1B (including light reflection layers 4-1 and 4-2) is defined as a "recording film", and is discriminated from recording layers 3-1 and 3-2 in which a recording material is disposed. With respect to a recording material using a phase change, in general, an optical characteristic change amount in a recorded area (in a recording mark) and an unrecorded area (out of a recording mark) is small, and thus, there is employed an enhancement structure for enhancing a relative change rate of a reproduction signal. Therefore, in a phase change recording film structure, as shown in FIG. 1A, an undercoat intermediate layer 5 is disposed between the transparent substrate 2-1 and a phase change type recording layer 3-1, and an upper intermediate layer 6 is disposed between the light reflection layer 4-2 and the phase change type recording layer 3-1. In the invention, as a material for the transparent substrates 2-1 and 2-2, there is employed a polycarbonate PC or an acrylic PMMA (poly methyl methacrylate) which is a transparent plastic material. A center wavelength of a laser light beam 7 used in the present embodiment is 405 nm, and refractive index $n_{21}$, $n_{22}$ of the polycarbonate PC at this wavelength is close to 1.62.

Standard refractive index $n_{31}$ and absorption coefficient $k_{31}$ in 405 nm at GeSbTe (germanium antimony tellurium) which is most generally used as a phase change type recording material are $n_{31} \cong 1.5$ and $k_{31} \cong 2.5$ in a crystalline area, whereas they are $n_{31} \cong 2.5$ and $k_{31} \cong 1.8$ in an amorphous area. Thus, a refractive index (in the amorphous area) of a phase change type recording medium is different from a refractive index of the transparent substrate 2-1, and reflection of a laser light beam 7 on an interface between the layers is easily occurred in a phase change recording film structure. As described above, for the reasons why (1) a phase change recording film structure takes an enhancement structure; and (2) a refractive index difference between the layers is great or the like, a light reflection amount change at the time of reproduction from a recording mark recorded in a phase change recording film (a differential value of a light reflection amount from a recording mark and a light reflection amount from an unrecorded area) can be obtained as an interference result of multiple reflection light beams generated on an interface between the undercoat intermediate layer 5, the recording layer 3-1, the upper intermediate layer 6, and the light reflection layer 4-2. In FIG. 1A, although the laser light beam 7 is apparently reflected on an interface between the undercoat intermediate layer 5 and the recording layer 3-1, an interface between the recording layer 3-1 and the upper intermediate layer 6, and an interface between the upper intermediate layer 6 and the light reflection layer 4-2, in actuality, a reflection light amount change is obtained as an interference result between a plurality of multiple reflection light beams.

In contrast, an organic dye recording film structure takes a very simple laminate structure made of an organic dye recording layer 3-2 and a light reflection layer 4-2. An information storage medium (optical disc) using this organic dye recording film is called a write-once type information storage medium, which enables only one time of recording. However, unlike a rewritable-type information storage medium using the phase change recording medium, this medium cannot carry out an erasing process or a rewriting process of information which has been recorded once. A refractive index at 405 nm of a general organic dye recording material is often close to $n_{32} \cong 1.4$ ($n_{32}$=1.4 to 1.9 in the refractive index range at 405 nm of a variety of organic dye recording materials) and an absorption coefficient is often close to $k_{32} \cong 0.2$ ($k_{32} \cong 0.1$ to 0.2 in the absorption coefficient range at 405 nm of a variety of organic dye recording materials). Because a refractive index difference between the organic dye recording material and the transparent substrate 2-2 is small, there hardly occurs a light reflection amount on an interface between the recording layer 3-2 and the transparent substrate 2-2. Therefore, an optical reproduction principle of an organic color recording film (reason why a reflection light amount change occurs) is not "multiple interference" in a phase change recording film, and a main factor is a "light amount loss (including interference) midway of an optical path with respect to the laser light beam 7 which comes back after being reflected in the light reflection layer 4-2". Specific reasons which cause a light amount loss midway of an optical path include an "interference phenomenon due to a phase difference partially caused in the laser light 7" or an "optical absorption phenomenon in the recording layer 3-2". The light reflection factor of the organic dye recording film in an unrecorded area on a mirror surface on which a pre-groove or a pre-pit does not exist is featured to be simply obtained by a value obtained by subtracting an optical absorption amount when the recording layer 3-2 is passed from the light reflection factor of the laser light beam 7 in the light reflection layer 4-2. As described above, this film is different from a phase change recording film whose light reflection factor is obtained by calculation of "multiple interference".

Light fastness of a recording film (organic dye recording film) of the disc (High Density recordable DVD (HD DVD-R)) using a blue light laser having a wavelength λ of 405 nm will be described. The light fastness of the HD DVD-R is tested by a device an air cooling xenon lamp which are in accordance with ISO-105-B02. In ISO-105-B02, a temperature of a black panel is not higher than 40° C. and a relative humidity is 70 to 80%. A testing laser beam is irradiated onto the disk in a perpendicular direction from the top. When all conditions after test are satisfied, the disc is regarded as a proofed disc.

First, a description will be given with respect to a principle of recording, which is used in a current DVD-R disc as a conventional technique. In the current DVD-R disc, when a recording film is irradiated with the laser light beam 7, the recording layer 3-2 locally absorbs energy of the laser light beam 7, and becomes hot. If a specific temperature is exceeded, the transparent substrate 2-2 is locally deformed. Although a mechanism, which induces deformation of the transparent substrate 2-2, is different depending on manufacturers of DVD-R discs, it is said that this mechanism is caused by:

1) local plastic deformation of the transparent substrate 2-2 due to gasification energy of the recording layer 3-2; and 2) transmission of a heat from the recording layer 3-2 to the transparent substrate 2-2 and local plastic deformation of the transparent substrate 2-2 due to the heat.

If the transparent substrate 2-2 is locally plastically deformed, there changes an optical distance of the laser light beam 7 reflected in the light reflection layer 4-2 through the transparent substrate 2-2, the laser light beam 7 coming back through the transparent substrate 2-2 again. A phase difference occurs between the laser light beam 7 from a recording mark, the laser light beam coming back through a portion of the locally plastically deformed transparent substrate 2-2, and a laser light beam 7 from the periphery of the recording mark, the laser light beam coming back through a portion of a transparent substrate 2-2 which is not deformed, and thus, a light amount change of reflection light beam occurs due to interference between these light beams. In addition, in particular, in the case where the above described mechanism of (1) has occurred, a change of a substantial refractive index $n_{32}$ produced by cavitations of the inside of the recording mark in the recording layer 3-2 due to gasification (evaporation), or alternatively, a change of a refractive index $n_{32}$ produced due to thermal decomposition of an organic dye recording material in the recording mark, also contributes to the above described occurrence of a phase difference. In the current DVD-R disc, until the transparent substrate 2-2 is locally deformed, there is a need for the recording layer 3-2 becoming hot (i.e., at a gasification temperature of the recording layer 3-2 in the above described mechanism of (1) or at an internal temperature of the recording layer 3-2 required for plastically reforming the transparent substrate 2-2 in the mechanism of (2)) or there is a need for a part of the recording layer 3-2 becoming hot in order to cause thermal decomposition or gasification (evaporation). In order to form a recording mark, there is a need for large amount of power of the laser light beam 7.

In order to form the recording mark, there is a necessity that the recording layer 3-2 can absorb energy of the laser light beam 7 at a first stage. The light absorption spectra in the recording layer 3-2 influence the recording sensitivity of an organic dye recording film. A principle of light absorption in an organic dye recording material which forms the recording layer 3-2 will be described with reference to (A3) of the present embodiment.

Figure 2:
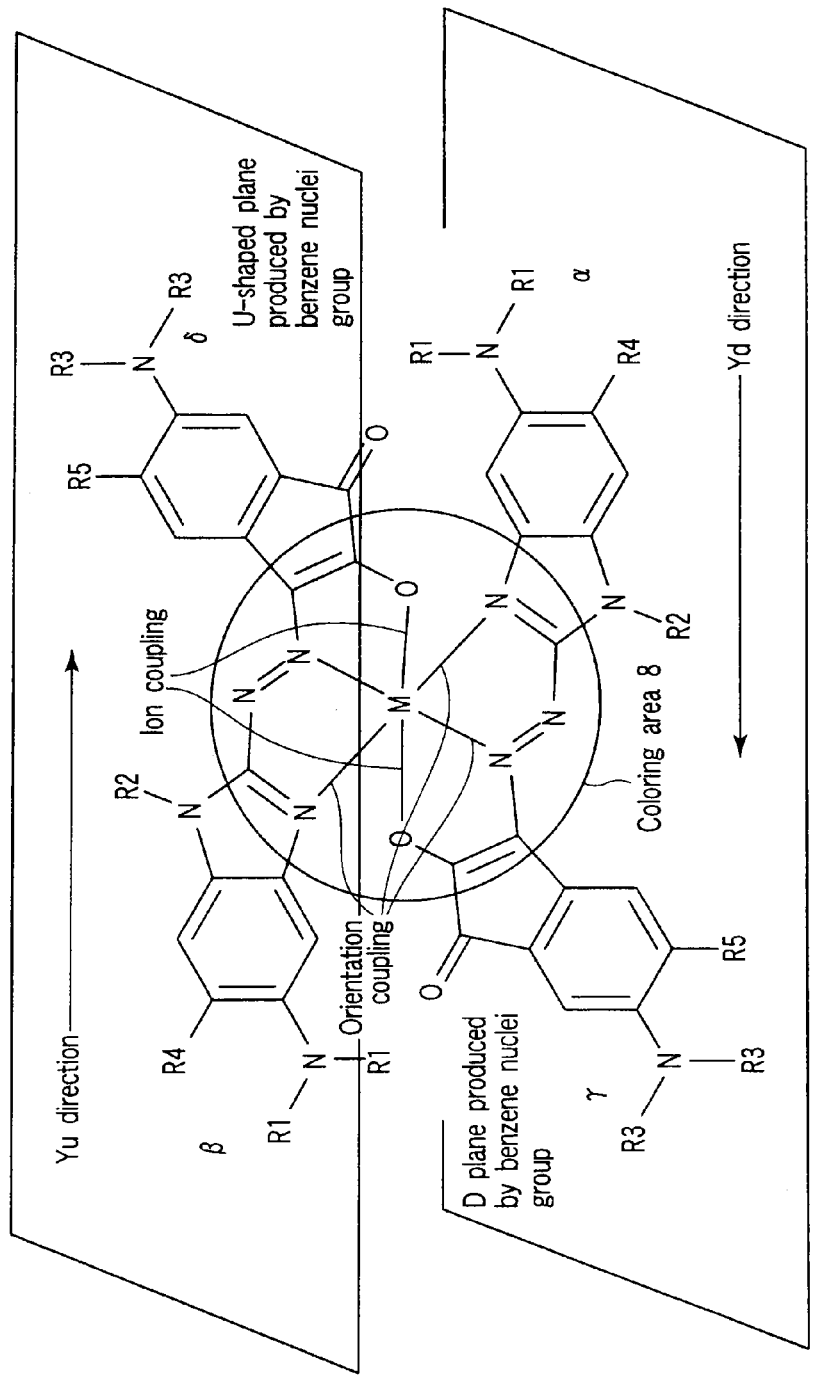
FIG. 2 is an exemplary view showing a specific structural formula of the specific content "(A3) azo-metal complex+ Cu" of the information storage medium constituent elements.

FIG. 2 shows a specific structural formula of the specific contents "(A3) azo metal complex+Cu" of the constituent elements of the information storage medium. A circular periphery area around a center metal M of the azo metal complex shown in FIG. 2 is obtained as a light emitting area 8. When a laser light beam 7 passes through this light emitting area 8, local electrons in this light emitting area 8 resonate to an electric field change of the laser light beam 7, and absorbs energy of the laser light beam 7. A value converted to a wavelength of the laser light beam with respect to a frequency of an electric field change at which these local electrons resonate most and easily absorbs the energy is called a maximum absorption wavelength, and is represented by $\lambda_{max}$. As a range of the light emitting area 8 (resonation range) as shown in FIG. 2 increases, the maximum absorption wavelength $\lambda_{max}$ is shifted to the long wavelength side. In addition, in FIG. 2, the localization range of local electrons around the center metal M (how large the center metal M can attract the local electrons to the vicinity of the center) is changed by changing atoms of the center metal M, and the value of the maximum absorption wavelength $\lambda_{max}$ changes.

Although it can be predicted that the light absorption spectra of the organic dye recording material in the case where there exists only one light emitting area 8 which is absolute 0 degree at a temperature and high in purity draws narrow linear spectra in close to a maximum absorption wavelength $\lambda_{max}$, the light absorption spectra of a general organic recording material including impurities at a normal temperature, and further, including a plurality of light absorption areas exhibit a wide light absorption characteristic with respect to a wavelength of a light beam around the maximum absorption wavelength $\lambda_{max}$.

Figure 3:
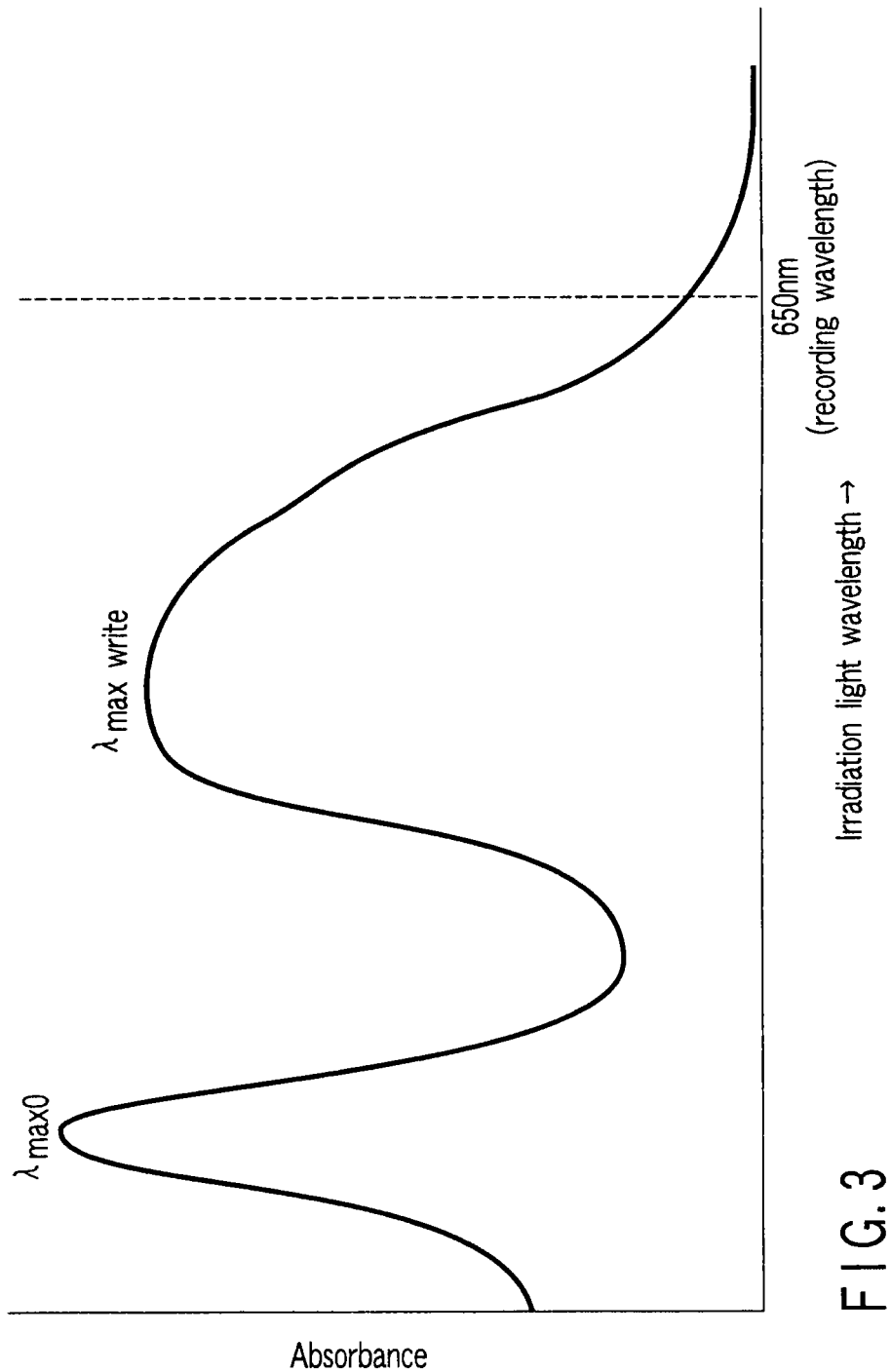
FIG. 3 is an exemplary view illustrating an example of optical absorption spectrum characteristics of an organic dye recording material for use in a current DVD-R disc.

FIG. 3 shows an example of light absorption spectra of an organic dye recording material used for a current DVD-R disc. In FIG. 3, a wavelength of a light beam to be irradiated with respect to an organic dye recording film formed by coating an organic dye recording material is taken on a horizontal axis, and absorbance obtained when an organic dye recording film is irradiated with a light beam having a respective wavelength is taken on a vertical axis. The absorbance used here is a value obtained by entering a laser light beam having incident intensity Io from the side of the transparent substrate 2-2 with respect to a state in which a write-once type information storage medium has been completed (or alternatively, a state in which the recording layer 3-2 has been merely formed on the transparent substrate 2-2 (a state that precedes forming of the optical reflection layer 4-2 with respect to a structure of FIG. 1B)), and then, measuring reflected laser light intensity Ir (light intensity It of the laser light beam transmitted from the side of the recording layer 3-2). The absorbance Ar (At) is represented by:

$$Ar = -\log_{10}(Ir/Io) \quad (A\text{-}1)$$

$$At = -\log_{10}(It/Io) \quad (A\text{-}2)$$

Unless otherwise specified, although a description will be given assuming that the absorbance denotes absorbance Ar of a reflection shape expressed by formula (A-1), it is possible to define absorbance At of a transmission shape expressed by formula (A-2) without being limited thereto in the present embodiment. In the embodiment shown in FIG. 3, there exist a plurality of light absorption areas, each of which includes the light emitting area 8, and thus, there exist a plurality of positions at which the absorbance becomes maximal. In this case, there exist a plurality of maximum absorption wavelength $\lambda_{max}$ when the absorbance takes a maximum value. A wavelength of the recording laser light in the current DVD-R disc is set to 650 nm. In the case where there exist a plurality of the maximum absorption wavelengths $\lambda_{max}$ in the present embodiment, a value of the maximum absorption wavelength $\lambda_{max}$ which is the closest to the wavelength of the recording laser light beam becomes important. Therefore, only in the description of the present embodiment, the value of the maximum absorption wavelength $\lambda_{max}$ set at a position which is the closest to the wavelength of the recording laser light beam is defined as "$\lambda_{max}$ write"; and is discriminated from another $\lambda_{max}$ ($\lambda_{max\ 0}$).

2-2) Difference of Light Reflection Layer Shape in Pre-Pit/Pre-Groove Area

FIGS. 4A and 4B each show a comparison in shape when a recording film is formed in a pre-pit area or a pre-groove area 10. FIG. 4A shows a shape relevant to a phase change recording film. In the case of forming any of the undercoat intermediate layer 5, the recording layer 3-1, the upper intermediate layer 6, and the light reflection layer 4-1 as well, any of methods of sputtering vapor deposition, vacuum vapor deposition, or ion plating is used in vacuum. As a result, in all of the layers, irregularities of the transparent substrate 2-1 are duplicated comparatively faithfully. For example, in the case where a sectional shape in the pre-pit area or pre-groove area 10 of the transparent substrate 2-1 is rectangular or trapezoidal, the sectional shape of the recording layer 3-1 and the light reflection layer 4-1 each is also rectangular or trapezoidal.

FIG. 4B shows a general recording film sectional shape of a current DVD-R disc which is a conventional technique as a recording film in the case where an organic dye recording film has been used. In this case, as a method for forming the recording film 3-2, there is used a method called spin coating (or spinner coating) which is completely different from that shown in FIG. 4A. The spin coating used here denotes a method for dissolving in an organic solvent an organic dye recording material which forms the recording layer 3-2; applying a coating onto the transparent substrate 2-2; followed by rotating the transparent substrate 2-2 at a high speed to spread a coating agent to the outer periphery side of the transparent substrate 2-2 by a centrifugal force; and gasifying the organic solvent, thereby forming the recording layer 3-2. Using this method, a process for coating the organic solvent is used, and thus, a surface of the recording layer 3-2 (an interface with the light reflection layer 2-2) is easily flattened. As a result, the sectional shape on the interface between the light reflection layer 2-2 and the recording layer 3-2 is obtained as a shape which is different from the shape of the surface of the transparent substrate 2-2 (an interface between the transparent substrate 2-2 and the recording layer 3-2). For example, in a pre-groove area in which the sectional shape of the surface of the transparent substrate 2-2 (an interface between the transparent substrate 2-2 and the recording layer 3-2) is rectangular or trapezoidal, the sectional shape on the interface between the light reflection layer 2-2 and the recording layer 3-2 is formed in a substantially V-shaped groove shape. In a pre-pit area, the above sectional shape is formed in a substantially conical side surface shape. Further, at the time of spin coating, an organic solvent is easily collected at a recessed portion, and thus, the thickness Dg of the recording layer 3-2 in the pre-pit area or pre-groove area 10 (i.e., a distance from a bottom surface of the pre-pit area or pre-groove area to a position at which an interface relevant to the light reflection layer 2-2 becomes the lowest) is larger than the thickness D1 in a land area 12 (Dg>D1). As a result, an amount of irregularities on an interface between the transparent substrate 2-2 and the recording area 3-2 in the pre-pit area or pre-groove area 10 becomes substantially smaller than an amount of irregularities on the transparent substrate 2-2 and the recording layer 3-2.

As described above, the shape of irregularities on the interface between the light reflection layer 2-2 and the recording layer 3-2 becomes blunt and an amount of irregularities becomes significantly small. Thus, in the case where the shape and dimensions of irregularities on a surface of the transparent substrate 2 (pre-pit area or pre-groove area 10) are equal to each other depending on a difference in method for forming a recording film, the diffraction intensity of the reflection light beam from the organic dye recording film at the time of laser light irradiation is degraded more significantly than the diffraction intensity of the reflection light beam from the phase change recording film. As a result, in the case where the shape and dimensions of irregularities on the surface of the transparent substrate 2 (pre-pit area or pre-groove area 10) are equal to each other, as compared with use of the phase change recording film, use of the conventional organic dye recording film is disadvantageously featured in that:

1) a degree of modulation of a light reproduction signal from the pre-pit area is small, and signal reproduction reliability from the pre-pit area is poor;
2) a sufficiently large track shift detecting signal is hardly obtained in accordance with a push-pull technique from the pre-groove area; and
3) a sufficient large wobble detecting signal is hardly obtained in the case where wobbling occurs in the pre-groove area.

In addition, in a DVD-R disc, specific information such as address information is recorded in a small irregular (pit) shape in a land area, and thus, a width W1 of the land area 12 is larger than a width Wg of the pre-pit area or pre-groove area 10 (Wg>/W1).

Chapter 3: Description of Characteristics of Organic Dye Recording Film in the Present Embodiment 3-1) Problem(s) Relevant to Achievement of High Density in Write-Once Type Recording Film (DVD-R) Using Conventional Organic Dye Material As has been described in "2-1) Difference in recording principle/recording film structure and difference in basic concept relating to generation of reproducing signal", a general principle of recording of a current DVD-R and CD-R, which is a write-once type information storage medium using a conventional organic dye material includes "local plastic deformation of transparent substrate 2-2" or "local thermal decomposition or "gasification" in recording layer 3-2". FIGS. 5A and 5B each show a plastic deformation state of a specific transparent substrate 2-2 at a position of a recording mark 9 in a write-once type information storage medium using a conventional organic dye material. There exist two types of typical plastic deformation states. There are two cases, i.e., a case in which, as shown in FIG. 5A, a depth of a bottom surface 14 of a pre-groove area at the position of the recording mark 9 (an amount of step relevant to an adjacent land area 12) is different from a depth of a bottom surface of a pre-groove area 11 in an unrecorded area (in the example shown in FIG. 5A, the depth of the bottom surface 14 in the pre-groove area at the position of the recording mark 9 is shallower than that in the unrecorded area); and a case in which, as shown in FIG. 5B, a bottom surface 14 in a pre-groove area at the position of the recording mark 9 is distorted and is slightly curved (the flatness of the bottom surface 14 is distorted: In the example shown in FIG. 5B, the bottom surface 14 in the pre-groove area at the position of the recording mark 9 is slightly curved toward the lower side). Both of these cases are featured in that a plastic deformation range of the transparent substrate 2-2 at the position of the recording mark 9 covers a wide range. In the current DVD-R disc which is a conventional technique, a track pitch is 0.74 µm, and a channel bit length is 0.133 µm. In the case of a large value of this degree, even if the plastic deformation range of the transparent substrate 2-2 at the position of the recording mark 9 covers a wide range, comparatively stable recording and reproducing processes can be carried out.

However, if the track pitch is narrower than 0.74 µm described above, the plastic deformation range of the transparent substrate 2-2 at the position of the recording mark 9 covers a wide range, and thus, the adjacent tracks are adversely affected, and the recording mark 9 of the existing adjacent track is substantially erased (cannot be reproduced) due to a "cross-write" or overwrite in which the recording mark 9 widens to the adjacent tracks. In addition, in a direction (circumferential direction) along the tracks, if the channel bit length is narrower than 0.133 µm, there occurs a problem that inter-code interference appears; an error rate at the time of reproduction significantly increases; and the reliability of reproduction is lowered.

3-2) Description of Basic Characteristics Common to Organic Dye Recording Film in the Present Embodiment 3-2-A] Range Requiring Application of Technique According to the Present Embodiment As shown in FIGS. 5A and 5B, in a conventional write-once type information storage medium including plastic deformation of the transparent substrate 2-2 or local thermal decomposition or gasification phenomenon in the recording film 3-2, a description will be given below with respect to what degree of track pitch is narrowed when an adverse affect appears or what degree of channel pit length is narrowed when an adverse effect appears and a result obtained after technical discussion has been carried out with respect to a reason for such an adverse effect. A range in which an adverse effect starts appearing in the case of utilizing the conventional principle of recording indicates a range (suitable for the achievement of high density) in which advantageous effect is attained due to a novel principle of recording shown in the present embodiment.

1) Condition of Thickness Dg of Recording Layer 3-2

When an attempt is made to carry out thermal analysis in order to theoretically identify a lower limit value of an allowable channel bit length or a lower limit value of allowable track pitch, a range of the thickness Dg of a recording layer 3-2 which can be substantially thermally analyzed becomes important. In a conventional write-once type information storage medium (CD-R or DVD-R) including plastic deformation of the transparent substrate 2-2 as shown in FIGS. 5A and 5B, with respect to a change of light reflection amount in the case where an information reproduction focusing spot is provided in the recording mark 8 and in the case where the spot is in an unrecorded area of the recording layer 3-2, the largest factor is "an interference effect due to a difference in optical distance in the recording mark 9 and in unrecorded area". In addition, a difference in its optical difference is mainly caused by "a change of the thickness Dg of a physical recording layer 3-2 due to plastic deformation of the transparent substrate 2-2 (a physical distance from an interface between the transparent substrate 2-2 and the recording layer 3-2 to an interface between the recording layer 3-2 and a light reflection layer 4-2) and "a change of refractive index $n_{32}$ of the recording layer 3-2 in the recording mark 9". Therefore, in order to obtain a sufficient reproduction signal (change of light reflection amount) between the recording mark 9 and the unrecorded area, when a wavelength in vacuum of laser light beam is defined as λ, it is necessary for the value of the thickness 3-2 in the unrecorded area has a size to some extent as compared with $\lambda/n_{32}$. If not, a difference (phase difference) in optical distance between the recording mark 9 and the unrecorded area does not appear, and light interference effect becomes small. In reality, a minimum condition:

$$Dg \geq \lambda/8n_{32} \qquad (1)$$

must be met, and desirably, a condition that:

$$Dg \geq \lambda/4n_{32} \qquad (2)$$

must be met.

At a time point of current discussion, the vicinity of λ=405 nm is assumed. A value of refractive index $n_{32}$ of an organic dye recording material at 405 nm ranges from 1.3 to 2.0. Therefore, as a result of substituting $n_{32}$=2.0 in formula (1), it is conditionally mandatory that a value of the thickness Dg of the recording layer 3-2 is:

$$Dg \geq 25 \text{ nm} \qquad (3)$$

Here, discussion is made with respect to a condition when an organic dye recording layer of a conventional write-once type information storage medium (CD-R or DVD-R) including plastic deformation of the transparent substrate 2-2 has been associated with a light beam of 405 nm. As described later, in the present embodiment, although a description is given with respect to a case in which plastic deformation of the transparent substrate 2-2 does not occur and a change of an absorption coefficient $k_{32}$ is a main factor of a principle of recording, it is necessary to carry out track shift detection by using a DPD (Differential Phase Detection) technique from the recording mark 9, and thus, in reality, the change of the refractive index $n_{32}$ is caused in the recording mark 9. Therefore, the condition for formula (3) becomes a condition, which should be met, in the present embodiment in which plastic deformation of the transparent substrate 2-2 does not occur.

From another point of view as well, the range of the thickness Dg can be specified. In the case of a phase change recording film shown in FIG. 4A, when a refractive index of the transparent substrate is $n_{21}$, a step amount between a pre-pit area and a land area is $\lambda/(8n_{21})$ when the largest track shift detection signal is obtained by using a push-pull technique. However, in the case of an organic dye recording film shown in FIG. 4B, as described previously, the shape on an interface between the recording layer 3-2 and the light reflection layer 4-2 becomes blunt, and a step amount becomes small. Thus, it is necessary to increase a step amount between a pre-pit area and a land area on the transparent substrate 2-2 more significantly than $\lambda/(8n_{22})$. For example, the refractive index at 405 nm in the case where polycarbonate has been used as a material for the transparent substrate 2-2 is $n_{22} \cong 1.62$, and thus, it is necessary to increase a step amount between the pre-pit area and the land area more significantly than 31 nm. In the case of using a spin coating technique, if the thickness Dg of the recording layer 3-2 in the pre-groove area is greater than a step amount between the pre-pit area and the land area on the transparent substrate 2-2, there is a danger that thickness D1 of the recording layer 3-2 in a land area 12 is eliminated. Therefore, from the above described discussion result, it is necessary to meet a condition that:

$$Dg \geq 31 \text{ nm} \quad (4)$$

The condition for formula (4) is also a condition, which should be met in the present embodiment in which plastic deformation of the transparent substrate 2-2 does not occur. Although conditions for the lower limit values have been shown in formulas (3) and (4), the value $Dg \cong 60$ nm obtained by substituting $n_{32}=1.8$ for an equal sign portion in formula (2) has been utilized as the thickness Dg of the recording layer 3-2 used for thermal analysis.

Then, assuming polycarbonate used as a standard material of the transparent substrate 2-2, 150° C. which is a glass transition temperature of polycarbonate has been set as an estimate value of a thermal deformation temperature at the side of the transparent substrate 2-2. For discussion using thermal analysis, a value of $k_{32}=0.1$ to 0.2 has been assumed as a value of an absorption coefficient of the organic dye recording film 3-2 at 405 nm. Further, discussion has been made with respect to a case in which an NA value of a focusing objective lens and an incident light intensity distribution when an objective lens is passed is NA=60 and H format ((D1):NA=0.65) and B format ((D2):NA=0.85) which is assumed condition in a conventional DVD-R format.

2) Condition for Lower Limit Value of Channel Bit Length

A check has been made for a lengthwise change in a direction along a track of an area reaching a thermal deformation temperature at the side of a transparent substrate 2-2 which comes into contact with a recording layer 3-2 when recording power has been changed. Discussion has been made with respect to a lower limit value of an allowable channel bit length considering a window margin at the time of reproduction. As a result, if the channel bit length is slightly lower than 105 nm, it is considered that a lengthwise change in a direction along a track in an area which reaches the thermal deformation temperature at the side of the transparent substrate 2-2 occurs according to the slight change of recording power, and a sufficient window margin cannot be obtained. On discussion of thermal analysis, an analogous tendency is shown in the case where the NA value is any one of 0.60, 0.65, and 0.85. Although a focusing spot size is changed by changing the NA value, a possibility cause is believed to be that a thermal spreading range is wide (a gradient of a temperature distribution at the side of the transparent substrate 2-2 which comes into contact with the recording layer 3-2) is comparatively gentle). In the above thermal analysis, the temperature distribution at the side of the transparent substrate 2-2 which comes into contact with the recording layer 3-2 is discussed, and thus, an effect of the thickness Dg of the recording layer 3-2 does not appear.

Further, in the case where a shape change of the transparent substrate 3-3 shown in FIGS. 5A and 5B occurs, a boundary position of a substrate deformation area blurs (is ambiguous), and thus, a window margin is lowered more significantly. When a sectional shape of an area in which the recording mark 9 is formed is observed by an electron microscope, it is believed that a blurring amount of the boundary position of the substrate deformation area increases as the value of the thickness Dg of the recording layer 3-2 increases. With respect to the effect of the thermal deformation area length due to the above recording power change, in consideration of the blurring of the boundary position of this substrate deformation area, it is considered necessary that the lower limit value of the channel bit length allowed for allocation of a sufficient window margin is in order of two times of the thickness Dg of the recording layer 3-2, and it is desirable that the lower limit value is greater than 120 nm.

In the foregoing, a description has been principally given with respect to discussion using thermal analysis in the case where thermal deformation of the transparent substrate 2-2 occurs. There also exists a case in which plastic deformation of the transparent substrate 2-2 is very small as another principle of recording (mechanism of forming the recording mark 9) in a conventional write-once type information storage medium (CD-R or DVD-R) and thermal deformation or gasification (evaporation) of the organic dye recording material in the recording layer 3-2 mainly occurs. Thus, an additional description will be given with respect to such a case. Although the gasification (evaporation) temperature of the organic dye recording material is different depending on the type of the organic dye material, in general, the temperature ranges 220° C. to 370° C., and a thermal decomposition temperature is lower than this range. Although a glass transition temperature 150° C. of a polycarbonate resin has been presumed as an arrival temperature at the time of substrate deformation in the above discussion, a temperature difference between 150° C. and 220° C. is small, and, when the transparent substrate 2-2 reaches 150° C., the inside of the recording layer 3-2 exceeds 220° C. Therefore, although there exists an exception depending on the type of the organic recording material, even in the case where plastic deformation of the transparent substrate 2-2 is very small and thermal decomposition or gasification (evaporation) of the organic dye recording material in the recording layer mainly occurs, there is obtained a result which is substantially identical to the above discussion result.

When the discussion result relating to the above channel bit length is summarized, in the conventional write-once type information storage medium (CD-R or DVD-R) including plastic deformation of the transparent substrate 2-2, it is considered that, when a channel bit length is narrower than 120 nm, the lowering of a window margin occurs, and further, if the length is smaller than 105 nm, stable reproduction becomes difficult. That is, when the channel bit is smaller than 120 nm (105 nm), advantageous effect is attained by using a novel principle of recording shown in the present embodiment.

3) Condition for Lower Limit Value of Track Pitches

When a recording layer 3-2 is exposed at recording power, energy is absorbed in the recording layer 3-2, and a high temperature is obtained. In a conventional write-once type information storage medium (CD-R or DVD-R), it is necessary to absorb energy in the recording layer 3-2 until the transparent substrate 3-2 has reached a thermal deformation temperature. A temperature at which a structural change of the organic dye recording material occurs in the recording layer 3-2 and a value of a refractive index $n_{32}$ or an absorption coefficient $k_{32}$ starts its change is much lower than an arrival temperature for the transparent substrate 2-2 to start thermal deformation. Therefore, the value of the refractive index $n_{32}$ or absorption coefficient $k_{32}$ changes in a comparatively wide range in the recording layer 3-2 at the periphery of a recording mark 9, which is thermal deformed at the side of the transparent substrate 2-2, and this change seems to cause "cross-write" or "cross-erase" for the adjacent tracks. It is possible to set a lower limit value of track pitch in which "cross-write" or "cross-erase" does not occur with the width of an area which reaches a temperature which changes the refractive index $n_{32}$ or absorption coefficient $k_{32}$ in the recording layer 3-2 when the transparent substrate 2-2 exceeds a thermal deformation temperature. From the above point of view, it is considered that "cross-write" or "cross-erase" occurs in location in which the track pitch is equal to or smaller than 500 nm. Further, in consideration of an effect of warping or inclination of an information storage medium or a change of recording power (recording power margin), it can be concluded difficult to set the track pitch to 600 nm or less in the conventional write-once type information storage medium (CD-R or DVD-R) in which energy is absorbed in the recording layer 3-2 until the transparent substrate 2-2 has reached a thermal deformation temperature.

As described above, even if the NA value is changed from 0.60, 0.65, and then, to 0.85, substantially similar tendency is shown because the gradient of the temperature distribution in the peripheral recording layer 3-2 when the transparent substrate 2-2 has reached a thermal deformation temperature at a center part is comparatively gentle, and the thermal spread range is wide. In the case where plastic deformation of the transparent substrate 2-2 is very small and thermal decomposition or gasification (evaporation) of the organic dye recording material in the recording layer 3-2 mainly occurs as another principle of recording (mechanism of forming the recording mark 9) in the conventional write-once type information storage medium (CD-R or DVD-R), as has been described in the section "(2) Condition for lower limit value of channel bit", the value of track pitch at which "cross-write" or "cross-erase" starts is obtained as a substantially analogous result. For the above described reason, advantageous effect is attained by using a novel principle of recording shown in the present embodiment when the track pitch is set to 600 nm (500 nm) or lower.

3-2-B] Basic Characteristics Common to Organic Dye Recording Material in the Invention As described above, in the case where plastic deformation of the transparent substrate 2-2 is very small and thermal decomposition or gasification (evaporation) of the organic dye recording material in the recording layer 3-2 mainly occurs as another principle of recording (mechanism of forming the recording mark 9) in the conventional write-once type information storage medium (CD-R or DVD-R), there occurs a problem that a channel bit length or track pitches cannot be narrowed because the inside of the recording layer 3-2 or a surface of the transparent substrate 2-2 reaches a high temperature at the time of forming the recording mark 9. In order to solve the above described problem, the present embodiment is featured in "inventive organic dye material" in which "a local optical characteristic change in the recording layer 3-2, which occurs at a comparatively low temperature, is a principle of recording" and "setting environment (recording film structure or shape) in which the above principle of recording easily occurs without causing a substrate deformation and gasification (evaporation) in the recording layer 3-2. Specific characteristics of the present embodiment can be listed below.

α] Optical Characteristic Changing Method Inside of Recording Layer 3-2

Chromogenic Characteristic Change

Change of Light Absorption Sectional Area Due to Qualitative Change of Light Emitting Area 8 (FIG. 2) or Change of Molar Molecule Light Absorption Coefficient The light emitting area 8 is partially destroyed or the size of the light emitting area 8 changes, whereby a substantial light absorption sectional area changes. In this manner, an amplitude (absorbance) at a position of $\lambda_{max\ write}$ changes in the recording mark 9 while a profile (characteristics) of light absorption spectra (FIG. 3) itself is maintained.

Change of Electronic Structure (Electron Orbit) Relevant to Electrons which Contribute to a Chromogenic Phenomenon Change of light absorption spectra (FIG. 3) based on discoloring action due to cutting of local electron orbit (dissociation of local molecular bonding) or change of dimensions or structure of light emitting area 8 (FIG. 2)

Intra-Molecular (Inter-Molecular) Change of Orientation or Array

Optical characteristic change based on orientation change in azo metal complex shown in FIG. 2, for example Molecular Structure Change in Molecule For example, discussion is made with respect to an organic dye material which causes either of dissociation between anion portion and cation portion, thermal decomposition of either of anion portion and cation portion, and a tar phenomenon that a molecular structure itself is destroyed, and carbon atoms are precipitated (denaturing to black coal tar). As a result, the refractive index $n_{32}$ or absorption coefficient $k_{32}$ in the recording mark 9 is changed with respect to an unrecorded area, enabling optical reproduction.

β] Setting Recording Film Structure or Shape, Making it Easy to Stably Cause an Optical Characteristic Change of [α] Above:

The specific contents relating to this technique will be described in detail in the section "3-2-C] Ideal recording film structure which makes it easy to cause a principle of recording shown in the present embodiment" and subsequent.

γ] Recording Power is Reduced in Order to Form Recording Mark in a State in which Inside of Recording Layer or Transparent Substrate Surface is Comparatively Low at Temperature The optical characteristic change shown in [α] above occurs at a temperature lower than a deformation temperature of the transparent substrate 2-2 or a gasification (evaporation) temperature in the recording layer 3-2. Thus, the exposure amount (recording power) at the time of recording is reduced to prevent the deformation temperature from being exceeded on the surface of the transparent substrate 2-2 or the gasification (evaporation) temperature from being exceeded in the recording layer 3-2. The contents will be described later in detail in the section "3-3) Recording characteristics common to organic dye recording layer in the present embodiment". In addition, in contrast, it becomes possible to determine whether or not the optical characteristic change shown in [α] above occurs by checking a value of the optimal power at the time of recording.

δ] Electron Structure in a Light Emitting Area is Stabilized, and Structural Decomposition Relevant to Ultraviolet Ray or Reproduction Light Irradiation is Hardly Generated When ultraviolet ray is irradiated to the recording layer 3-2 or reproduction light is irradiated to the recording layer 3-2 at the time of reproduction, a temperature size in the recording layer 3-2 occurs. There is a request for a seemingly contradictory performance that characteristic degradation relevant to such a temperature rise is prevented and recording is carried out at a temperature lower than a substrate deformation temperature or a gasification (evaporation) temperature in the recording layer 3-2. In the present embodiment, the above described seemingly contradictory performance is ensured by "stabilizing an electron structure in a light emitting area". The specific technical contents will be described in "Chapter 4 Specific Description of Embodiments of Organic Dye Recording Film in the Present Embodiment".

ε] Reliability of Reproduction Information is Improved for a Case in which Reproduction Signal Degradation Due to Ultraviolet Ray or Reproduction Light Irradiation Occurs In the present embodiment, although a technical contrivance is made for "stabilizing an electron structure in a light emitting area", the reliability of the recording mark 9 formed in a principle of recording shown in the present embodiment may be principally lowered as compared with a local cavity in the recording layer 3-2 generated due to plastic deformation or gasification (evaporation) of the surface of the transparent substrate 2-2. As countermeasures against it, in the present embodiment, advantageous effect that the high density and the reliability of recording information are achieved at the same time in combination with strong error correction capability (novel ECC block structure), as described later in "Chapter 7: Description of H Format" and "Chapter 8: Description of B Format". Further, in the present embodiment, PRML (Partial Response Maximum Likelihood) technique is employed as a reproduction method, as described in the section "4-2 Description of reproducing circuit in the present embodiment", the high density and the reliability of recording information are achieved at the same time in combination with an error correction technique at the time of ML demodulation.

Among the specific characteristics of the above described present embodiment, a description has been given with respect to the fact that items [α] to [γ] are the contents of technical contrivance newly devised in the present embodiment in order to achieve "narrow track pitch" and "narrow channel bit length". In addition, "narrow channel bit length" causes the achievement of "reduction of minimum recording mark length". The meanings (objects) of the present embodiment relating to the remaining items [δ] and [ε] will be described in detail. At the time of reproduction in the H format in the present embodiment, a passage speed (line speed) of a focusing spot of light passing through the recording layer 3-2 is set to 6.61 m/s, and the line speed in the B format is set in the range of 5.0 m/s to 10.2 m/s.

Figure 14:
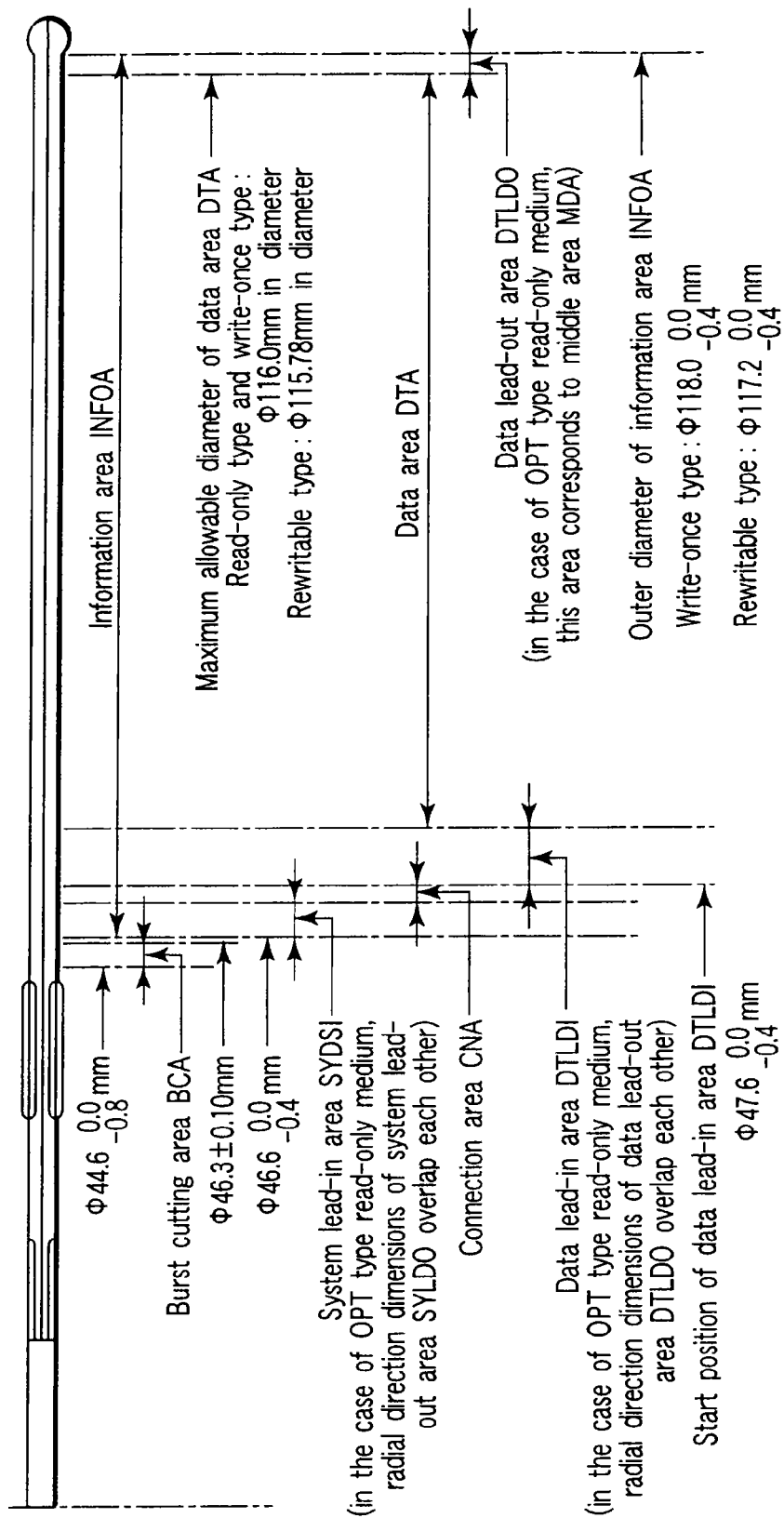
FIG. 14 is an exemplary view showing an example of an internal structure and dimensions of an information storage medium.

In any case, the line speed at the time of reproduction in the present embodiment is equal to or greater than 5 m/s. As shown in FIG. 14, a start position of a data lead-in area DTLDI in the H format is 47.6 mm in diameter. In view of the B format as well, user data is recorded in location equal to or greater than 45 mm in diameter. An inner periphery of 45 mm in diameter is 0.141 m, and thus, the rotation frequency of an information storage medium when this position is reproduced at a line speed of 5 m/s is obtained as 35.4 rotations/second. Video image information such as TV program is provided as one of the methods utilizing a write-once type information storing medium according to the present embodiment. For example, when a user presses "pause (temporary stop) button" at the reproduction of the user's recorded video image, a reproduction focusing spot stays on a track of its paused position. When the spot stops on the track of the paused position, the user can start reproduction at the paused position immediately after a "reproduction start button" has been pressed. For example, after the user has pressed a "pause (temporary stop) button", in the case where a customer visits the user's home immediately after the user has gone to toilet, there is a case in which the pause button is left to have been pressed for one hour while the user meets the customer. The write-once type information storage medium makes 35.4× 60×60≅130,000 rotations for one hour, and the focusing spot traces on the same track during this period (130,000 repetitive playbacks). If the recording layer 3-2 is degraded due to repetitive playback and video image information cannot be reproduced after this period, the user coming back one hour later cannot see any portion of video image, and thus, gets angry, and in the worst case, there is a danger that the problem may be taken to court. Therefore, a minimum condition that, if the recorded video image information is not destroyed even if such a pausing is left for one hour or longer (even if continuous playback in the same track occurs), no video image data is destroyed, requires to guarantee that at least 100,000 repetitive playback occurs, no reproduction degradation occurs. There is a rare case in which a user repeats one-hour pausing (repetitive playback) 10 times with respect to the same location in a general use condition. Therefore, when it is guaranteed that the write-once type information storage medium according to the present embodiment desirably makes 1,000,000 repetitive playbacks, no problem occurs with use by the general user, and it is considered sufficient to set to about 1,000,000 times the upper limit value of the repetitive playback count as long as the recording layer 3-2 is not degraded. If the upper limit value of the repetitive playback count is set to a value which significantly exceeds 1,000,000 times, there occurs inconvenience that "recording sensitivity is lowered" or "medium price increases".

In the case where the upper limit value of the above repetitive reproduction count is guaranteed, a reproduction power value becomes an important factor. In the present embodiment, recording power is defined in a range set in formulas (8) to (13). It is said that a semiconductor laser beam is featured in that continuous light irradiation is not stable in a value equal to or smaller than 1/80 of the maximum use power. Because the power, which is 1/80 of the maximum use power, is in location in which light irradiation is just started (mode initiation is started), mode hopping is likely to occur. Therefore, at this light irradiation power, the light reflected in the light reflection layer 4-2 of the information storage medium comes back to a semiconductor laser light source, there occurs a "return light noise" featured in that the light emission amount always changes. Accordingly, in the present embodiment, the values of the reproduction power is set below around the value which is 1/80 of the value described at the right side of formula (12) or formula (13):

$$[\text{Optical reproduction power}] > 0.19 \times (0.65/NA)^2 \times (V/6.6) \qquad (\text{B-1})$$

$$[\text{Optical reproduction power}] > 0.19 \times (0.65/NA)^2 \times (V/6.6)^{1.2} \qquad (\text{B-2})$$

In addition, the value of the optimal reproduction power is restricted by a dynamic range of a power monitoring optical detector. Although not shown in an information recording/reproducing unit 141 of FIG. 8, a recording/reproducing optical head exists. This optical head incorporates an optical detector which monitors a light emission amount of a semiconductor laser light source. In the present embodiment, in order to improve light irradiation precision of the reproduction power at the time of reproduction, this optical detector detects a light emission amount and applies a feedback to an amount of a current to be supplied to the semiconductor laser light source at the time of light irradiation. In order to lower a price of the optical head, it is necessary to use a very inexpensive optical detector. A commercially available, inexpensive optical detector is often molded with a resin (an optical detecting unit is surrounded).

Figures 7A, 7B, 7C:
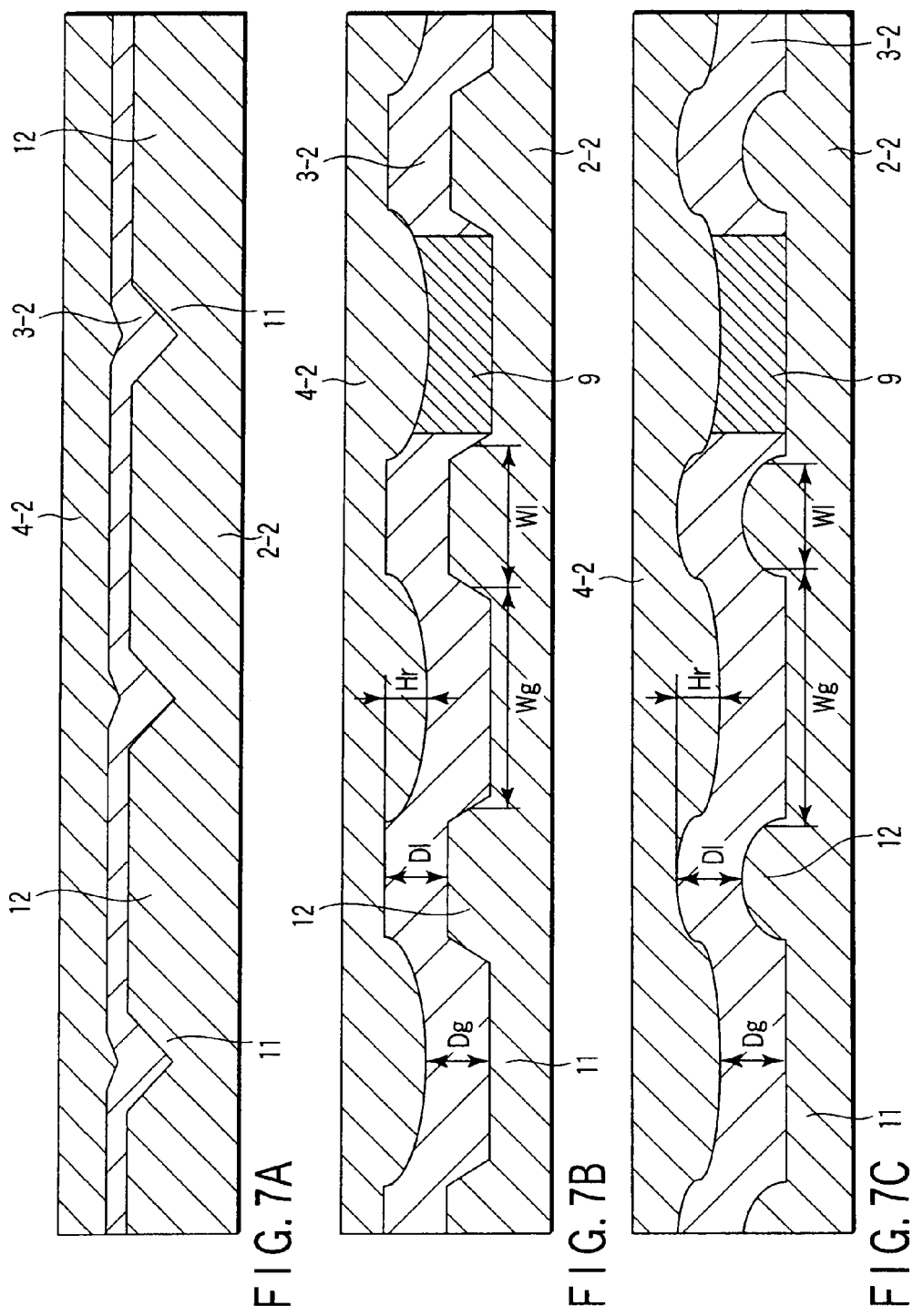
FIGS. 7A, 7B and 7C are exemplary views each showing a shape and dimensions of the recording film.

As disclosed in "Chapter 0: Description of Relationship between Use Wavelength and the Present Embodiment", 530 nm or less (in particular, 455 nm or less) is used as a light source wavelength in the present embodiment. In the case of this wavelength area, a resin with which the optical detecting unit is molded (mainly, epoxy resin) causes such a degradation that occurs when ultraviolet ray has been irradiated if the wavelength light is irradiated (such as dark yellow discoloring or occurrence of cracks (fine white stripes)) and the optical detection characteristics are impaired. In particular, in the case of the write-once type information storage medium shown in the present embodiment, a mold resin degradation is likely to occur because the storage medium has a pre-groove area 11 as shown in FIGS. 7A, 7B and 7C. As a focus blurring detection system of an optical head, in order to remove adverse effect due to the diffraction light from this pre-groove area 11, there is most often employed a "knife-edge technique" of allocating an optical detector at an image forming position relevant to the information storage medium (image forming magnification M is in order of 3 times to 10 times). When the optical detector is arranged at the image forming position, high optical density is irradiated onto a mold resin because light beams are focused on the optical detector, and resin degradation due to this light irradiation is likely to occur. This mold resin characteristic degradation mainly occurs due to a photon mode (optical action), and however, it is possible to predict an upper limit value of an allowable irradiation amount in comparison with a light emission amount in a thermal mode (thermal excitation). Assuming the worst case, let us assume an optical system in which an optical detector is arranged at an image forming position as an optical head.

From the contents described in "(1) Condition for thickness Dg of recording layer 3-2" in "3-2-A] Range requiring application of technique according to the present embodiment", when an optimal characteristic change (thermal mode) occurs in the recording layer 3-2 at the time of recording in the present embodiment, it is considered that a temperature temporarily rises in the range of 80° C. to 150° C. in the recording layer 3-2. In view of a room temperature of about 15° C., a temperature difference $\Delta T_{write}$ ranges from 65° C. to 135° C. Pulse light emissions occur at the time of recording, and continuous light emissions occur at the time of reproduction. At the time of reproduction, the temperature rises in the recording layer 3-2 and a temperature difference $\Delta T_{read}$ occurs. When an image forming magnification of a detecting system in the optical head is M, the optical density of the detected light focused on the optical detector is obtained as $1/M^2$ of the optical density of convergence light irradiated on the recording layer 3-2, and thus, a temperature rise amount on the optical detector at the time of reproduction is obtained as $\Delta T_{read}/M^2$ which is a rough estimate. In view of the fact that an upper limit value of optical density, which can be irradiated on the optical detector, is converted by the temperature rise amount, it is considered that the upper limit value is in order of $\Delta T_{read}/M^2 \leq 1°$ C. The image foaming magnification of the detecting system in the optical head M is in order of 3 times to 10 times in general, if the magnification $M^2 \cong 10$ is tentatively estimated, it is necessary to set reproduction power so as to obtain:

$$\Delta T_{read}/\Delta T_{write} \leq° \quad \text{(B-3)}$$

Assuming that a duty ratio of recording pulses at the time of recording is estimated as 50%, the following is required:

$$[\text{Optimal reproduction power}] \leq [\text{Optimal recording power}]/10 \quad \text{(B-4)}$$

Therefore, in view of formulas (8) to (13) described later and the above formula (B-4), optimal reproduction power is assigned as follows:

$$[\text{Optimal reproduction power}] < 3 \times (0.65/NA)^2 \times (V/6.6) \quad \text{(B-5)}$$

$$[\text{Optimal reproduction power}] < 3 \times (0.65/NA)^2 \times (V/6.6)^{1/2} \quad \text{(B-6)}$$

$$[\text{Optimal reproduction power}] < 2 \times (0.65/NA)^2 \times (V/6.6) \quad \text{(B-7)}$$

$$[\text{Optimal reproduction power}] < 2 \times (0.65/NA)^2 \times (V/6.6)^{1/2} \quad \text{(B-8)}$$

$$[\text{Optimal reproduction power}] < 1.5 \times (0.65/NA)^2 \times (V/6.6) \quad \text{(B-9)}$$

$$[\text{Optimal reproduction power}] < 1.5 \times (0.65/NA)^2 \times (V/6.6)^{1/2} \quad \text{(B-10)}$$

(Refer to "3-2-E] Basic characteristics relating to thickness distribution of recording layer in the present embodiment for definition of parameters".) For example, when NA=0.65 and V=6.6 m/s, the following is obtained:

[Optimal reproduction power]<3 mW,

[Optimal reproduction power]<2 mW, or

[Optimal reproduction power]<1.5 mW.

In reality, the optical detector is fixed as compared with the fact the information storage medium rotates and relatively moves, and thus, in consideration of this fact, it is necessary to further set the optimal reproduction power to be in order of ⅓ or less of the value obtained in the above formula. In the information recording/reproducing apparatus according to the present embodiment, a value of the reproduction power is set to 0.4 mW.

3-2-C] Ideal Recording Film Structure in which a Principle of Recording Shown in the Present Embodiment is Easily Generated A description will be given with respect to a method for "setting an environment" (recording film structure or shape) in which the above principle of recording is easily generated in the present embodiment.

As an environment in which an optical characteristic change inside of the above described recording layer 3-2 is likely to occur, the present embodiment is featured in that a technical contrivance is carried out in recording film structure or shape such as:

"in an area for forming the recording mark 9, a critical temperature at which an optical characteristic change is likely to occur is exceeded, and at a center part of the recording mark 9, a gasification (evaporation) temperature is not exceeded, and a surface of a transparent substrate 2-2 in the vicinity of the center part of the recording mark 9 does not exceed a thermal temperature"

Figure 6A:
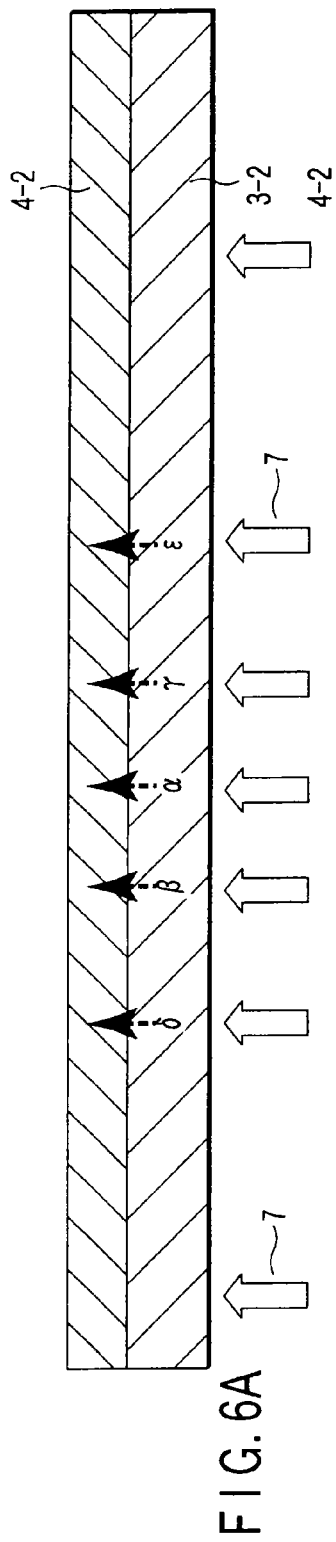
FIGS. 6A, 6B and 6C are exemplary views relating to a shape or dimensions of a recording film in which a principle of recording is easily established.
Figure 6B:
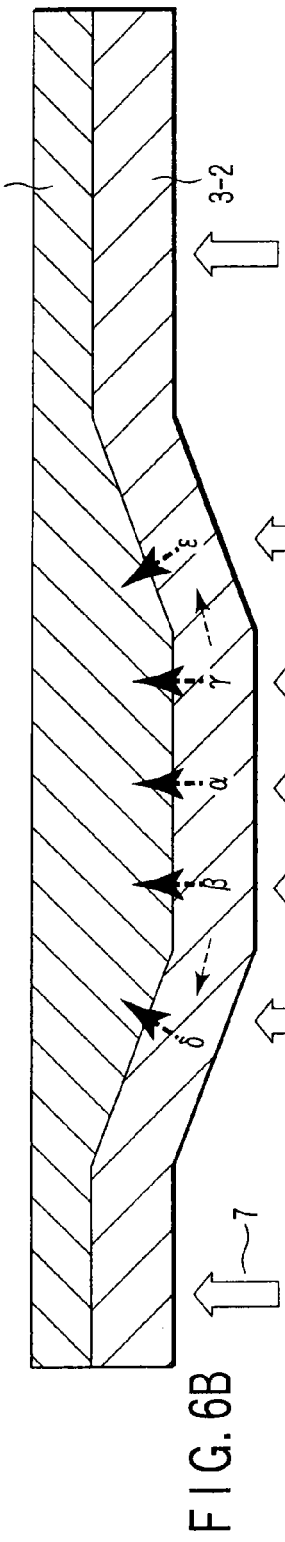
Figure 6C:
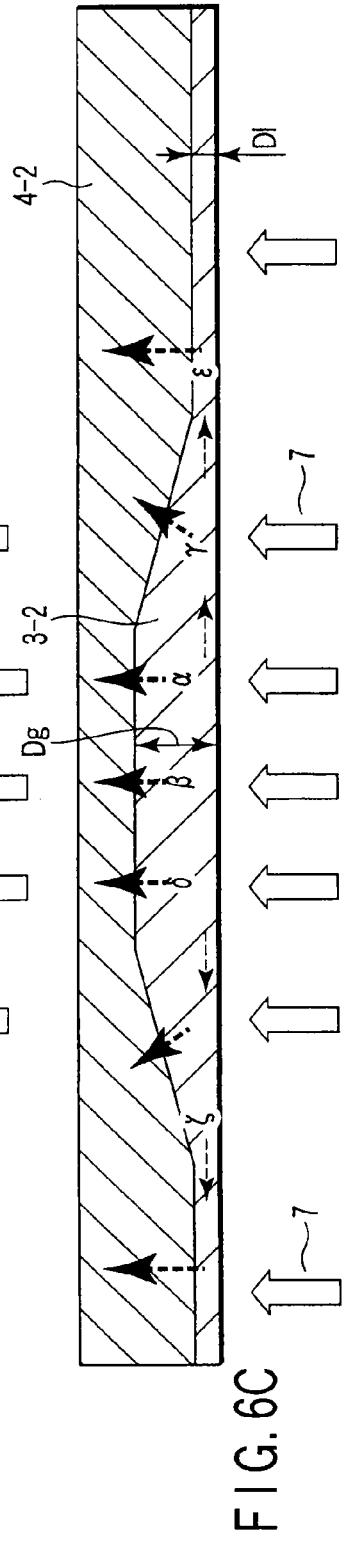

The specific contents relating to the above description will be described with reference to FIGS. 6A, 6B and 6C. In FIGS. 6A, 6B and 6C, the open (blank) arrow indicates an optical path of an irradiation laser light beam 7, and the arrow of the dashed line indicates a thermal flow. A recording film structure shown in FIG. 6A indicates an environment in which an optical characteristic change inside of a recording layer 3-2 corresponding to the present embodiment is most likely to occur. That is, in FIG. 6A, the recording layer 3-2 consisting of an organic dye recording material has uniform thickness anywhere in the range shown in formula (3) or formula (4) (where the thickness is sufficiently large), and receives irradiation of the laser light beam 7 in a direction vertical to the recording layer 3-2. As described in detail in "6-1) light reflection layer (material and thickness)", a silver alloy is used as a material for a light reflection layer 4-2 in the present embodiment. A material including a metal with high light reflection factor, in general, has high thermal conductivity and heat radiation characteristics without being limited to the silver alloy. Therefore, although a temperature of the recording layer 3-2 is risen by absorbing the energy of the irradiated laser light beam 7, a heat is radiated toward the light reflection layer 4-2 having heat radiation characteristics. Although a recording film shown in FIG. 6A is formed anywhere in a uniform shape, a comparatively uniform temperature rise occurs inside of the recording layer 3-2, and a temperature difference at points $\alpha$, $\beta$, and $\gamma$ at the center part is comparatively small. Therefore, when the recording mark 9 is formed, when a critical temperature at which an optical characteristic change at the points $\alpha$ and $\beta$ occurs is exceeded, a gasification (evaporation) temperature is not exceeded at the point $\alpha$ of the center part; and a surface of a transparent substrate (not shown) which exists at a position which is the closest to the point $\alpha$ of the center part does not exceed a thermal deformation temperature.

In comparison, as shown in FIG. 6B, a step is provided partly of the recording film 3-2. At the points $\delta$ and $\epsilon$, the radiation of the laser light beam 7 is subjected in a direction oblique to a direction in which the recording layer 3-2 is arrayed, and thus, an irradiation amount of the laser light beam 7 per a unit area is relatively lowered as compared with the point $\alpha$ of the center part. As a result, a temperature rise amount in the recording layer 3-2 at the points $\delta$ and $\epsilon$ is lowered. At the points $\delta$ and $\epsilon$ as well, thermal radiation toward the light reflection layer 4-2 occurs, and thus, the arrival temperature at the points $\delta$ and $\epsilon$ is sufficiently lowered as compared with the point $\alpha$ of the center part. Therefore, a heat flows from the point $\beta$ to the point $\alpha$ and a heat flows from the point $\alpha$ to the point $\beta$, and thus, a temperature difference at the points $\beta$ and $\gamma$ relevant to the point $\alpha$ of the center part becomes very small. At the time of recording, a temperature rise amount at the points $\beta$ and $\gamma$ is low, and a critical temperature at which an optical characteristic change occurs is hardly exceeded at the points $\beta$ and $\alpha$. As countermeasures against it, in order to produce an optical characteristic change occurs at the points $\beta$ and $\gamma$ (in order to produce a critical temperature or more), it is necessary to increase an exposure amount (recording power) of the laser light beam 7. In the recording film structure shown in FIG. 6B, a temperature difference at the point $\alpha$ of the center part relevant to the points $\beta$ and $\gamma$ is very large. Thus, when a current temperature has risen at a temperature at which an optical characteristic change occurs at the points $\beta$ and $\gamma$, a gasification (evaporation) temperature is exceeded at the point $\alpha$ of the center part or the surface of a transparent substrate (not shown) in the vicinity of the point $\alpha$ of the center part hardly exceeds a thermal deformation temperature.

In addition, even if the surface of the recording layer 3-2 at the side at which irradiation of the laser light beam 7 is subjected is vertical to the irradiation direction of the laser light beam 7 anywhere, in the case where the thickness of the recording layer 3-2 changes depending on a location, there is provided a structure in which an optical characteristic change inside of the recording layer 3-2 according to the present embodiment hardly occurs. For example, as shown in FIG. 6C, let us consider a case in which the thickness D1 of a peripheral part is significantly small with respect to the thickness Dg of the recording layer 3-2 at the point $\alpha$ of the center part (for example, formula (2) or formula (4) is not satisfied). Even at the point $\alpha$ of the center part, although heat radiation toward the light reflection layer 4-2 occurs, the thickness Dg of the recording layer 3-2 is sufficiently large, thus making it possible to achieve heat accumulation and to achieve a high temperature. In comparison, at the points $\zeta$ and $\eta$ at which the thickness D1 is significantly small, a heat is radiated toward the light reflection layer 4-2 without carrying out heat accumulation, and thus, a temperature rise amount is small. As a result, heat radiation toward points $\beta$, $\delta$, and $\zeta$ in order and heat radiation toward points $\gamma$, $\epsilon$, and $\eta$ in order occurs as well as heat radiation toward the light reflection layer 4-2, and thus, as in FIG. 6B, a temperature difference at the point a of the center part relevant to points $\beta$ and $\gamma$ becomes very large. When an exposure amount of the laser light beam 7 (recording power) is increased in order to produce an optical characteristic change at the points $\beta$ and $\gamma$ (in order to produce a critical temperature or more), the gasification (evaporation) temperature at the point $\alpha$ of the center part is exceeded or the surface of the transparent substrate (not shown) in the vicinity of the point $\alpha$ of the center part easily exceeds a thermal deformation temperature.

Based on the contents described above, referring to FIGS. 7A, 7B and 7C, a description will be given with respect to: the contents of a technical contrivance in the present embodiment relating to the pre-groove shape/dimensions for providing "setting of environment (structure or shape of a recording film)" in which a principle of recording according to the present embodiment is likely to occur; and the contents of a technical contrivance in the present embodiment relating to a thickness distribution of the recording layer. FIG. 7A shows a recording film structure in a conventional write-once type information storage medium such as CD-R or DVD-R; and FIGS. 7B and 7C each show a recording film structure in the present embodiment. In the invention, as shown in FIGS. 7A, 7B and 7C, a recording mark 9 is formed in a pre-groove area 11.

3-2-D] Basic Characteristics Relating to Pre-Groove Shape/Dimensions in the Present Embodiment As shown in FIG. 7A, there have been many cases in which a pre-groove area 11 is formed in a "V-groove" shape in a conventional write-once type information storage medium such as CD-R or DVD-R. In the case of this structure, as described in FIG. 6B, the energy absorption efficiency of the laser light beam 7 is low, and the temperature distribution non-uniformity in the recording layer 3-2 becomes very large. The present embodiment is featured in that, in order to make close to an ideal state of FIG. 6A, a planar shape orthogonal to a traveling direction of the incident laser light beam 7 is provided in the pre-groove area 11 at the side of at least the "transparent substrate 2-2". As described with reference to FIG. 6A, it is desirable that this planar area be as wide as possible. Therefore, the present embodiment is featured in that the planar area is provided in the pre-groove area 11 and the width Wg of the pre-groove area 11 is wider than the width W1 of a land area (Wg>W1). In this description, the width Wg of the pre-groove area and the width W1 of the land area are defined as their respective widths at a position at which there crosses a plane having an intermediate height between a height at a planar position of the pre-groove area and a height at a position at which the land area becomes the highest and an oblique surface in the pre-groove.

A discussion has been made using thermal analysis, data has been recorded in a write-once type information storage medium actually produced as a prototype, substrate deformation observation due to a sectional SEM (scanning type electronic microscope) image at the position of the recording mark 9 has been made, and observation of the presence or absence of a cavity generated due to gasification (evaporation) in the recording layer 3-2 has been repeated. As a result, it is found that advantageous effect is attained by widening the width Wg of the pre-groove area more significantly than the width W1 of the land area. Further, a ratio of the pre-groove area width Wg and the land area width W1 is Wg:W1=6:4, and desirably, is greater than Wg:W1=7:3, whereby it is considered that a local optical characteristic change in the recording layer 3-2 is likely to occur while the change is more stable at the time of recording. As described above, when a difference between the pre-groove area width Wg and the land area width W1 is increased, a flat surface is eliminated from the top of the land area 12, as shown in FIG. 7C. In the conventional DVD-R disc, a pre-pit (land pre-pit: not shown) is formed in the land area 12, and a format for recording address information or the like in advance is realized here. Therefore, it is conditionally mandatory to form a flat area in the land area 12. As a result, there has been a case in which the pre-groove area 11 is formed in the "V-groove" shape. In addition, in the conventional CD-R disc, a wobble signal has been recorded in the pre-groove area 11 by means of frequency modulation. In a frequency modulation system in the conventional CD-R disc, slot gaps (a detailed description of each format is given in detail) are not constant, and phase adjustment at the time of wobble signal detection (PLL: synchronization of PLL (Phase Lock Loop)) has been comparatively difficult. Thus, a wall face of the pre-groove area 11 is concentrated (made close to the V-groove) in the vicinity of a center at which the intensity of a reproducing focusing spot is the highest and a wobble amplitude amount is increased, whereby the wobble signal detection precision has been guaranteed. As shown in FIGS. 7B and 7C, after the flat area in the pre-groove area 11 in the present embodiment has been widened, when the oblique surface of the pre-groove area 11 is shifted to the outside relatively than a center position of the reproducing focusing spot, a wobble detection signal is hardly obtained. The present embodiment is featured in that the width Wg of the pre-groove area described above is widened and the H format utilizing PSK (Phase Shift Keying) in which slot gaps at wobble detection is always fixedly maintained or the B format utilizing FSK (Frequency Shift Keying) or STW (Saw Tooth Wobble) are combined, whereby stable recording characteristics are guaranteed (suitable to high speed recording or layering) at low recording power and stable wobble signal detection characteristics are guaranteed. In particular, in the H format, in addition to the above combination, "a ratio of a wobble modulation is lowered more significantly than that of a non-modulation area", thereby facilitating synchronization at the time of wobble signal detection more significantly, and further, stabilizing wobble signal detection characteristics more significantly.

3-2-E] Basic Characteristics Relating to Thickness Distribution of Recording Layer 3-2 in the Present Embodiment In the present description, as shown in FIGS. 7B and 7C, the thickness in a portion at which the recording layer 3-2 in the land area 12 is the thickest is defined as recording layer thickness D1 in the land area 12; and a portion at which the recording layer 3-2 in the pre-groove area 11 is the thickest is defined as recording layer thickness Dg in the pre-groove area. As has been described with reference to FIG. 6C, the recording layer thickness D1 in the land area is relatively increased, whereby a local optical characteristic change in the recording layer is stably likely to occur at the time of recording.

In the same manner as that described above, a discussion has been made using thermal analysis, data has been recorded in a write-once type information storage medium actually produced as a prototype, substrate deformation observation and observation of the presence or absence of a cavity generated due to gasification (evaporation) in the recording layer 3-2 by a sectional SEM (scanning type electronic microscope) image at the position of the recording mark 9 have been made. As a result, it has been found necessary to set a ratio between the recording layer thickness Dg in the pre-groove area and the recording layer thickness D1 in the land area to be equal to or smaller than Dg:D1=4:1. Further, Dg:D1=3:1 is set, and desirably, Dg:D1=2:1 is set, thereby making it possible to guarantee stability of a principle of recording in the present embodiment.

3-3) Recording Characteristics Common to Organic Dye Recording Film in the Present Embodiment As one of "3-2-B] basic characteristics common to an organic dye recording material in the present embodiment", the present embodiment is featured by recording power control, as described in item [γ].

The formation of the recording mark 9 due to a local optical characteristic change in the recording layer 3-2 occurs at a temperature, which is much lower than a plastic deformation temperature of the conventional transparent substrate 2-2, at a thermal decomposition temperature in the recording layer 3-2, or a gasification (evaporation) temperature. Thus, an upper limit value of recording power is restricted so as not ensure that the transparent substrate 2-2 locally exceeds a plastic deformation temperature at the time of recording or a thermal decomposition temperature or a gasification (evaporation) temperature is locally exceeded in the recording layer 3-2.

In parallel to discussion using thermal analysis, by using an apparatus described later in "4-1) Description of structure and characteristics of reproducing apparatus or recording/reproducing apparatus in the present embodiment" and by using a recording condition described later in "4-3) Description of recording condition in the present embodiment", there has been made a demonstration of a value of optimal power in the case where recording has been carried out in a principle of recording shown in the present embodiment. A numerical aperture (NA) value of an objective lens in the recording/reproducing apparatus used in a demonstration test has been 0.65, and a line speed at the time of recording has been 6.61 m/s. As a value of recording power (Peak Power) defined later in "4-3) Description of recording condition in the present embodiment", it has been found that:

Gasification (evaporation) occurs with most of an organic dye recording material at 30 mW, and a cavity occurs in a recording mark;

A temperature of the transparent substrate 2-2 at a position in the vicinity of the recording layer 3-2 significantly exceeds a glass transition temperature;

A temperature of the transparent substrate 2-2 at a position in the vicinity of the recording layer 3-2 reaches a plastic deformation temperature (glass transition temperature) at 20 mW;

15 mW or less is desirable in consideration of a margin such as surface pre-warping or recording power change of an information storage medium.

The "recording power" described above denotes a sum of exposure amount irradiated to the recording layer 3-2. The optical energy density at a center part of a focusing spot and at a portion at which the optical intensity density is the highest is obtained as parameters targeted for discussion in the present embodiment. The focusing spot size is inversely proportional to the NA value, and thus, the optical energy density at the center part of the focusing spot increases in proportion to a square of the NA value. Therefore, the current value can be converted to a value of optimal recording power in the B format described later or another format (another NA value) (D3) by using a relational formula below:

[Recording power applicable to different $NA$ values]=
[Recording power when $NA$=0.65]×0.65$^2$/$NA^2$ (5)

Further, optimal recording power changes depending on a line speed V in phase change type recording material. In general, it is said that optimal recording power changes in proportion to a ½ square of a line speed V in phase change type recording material, and changes in proportion to a line speed V in organic dye recording material. Therefore, a conversion formula of optimal recording power considering a line speed V, obtained by extending formula (5), is obtained as follows:

[General recording power] = (6)
[Recording power when $NA = 0.65$; 6.6 m/s]×
$(0.65/NA)^2 \times (V/6.6)$, or

[General recording power] = (7)
[Recording power when $NA = 0.65$; 6.6 m/s]×
$(0.65/NA)^2 \times (V/6.6)^{1/2}$ When the above discussion result is summarized, as recording power for guaranteeing a principle of recording shown in the present embodiment, it is desirable to set an upper limit value such as:

[Optimal recording power]<30×$(0.65/NA)^2$×$(V/6.6)$ (8)

[Optimal recording power]<30×$(0.65/NA)^2$×$(V/6.6)^{1/2}$ (9)

[Optimal recording power]<20×$(0.65/NA)^2$×$(V/6.6)$ (10)

[Optimal recording power]<20×$(0.65/NA)^2$×$(V/6.6)^{1/2}$ (11)

[Optimal recording power]<15×$(0.65/NA)^2$×$(V/6.6)$ (12)

[Optimal recording power]<15×$(0.65/NA)^2$×$(V/6.6)^{1/2}$ (13)

From among the above formulas, a condition for formula (8) or formula (9) is obtained as a mandatory condition; a target condition for formula (10) or formula (11) is obtained; and a condition for formula (12) or formula (13) is obtained as a desirable condition.

3-4) Description of Characteristics Relating to "H-L" Recording Film in the Present Embodiment A recording film having characteristics that a light reflection amount in a recording mark 9 is lower than that in an unrecorded area is referred to as an "H-L" recording film. In contrast, a recording film in which the above light reflection amount is high is referred to as an "L-H" recording film. Among them, with respect to the "H-L" recording film, the present embodiment is featured in that:

1) an upper limit value is provided at a ratio of absorbance at a reproduction wavelength relevant to absorbance at a $\lambda_{max\ write}$ position of light absorption spectra; and 2) a light absorption spectra profile is changed to form a recording mark.

In the H format in the present embodiment, as a modulation system, there is employed ETM (Eight to Twelve: 8-bit data code is converted to 12-channel bit) and RLL (1, 10) (Among a code train after modulated, a minimum inversion length relevant to a 12-channel bit length T is 2T, and a maximum inversion length is 11T). Where performance evaluation of a reproduction circuit described later in "4-2) Description of reproducing circuit in the present embodiment) is carried out, in order to stably carry out reproduction by the reproducing circuit, it has been found necessary to meet that a ratio of [a differential value $I_{11}\equiv I_{11L}$, where $I_{11H}$ is a reproduction signal amount from an unrecorded area having a sufficiently long length (11T) and $I_{11L}$ is a reproduction signal amount from a recording mark having the sufficiently long length (11T) to $[1_{11H}]$ is:

$I_{11}/I_{11H} \geq 0.4$ (20) or preferably, $I_{11}/I_{11H} > 0.2$ (21)

In the present embodiment, a PRML (partial response maximum likelihood) method is utilized at the time of signal reproduction recorded at high density. In order to precisely carry out detection in accordance with a PRML technique, the linearity of a reproduction signal is requested.

As a method for selecting an organic dye material suitable to a specific "H-L" recording layer, there is selected an organic dye material for which, in the present embodiment, based on an optical film design, a refractive factor range in an unrecorded state is $n_{32}=1.3$ to 2.0; the absorption coefficient range is $k_{32}=0.1$ to 0.2, desirably $n_{32}=1.7$ to 1.9; the absorption coefficient range is $k_{32}=0.15$ to 0.17, and a series of conditions described above are met.

In the "H-L" recording film, in light absorption spectra in an unrecorded area, although a wavelength of $\lambda_{max\ write}$ is shorter than a wavelength of reproduction light or recording/reproducing light (for example, 405 nm), the wavelength of $\lambda_{max\ write}$ may be longer than a wavelength of reproduction light or recording/reproducing light (for example, 405 nm), without being limited thereto.

In odder to meet the above formula (22) or formula (23), the thickness Dg of the recording layer 3-2 is influenced. For example, if the thickness Dg of the recording layer 3-2 significantly exceeds an allowable value, optical characteristics of only a part coming into contact with the transparent substrate 2-2 in the recording layer 3-2 are changed as a state that follows forming of the recording mark 9, whereby the optical characteristics of a portion coming into contact with the light reflection layer 4-2 adjacent to its location are obtained as a value equal to that in the unrecorded area. As a result, a reproduction light amount change is lowered, and a value of $I_3$ in formula (22) or formula (23) is reduced, and a condition for formula (22) or formula (23) cannot be met. Therefore, in order to meet formula (22), as shown in FIGS. 7B and 7C, it is necessary to make a change to the optical characteristics of a portion which comes into contact with the light reflection layer 4-2 in the recording mark 9. Further, if the thickness Dg of the recording layer 3-2 significantly exceeds an allowable value, a temperature gradient occurs in the thickness direction in the recording layer 3-2 when the recording mark is formed.

Then, before reaching the optical characteristic change temperature at a portion coming into contact with the light reflection layer 4-2 in the recording layer 3-2, a gasification (evaporation) temperature of a portion coming into contact with the transparent substrate 2-2 is exceeded or a thermal deformation temperature is exceeded in the transparent substrate 2-2. For the above reason, in the present embodiment, in order to meet formula (22), the thickness Dg of the recording layer 3-2 is set to "3T" or less based on the discussion of thermal analysis; and a condition meeting formula (23) is such that the thickness Dg of the recording layer 3-2 is set to "3×3T" or less. Basically, in the case where the thickness Dg of the recording layer 3-2 is equal to or smaller than "3T", although formula (22) can be met, the thickness may be set to "T" or less in consideration of effect of a tilt due to a facial motion or warping of the write-once type information storage medium or a margin relevant to a focal blurring. In consideration of a result obtained by formulas (1) and (2) described previously, the thickness Dg of the recording layer 3-2 in the present embodiment is set in the range assigned in a required minimum condition that:

$$9T \geq Dg \geq \lambda/8n_{32} \tag{27}$$

and in a desired condition that:

$$3T \geq Dg \geq \lambda/4n_{32} \tag{28}$$

Without being limited thereto, the severest condition can be defined as:

$$T \geq Dg \geq \lambda/4n_{32} \tag{29}$$

As described later, a value of the channel bit length T is 102 nm in the H format, and is 69 nm to 80 nm in the B format. Thus, a value of 3T is 306 nm in the H format and is 207 nm to 240 nm in the B format. A value of 9T is 918 nm in the H format and is 621 nm to 720 nm in the B format. Here, although an "H-L" recording film has been described, the conditions for formulas (27) to (29) can be applied to an "L-H" recording film without being limited thereto.

Chapter 4: Description of Reproducing Apparatus or Recording/Reproducing Apparatus and Recording Condition/Reproducing Circuit 4-1) Description of Structure and Characteristics of Reproducing Apparatus or Recording/Reproducing Apparatus in the Present Embodiment FIG. 8 shows an illustration of a structure in an embodiment of an information recording/reproducing apparatus. In FIG. 8, an upper side of a control unit 143 mainly indicates an information recording control system for an information storage medium. In the embodiment of the information reproducing apparatus, a structure excluding the information recording control system in FIG. 8 corresponds to the above structure. In FIG. 8, the arrow drawn by the thick solid line indicates a flow of main information which designates a reproduction signal or a recording signal; the arrow of the thin solid line denotes a flow of information; the arrow of the one-dotted chain line denotes a reference clock line; and the arrow of the thin dashed line denotes a command indicating direction.

An optical head (not shown) is arranged in an information recording/reproducing unit 141 shown in FIG. 8. In the present embodiment, although a wavelength of a light source (semiconductor laser) used in the optical head is 405 nm, the present embodiment is not limited thereto, and there can be used a light source having a use wavelength equal to or shorter than 620 nm or 530 nm or a light source ranging from 355 nm to 455 nm, as described previously. In addition, two objective lenses used to focus the light beam having the above wavelength onto the information storage medium may be incorporated in the optical head. In the case where a recording/reproducing operation is carried out with respect to an information storage medium in the H format, an objective lens having a NA value of 0.65 is used. A structure is provided such that, in the case where a recording/reproducing operation is carried out with respect to an information storage medium in the B format, an objective lens having NA=0.85 is used. As an intensity distribution of incident light immediately before the light is incident to an objective lens, the relative intensity at the periphery of the objective lens (at the boundary position of an aperture) when the center intensity is set to "1" is referred to as "RIM Intensity". A value of the RIM intensity in the H format is set in the range of 55% to 70%. At this time, a wave surface aberration amount in the optical head is optically designed so as to be 0.33λ (0.33λ or less) with respect to a use wavelength λ.

In the present embodiment, a partial response maximum likelihood (PRML) is used for information reproduction to achieve high density of an information storage medium (point [A]). As a result of a variety of tests, when PR (1, 2, 2, 2, 1) is used as a PR class to be used, line density can be increased and the reliability of a reproduction signal can be improved (i.e., demodulation reliability can be improved) when a servo correction error such as a focal blurring or a track shift has occurred. Thus, in the present embodiment, PR (1, 2, 2, 2, 1) is employed (point [A1]). In the present embodiment, a channel bit pattern after modulated is recorded in an information storage medium in accordance with a (d, k; m, n) modulation rule (In the above described method, this denotes RLL (d, k) of m/n modulation).

Specifically, ETM (Eight to Twelve Modulation) for converting 8-bit data to a 12-channel bit (m=8, n=12) is employed as a modulation system, and a condition of RLL (1, 10) in which a minimum value having continuous "0"s is defined as d=1, and a maximum value is defined as k=10 as a run length limited RLL restriction for apply limitation to a length that follows "0" in the channel bit pattern after modulated must be met. In the present embodiment, in order to achieve high density of an information storage medium, a channel bit gap is reduced to the minimum. As a result, for example, after a pattern "101010101010101010101010" which is a repetition of a pattern of d=1 has been recorded in the information storage medium, in the case where the data is reproduced in an information recording/reproducing unit 141, the data is close to a shutdown frequency having MTF characteristics of a reproducing optical system, and thus, a signal amplitude of a reproduced raw signal is formed in a shape almost hidden by noise. Therefore, a partial response maximum likelihood (PRML) technique is used as a method for thus reproducing a recording mark or a pit, which has been dense up to the vicinity of a limit of the MTF characteristics (shutdown frequency). That is, a signal reproduced from the information recording/reproducing unit 141 receives reproducing waveform correction by a PR equalizer circuit 130.

A signal having passed through the PR equalizer circuit 130 is sampled by converting a signal after passing through the PR equalizer circuit 130 to a digital amount in accordance with a timing of a reference clock 198 sent from a reference clock generating circuit 160; the sampled signal is converted to a digital data by an AD converter 169; and a Viterbi decoding process is carried out in a Viterbi decoder 156. The data after Viterbi-decoded is processed as data, which is completely similar to binary data at a conventional slice level. In the case where the PRML technique has been employed, if a sampling timing obtained by the AD converter 169 is shifted, an error rate of the data after Viterbi decoded increases.

Therefore, in order to enhance precision of the sampling timing, the information reproducing apparatus or information recording/reproducing apparatus according to the present embodiment has another sampling timing sampling circuit in particular (combination of Schmidt trigger binarizing circuit 155 and PLL circuit 174). This Schmidt trigger circuit 155 has a specific value (forward direction voltage value of diode in actuality) at a slice reference level for binarizing, and is featured in that binarizing is provide only when the specific width has been exceeded. Therefore, for example, as described above, in the case where a pattern of "1010101010101010101010" has been input, a signal amplitude is very small, and thus, switching of binarizing does not occur. In the case where "1001001001001001001001" or the like, for example, being a pattern of a rarer fraction than the above, has been input, an amplitude of a reproducing raw signal increases, and thus, the polarity switching of a binary signal occurs in accordance with a timing of "1" by a Schmidt trigger binarizing circuit 155. In the present embodiment, an NRZI (Non Return to Zero Invert) technique is employed, and a position of "1" of the above pattern coincides with an edge section (boundary section) of a recording mark or a pit.

A PLL circuit 174 detects a shift in frequency and phase between a binary signal which is an output of this Schmidt trigger binarizing circuit 155 and a signal of a reference clock 198 sent from a reference clock generating circuit 160 to change the frequency and phase of the output clock of the PLL circuit 174. A reference clock generating circuit 160 applies a feedback to (a frequency and a phase) of a reference clock 198 so as to lower an error rate after Viterbi decoded, by using an output signal of this PLL circuit 174 and decoding characteristic information on a Viterbi decoder 156 and a convergence length (information on (distance to convergence)) in a path metric memory in the Viterbi decoder 156, although is not specifically shown). The reference clock 198 generated by this reference clock generating circuit 160 is utilized as a reference timing at the time of reproduction signal processing.

A sync code position sampling unit 145 serves to detect the presence and position of a sync code, which coexists in an output data train of the Viterbi decoder 156 and to sample a start position of the above output data. While this start position is defined as a reference, a demodulator circuit 152 carries out a demodulating process with respect to data temporarily stored in a shift resistor circuit 170. In the present embodiment, the above temporarily stored data is returned to its original bit pattern with reference to a conversion table recorded in a demodulating conversion table recording unit 154 on 12-channel bit by bit basis. Then, an error correcting process is performed by an ECC decoding circuit 162, and descrambling is carried out by a descrambling circuit 159. Address information is recorded in advance by wobble modulation in a recording type (rewritable type or write-once type) information storage medium according to the present embodiment. A wobble signal detecting unit 135 reproduces this address information (i.e., judges the contents of a wobble signal), and supplies information required to provide an access to a desired location to the control unit 143.

A description will be given with respect to an information recording control system provided at the upper side than the control unit 143. After data ID information has been generated from a data ID generating unit 165 in accordance with a recording position on an information storage medium, when copy control information is generated by a CPR_MAI data generating unit 167, a variety of information on data ID, IED, CPR_MAI, and EDC is added to information to be recorded by a data ID, IED, CPR_MAI, and EDC adding unit 168. After the added information has been descrambled by the descrambling circuit 157, an ECC block is formed by an ECC encoding circuit 161, and the ECC block is converted to a channel bit pattern by a modulating circuit 151. A sync code is added by a sync code generating/adding unit 146, and data is recorded in an information storage medium in the information recording/reproducing unit 141. At the time of modulation, DSV values after modulated are sequentially calculated by a DSV (Digital Sum Value) calculating unit 148, and the serially calculated values are fed back to code conversion after modulated.

Figure 9:
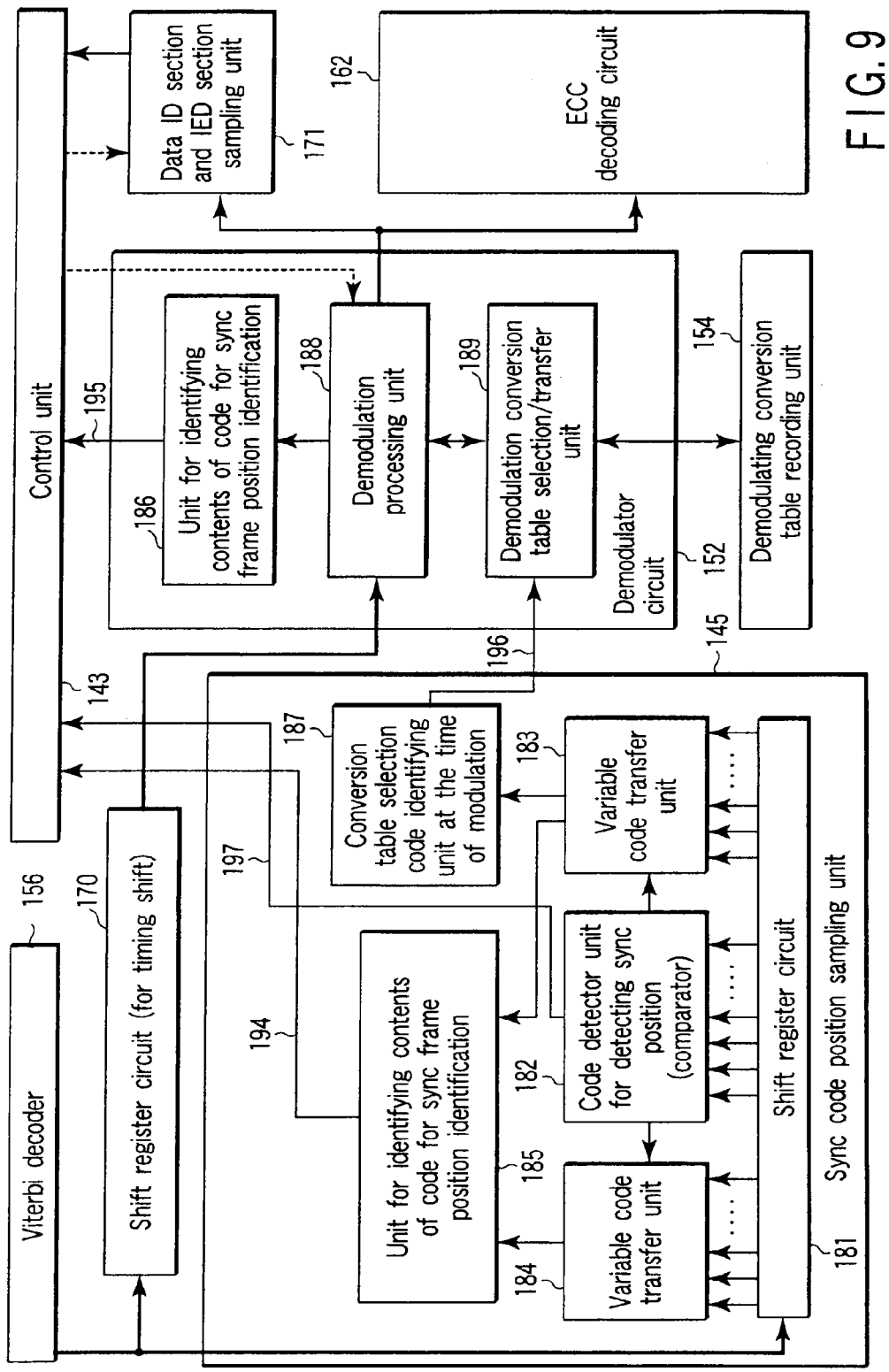
FIG. 9 is an exemplary view showing a detailed structure of peripheral portions including a sync code position sampling section 145 shown in FIG. 8.

FIG. 9 shows a detailed structure of peripheral portions including the sync code position detector unit 145 shown in FIG. 8. A sync code is composed of a sync position detecting code section and a variable code section having a fixed pattern. From the channel bit pattern output from a Viterbi decoder, a sync position detecting code detector unit 182 detects a position of a sync position detecting code section having the above fixed pattern. Variable code transfer units 183 and 184 sample data on a variable code which exists before and after the detected position, and judge in which sync frame in a sector the sync code is positioned, the sync code being detected by an identifying unit 185 for detecting a sync position having the above fixed pattern. User information recorded on an information storage medium is sequentially transferred in order of a shift register circuit 170, a demodulation processing unit 188 in a demodulator circuit 152, and an ECC decoding circuit 162.

In the present embodiment, in the H format, the high density of the information storage medium is achieved (in particular, line density is improved) by using the PRML system for reproduction in a data area, a data lead-in area, and a data lead-out area. In addition, compatibility with a current DVD is ensured and reproduction stability is ensured by using a slice level detecting system for reproducing in a system lead-in area and a system lead-out area. (A detailed description will be given later in "Chapter 7: Description of H Format".)

Chapter 5: Specific Description of Organic Dye Recording Film in the Present Embodiment 5-1) Description of Characteristics Relating to "L-H" Recording Film in the Present Embodiment A description will be given with respect to an "L-H" recording film having characteristics in which a light reflection amount is lowered in a recording mark as compared with that in an unrecorded area. From among principles of recording described in "3-2-B] Basic characteristics common to organic dye recording material in the present embodiment", a principle of recording in the case of using this recording film mainly utilizes any of:

Chromogenic characteristic change;

Change of electron structure (electron orbit) relevant to elements which contribute to chromogenic phenomenon [discoloring action or the like]; and Array change between molecules, and changes characteristics of light absorption spectra. The "L-H" recording film is featured in that the reflection amount range in an unrecorded location and a recorded location has been specified in view of characteristics of a read-only type information storage medium having a one-sided dual layered structure.

Figure 10:
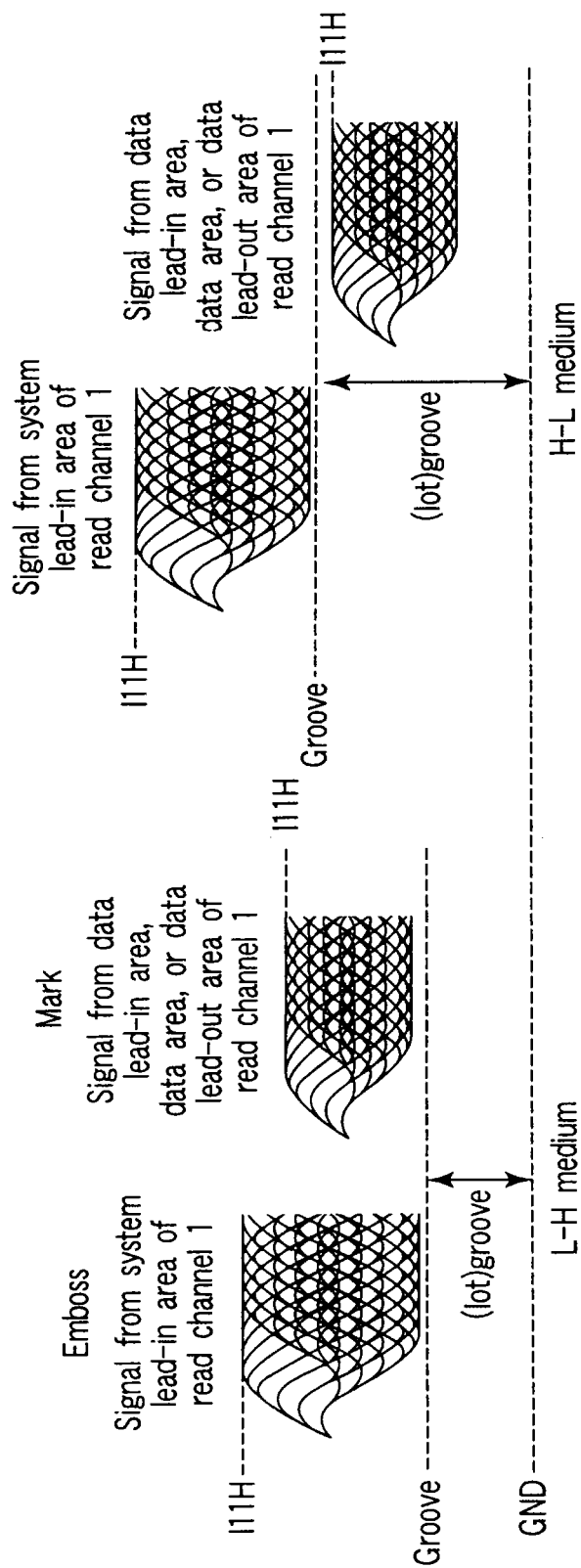
FIG. 10 is an exemplary view illustrating polarity of a detection signal detected from the "H-L" recording film and the "L-H" recording film.

FIG. 10 shows reflection factors at a non-recording position and a recorded position in a variety of recording films in the present embodiment. In the case where an H format has been employed (refer to "Chapter 7: Description of H Format"), a signal appears in a same direction in an emboss area (such as system leas-in area SYLDI) and a recording mark area (data lead-in area DTLDI, data lead-out area DTLDO, or data area DTA) in the "L-H" recording film while a groove level is defined as a reference. Similarly, in the "H-L" recording film, while a groove level is defined as a reference, a signal appears in an opposite direction in an emboss area (such as system lead-in area SYSDI) and a recording mark area (data lead-in area DTLDI, data lead-out area DTLDO, or data area DTA). Utilizing this phenomenon, a detecting circuit design corresponding to the "L-H" recording film and "H-L" recording film is facilitated in addition to use for recording film identification between the "L-H" recording film and the "H-L" recording film. In addition, the reproduction signal characteristics obtained from a recording mark recorded on the "L-H" recording film shown in the present embodiment is adjusted to conform to signal characteristics obtained from the "H-L" recording film to meet formulas (20) to (23). In this manner, in the case of using either one of the "L-H" recording film and the "H-L" recording film, the same signal processor circuit can be used, and the signal processor circuit can be simplified and reduced in price.

Figures 27A, 27B:
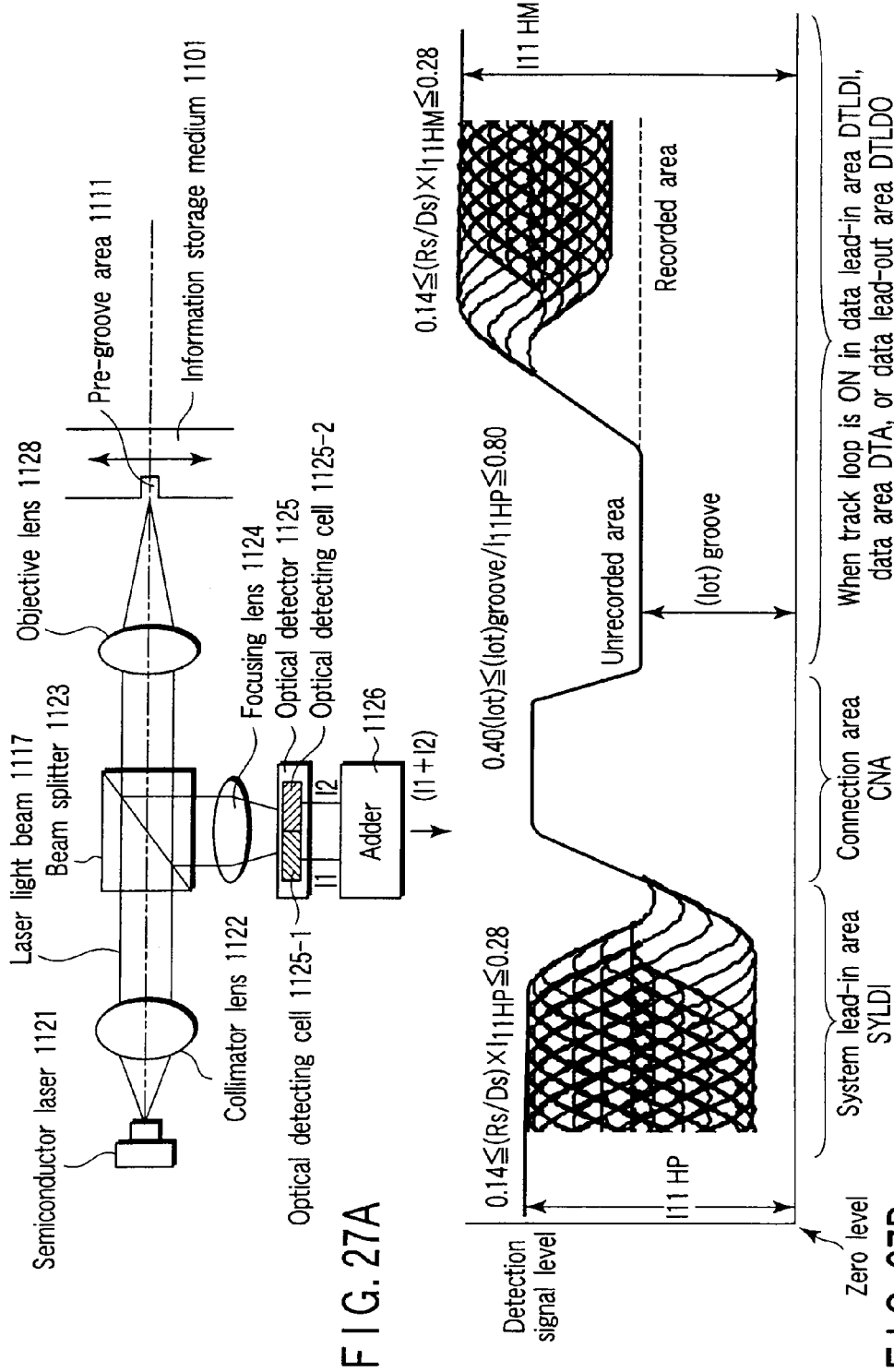
FIGS. 27A and 27B are exemplary views each illustrating another embodiment of the detection signal level conforming to the H format in an "L-H" recording film.

Referring to FIGS. 27A and 27B, a description will be given with respect to another embodiment relevant to an embodiment showing a relationship in light reflection factor between an "H-L" recording film and an "L-H" recording film shown in FIG. 10.

In the present embodiment, as shown in FIGS. 7B and 7C, the width Wg of the pre-groove area 11 is set to be wider than the width W1 of the land area 12. In this manner, according to the present embodiment, a signal level (Iot)groove from the pre-groove area 11 is increased when tracking is carried out on the pre-groove area 11 (data lead-in area DTLDI or data area DTA and inside of data lead-out area DTLDO).

In the present embodiment, a "light reflection factor" is defined by using a detection signal level detected by using an optical head, as described below.

First, a parallel laser light beam of an incident light quantity $I_o$ is irradiated to a specific area free from fine irregularities such as pre-pits or pre-grooves of the information storage medium 1101; a reflection light quantity $I_R$ of the parallel laser light beam reflected from the information storage medium 1101 is measured; and a value of $Rs=I_R/I_o$ is utilized as a reference of the light reflection factor Rs. In this way, the value measured without using an optical head is defined as a calibrated light reflection factor Rs. Next, a detection signal level detected by using an optical head in its predetermined area is defined as reflection light power Ds, and a value of (Rs/Ds) is utilized as a conversion coefficient for converting into a "light reflection factor" from the detection signal level detected by using the optical head at each position of the information storage medium 1101.

According to the present embodiment, a reflection factor of an information recording medium is specified so that the light reflection factor of the system lead-in area SYLDI of the "H-L" recording film ranges from 16% to 32%.

Further, a ratio (Iot)groove/I11HP of the light reflection quantity (Iot)groove in a unrecorded area in the "H-L" recording film to the reflection factor I11HP in the system lead-in area SYLDI according to the present embodiment is specified at a high level so as to be included in the range of 0.5 to 1.0. As shown in FIGS. 7B and 7C, the width Wg of the pre-groove area 11 is narrower than the width W1 of the land area 12, thereby increasing a level of (Iot)groove. In particular, in the "H-L" recording film, thickness Dg of the recording layer 3-2 is increased, thereby reducing a step difference quantity Hr between groove and land areas. In this manner, the level of (Iot)groove is increased so that a value of (Iot)groove/I11HP is 50% or more. As a result, the light reflection quantity I11HM from the recording mark recorded in the groove area 11 can be increased, and the detection signal amplitude from the recording mark on the groove area 11 is increased.

Now, referring to FIGS. 27A and 27B, a description will be given with respect to a detection signal level in an "L-H" recording film. A laser light 1117 emitted from a semiconductor laser 1121 is changed to a parallel beam through a collimator lens 1122. The parallel beam is passed through a beam splitter 1123 and focused onto a pre-groove area 1111 of an optical disc 1101 through an objective lens 1128. The light reflected from the pre-groove area 1111 is incident on the beam splitter 1123 through the objective lens 1128. The light reflected by the beam splitter 1123 is irradiated on an optical sensor 1125 through a condenser lens 1124. The optical sensor 1125 includes optical detector cells 1125-1 and 1125-2 which output detection signals I1 and I2. The light reflection quantity in the system lead-in area SYLDI of the "L-H" recording film is defined by (Rs/Ds)×I11HP as in the "H-L" recording film. In the present embodiment, the light reflection factor in the system lead-in area SYLDI of the "L-H" recording film is specified in the range of 14% to 28%. In the "L-H" recording film, the thicknesses Dg and D1 of the recording film 3-2 in the pre-groove area 11 and the land area 12 shown in FIGS. 7B and 7C are relatively made small. Thus, the detection signal level (Iot)groove in an unrecorded area of the pre-groove area 214 when a track loop is ON in an unrecorded area is lower than that of the "H-L" recording film. As a result, in the present embodiment, a ratio (Iot)groove/I11HP of the light reflection quantity (Iot)groove on the pre-groove area 214 at an unrecorded position of the data lead-in area DTLDI, the data area DTA, or the data lead-out area DTLDO is set to be lower than that of the "H-L" recording film so as to be included in the range of 40% to 80%. In the "L-H" recording film, the light reflection factor in the recording mark increases more significantly than the reflection factor of the unrecorded area, and thus, a reproduction signal waveform as shown in FIG. 27B is produced. In FIG. 27B as well, the highest detection signal level I11HM of the reproduction signal from the recording mark is used as the light reflection quantity, and the reflection factor is specified by (Rs/Ds)×I11HM. In the present embodiment, the reflection factor in the "L-H" recording film ranges from 14% to 28%. According to the present embodiment, the light reflection range in the system lead-in area SYLDI is specified so as to partially overlap in the "L-H" recording film and the "H-L" recording film. There exists an overlap portion α of the light reflection factors between the "H-L" recording film and the "L-H" recording film in the system lead-in area SYLDI. In the present embodiment, this light reflection range in this area ranges from 16% to 28%. The present embodiment uses a method for overlapping the reflection factor range between the "H-L" recording film and the "L-H" recording film in this system lead-in area SYLDI in which an overlap portion of the reflection factors between the "H-L" recording film and the "L-H" recording film in the system lead-in area SYLDI is produced by controlling optical characteristics of each recording layer 3-2. Further, there is provided an overlap portion β of the light reflection factor range when a track loop is ON in the data lead-in area DTLDI, the data DTA, or the data lead-out area DTLDO. In this overlap portion, the (Iot) groove level in an unrecorded area of the "H-L" recording film is set to be higher than a signal level of the detection signal level (Iot)groove in an unrecorded area of the "L-H" recording film, whereby the overlap portion β between the light reflection factors exists.

Specifically, as shown in FIGS. 7B and 7C, the film thicknesses Dg and D1 of the recording layer 3-2 are set to be greater in the "H-L" recording film than in the "L-H" recording film. As a result, a step difference Hr in the light reflection layer 4-2 of the "H-L" recording film is smaller than that of the "L-H" recording film. As a result, the detection signal level (Iot)groove in an unrecorded area of the "H-L" recording film increases. In the present embodiment, the light reflection factor range when a track loop is ON is coincident between the "H-L" recording film and the "L-H" recording film. In addition, the overlap portion p of the light reflection factor is maximized between the "H-L" recording film and the "L-H" recording film in the data area DTA or the like. Further, in the present embodiment, there exists a portion γ at which the light reflection factors overlap each other between the portion α at which the light reflection factors in the system lead-in area SYLDI overlap each other and the portion β at which the light reflection factors in the data area DTA overlap each other.

In the present embodiment, as shown in FIG. 7B or 7C, the width Wg of the pre-groove area 11 is wider than the width W1 of the land area 12, and a detection signal level (Iot) groove from a groove in an unrecorded area such as the inside of the data area DTA is reduced, thereby increasing the overlap portion γ of the light reflection factors between the portions α and β.

5-2) Characteristics of Light Absorption Spectra Relating to "L-H" Recording Film in the Present Embodiment As has been described in "3-4) Description of characteristics relating to "H-L" recording film in the present embodiment, the relative absorbance in an unrecorded area is basically low in the "H-L" recording film, and thus, when reproduction light has been irradiated at the time of reproduction, there occurs an optical characteristic change generated by absorbing energy of the reproduction light. Even if an optical characteristic change (update of recording action) has occurred after the energy of the reproduction light has been absorbed in a recording mark having high absorbance, a light reflection factor from the recording mark is lowered. Thus, reproduction signal processing is less affected because such a change works in a direction in which an amplitude of a reproduction signal ($I_{11} \equiv I_{11H} - I_{11L}$) of the reproduction signal increases.

In contrast, the "L-H" recording film has optical characteristics that "a light reflection factor of an unrecorded portion is lower than that in a recording mark". This means that the absorbance of the unrecorded portion is higher than that in the recording mark. Thus, in the "L-H" recording film, signal degradation at the time of reproduction is likely to occur as compared with the "H-L" recording film. As described in "3-2-B] Basic characteristics common to organic dye recording material in the invention", there is a need for improving reliability of reproduction information in the case where reproduction signal degradation has occurred due to ultraviolet ray or reproduction light irradiation".

As a result of checking the characteristics of an organic dye recording material in detail, it has been found that a mechanism of absorbing the energy of reproduction light to cause an optical characteristic change is substantially analogous to that of an optical characteristic change due to ultraviolet ray irradiation. As a result, if there is provided a structure of improving durability relevant to ultraviolet ray irradiation in an unrecorded area, signal degradation at the time of reproduction hardly occurs. Thus, the present embodiment is featured in that, in the "L-H" recording film, a value of $\lambda_{max\ write}$ (maximum absorption wavelength which is the closest to wavelength of recording light) is longer than a wavelength of recording light or reproduction light (close to 405 nm). In this manner, the absorbance relevant to the ultraviolet ray can be reduced, and the durability relevant to ultraviolet ray irradiation can be significantly improved. As is evident from FIG. 12, a difference in absorbance between a recorded portion and an unrecorded portion in the vicinity of $\lambda_{max\ write}$ is small, and a degree of reproduction signal modulation (signal amplitude) in the case where the wavelength light in the vicinity of $\lambda_{max}$ write is reduced. In view of a wavelength change of a semiconductor laser light source, it is desirable that a sufficiently large degree of reproduction signal modulation (signal amplitude) be taken in the range of 355 nm to 455 nm. Therefore, in the present embodiment, a design of a recording film 3-2 is made so that a wavelength of $\lambda_{max\ write}$ exists out of the range of 355 nm to 455 nm (i.e., at a longer wavelength than 455 nm).

Figure 11:
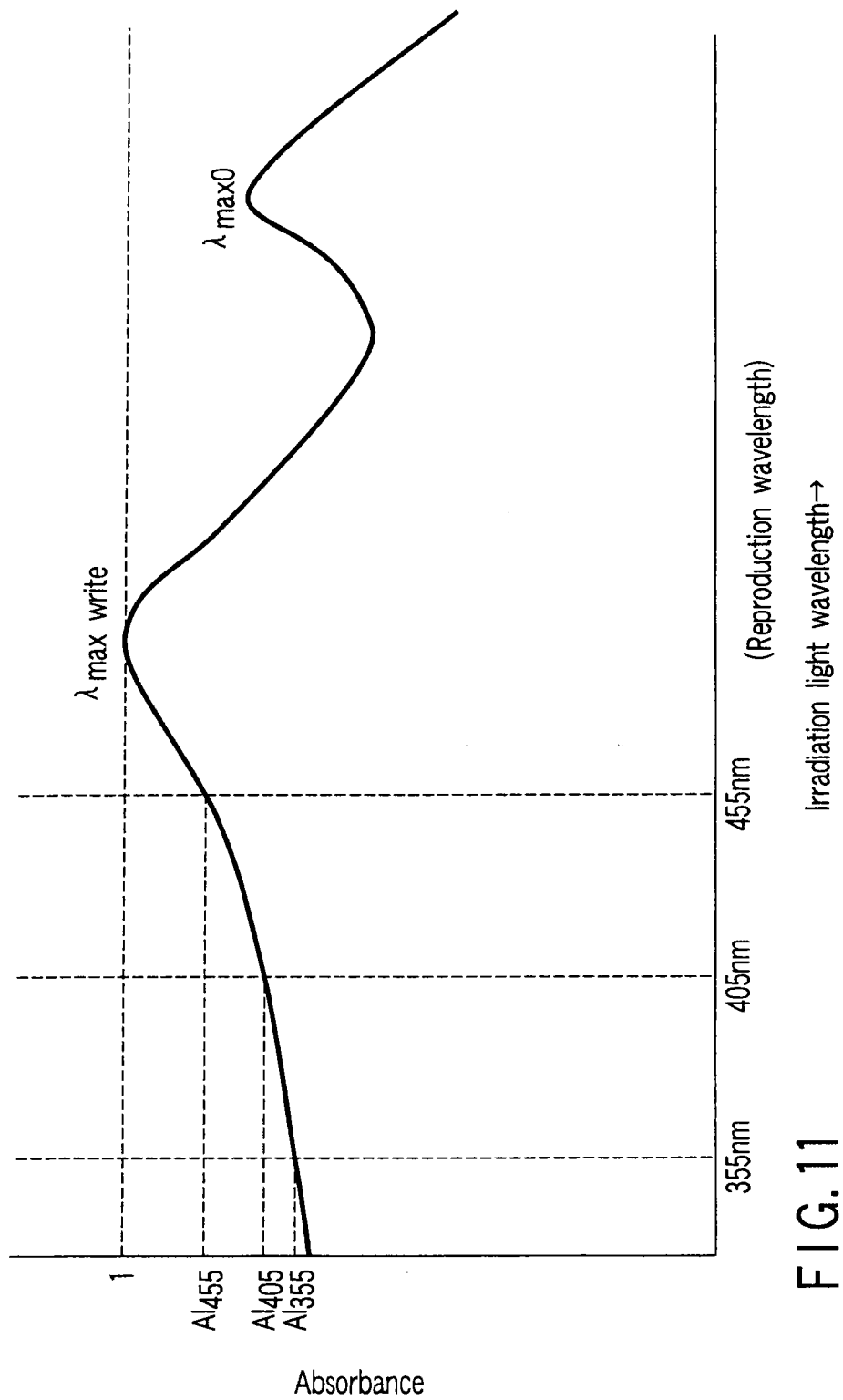
FIG. 11 is an exemplary view showing light absorption spectrum characteristics in an unrecorded state of the "L-H" recording film.

FIG. 11 shows an example of light absorption spectra in the "L-H" recording film in the present embodiment. As described in "5-1) Description of feature relating to "L-H" recording film, a lower limit value β of a light reflection factor at a non-recording portion ("L" section) of the "L-H" recording film is set to 18%, and an upper limit value γ is set to 32% in the present embodiment. From 1−0.32=0.68, in order to meet the above condition, it is possible to intuitively understand whether or not a value $Al_{405}$ of the absorbance in an unrecorded area at 405 nm should meet:

$$Al_{405} \geq 68\% \quad (36)$$

Although the light reflection factor at 405 nm of the light reflection layer 4-2 in FIGS. 1A and 1B is slightly lowered than 100%, it is assumed that the factor is almost close to 100% for the sake of simplification. Therefore, the light reflection factor when absorbance Al=0 is almost 100%. In FIG. 11, the light reflection factor of the whole recording film at a wavelength of $\lambda_{max\ write}$ is designated by $R\lambda_{max\ write}$. At this time, assuming that the light reflection factor is zero ($R\lambda_{max\ write} \approx 0$), formula (36) is derived. However, in actuality, the factor is not set to "0", and thus, it is necessary to drive a severer formula. A severe conditional formula for setting the upper light value γ of the light reflection factor of the non-recording portion "'L" portion) of the "L-H" recording film to 32% is given by:

$$1 - Al_{405} \times (1 - R\lambda_{max\ write}) \leq 0.32 \quad (37)$$

In a conventional write-once type information storage medium, only the "H-L" recording film is used, and there is no accumulation of information relating to the "L-H" recording film. However, in the case of using the present embodiment described later in "5-3) Anion portion: azo metal complex+cation portion: dye" and "5-4) Using "copper" as azo metal complex+center metal", the most severest condition which meets formula (37) is obtained as:

$$Al_{405} \geq 80\% \quad (38)$$

In the case of using an organic dye recording material described later in the embodiment, when an optical design of a recording film is made including a margin such as a characteristic variation at the time of manufacture or a thickness change of the recording layer 3-2, it has been found that a minimum condition which meet the reflection factor described in the section "Description of feature relating to "L-H" recording film" in the present embodiment:

$$Al_{405} \geq 40\% \quad (39)$$

may be met. Further, by meeting either of:

$$Al_{355} \geq 40\% \quad (40)$$

$$Al_{455} \geq 40\% \quad (41)$$

it is possible to ensure stable recording characteristics or reproduction characteristics even if a wavelength of a light source is changed in the range of 355 nm to 405 nm or in the range of 405 nm to 455 nm (in the range of 355 nm to 455 nm in the case where both of the formulas are met at the same time).

Figure 12:
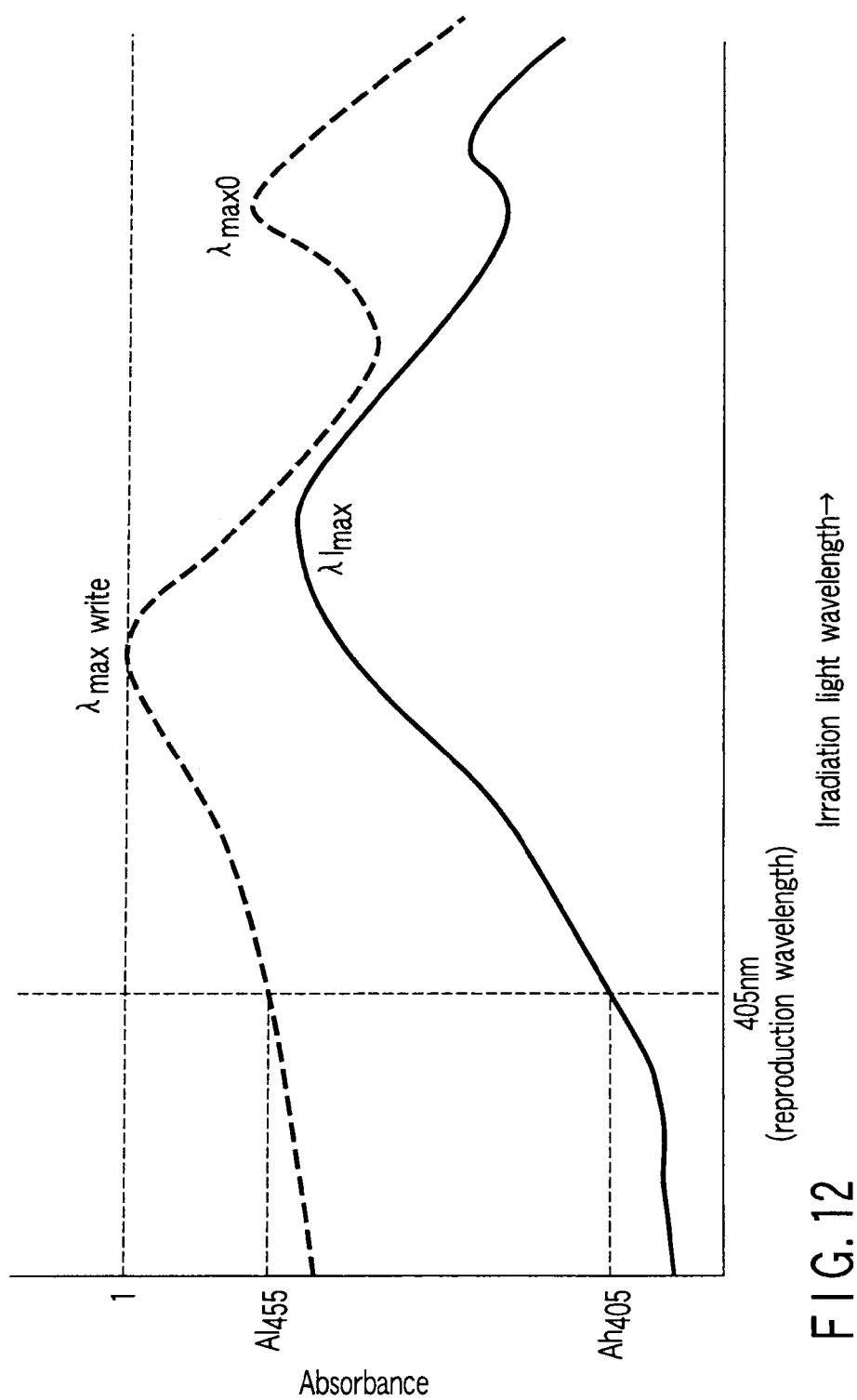
FIG. 12 is an exemplary view showing a change of light absorption spectrum characteristics in a recorded state and an unrecorded state of the "L-H" recording film.

FIG. 12 shows a light absorption spectrum change after recorded in the "L-H" recording film according to the present embodiment. It is considered that a value of a maximum absorption wavelength $\lambda l_{max}$ in a recording mark deviates from a wavelength of $\lambda_{max\ write}$, and an inter-molecular array change (for example, an array change between azo metal complexes) occurs. Further, it is considered that a discoloring action (cutting of local electron orbit (local molecular link dissociation)) occurs in parallel to a location in which both of the absorbance in location of $\lambda l_{max}$ and the absorbance $Al_{405}$ at 405 nm are lowered and the light absorption spectra spreads itself.

In the "L-H" recording film according to the present embodiment as well, by meeting each of formulas (20), (21), (22), and (23), the same signal processor circuit is made available for both of the "L-H" recording film and the "H-L" recording film, thereby promoting simplification and price reduction of the signal processor circuit. In formula (20), when:

$$I_{11}/I_{11H} \equiv (I_{11H} - I_{11L})/I_{11H} \geq 0.4 \quad (42),$$

is modified, $$I_{11H} \geq I_{11L}/0.6 \quad (43)$$

is obtained. As described previously, in the present embodiment, a lower limit value β of a light reflection factor of an unrecorded portion ("L" portion) of an "L-H" recording film is set to 18%, and this value corresponds to $I_{11L}$. Further, conceptually, the above value corresponds to:

$$I_{11H} \cong 1 - Ah_{405} \times (1 - R\lambda_{max\ write}) \quad (44).$$

Thus, from formulas (43) and (44), the following formula is established:

$$1 - Ah_{405} \times (1 - R\lambda_{max\ write}) \geq 0.18/0.6 \quad (45)$$

In comparison between the above formulas (46) and (36), it is found that the values of $Al_{405}$ and $Ah_{405}$ may be seemingly set in the vicinity of 68% to 70% as values of absorbance. Further, in view of a case in which the value of $Al_{405}$ is obtained in the range of formula (39) and performance stability of a signal processor circuit, a sever condition is obtained as:

$$Ah_{405} \leq 0.4 \quad (47)$$

If possible, it is desirable to meet;

$$Ah_{405} \leq 0.3 \quad (48)$$

5-3) Anion Portion: Azo Metal Complex+Cation Portion: Dye

A description will be specifically given with respect to an organic dye material in the present embodiment having characteristics described in "5-1) Description of characteristics relating to "L-H" recording film in the present embodiment", the present embodiment meeting a condition shown in "5-2) Characteristics of optical absorption spectra relating to "L-H" recording film" in the present embodiment". The thickness of the recording layer 3-2 meets the conditions shown in formulas (3), (4), (27), and (28), and is formed by spinner coating (spin coating). For comparison, a description will be given by way of example. A crystal of a "salt" is assembled by "ion coupling" between positively charged "sodium ions" and negatively charged "chloride ions". Similarly, in polymers as well, there is a case in which a plurality of polymers are combined with each other in the form close to "ion coupling", forming configuring an organic dye material. The organic dye recording film 3-2 in the present embodiment is composed of a positively charged "cation portion" and a negatively charged "anion portion". In particular, the above recording film is technically featured in that: coupling stability is improved by utilizing a "dye" having chromogenic characteristics for the positively charged "cation portion" and utilizing an organic metal complex for the negatively charged "anion portion"; and there is met a condition that "δ] an electron structure in a chromogenic area is stabilized, and structural decomposition relevant to ultraviolet ray or reproduction light irradiation hardly occurs" shown in "3-2-B] Basic feature common to organic dye recording material in the present embodiment". Specifically, in the present embodiment, an "azo metal complex" whose general structural formula is shown in FIG. 2 is utilized as an organic metal complex. In the present embodiment which comprises a combination of an anion portion and a cation portion, cobalt or nickel is used as a center metal M of this azo metal complex, thereby enhancing optical stability. There may be used: scandium, yttrium, titanium, zirconium, hafnium, vanadium, niobium, tantalum, chrome, molybdenum, tungsten, manganese, technetium, rhenium, iron, ruthenium, osmium, rhodium, iridium, palladium, platinum, copper, silver, gold, zinc, cadmium, or mercury and the like without being limited thereto.

In the present embodiment, as a dye used for the cation portion, there is used any of a cyanine dye whose general structural formula is shown in FIG. 13; a styril dye; and a monomethine cyanine dye.

Although an azo metal complex is used for the anion portion in the present embodiment, a formazane metal complex may be used without being limited thereto, for example. The organic dye recording material comprising the anion portion and cation portion is first powdered. In the case of forming the recording layer 3-2, the powdered organic dye recoding material is dissolved in organic solvent, and spin coating is carried out on the transparent substrate 2-2. At this time, the organic solvent to be used includes: a fluorine alcohol based TFP (tetrafluoro propanol) or pentane; hexane; cyclohexane; petroleum ether; ether or analogous, nitrile or analogous, and any of a nitro compound or sulfur-containing compound or a combination thereof.

Chapter 6: Description Relating to Pre-Groove Shape/Pre-Pit Shape in Coating Type Organic Dye Recording Film and on Light Reflection Layer Interface 6-1) Light Reflection Layer As described in "Chapter 0: Description of Relationship between Use Wavelength and the Present Embodiment", the present embodiment assumes a range of 355 nm to 455 nm in particular around 405 nm. When the metal materials each having a high light reflection factor at this wavelength bandwidth are arranged in order from the highest light reflection factor, Ag is in the order of around 96%; Al is in the order of around 80%, and Rh is in the order of around 80%. In a write-one type information storage medium using an organic dye recording material, as shown in FIG. 1B, the reflection light from the light reflection layer 4-2 is a standard, and thus, the light reflection layer 4-2 requires a high light reflection factor in characteristics. In particular, in the case of the "H-L" recording film according to the present embodiment, the light reflection factor in an unrecorded area is low. Thus, if the light reflection factor in the light reflection layer 4-2 simplex is low, in particular, a reproduction signal C/N ratio from a pre-pit (emboss) area is low, lacking the stability at the time of reproduction. Thus, in particular, it is mandatory that the light reflection factor in the light reflection layer 4-2 simplex is high. Therefore, in the present embodiment, in the above wavelength bandwidth, a material mainly made of Ag (silver) having the highest reflection factor is used. As a material for the light reflection layer 4-2, there occurs a problem that "atoms easily move" or "corrosion easily occurs" if silver is used alone. To solve the first problem, when partial alloying is carried out by adding other atoms, silver atoms hardly move. In the first embodiment in which other atoms are added, the light reflection layer 4-2 is made of AgNdCu according to the first embodiment. AgNdCu is in a solid soluble state, and thus, the reflection factor is slightly lowered than a state in which silver is used alone. In the second embodiment in which other atoms are added, the light reflection layer 4-2 is made of AgPd, and an electric potential is changed, whereby corrosion hardly occurs in an electrochemical manner. If the light reflection layer 4-2 corrodes due to silver oxidization or the like, the light reflection factor is lowered. In an organic dye recording film having a recording film structure shown in FIG. 1B, in particular, in the case of an organic dye recording film shown in "Chapter 3: Description of Characteristics of Organic Dye Recording Film in the Present Embodiment", in particular, a light reflection factor on an interface between the recording layer 3-2 and the light reflection later 4-2 is very important. If correction occurs on this interface, the light reflection factor is lowered, and an optical interface shape blurs. In addition, the detection signal characteristics from a track shift detection signal (push-pull signal) or a wobble signal and a pre-pit (emboss) area are degraded. In addition, in the case where the width Wg of the pre-groove area 11 is wider than the width W1 of the land area, a track shift detection signal (push-pull signal) or a wobble signal is hardly generated, thus increasing effect of degradation of the light reflection factor on the interface between the recording layer 3-2 and the light reflection layer 4-2 due to corrosion. In order to prevent degradation of the light reflection factor on this interface, AgBi is used for the light reflection layer 4-2 as the third embodiment. AgBi forms a very stable phase and prevents degradation of the light reflection factor on the above interface because a passive coat film is formed on a surface (interface between the recording layer 3-2 and the light reflection layer 4-2). That is, if Bi (bismuth) is slightly added to Ag, Bi is isolated from the above interface, the isolated Bi is oxidized. Then, a very fine film (passive coat film) called oxidized bismuth is formed to function to preclude internal oxidization. This passive coat film is formed on the interface, and forms a very stable phase. Thus, the degradation of a light reflection factor does not occur, and the stability of detection signal characteristics from a track shift detection signal (push-pull signal) or a wobble signal and a pre-pit (emboss) area is guaranteed over a long period of time. At a wavelength band ranging from 355 nm to 455 nm, the silver simplex has the highest light reflection factor, and the light reflection factor is lowered as an additive amount of other atoms is increased. Thus, it is desirable that an additive amount of Bi atoms in AgBi in the present embodiment be equal to or smaller than 5 at %. The unit of at % used here denotes atomic percent, and indicates that five Bi atoms exist in a total atom number 100 of AgBi, for example. When characteristics have been evaluated by actually producing the passive coat film, it has found that a passive coat film can be produced as long as an additive amount of Bi atoms is equal to or greater than 0.5 at %. Based on a result of this evaluation, an additive amount of Bi atoms in the light reflection layer 4-2 in the present embodiment is defined as lat %. In this third embodiment, only one atom Bi is added, and an additive amount of atoms can be reduced as compared with AgNdCu according to the first embodiment (a case in which two types of atoms Nd and Cu is added in Ag), and AgBi can increase the light reflection factor more significantly than AgNdCu. As a result, even in the case of the "H-L" recording film according to the present embodiment or in the case where the width Wg of the pre-groove area 11 is wider than the with W1 of the land area, as shown in FIGS. 7B and 7C, a detection signal can be stably obtained from a track shift detection signal (push-pull signal) or a wobble signal and a pre-pit (emboss) area with high precision. The third embodiment is not limited to AgBi, and a ternary system including AgMg, AgNi, AgGa, AgNx, AgCo, AgAl or the atoms described previously may be used as a silver allow which produces a passive coat film. The thickness of this light reflection layer 4-2 is set in the range of 5 nm to 200 nm. If the thickness is smaller than 5 nm, the light reflection layer 4-2 is not uniform, and is formed in a land shape. Therefore, the thickness of the light reflection layer 4-2 is set to 5 nm. When an AgBi film is equal to or smaller than 80 nm in thickness, the film permeates to its back side. Thus, in the case of a one-sided single recording layer, the thickness is set in the range of 80 nm to 200 nm, and preferably, in the range of 100 nm to 150 nm. In the case of a one-sided double recording layer, the thickness is set in the range of 5 nm to 15 nm.

6-2) Description Relating to Pre-Pit Shape in Coating Type Organic Dye Recording Film and on Light Reflection Layer Interface In an H format according to the present embodiment, the system lead-in area SYLDI is provided. In this area, an emboss pit area 211 is provided and information is recorded in advance in the form of a pre-bit. A reproduction signal in this area is adjusted to conform to reproduction signal characteristics from a read-only type information storage medium, and a signal processor circuit in an information reproducing apparatus or an information recording/reproducing apparatus shown in FIG. 8 is compatible with a read-only type information storage medium and a write-once type information storage medium. A definition relevant to a signal detected from this area is adjusted to conform to a definition of "3-4): Description of characteristics relating to "H-L" recording film in the invention". That is, a reproduction signal amount from the space area 14 having a sufficiently large length (11T) is defined as $I_{11H}$, and a reproduction signal from the pre-pit (emboss) area 13 having a sufficiently large length (11T) is defined as $I_{11L}$. In addition, a differential value between these amounts is defined as $I_{11}=I_{11H}-I_{11L}$. In the present embodiment, in accordance with the reproduction signal characteristics from the read-only type information storage medium, the reproduction signal in this area is set to be:

$$I_{11}/I_{11H} \geq 0.3 \tag{54}$$

and desirably, is set to be:

$$I_{11}/I_{11H} > 0.5 \tag{55}$$

When a repetitive signal amplitude of the space area 14 relevant to the pre-pit (emboss) area 13 having a 2t length is defined as $I_2$, the amplitude is set to be:

$$I_2/I_{11} \geq 0.5 \tag{56}$$

and desirably, is set to be:

$$I_2/I_{11} > 0.7 \tag{57}$$

A description will be given with respect to a physical condition for meeting the above formula (54) or formula (55).

As has been described in FIG. 1B, the signal characteristics from a pre-pit are mainly dependent on the reflection in the light reflection layer 4-2. Therefore, the reproduction signal amplitude value $I_{11}$ is determined depending on a step amount Hpr between the space area 14 and the pre-pit (emboss) area 13 in the light reflection layer 4-2. When optical approximation calculation is made, this step amount Hpr, with respect to a reproduction light wavelength λ and a refractive index $n_{32}$ in the recording layer 3-2, has the following relationship:

$$I_{11} \propto \sin^2\{(2\pi \times Hpr \times n_{32})/\lambda\} \tag{58}$$

From formula (58), it is found that $I_{11}$ becomes maximal when $Hpr \cong \lambda/(4 \times n_{32})$. In order to meet formula (54) or formula (55), from formula (58), it is necessary to meet:

$$Hpr \geq \lambda/(12 \times n_{32}) \tag{59}$$

and desirably, $$Hpr > \lambda/(6 \times n_{32}) \tag{60}$$

As described in "Chapter 0: Description of Relationship between Use Wavelength and the Present Embodiment", λ=355 nm to 455 nm is used in the embodiment, and as described in "2-1) Difference in Principle of Recording/Recording Film and Difference in Basic Concept Relating to Generation of Reproduction Signal", $n_{32}$=1.4 to 1.9 is established. Thus, when this value is substituted into formula (59) or formula (60), a step is produced so as to meet a condition:

$$Hpr \geq 15.6 \text{ nm} \tag{62}$$

and desirably, $$Hpr > 31.1 \text{ nm} \tag{63}$$

In the conventional write-once type information storage medium, the thickness of the recording layer 3-2 is small in the space area 14, and thus, a step on an interface between the light reflection layer 4-2 and the recording layer 3-2 is small, and formula (62) has not successfully met. In contrast, in the present embodiment, a contrivance has been made to ensure that a relationship between the thickness Dg of the recording layer 3-2 in the pre-pit (emboss) area 13 and the thickness D1 of the recording layer 3-2 in the space area 14 conform with a condition described in "3-2-E] Basic characteristics relating to thickness distribution of recording layer in the present embodiment for definition of parameters". As a result, a sufficiently large step Hpr which meets formula (62) or formula (63) has been successfully provided.

By carrying out optical approximation discussion as described above, in the present embodiment, in order to have sufficient resolution of a reproduction signal so as to meet formula (56) or formula (57), a contrivance is made so that the width Wp of the pre-pit (emboss) area 13 is equal to or smaller than half of track pitches, and a reproduction signal from the pre-pit (emboss) area 13 can be largely taken.

Chapter 7: Description of H Format

Now, an H format in the present embodiment will be described here.

FIG. 14 shows a structure and dimensions of an information storage medium in the present embodiment. As embodiments, there are explicitly shown three types of embodiments of information storage mediums such as:

"read-only type information storage medium" used exclusively for reproduction in which recording cannot be carried out;

"write-once type information storage medium" capable of additional recording; and "rewritable type information storage medium" capable of rewriting or recording any times As shown in FIG. 14, the above three types of information storage mediums are common to each other in a majority of structure and dimensions. In all of the three types of information storage mediums, from their inner periphery side, a burst cutting area BCA, a system lead-in area SYLDI, a connection area CNA, a data lead-in area DTLSI, and a data area DTA have been arranged. All the mediums other than an OPT type read-only medium is featured in that a data lead-out area DTLDO is arranged at the outer periphery. As described later, in the OPT type read-only medium, a middle area MDA is arranged at the outer periphery. In either of the write-once type and rewritable type mediums, the inside of this area is for read-only (additional writing disabled). In the read-only type information storage medium, information is recorded in the data lead-in area DTLDI in the form of emboss (pre-pit). In contrast, in the write-once type and the rewritable type information storage medium, new information can be additionally written (rewritten in the rewritable type) by forming a recording mark in the data lead-in area DTLDI. As described later, in the write-once type and rewritable type information storage medium, in the data lead-out area DTLDO, there coexist an area in which additional writing can be carried out (rewriting can be carried out in the rewritable type) and a read-only area in which information is recorded in the form of emboss (pre-pit). As described previously, in the data area DTA, data lead-in area DTLVI, data lead-out area DTSDO, and middle area MDA shown in FIG. 14, high density of the information storage medium is achieved (in particular, line density is improved) by using a PRML (Partial Response Maximum Likelihood) method for reproduction of signals recorded therein. In addition, in the system lead-in area SYLDI and the system lead-out area SYLDO, compatibility with a current DVD is realized and the stability of reproduction is improved by using a slice level detecting system for reproduction of signals recorded therein.

Unlike the current DVD specification, in the embodiment shown in FIG. 14, the burst cutting area BCA and system lead-in area SYLDI are separated from each other in location without being superimposed on each other. These areas are physically separated from each other, thereby making it possible to prevent interference between the information recorded in the system lead-in area SYLDI at the time of information reproduction and the information recorded in the burst cutting area BCA and to allocate information reproduction with high precision.

Now, a description will be given with respect to internal signal characteristics and data structure of a burst cutting area BCA shown in FIG. 14. At the time of measuring a BCA signal, a focusing spot of laser light beams emitted from an optical head needs to be focused on a recording layer. A reproduction signal obtained in the following burst cutting area BCA is filtered by means of a secondary low-pass vessel filter for a shutdown frequency of 550 kHz. The following signal characteristics of the burst cutting area BCA are defined in the range of 22.4 mm to 23.0 mm in radius from the center in the information storage medium. With respect to a reproduction signal from the burst cutting area BCA, the maximum and minimum levels when a BCA code and a channel bit are set to "0" are defined as IBHmax and IBHmin; and the maximum bottom level of the BCA code and a channel bit "1" is defined as IBLmax. In addition, an intermediate level is defined as (IBHmin+IBLmax)/2.

In the present embodiment, detection signal characteristics are defined under a condition that (IBLmax/IBHmin) is 0.8 or less and under a condition that (IBHmax/IBHmin) is 1.4 or less. While an average level between IBL and IBH is defined as a reference, a position at which the BCA signal crosses the reference position is regarded as an edge position. The cycle of the BCA signal is defined when a rotation speed is 2760 rpm (46.0 Hz). A cycle between the front-end edges (the falling positions) is defined as 4.63×n±1.00 μs, and a width of a pulse position in location in which an amount of light is lowered (an interval from a first fall position to a next fall position) is defined as 1.56±0.75 μs.

The BCA code is often recorded after manufacture of an information storage medium has been terminated. However, the BCA code may be recorded in advance as a pre-pit. The BCA code is recorded in a direction along the circumference of the information storage medium. This BCA code is also recorded so that a direction in which a pulse width narrows coincides with a direction in which a light reflectivity is lowered. The BCA code is recorded after modulated in accordance with an RZ modulating method. A pulse having a narrow pulse width (=having a low reflectivity) needs to be narrower than half of a channel clock width of the thus modulated BCA code.

Figure 28:
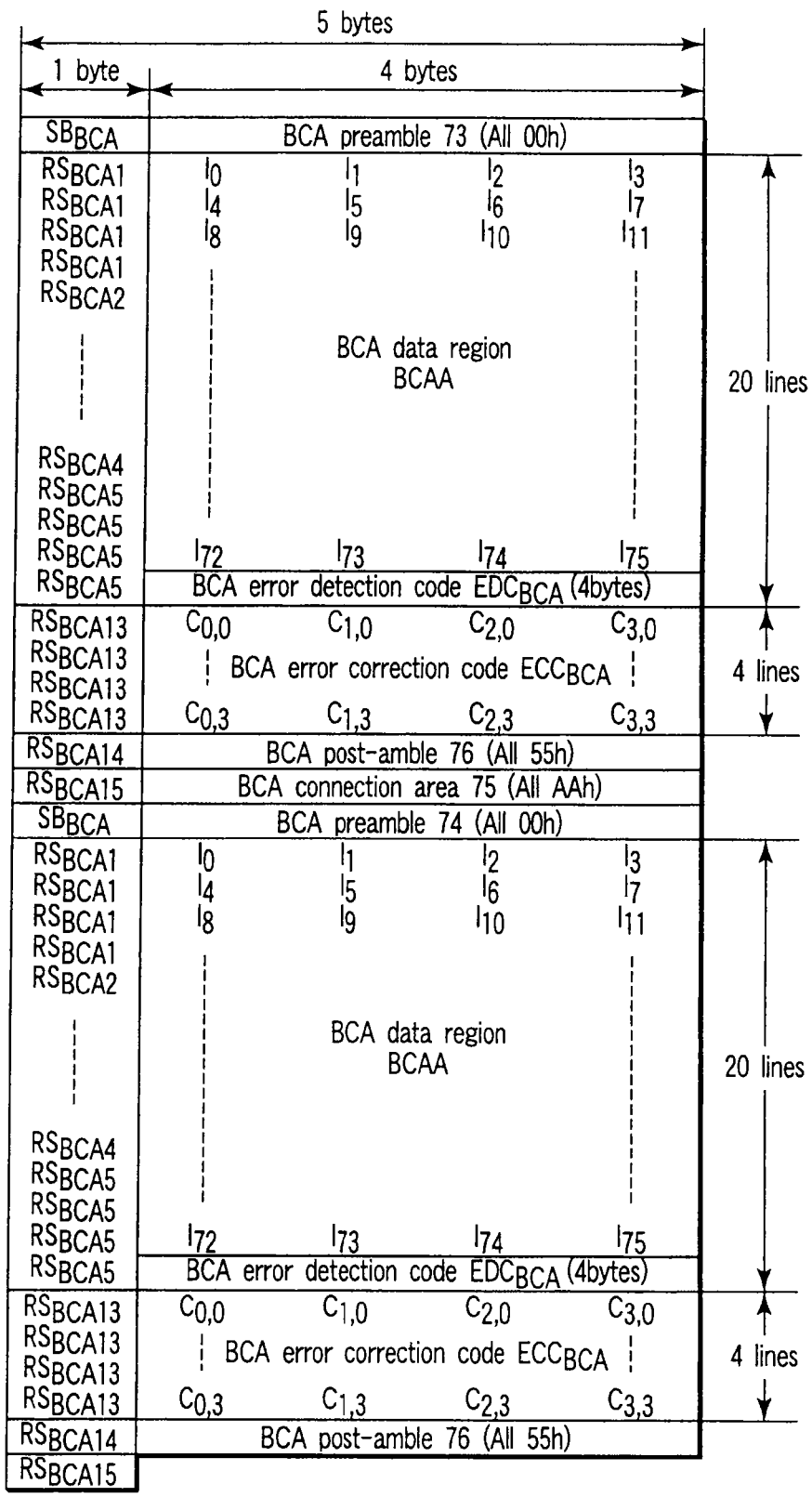
FIG. 28 is an exemplary view illustrating a BCA data structure.

FIG. 28 shows a BCA data structure. BCA data contains two BCA preambles 73 and 74, two post-ambles 76 and 77, and two BCA data areas BCAA. A BCA error detection code $EDC_{BCA}$ and a BCA error correction code $ECC_{BCA}$ are added to each of the BCA data areas BCAA, and a BCA link area 75 is allocated therebetween. Further, a sync byte $SB_{BCA}$ or re-sync $RS_{BCA}$ for each byte is inserted on a four by four byte basis. The foregoing BCA preambles 73 and 74 each are composed of 4 bytes, and all settings "00h" are recorded. In addition, the sync byte $SB_{BCA}$ is allocated immediately preceding each of the BCA preambles 73 and 74. 76 bytes are set in the BCA data area BCAA. The BCA post-ambles 76 and 77 each are composed of 4 bytes, and a repetition pattern of all settings "55h" is recorded. The BCA link area 75 is composed of 4 bytes, and all settings "AAh" are repeatedly recorded.

Figure 29:
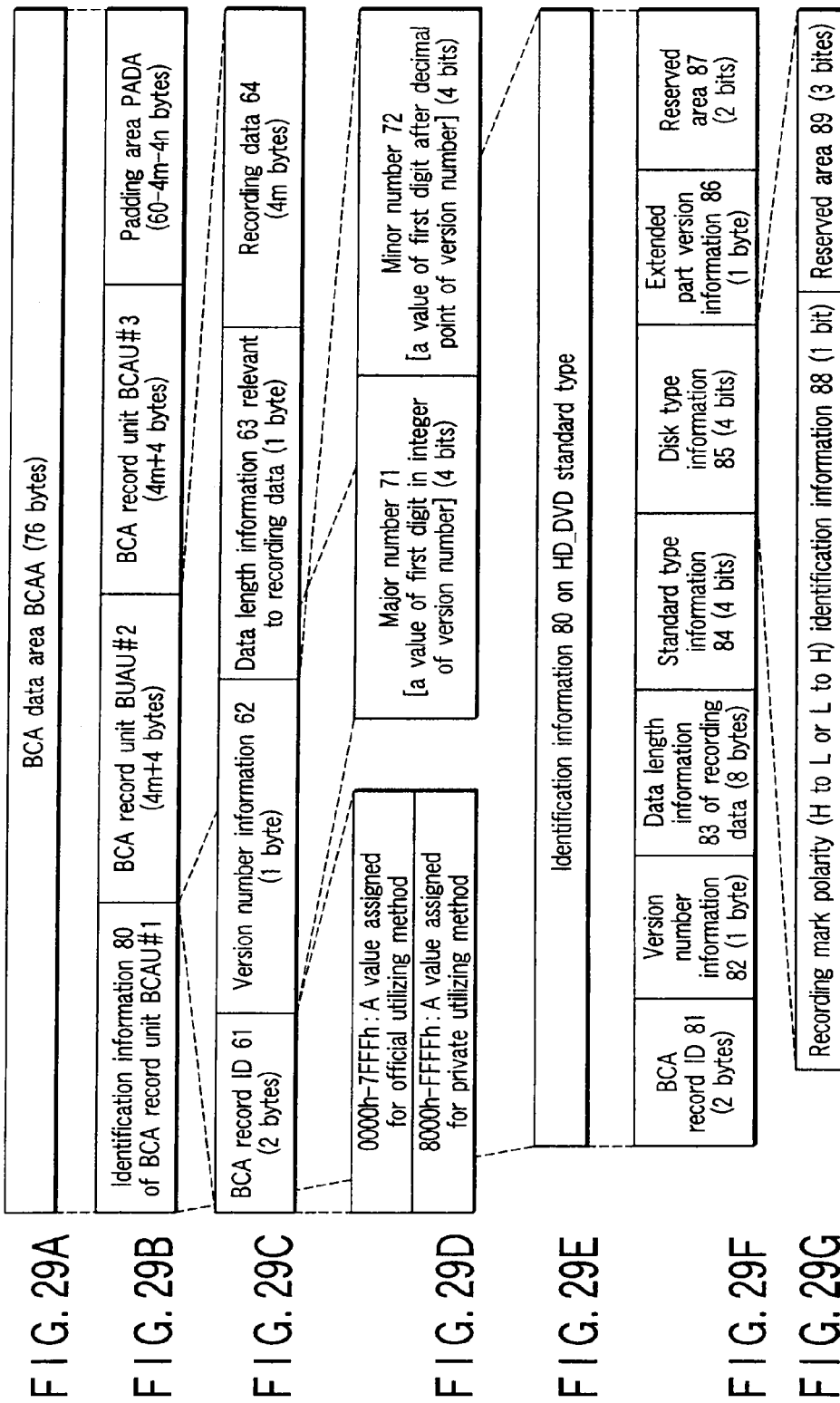
FIGS. 29A, 29B, 29C, 29D, 29E, 29F and 29G are exemplary views each illustrating an example of the contents of the BCA information recorded in the BCA data area.

FIGS. 29A to 29G each show an example of the contents of the BCA information recorded in a BCA data area. The BCA data area BCAA is capable of recording 76-type information, and data is recorded in units of BCA record units BCAU. The information recorded in this BCA record unit internal BCAU is referred to as a BCA record. The size of each BCA record is produced as an integer multiple of 4 bytes. In each of the BCA records, as shown in FIG. 29C, there are sequentially recorded: BCA record ID 61 composed of 2 bytes; version number information 62 composed of 1 byte; data length information 63 on recording data composed of 1 byte; and a data record (recording data 64) of 4 m bytes. The IDs to be set in BCA record ID 61 are assigned in the range of 0000h to 7FFFFh in accordance with a publicly acceptable utilizing method, and from 8000h to FFFFh are assigned in accordance with an individual utilizing method. The version number information 62 composed of 1 byte is divided into major number 71 of the significant 4 bits and minor number 72 of the least significant 4 bits. The first integer digit of version number is recorded in major number 71, and a value of a first digit after the decimal point of version number is recorded in minor number 72. For example, in the case of version "2.4", number "2" is recorded in the field of major number 71, and number "4" is recorded in the field of minor number 72.

In the H format according to the present embodiment, identification information 80 on an HD DVD standard type is recorded in the BCA record, as shown in FIG. 29E. Specifically, with respect to the contents of this information, as shown in FIG. 29F, there are recorded: BCA record ID 81; version number information 82; and data length information 83 on recording data. In addition, there are recorded: standard type information 84 composed of 4 bits; disc type information 85 composed of 4 bits; extended part version information 86 (1 byte); and a reserved area 87 (2 bytes). Recording mark polarity (identification of H-L or L-H) information 88 is allocated in the significant 1 bit in the disc type information 85, and the remaining 3 bits are assigned to a reserved area 89.

The following configuration can be provided as another example of the data structure shown in FIGS. 29A to 29G. That is, the BCA record recorded in the BCA record unit BCAU #1 (8 bytes) shown in FIG. 29B can contain the following items of information in the following order:

1) "BCA Record ID" of 2 bytes that is an HD DVD book type identifier;
2) "Version number" of 1 byte indicating a version number;
3) "Data length" of 1 byte indicating a data length;
4) "Book type and Disc type" of 1 byte indicating a book type and a disc type;
5) "Extended Part version" of 1 byte indicating an extended portion version; and
6) Reserved 2 bytes.

Here, "Disc type" included in the above "Book type and Disc type" is configured so that "Mark polarity" and "Twin format flag" can be described. The "Mark polarity" described in this "Disc type" is provided as information that corresponds to the "recording mark polarity information 88" described previously. When "Mark polarity=0b", it indicates "Low-to-High disc" featured in that "a signal from a mark is greater than a signal from a space"; and when "Mark polarity=1b", it indicates "High-to-Low disc" featured in that "a signal from a mark is smaller than a signal from a space".

On the other hand, "Twin format flag" described in "Disc type" is provided as information indicating whether or not the disc is a twin format disc. "Twin format flag=0b" indicates that the disc is not a twin format disc, and "Twin format flag=1b" indicates that the disc is a twin format disc. The "twin format disc" described herein is a disc featured in that the disc has two recording/reproducing layers of different formats (other formats defined in a DVD forum) depending on recording/reproducing layers are applied. This "Twin format flag" is provided as a BCA record, whereby, in individual multi-layered HD DVD-R (High Definition DVD Recordable) disc, it is possible to easily discriminate whether the disc is a single format disc or a multi-format disc.

As shown in FIG. 28, the same information as those contained in a BCA data area BCAA surrounded by a BCA preamble 73 and a BCA post-amble 76 is described in a BCA data area BCAA surrounded by a BCA preamble 74 and a BCA post-amble 77. In this manner, the same information is multiply written into the plurality of BCA data areas BCAA. Thus, even if one item of data cannot be reproduced due to an effect of dust or scratch produced on a surface of an information storage medium, data can be reproduced from the other BCA data area BCAA. As a result, the reliability of the data recorded in the BCA data area BCAA is remarkably improved.

Further, in the BCA data structure shown in FIG. 28, in addition to the BCA error detection code $EDC_{BCA}$ that exists conventionally, a BCA error correction code $ECC_{BCA}$ further exists. Thus, even if an error occurs with the data contained in the BCA data area BCAA, such an error can be corrected by the BCA error correction code $ECC_{BCA}$, and the reliability is further improved.

In the case where an "L-H" type recording film has been used as another embodiment, there is a method for forming fine irregularities in advance in location for allocating the burst cutting area BCA.

As described later, the present embodiment also considers a case of using the "L-H" recording film. Data recorded in the burst cutting area BCA (barcode data) is formed by locally carrying out laser exposure to a recording film. The system lead-in area SYLDI is formed of the emboss bit area, and thus, the reproduction signal from the system lead-in area SYLDI appears in a direction in which a light reflection amount decreases as compared with a light reflection level from the mirror surface. If while the burst cutting area BCA is formed as the mirror surface, in the case where the "L-H" recording film has been used, a reproduction signal from the data recorded in the burst cutting area BCA appears in a direction in which a light reflection amount increases more significantly than a light reflection level from the mirror surface (in an unrecorded state). As a result, a significant step occurs between a position (amplitude level) of a maximum level and a minimum level of the reproduction signal from the data recorded in the burst cutting area BCA and a position (amplitude level) of a maximum level and a minimum level of the reproduction signal from the system lead-in area SYLDI. An information reproducing apparatus or an information recording/reproducing apparatus carry out processing in accordance with the steps of:

1) reproducing information in the burst cutting area BCA;
2) reproducing information contained in a information data zone CDZ in the system lead-in area SYLDI;
3) reproducing information contained in the data lead-in area DTLDI (in the case of write-once type or rewriting type);
4) readjusting (optimizing) a reproduction circuit constant in a reference code recording zone RCZ; and
5) reproducing information recorded in the data area DTA or recording new information.

Thus, if there exists a large step between a reproduction signal amplitude level from the data formed in the burst cutting area BCA and a reproduction signal amplitude level from the system lead-in area SYLDI, there occurs a problem that the reliability of information reproduction is lowered. In order to solve this problem, in the case where the "L-H" recording film is used as a recording film, the present embodiment is featured in that fine irregularities are formed in advance in thus burst cutting area BCA. When such fine irregularities are formed, the light reflection level becomes lower than that from the mirror surface 210 due to a light interference effect at the stage prior to recording data (barcode data) by local laser exposure. Then, there is attained an advantageous effect that a step is remarkably decreased between a reproduction signal amplitude level (detection level) from the data formed in the burst cutting area BCA and a reproduction signal amplitude level (detection level) from the system lead-in area SYLDI; the reliability of information reproduction is improved; and processing going from the above item (1) to item (2) is facilitated.

In the case of using the "L-H" recording film, the specific contents of fine irregularities formed in advance in the burst cutting area BCA include the emboss pit area 211 like the system lead-in area SYLDI. Another embodiment includes a method for forming the groove area 214 or the land area and the groove area 213 like the data lead-in area DTLDI or data area DTA. As has been described in the description of embodiments in which the system lead-in area SYSDI and burst cutting area BCA are separately arranged, if the burst cutting area BCA and the emboss bit area 211 overlaps each other, there increases a noise component from the data provided in the burst cutting area BCA due to unnecessary interference to a reproduction signal.

When the groove area 214 or the land area and groove area 213 is formed without forming the emboss pit area 211 as an embodiment of the fine irregularities in the burst cutting area BCA, there is attained an advantageous effect that there decreases a noise component from the data formed in the burst cutting area BCA due to unnecessary interference to a reproduction signal and the quality of a reproduction signal is improved.

When track pitches of the groove area 214 or the land area and groove area 213 formed in the burst cutting area BCA are adjusted to conform with the those of the system lead-in area SYLDI, there is attained an advantageous effect that the manufacturing performance of the information storage medium is improved. That is, at the time of original master manufacturing of the information storage medium, emboss pits in the system lead-in area are produced while a feed motor speed is made constant. At this time, the track pitches of the groove area 214 or the land area and groove area 213 formed in the burst cutting area BCA are adjusted to conform with those of the emboss pits in the system lead-in area SYLDI, thereby making it possible to continuously maintain a constant motor speed in the burst cutting area BCA and the system lead-in area SYLDI. Thus, there is no need for changing the speed of the feed motor midway, and thus, the pitch non-uniformity hardly occurs, and the manufacturing performance of the information storage medium is improved.

The rewritable type information storage medium has higher recording capacity than the read-only type or write-once type information storage medium by narrowing track pitches and line density (data bit length). As described later, in the rewritable type information storage medium, the track pitches are narrowed by reducing effect of a cross-talk of the adjacent tracks by employing land-groove recording. Alternatively, any of the read-only type information storage medium, write-once information storage medium, and rewritable-type information storage medium is featured in that the data bit length and track pitches (corresponding to recording density) of the system lead-in/system lead-out areas SYLDI/SYLDO are greater than those of the data lead-in/data lead-out area DTLDI/DTLDO (in that the recording density is low).

The data bit length and track pitches of the system lead-in/system lead-out areas SYLDI/SYLDO are close to the values of the current DVD lead-in area, thereby realizing compatibility with the current DVD.

In the present embodiment as well, like the current DVD-R, an emboss step in the system lead-in/system lead-out areas SYLDI/SYLDO of the write-once type information storage medium is shallowly defined. In this manner, there is attained advantageous effect that a depth of a pre-groove of the write-once information storage medium is shallowly defined and a degree of modulation of a reproduction signal from a recording mark formed on a pre-groove by additional writing is increased. In contrast, as a counteraction against it, there occurs a problem that the degree of modulation of the reproduction signal from the system lead-in/system lead-out areas SYLDI/SYLDO decreases. In order to solve this problem, the data bit length (and track pitches) of system lead-in/system lead-out areas SYLDI/SYLDO are roughened and a repetition frequency of pits and spaces at the narrowest position is isolated (significantly reduced) from an optical shutdown frequency of an MTF (Modulation Transfer Function) of a reproduction objective lens, thereby making it possible to increase the reproduction signal amplitude from the system lead-in/system lead-out areas SYLDI/SYLDO and to stabilize reproduction.

The initial zone INZ indicates a start position of the system lead-in area SYLDI, as shown in FIGS. 15A to 15D. As significant information recorded in the initial zone INZ, there is discretely arranged data ID (Identification Data) information including information on physical sector numbers or logical sector numbers described previously. As described later, one physical sector records information on a data frame structure composed of data ID, IED (ID Error Detection code), main data for recording user information, and EDC (Error detection code); and the initial zone records information on the above described data frame structure. However, in the initial zone INZ, all the information on the main data for recording the user information is all set to "00h", and thus, the significant information contained in the initial zone INZ is only data ID information. A current location can be recognized from the information on physical sector numbers or logical sector numbers recorded therein. That is, when an information recording/reproducing unit 141 shown in FIG. 8 starts information reproduction from an information storage medium, in the case where reproduction has been started from the information contained in the initial zone INZ, first, the information on physical sector numbers or logical sector numbers recorded in the data ID information is sampled, and the sampled information is moved to the control data zone CDZ while the current location in the information storage medium is checked.

A buffer zone 1 BFZ1 and a buffer zone 2 BFZ2 each are composed of 32 ECC blocks. One ECC block corresponds to 1024 physical sectors. In the buffer zone 1 BFZ1 and the buffer zone 2 BFZ2 as well, like the initial zone INZ, main data information is set to all "00h".

The connection zone CNZ which exists in a CNA (Connection Area) is an area for physically separating the system lead-in area SYLDI and the data lead-in area DTLDI from each other. This area is provided as a mirror surface on which no emboss pit or pre-groove exists.

An RCZ (Reference code zone) of the read-only type information storage medium and the write-once type information storage medium each is an area used for reproduction circuit tuning of a reproducing apparatus, wherein information on the data frame structure described previously is recorded. A length of the reference code is one ECC block (=32 sectors). The present embodiment is featured in that the RCZ (Reference code zone) of the read-only type information storage medium and the write-once information storage medium each is arranged adjacent to a DTA (data area). In any of the structures of the current DVD-ROM disc and the current DVD-R disc as well, a control data zone is arranged between the reference code zone and data area, and the reference code zone and the data area are separated from each other. If the reference code zone and data area are separated from each other, a tilt amount or a light reflection factor of the information storage medium or the recording sensitivity of a recording film (in the case of the write-once information storage medium) slightly changes. Therefore, there occurs a problem that an optimal circuit constant in the data area is distorted even if a circuit constant of the reproducing apparatus is adjusted. In order to solve the above described problem, when the RCZ (reference code zone) is arranged adjacent to the DTA (data area), in the case where the circuit constant of the information reproducing apparatus has been optimized in the RCZ (reference code zone), an optimized state is maintained by the same circuit constant in the DTA (data area). In the case where an attempt is made to precisely reproduce a signal in arbitrary location in the DTA (data area), it becomes possible to reproduce a signal at a target position very precisely in accordance with the steps of:

1) optimizing a circuit constant of the information reproducing apparatus in the RCZ (reference code zone);

2) optimizing a circuit constant of the information reproducing apparatus again while reproducing a portion which is the closest to the reference code zone RCZ in the data area DTA;

3) optimizing a circuit constant once again while reproducing information at an intermediate position between a target position in the data area DTA and the position optimized in step (2); and 4) reproducing signal after moving to the target position.

GTZ1 and GTZ2 (guard track zones 1 and 2) existing in the write-once information storage medium and the rewritable-type information storage medium are areas for specifying the start boundary position of the data lead-in area DTLDI, and a boundary position of a drive test zone DRTZ and a disc test zone DKTZ. These areas are prohibited from being recorded a recording mark. The guard track zone 1 GTZ1 and guard track zone 2 GTZ2 exist in the data lead-in area DTLDI, and thus, in this area, the write-once type information storage medium is featured in that the pre-groove area is formed in advance. Alternatively, the rewritable-type information storage medium is featured in that the groove area and the land area are formed in advance. In the pre-groove area or groove area and the land area, wobble addresses are recorded in advance, and thus, the current location in the information storage medium is determined by using these wobble addresses.

The disc test zone DKTZ is an area provided for manufactures of information storage mediums to carry out quality test (evaluation).

The drive test zone DRTZ is provided as an area for carrying out test writing before the information recording/reproducing apparatus records information in the information storage medium. The information recording/reproducing apparatus carries out test writing in advance in this area, and identifies an optimal recording condition (write strategy). Then, the information contained in the data area DTA can be recorded under the optimal recording condition.

The information recorded in the disc identification zone DIZ which exists in the rewritable-type information storage medium is an optional information recording area, the area being adopted to additionally write a set of drive descriptions composed of: information on manufacturer name of recording/reproducing apparatuses; additional information relating thereto; and an area in which recording can be uniquely carried out by the manufacturers.

A defect management area 1 DMA1 and a defect management area 2 DMA2 which exist in a rewritable-type information storage medium record defect management information contained in the data area DTA, and, for example, substitute site information when a defect occurs or the like is recorded.

In the write-once type information storage medium, there exist uniquely: an RMD duplication zone RDZ; a recording management zone RMZ; and an R physical information zone R-PFIZ. The recording management zone RMZ records RMD (recording management data) which is an item of management information relating to a recording position of data updated by additional writing of data. A detailed description will be given later. As described later in FIGS. 15A, 15B, 15C, and 15D, in the present embodiment, a recording management zone RMZ is set for each bordered area BRDA, enabling area expansion of the recording management zone RMZ. As a result, even if the required recording management data RMD increases due to an increase of additional writing frequency, such an increase can be handled by extending the recording management zone RMZ in series, and thus, there is attained advantageous effect that the additional writing count can be significantly increased. In this case, in the present embodiment, the recording management zone RMZ is arranged in a border-in BRDI which corresponds to each bordered area BRDA (arranged immediately before each bordered area BRDA). In the present embodiment, the border-in BRDI corresponding to the first bordered area BRDA#1 and a data lead-in area DTLDI are made compatible with each other, and efficient use of the data area DTA is promoted while the forming of the first border-in BRDI in the data area DTA is eliminated. That is, the recording management zone RMZ in the data lead-in area DTA is utilized as a recording location of the recording management data RDM which corresponds to the first bordered area BRDA#1.

The RMD duplication zone RDZ is a location for recording information on the recording management data RMD which meets the following condition in the recording management zone RMZ, and the reliability of the recording management data RMD is improved by providing the recording management data RMD in a duplicate manner, as in the present embodiment. That is, in the case where the recording management data RMD contained in the recording management zone RMZ is valid due to dust or scratch adhering to a write-once information storage medium surface, the recording management data RMD is reproduced, the data being recorded in this RMD duplication zone RDZ. Further, the remaining required information is acquired by tracing, whereby information on the latest recording management data RMD can be restored.

This RMD duplication zone records recording management data RDM at a time point at which (a plurality of) borders are closed. As described later, a new recording management zone RMZ is defined every time one border is closed and a next new bordered area is set. Thus, every time a new recording management zone RMZ is created, the last recording management data RMD relating to the preceding bordered area may be recorded in this RMD duplication zone RDZ. When the same information is recorded in this RMD duplication zone RDZ every time the recording management data RDM is additionally recorded on a write-once information storage medium, the RMD duplication zone RDZ becomes full with a comparatively small additional recording count, and thus, an upper limit value of the additional writing count becomes small. In contrast, as in the present embodiment, in the case where a recording management zone is newly produced when a border is closed, the recording management zone in the border-in BRDI becomes full, and a new recording management zone RMZ is formed by using an R zone, there is attained advantageous effect that only the last recording management data RMD contained in the past recording management zone RMZ is recorded in the RMD duplication zone RDZ, thereby making it possible to improve an allowable additional writing count by efficiently using the RMD duplication zone RDZ.

For example, in the case where the recording management data RMD contained in the recording management zone RMZ which corresponds to the bordered area BRDA on the way of additional writing (before closed) cannot be reproduced due to the dust or scratch adhering to the surface of the write-once type information storage medium, a location of the bordered area BRDA, which has been already closed, can be identified by reading the recording management data RMD lastly recorded in this RMD duplication zone RDZ. Therefore, the location of the bordered area BRDA on the way of additional writing (before closed) and the contents of information recorded therein can be acquired by tracing another location in the data area DTA of the information storage medium, and the information on the latest recording management data RMD can be restored.

An R physical information zone R-PFIZ records the information analogous to the physical format PFI contained in the control data zone CDZ (described later in detail).

Figures 15A, 15B, 15C, 15D:
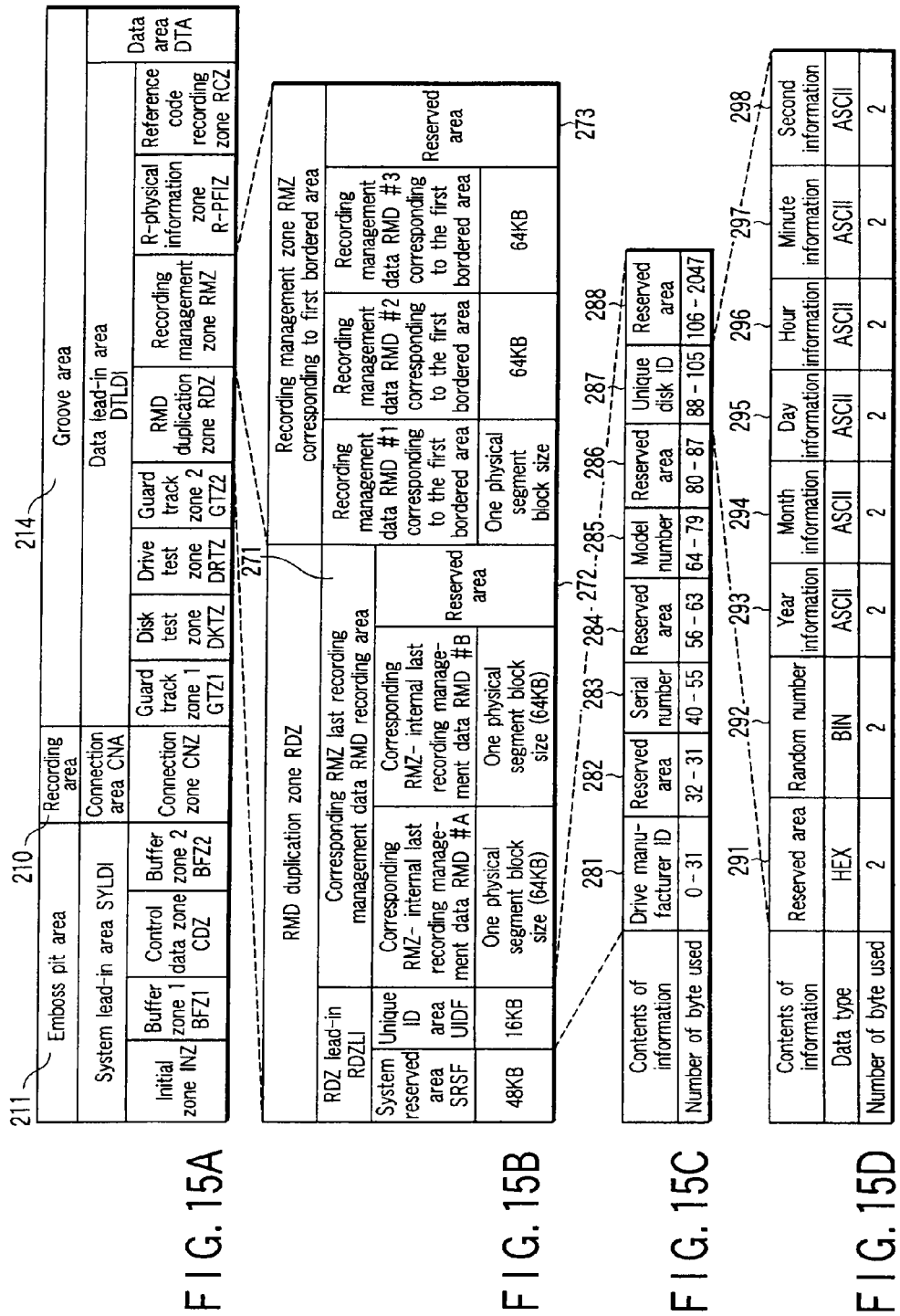
FIGS. 15A, 15B, 15C and 15D are exemplary views each showing an internal data structure of an RMD duplication zone RDZ and a recording management zone RMZ located in a write-once type information storage medium.

FIG. 15C shows a data structure in the RMD duplication zone RDZ and the recording management zone RMZ which exists in the write-once type information storage medium. FIG. 15B shows an enlarged view of the RMD duplication zone RDZ and the recording management zone RDZ. As described above, in the recording management zone RMZ contained in the data lead-in area DTLDI, data relating to recording management which corresponds to the first bordered area BRDA is collectively recorded, respectively, in one items of recording management data (RMD); and new recording management data RMD is sequentially additionally written at the back side every time the contents of the recording management data RMD generated when additional writing process has been carried out in the write-once information storage medium are updated. That is, the RMD (Recording Management Data) is recorded in size units of single physical segment block (a physical segment block will be described later), and new recording management data RMD is sequentially additionally written every time the contents of data are updated. In the example shown in FIG. 15B, a change has occurred with management data in location recording management data RMD#1 and RMD#2 has been recorded. Thus, this figure shows an example in which the data after changed (after updated) has been recorded as recording management data RMD#3 immediately after the recording management data RMD#2. Therefore, in the recording management zone RMD, a reserved area 273 exists so that additional writing can be further carried out.

Although FIG. 15B shows a structure in the recording management zone RMZ which exists in the data lead-in area DTLDI, a structure in the recording management zone RMZ (or extended recording management zone: referred to as extended RMZ) which exists in the border-in BRDI or bordered area BRDA described later is also identical to the structure shown in FIG. 15B without being limited thereto.

In the present embodiment, in the case where a first bordered area BRDA#1 is closed or in the case where the terminating process (finalizing) of the data area DTA is carried out, a processing operation for padding all the reserved area 273 shown in FIG. 15B with the latest recording management data RMD duplication zone is carried out. In this manner, the following advantageous effects are attained:

1) An "unrecorded" reserved area 273 is eliminated, and the stabilization of tracking correction due to a DPD (Differential Phase Detection) technique is guaranteed;

2) the latest recording management data RMD is overwritten in the past reserved area 273, thereby remarkably improving the reliability at the time of reproduction relating to the last recording management data RMD; and 3) an event that different items of recording management data RMD are mistakenly recorded in an unrecorded reserved area 273 can be prevented.

The above processing method is not limited to the recording management zone RMZ contained in the data lead-in area DTLDI. In the present embodiment, with respect to the recording management zone RMZ (or extended recording management zone: referred to as extended RMZ) which exists in the border-in BRDI or bordered area BRDA described later, in the case where the corresponding bordered area BRDA is closed or in the case where the terminating process (finalizing) of the data area DTA is carried out, a processing operation for padding all the reserved area 273 shown in FIG. 15B with the latest recording management data RMD is carried out.

The RMD duplication zone RDZ is divided into the RDZ lead-in area RDZLI and a recording area 271 of the last recording management data RMD duplication zone RDZ of the corresponding RMZ. The RDZ lead-in area RDZLI is composed of a system reserved field SRSF whose data size is 48 KB and a unique ID field UIDF whose data size is 16 KB, as shown in FIG. 15B. All "00h" are set in the system reserved field SRSF.

The present embodiment is featured in that DRZ lead-in area RDZLI is recorded in the data lead-in area DTLDI which can be additionally written. In the write-once type information storage medium according to the present embodiment, the medium is shipped with the RDZ lead-in area RDZLI being in an unrecorded state immediately after manufacturing. In the user's information recording/reproducing apparatus, at a stage of using this write-once type information storage medium, RDZ lead-in area RDZLI information is recorded. Therefore, it is determined whether or not information is recorded in this RDZ lead-in area RDZLI immediately after the write-once type information storage medium has been mounted on the information recording/reproducing apparatus, thereby making it possible to easily know whether or not the target write-once type information storage medium is in a state immediately after manufacturing/shipment or has been used at least once. Further, as shown in FIGS. 15A to 15D, the present embodiment is secondarily featured in that the RMD duplication zone RDZ is provided at the inner periphery side than the recording management zone RMZ which corresponds to a first bordered area BRDA, and the RDZ lead-in RDZLI is arranged in the RMD duplication zone RDZ.

The use efficiency of information acquisition is improved by arranging information (RDZ lead-in area RDZLI) representing whether or not the write-once type information storage medium is in a state immediately after manufacturing/shipment or has been used at least once in the RMD duplication zone RDZ used for the purpose of a common use (improvement of reliability of RMD). In addition, the RDZ lead-in area RDZLI is arranged at the inner periphery side than the recording management zone RMZ, thereby making it possible to reduce a time required for acquisition of required information. When the information storage medium is mounted on the information recording/reproducing apparatus, the information recording/reproducing apparatus starts reproduction from the burst cutting area BCA arranged at the innermost periphery side, as described in FIG. 14, and sequentially changes a reproducing location from the system lead-in SYLSI to the data lead-in area DTLDI while the reproduction position is sequentially moved to the innermost periphery side. It is determined whether or not information has been recorded in the RDZ lead-in area RDZLI contained in the RMD duplication zone RDZ. In a write-once type information storage medium in which no recording is carried out immediately after shipment, no recording management data RMD is recorded in the recording management zone RMZ. Thus, in the case where no information is recorded in the RDZ lead-in area RDZLI, it is determined that the medium is "unused immediately after shipment", and the reproduction of the recording management zone RMD can be eliminated, and a time required for acquisition of required information can be reduced.

As shown in FIG. 15C, a unique ID area UIDF records information relating to an information recording/reproducing apparatus for which the write-once type information storage medium immediately after shipment has been first used (i.e., for which recording has been first started). That is, this area records a drive manufacturer ID 281 of the information recording/reproducing apparatus or serial number 283 and model number 284 of the information recording/reproducing apparatus. The unique ID area UIDF repeatedly records the same information for 2 KB (strictly, 2048 bytes) shown in FIG. 15C. Information contained in the unique disc ID 287 records year information 293, month information 294, date information 295, time information 296, minutes information 297, and seconds information 298 when the storage medium has been first used (recording has been first started). A data type of respective items of information is described in HEX, BIN, ASCII as described in FIG. 15D, and two types or four bytes are used.

The present embodiment is featured in that the size of an area of this RDZ lead-in area RDZLI and the size of the one recording management data RMD are 64 KB, i.e., the user data size in one ECC block becomes an integer multiple. In the case of the write-once type information storage medium, it is impossible to carry out a processing operation for rewriting ECC block data after changed in the information storage medium after changing part of the data contained in one ECC block. Therefore, in particular, in the case of the write-once type information storage medium, as described later, data is recorded in recording cluster units composed of an integer multiple of a data segment including one ECC block. Therefore, the size of the area of the RDZ lead-in area RDZLI and the size of such one item of recording management data RMD are different from a user data size in an ECC block, there is a need for a padding area or a stuffing area for making adjustment to the recording cluster unit, and a substantial recording efficiency is lowered. As in the present embodiment, the size of the area of the RDZ lead-in area RDZLI and the size of such one item of recording management data RMD are set to an integer multiple of 64 KB, thereby making it possible to lower the recording efficiency.

A description will be given with respect to a last recording management data RMD recording area 271 of the corresponding RMZ shown in FIG. 15B. As described in Japanese Patent No. 2621459, there is a method for recording intermediate information at the time of interruption of recording inwardly of the lead-in area. In this case, every time recording is interrupted or every time an additional writing process is carried out, it is necessary to serially additionally write intermediate information in this area (recording management data RMD in the present embodiment). Thus, if such recording interruption or additional writing process is frequently repeated, there is a problem that this area becomes full immediately and a further adding process cannot be carried out. In order to solve this problem, the present embodiment is featured in that an RMD duplication zone RDZ is set as an area capable of recording the recording management data RMD updated only when a specific condition is met and the recording management data RMD sampled under such a specific condition is recorded. Thus, there is attained advantageous effect that the RMD duplication zone RDZ can be prevented from being full and the numbers of additional writings enable with respect to the write-once type information storage medium can be remarkably improved by lowering the frequency of the recording management data RMD additionally written in the RMD duplication zone RDZ. In parallel to this effect, the recording management data updated every time an additional writing process is carried out is serially additionally written in the recording management zone RMZ in the border-in area BRDI shown in FIG. 15A (in the data lead-in area DTLDI as shown in FIG. 15A with respect to the first bordered area BRDA#1) or the recording management zone RMZ utilizing an R zone described later. When a new recording management zone RMZ is created, for example, when the next bordered area BRDA is created (new border-in area BRDI is set) or when a new recording management zone RMZ is set in an R zone, the last recording management data RMD (the newest RMD in a state immediately before creating a new recording management zone RMZ) is recorded in (the corresponding last recording management data RMD recording area 271) contained in the RMD duplication zone RDZ. In this manner, there is attained advantageous effect that a newest RMD position search is facilitated by utilizing this area in addition to a significantly increase of additional writing enable count for the write-once type information storage medium.

In any of the read-only type, write-once type, and rewritable-type information storage medium, the present embodiment is featured in that a system lead-in area is arranged at an opposite side of a data area while a data lead-in area is sandwiched between the two areas, and further, as shown in FIG. 14, the burst cutting area BCA and the data lead-in area DTLDI are arranged at an opposite side to each other while the system lead-in area SYSDI is sandwiched between the two areas. When an information storage medium is inserted into the information reproducing apparatus or information recording/reproducing apparatus shown in FIG. 8, the information reproducing apparatus or information recording/reproducing apparatus carries out processing in accordance with the steps of:

1) reproducing information contained in the burst cutting area BCA;
2) reproducing information contained in the information data zone CDZ contained in the system lead-in area SYLDI;
3) reproducing information contained in the data lead-in area DTLDI (in the case of a write-once type or a rewritable-type medium);
4) readjusting (optimizing) a reproduction circuit constant in the reference code zone RCZ; and
5) reproducing information recorded in the data area DTA or recording new information.

Information is sequentially arranged from the inner periphery side along the above processing steps, and thus, a process for providing an access to an unnecessary inner periphery is eliminated, the number of accesses is reduced, and the data area DTA can be accessed. Thus, there is attained advantageous effect that a start time for reproducing the information recording in the data area or recording new information is accelerated. In addition, RPML is used for signal reproduction in the data lead-in area DTDLI and data area DTA by utilizing a slice level detecting system for signal reproduction in the system lead-in area SYLDI. Thus, if the data lead-in area DTLDI and the data area DTA are made adjacent to each other, in the case where reproduction is carried out sequentially from the inner periphery side, a signal can be stably reproduced continuously merely by switching a slice level detecting circuit to a PRML detector circuit only once between the system lead-in area SYLDI and the data lead-in area DTLDI. Thus, the number of reproduction circuit switchings along the reproduction procedures is small, thus simplifying processing control and accelerating a data intra-area reproduction start time.

In the read-only type information storage medium, the data recorded in the data lead-out area DTLDO and the system lead-out area SYLDO each have a data frame structure (described later in detail) in the same manner as in the buffer zone 1 BFZ1 and buffer zone 2 BFZ2, and all values of the main data contained therein are set to "00h". In the read-only type information storage medium, a user data prerecording area 201 can be fully used in the data area DTA. However, as described later, in any of the embodiments of the write-once information storage medium and rewritable-type information storage medium as well, user rewriting/additional writing enable ranges 202 to 205 are narrower than the data area DTA.

In the write-once information storage medium or rewritable-type information storage medium, an SPA (Spare Area) is provided at the innermost periphery of the data area DTA. In the case where a defect has occurred in the data area DTA, a substituting process is carried out by using the spare area SPA. In the case of the rewritable-type information storage medium, the substitution history information (defect management information) is recorded in a defect management area 1 (DMA1) and a defect management area 2 (DMA2); and a detect management area 3 (DMA3) and a defect management area 4 (DMA4). The defect management information recorded in the defect management area 3 (DMA3) and defect management area 4 (DMA4) are recorded as the same contents of the defect management information recorded in the defect management information 1 (DMA1) and defect management information 2 (DMA2). In the case of the write-once type information storage medium, substitution history information (defect management information) in the case where the substituting process has been carried out is recorded in the data lead-in area DTLDI and copy information C_RMZ on the contents of recoding in a recording management zone which exists in a border zone. Although defect management has not been carried out in a current DVD-R disc, DVD-R discs partially having a defect location are commercially available as the manufacture number of DVD-R discs increases, and there is a growing need for improving the reliability of information recorded in a write-once type information storage medium.

A drive test zone DRTZ is arranged as an area for test writing before an information recording/reproducing apparatus records information in an information storage medium. The information recording/reproducing apparatus carries out test writing in advance in this area, and identifies an optimal recording condition (write strategy). Then, this apparatus can record information in the data area DTA under the optimal recording condition.

The disc test zone DKTZ is an area provided for manufacturers of information storage mediums to carry out quality test (evaluation).

In the write-once type information storage medium, two drive test zones DRTZ are provided at the inner periphery side and the outer periphery side of the medium. As more test writing operations are carried out for the drive text zones DRTZ, parameters are finely assigned, thereby making it possible to search an optimal recording condition in detail and to improve the precision of recording in the data area DTA. The rewritable-type information storage medium enables reuse in the drive test zone DRTZ due to overwriting. However, if an attempt is made to enhance the recording precision by increasing the number of test writings in the write-once type information storage medium, there occurs a problem that the drive test zone is used up immediately. In order to solve this problem, the present embodiment is featured in that an EDRTZ (Expanded Drive Test Zone) can be set from the outer periphery to the inner periphery direction, making it possible to extend a drive test zone.

In the present embodiment, features relating to a method for setting an extended drive test zone and a method for carrying out test writing in the set extended drive test zone are described below.

1) The setting (framing) of extended drive test zones EDRTZ are sequentially provided collectively from the outer periphery direction (close to the data lead-out area DTLDO) to the inner periphery side.

The extended drive test zone 1 (EDRTZ1) is set as an area collected from a location which is the closest to the outer periphery in the data area (which is the closest to the data lead-out area DTLDO); and the extended drive test zone 1 (EDRTZ1) is used up, thereby making it possible to secondarily set the extended drive test zone 2 (EDRTZ2) as a corrected area which exists in the inner periphery side than the current position.

2) Test writing is sequentially carried out from the inner periphery side in the extended dive test zone DDRTZ.

In the case where test writing is carried out in the extended drive test zone EDRTZ, such test writing is carried out along a groove area 214 arranged in a spiral shape from the inner periphery side to the outer periphery side, and current test writing is carried out for an unrecorded location that immediately follows the previously test-written (recorded) location.

The data area is structured to be additionally written along the groove area 214 arranged in a spiral manner from the inner periphery side to the outer periphery side. A processing operation from "checking immediately test-written location" to "carrying out current test writing" can be serially carried out by using a method for sequentially carrying out additional writing a location that follows a test writing location in which test writing in the extended drive test zone has been carried out immediately before, thus facilitating a test writing process and simplifying management of the test-written location in the extended drive test zone EDRTZ.

3) The data lead-out area DTLDO can be reset in the form including the extended drive test zone.

two areas, i.e., an extended spare area 1 (ESPA1) and an extended spare area 2 (ESPA2) are set in the data area DTA and two areas, i.e., the extended drive test zone 1 (EDRTZ1) and extended drive test zone 2 (EDRTZ2) are set. The present embodiment is featured in that the data lead-out area DTLO can be reset with respect to an area including up to the extended drive test zone 2 (EDRTZ2). Concurrently, the range of data area DTA is reset in a range-narrowed manner, making it easy to manage an additional writing enable range 205 of the user data which exists in the data area DTA.

In the case where the resetting has been provided, a setting location of the extended spare area 1 (ESPA1) is regarded as an "extended spare area which has already been used up", and an unrecorded area (area enabling additional test writing) is managed only in the extended spare area 2 (ESPA2) contained in the extended drive test zone EDRTZ if any. In this case, non-defect information which is recorded in the extended spare area 1 (ESPA1) and which has been used up for substitution is transferred to a location of an area which is not substituted in the extended spare area 2 (ESPTA2), and defect management information is rewritten. The start position information on the reset data lead-out area DTLDO is recorded in allocation position information on the latest (updated) data area DTA of RMD field 0 contained in the recording management data RMD. A structure of a border area in a write-once type information storage medium will be described here with reference to FIGS. 17A to 17D. When one border area has been first set in the write-once information storage medium, a bordered area (Bordered Area) BRDA#1 is set at the inner periphery size (which is the closest to the data lead-in area DTLDI), as shown in FIG. 17A, and then, a border out (Border out) BRDO that follows the above area is formed.

Further, in the case where an attempt is made to set a next bordered area (Bordered Area) BRDA#2, as shown in FIG. 17B, a next (#1) border in area BRDI that follows the preceding #1 border out area BRDO is formed, and then, a next bordered area BRDA#2 is set. In the case where an attempt is made to close the next bordered area BRDA#2, a (#2) border out area BRDO that immediately follows the area BRDA#2 is formed. In the present embodiment, a state in which the next ((#1) border in area BRDI) that follows the preceding (#1) border out area BRDO is formed and combined is referred to as a border zone BRDZ. The border zone BRDZ is set to prevent an optical head from overrun between the bordered areas BRDAs when reproduction has been carried out by using the information reproducing apparatus (on the presumption that the DPD detecting technique is used). Therefore, in the case where a write-once type information storage medium having information recorded therein is reproduced by using a read-only apparatus, it is presumed that a border close process is made such that the border out area BRDO and border-in area BRDI are already recorded and the border out area BRDO that follows the last bordered area BRDA is recorded. The first bordered area BRDA#1 is composed of 4080 or more physical segment blocks, and there is a need for the first bordered area BRDA#1 to have a width of 1.0 mm or more in a radial direction on the write-once type information storage medium. FIG. 17B shows an example of setting an extended drive test zone EDRTZ in the data area DTA.

FIG. 17C shows a state obtained after finalizing a write-once information storage medium. FIG. 17C shows an example in which an extended drive test zone EDRTZ is incorporated in the data lead-out area DTLDO, and further, an extended spare area ESPA has been set. In this case, a user data adding enable range 205 is fully padded with the last border out area BRDO.

FIG. 17D shows a detailed data structure in the border zone area BRDZ described above. Each item of information is recorded in size units of one physical segment blocks (physical segment block). Copy information C_RMZ on the contents recorded in a recording management zone is recorded at the beginning of the border out area BRDO, and a border end mark (Stop Block) STB indicating the border out area BRDOP is recorded. Further, in the case the next border in area BDI is reached, a first mark (Next Border Marker) NBM indicating that a next border area reaches an "N1-th" physical segment block counted from a physical segment block in which the border end mark (Stop Block) STC has been recorded; a second mark NBM indicating that a next border region reaches an "N2-th" physical segment block; and a third mark NBM indicating that a next border region reaches an "N3-th" mark NBM are discretely recorded in a total of three locations on a size by size basis of one physical segment block, respectively. Updated physical format information U_PFI is recorded in the next border-in area BRDI. In a current DVD-R or a DVD-RW disc, in the case where a next border is not reached (in the last border out area BRDO), a location in which "a mark NBM indicating a next border" should be recorded (a location of one physical segment block size) shown in FIG. 17D is maintained as a "location in which no data is recorded". If border closing is carried out in this state, this write-once type information storage medium (current DVD-R or DVD-RW disc) enters a state in which reproduction can be carried out by using a conventional DVD-ROM drive or a conventional DVD player. The conventional DVD-ROM drive or the conventional DVD player utilizes a recording mark recorded on this write-once type information storage medium (current DVD-R or DVD-RW disc) to carry out track shift detection using the DPD (Differential Phase Detect) technique. However, in the above described "location in which no data is recorded", a recording mark does not exist over one physical segment block size, thus making it impossible to carry out track shift detection using the DPD (Differential Phase Detect) technique. Thus, there is a problem that a track servo cannot be stably applied.

In order to solve the above described problem with the current DVD-R or DVD-RW disc, the present embodiment newly employed methods for:

1) in the case where a next border area is reached, recording data on a specific pattern in advance in a "location in which the mark NBM indicating a next border should be recorded"; and 2) carrying out an "overwriting process" in a specific recording pattern partially and discretely with respect to a location indicating "the mark NBM indicating a next border" in which, in the case where a next border area is reached, the data on the specific pattern is recorded in advance, thereby utilizing identification information indicating that "a next border area is reached".

By setting a mark indicating a next border due to overwriting, there is attained advantageous effect that, even in the case where a next border area is reached as shown in item (1), a recording mark of a specific pattern can be formed in advance in a "location in which the mark NBM indicating a next border should be recorded", and, after border closing, even if a read-only type information reproducing apparatus carries out track shift detection in accordance with the DPD technique, a track servo can be stably applied. If a new recording mark is overwritten partially on a portion at which a recording mark has already been formed in a write-once type information storage medium, there is a danger that the stability of a PLL circuit shown in FIG. 8 is degraded in an information recording/reproducing apparatus or an information reproducing apparatus. In order to overcome this danger, the present embodiment further newly employs methods for:

3) when overwriting is carried out at a position of "the mark NBM indicating a next border" of one physical segment block size, changing an overwrite state depending on a location contained in the same data segment;

4) partially carrying out overwriting in a sync data 432 and disabling overwriting on a sync code 431; and 5) carrying out overwriting in a location excluding data ID and IED.

As described later in detail, data fields 411 to 418 for recording user data and guard areas 441 to 448 are alternately recorded on an information storage medium. A group obtained by combining the data fields 411 to 418 and the guard areas 441 to 448 is called a data segment 490, and one data segment length coincides with one physical segment block length. The PLL circuit 174 shown in FIG. 8 facilitates PLL lead-in in VFO areas 471 and 472 in particular. Therefore, even if PLL goes out immediately before the VFO areas 471 and 472, PLL re-lead-in is easily carried out by using the VFO areas 471 and 472, thus reducing an effect on a whole system in the information recording/reproducing apparatus or information reproducing apparatus. There is attained advantageous effect that (3) an overwrite state is changed depending on a location in a data segment internal location, as described above, by utilizing this state, and an overwrite amount of a specific pattern is increased at a back portion close to the VFO areas 471 and 472 contained in the same data segment, thereby making it possible to facilitate judgment of "a mark indicating a next border" and to prevent degradation of the precision of a signal PLL at the time of reproduction.

One physical sector is composed of a combination of a location in which sync codes (SY0 to SY3) are arranged and the sync data 434 arranged between these sync codes 433. The information recording/reproducing apparatus or the information recording apparatus samples sync codes 43 (SY0 to SY3) from a channel bit pattern recorded on the information storage medium, and detects a boundary of the channel bit pattern. As described later, position information (physical sector numbers or logical sector numbers) on the data recorded on the information storage medium is sampled from data ID information. A data ID error is sensed by using an IED arranged immediately after the sampled information. Therefore, the present embodiment enables (5) disabling overwriting on data ID and IED and (4) partially carrying out overwriting in the sync data 432 excluding the sync code 431, thereby enabling detection of a data ID position and reproduction (content-reading) of the information recorded in data ID by using the sync code 431 in the "mark NMB indicating a next border".

FIGS. 16A to 16D show another embodiment which is different from that shown in FIGS. 17A to 17D relating to a structure of a border area in a write-once type information storage medium. FIGS. 16A and 16B show the same contents of FIGS. 17A and 17B. FIGS. 16A to 16D are different from FIG. 17C in terms of a state that follows finalization of a write-once type information storage medium. For example, as shown in FIG. 16C, after information contained in the bordered area BRDA#3 has been recorded, in the case where an attempt is made to achieve finalization, a border out area BRDO is formed immediately after the bordered area BDA#3 as a border closing process. Then, a terminator area TRM is formed after the border out area DRDO which immediately follows the bordered area BRDA#3, thereby reducing a time required for finalization.

In the embodiment shown in FIGS. 17A to 17D, there is a need for padding a region that immediately precedes the extended spare area ESPA with border out area BRDO. There occurs a problem that a large amount of time is required to form this border out area BRDO, thereby extending the finalization time. In contrast, in the embodiment shown in FIG. 16C, a comparatively short terminator area TRM is set in length; all of the outer areas than the terminator TRM are redefined as a data lead-out area NDTLDO; and an unrecorded portion which is outer than the terminator TRM is set as a user disable area 911. That is, when the data area DTA is finalized, the terminator area TRM is formed at the end of recording data (immediately after the border out area BRDO). All the information on the main data contained in this area is set to "00h". Type information on this area is set in an attribute of the data lead-out area NDTLDO, whereby this terminator area TRM is redefined as a new data lead-out area NDTLDO, as shown in FIG. 16C. Type information on this area is recorded in area type information 935 contained in data ID, as described later. That is, the area type information 935 contained in the data ID in this terminator area TRM is set to "10b", thereby indicating that data exists in the data lead-out area DTLDO. The present embodiment is featured in that identification information on a data lead-out position is set by the data ID internal area type information 935.

In an information recording/reproducing apparatus or an information reproducing apparatus shown in FIG. 8, let us consider a case in which an information recording/reproducing unit 141 has provided a random access to a specific target position on a write-once type information storage medium. Immediately after random access, the information recording/reproducing unit 141 must reproduce a data ID and decode a data frame number 922 in order to know where on the write-once type information storage medium has been reached. In the data ID, area type information 935 exists near the data frame number 922. At the same time, it is possible to immediately identify whether or not the information recording/reproducing unit 141 exists in the data lead-out area DTLDO merely by decoding this area type information 935. Thus, a simplification and high speed access control can be made. As described above, identification information on the data lead-out area DTLDO is provided by data ID internal setting of the terminator area TRM, thereby making it easy to detect the terminator area TRM.

As a specific example, in the case where the border out area BRDO is set as an attribute of the data lead-out area NDTLDO (that is, in the case where the area type information 935 contained in the data ID of a data frame in the border out BRDO is set to "10b"), the setting of this terminator area TRM is not provided. Therefore, when the terminator area TRM is recorded, the area having an attribute of the data lead-out area NDTLDO, this terminator area TRM is regarded as part of the data lead-out area NDTLDO, thus disabling recording into the data area DTA. As a result, as in FIG. 16C, a user disable area 911 may remain.

In the present embodiment, the size of the terminator area TRM is changed depending on a location on a write-once type information storage medium, thereby reducing a finalization time and achieving efficient processing. This terminator area TRM indicates an end position of recording data. In addition, even in the case where this area is used in a read-only apparatus, which carries out track shift detection in accordance with a DPD technique, the terminator area, is utilized to prevent overrun due to a track shift. Therefore, a width in a radial direction on the write-once type information storage medium having this terminator area TRM (width of a portion padded with the terminator area TRM) must be a minimum of 0.05 nm or more because of the detection characteristics of the read-only apparatus. A length of one cycle on the write-once type information storage medium is different depending on a radial position, and thus, the number of physical segment blocks included in one cycle is also different depending on the radial position. Thus, the size of the terminator area TRM is different depending on the physical sector number of a physical sector which is positioned at the beginning of the terminator area TRM, and the size of the terminator area TRM increases as the physical sector go to the outer periphery side. A minimum value of a physical sector number of an allowable terminator area TRM must be greater than "04FE00h". This derived from a restrictive condition in which the first bordered area DRDA#1 is composed of 4080 or more physical segment blocks, making it necessary for the first bordered area BRDA#1 to have a width equal to or greater than 1.0 mm in a radial direction on the write-once type information storage medium. The terminator area TRM must start from a boundary position of physical segment blocks.

In FIG. 16D, a location in which each item of information is to be recorded is set for each physical segment block size for the reason described previously, and a total of 64 KB user data recorded to be distributed in 32 physical sectors is recorded in each physical segment block. A relative physical segment block number is set with respect to a respective one item of information, as shown in FIG. 16D, and the items of information are sequentially recorded in the write-once type information storage medium in ascending order from the lowest relative physical segment number. In the embodiment shown in FIGS. 16A to 16D, copies CRMD#0 to CRMD#4 of RMD, which are the same contents, are overwritten five times in a copy information recording zone C_TRZ of the contents recorded in the recording management zone shown in FIG. 17D. The reliability at the time of reproduction is improved by carrying out such overwriting, and, even if dust or scratch adheres onto a write-once information storage medium, the copy information CRMD on the contents recorded in the recording management zone can be stably reproduced. Although the border end mark STB shown in FIG. 16D coincides with a border end mark STB shown in FIG. 17D, the embodiment shown in FIG. 16D does not have the mark NBM indicating a next border, unlike the embodiment shown in FIG. 17D. All the information on the main data contained in reserved areas 901 and 902 is set to "00h".

At the beginning of the border-in area BRDI, information which is completely identical to updated physical format information U_PFI is multiply written six times from N+1 to N+6, configuring the updated physical format information U_PFI shown in FIG. 17D. The thus updated physical format information U_PFI is multiply written, thereby improving the reliability of information.

In FIG. 16D, the present embodiment is featured in that the recording management zone RMZ in the border zone is provided in the border-in area BRDI. As shown in FIG. 15A, the size of the recording management zone RMZ contained in the data lead-in area DTLDI is comparatively small. If the setting of a new bordered area BRDA is frequently repeated, the recording management data RMD recorded in the recording management zone RMZ is saturated, making it impossible to set a new bordered area BRDA midway. As in the embodiment shown in FIG. 16D, there is attained advantageous effect that a recording management zone for recording the recording management data RMD relating to the bordered area BRDA#3 that follows is provided in the border-in area DRDI, whereby the setting of a new bordered area BRDA can be provided a number of times and the additional writing count in the bordered area BRDA can be significantly increased. In the case where the bordered area BRDA#3 that follows the border-in area BRDI including the recording management zone RMZ in this border zone is closed or in the case where the data area DTA is finalized, it is necessary to repeatedly record all the last recording management data RMD into a spare area 273 established in an unrecorded state in the recording management zone RMZ, and pad all the spare area with the data. In thins manner, the spare area 273 in an unrecorded state can be eliminated, a track shift (due to DPD) at the time of reproduction in a read-only apparatus can be prevented, and the reproduction reliability of the recording management data RMD can be improved by multiple recording of the recording management data. All the data contained in a reserve area 903 are set to "00h".

Although the border out area BRDO serves to prevent overrun due to a track shift in the read-only apparatus while the use of DPD is presumed, there is no need for the border-in area BRDI to have a particularly large size other than having the updated physical format information U_PFI and the information contained in recording management zone RMZ in the border zone. Therefore, an attempt is made to reduce the size to the minimum in order to reduce a time (required for border zone BRDZ recording) at the time of setting a new bordered area BRDA. With respect to FIG. 16A, before forming the border out area BRDO due to border closing, there is a high possibility that the user data additional writing enable range 205 is sufficiently large, and a large number of additional writing is carried out. Thus, it is necessary to largely take a value of "M" shown in FIG. 16D so that recording management data can be recorded a number of times in the recording management zone RMZ in a border zone. In contrast, with respect to FIG. 16B, in a state that precedes border closing of the bordered area BRDA#2 and that precedes recording the border out area BRDO, the user data additional writing enable range 205 narrows, and thus, it is considered that not the number of additional writings of the recording management data to be additionally written in the recording management zone RMZ in the border zone does not increase so much. Therefore, the setting size "M" of the recording management zone RMZ in the border-in area BRDI that immediately precedes the bordered area BRDA#2 can be taken to be relatively small. That is, as a location in which the border-in area BRDI is arranged goes to the inner periphery side, the number of predicted additional writings of the recording management data increases. As the location goes to the outer periphery, the number of predicted additional writings of the recording management data decreases. Thus, the present embodiment is featured in that the size of the border-in area BRDI is reduced. As a result, the reduction of a time for setting a new bordered area BRDA and processing efficiency can be achieved.

A logical recording unit of the information recorded in the bordered area BRDA shown in FIG. 17C is referred to as an R zone. Therefore, one bordered area BRDA is composed of at least one or more R zones. In a current DVD-ROM, as a file system, there are employed a file system called a "UDF bridge" in which both of file management information which conforms with a UDF (Universal Disc Format) and file management information which conforms with ISO 9660 are recorded in one information storage medium at the same time. In a file management method which conforms to ISO 9660, there is a rule that one file must be continuously recorded in an information storage medium. That is, information contained in one file is disabled to be divisionally arranged at a discrete position on an information storage medium. Therefore, for example, in the case where information has been recorded in conformance with the above UDF bridge, all the information configuring one file is continuously recorded. Thus, it is possible to adapt this area in which one file is continuously recorded so as to configure one R zone.

FIGS. 18A to 18D show a data structure in the control data zone CDZ and the R-physical information zone RIZ. As shown in FIG. 18B, physical format information (PFI) and disc manufacturing information (DMI) exist in the control data zone CDZ, and similarly, an DMI (Disc Manufacturing Information) and R_PFI (R-Physical Format Information) are contained in an R-physical information zone RIZ.

Information 251 relating to a medium manufacture country and medium manufacturer's nationality information 252 are recorded in medium manufacture related information DMI. When a commercially available information storage medium infringes a patent, there is a case in which an infringement warning is supplied to such a country in which a manufacturing location exists or an information storage medium is consumed (or used). A manufacturing location (country name) is identified by being obliged to record the information contained in an information storage medium, and a patent infringement warning is easily supplied, whereby an intellectual property is guaranteed, and technical advancement is accelerated. Further, other medium manufacture related information 253 is also recorded in the medium manufacture related information DMI.

The present embodiment is featured in that type of information to be recorded is specified depending on a recording location (relative byte position from the beginning) in physical format information PFI or R-physical format information R_PFI. That is, as a recording location in the physical format information PFI or R-physical format information R_PFI, common information 261 in a DVD family is recorded in an 32-byte area from byte 0 to byte 31; common information 262 in an HD DVD family which is the subject of the present embodiment is recorded in 96 bytes from byte 32 to byte 127; unique information (specific information) 263 relating to various specification types or part versions are recording in 384 bytes from byte 128 to byte 511; and information corresponding to each revision is recorded in 1536 bytes from byte 512 to byte 2047. In this way, the information allocation positions in the physical format information are used in common depending on the contents of information, whereby the locations of the recorded information are used in common depending on medium type, thus making it possible to carry out in common and simplify a reproducing process of an information reproducing apparatus or an information recording/reproducing apparatus. The common information 261 in a DVD family recorded in byte 0 to byte 31, as shown in FIG. 18D, is divided into: information 267 recorded in common in all of a read-only type information storage medium and a rewritable-type information storage medium, and a write-once type information storage medium recorded from byte 0 to byte 16; and information 268 which is recorded in common in the rewritable-type information storage medium and the write-once type information storage medium from byte 17 to byte 31 and which is not recorded in the read-only type medium.

Now, a description will be given with respect to the significance of specific information 263 of the type and version of each of the specifications from byte 128 to byte 511 shown in FIG. 18C and the significance of information content 264 which can be set specific to each of the revisions from byte 512 to byte 2047. That is, in the specific information 263 of type and version of each of the specifications from byte 128 to byte 511, the significance of the contents of recording information at each byte position coincides with a rewritable-type information storage medium of a different type regardless of a write-once type information storage medium. The information content 264 which can be set specific to each of the revisions from byte 512 to byte 2047 permits the fact that if a revision is different from another in the same type of medium as well as a difference between a rewritable-type information storage medium and a write-once type information storage medium whose types are different from each other, the significances of the contents of recording information at byte positions are different from each other.

A specific method for mounting an information recording/reproducing apparatus will be described below. The specification (version book) or revision book describe both of the reproduction signal characteristics derived from the "H-L" recording film and the reproduction signal characteristics derived from the "L-H" recording film. Concurrently, the corresponding circuits are provided on a two by two basis in the PR equalizing circuit 130 and Viterbi decoder 156 shown in FIG. 8. When an information storage medium is mounted in the information reproduction unit 141, first, the slice level detector circuit 132 for reading the information contained in the system lead-in area SYLDI is started up. This slice level detector circuit 132 reads information on polarity of a recording mark recorded in this 192 byte (identification of "H-L" or "L-H"); and then make judgment of "H-L" or "L-H". In response to the judgment, after the PR equalizing circuit 130 and a circuitry contained in the Viterbi decoder 156 has been switched, the information recorded in the data lead-in area DTLDI or data area DTA is reproduced. The above described method can read the information contained in the data lead-in area DTLDI or data area DTA comparatively quickly, and moreover, precisely. Although revision number information defining a maximum recording speed is described in byte 17 and revision number information defining a minimum recording speed is described in byte 18, these items of information are merely provided as range information defining a maximum and a minimum. In the case where the most stable recording is carried out, there is a need for optimal line speed information at the time of recording, and thus, the associated information is recorded in byte 193.

The present embodiment is featured in that information on a rim intensity value of an optical system along a circumferential direction of byte 194 and information on a rim intensity value of an optical system along in a radial direction of byte 195 is recorded as optical system condition information at a position which precedes information on a variety of recording conditions (write strategies) included in the information content 264 set specific to each revision. These items of information denote conditional information on an optical system of an optical head used when identifying a recording condition arranged at the back side. The rim intensity used here denotes a distribution state of incident light incident to an objective lens before focusing on a recording surface of an information storage medium. This intensity is defined by a strength value at a peripheral position of an objective lens (iris face outer periphery position) when a center intensity of an incident light intensity distribution is defined as "1". The incident light intensity distribution relevant to an objective lens is not symmetrical on a point to point basis; an elliptical distribution is formed; and the rim intensity values are different from each other depending on the radial direction and the circumferential direction of the information storage medium. Thus, two values are recorded. As the rim intensity value increases, a focal spot size on a recording surface of the information storage medium is reduced, and thus, an optimal recording power condition changes depending on this rim intensity value. The information recording/reproducing apparatus recognizes in advance the rim intensity value information contained in its own optical head. Thus, this apparatus reads the rim intensity values of the optical system along the circumferential direction and the radial direction, the value being recorded in the information storage medium, and compares values of its own optical head. If there is no large difference as a result of the comparison, a recording condition recorded at the back side can be applied. If there is a large difference, there is a need for ignoring the recording condition recorded at the back side and starting identifying an optimal recording condition while the recording/reproducing apparatus carries out test writing by utilizing the drive test zone DRTZ.

Therefore, there is a need for quickly making a decision as to whether to utilize the recording condition recorded at the back side or whether to start identifying the optimal recording condition while ignoring the information and carrying out test writing by oneself. There is attained advantageous effect that the rim intensity information can be read, and then judgment can be made at a high speed as to whether or not the recoding condition arranged later is met by arranging conditional information on an optical system identified at a preceding position with respect to a position at which the recommended recording condition has been recorded.

As described above, according to the present embodiment, there are divisionally provided: a specification (version book) in which a version is changed when the contents have been significantly changed; and a revision book in which the corresponding revision is changed and issued, and only a revision book is issued, the book having updated only revision every time a recording speed is improved. Therefore, if a revision number is different from another, a recording condition in a revision book changes. Thus, information relating to a recording condition (write strategy) is mainly recorded in the information content 264 which can be set specific to each of the revisions from byte 512 to byte 2047. The information content 264 which can be set specific to each of the revisions from byte 512 to byte 2047 permits the fact that if a revision is different from another in the same type of medium as well as a difference between a rewritable-type information storage medium and a write-once type information storage medium whose types are different from each other, the significances of the contents of recording information at byte positions are different from each other.

In a write-once type information storage medium, with respect to R-physical format information recorded in an R-physical information zone RIZ contained in the data lead-in area DTLDI, border zone start position information (first border outermost periphery address) is added to the physical format information PFI (copy of HD DVD family common information), and the added information is described. In the updated physical format information U_PFI, updated in the border-in area BRDI shown in FIGS. 17A to 17D or FIGS. 16A to 16D, start position information (self-border outermost periphery address) is added to the physical format information (copy of HD DVD family common information), and the added information is recorded. The updated start position information is arranged in byte 256 to byte 263 which are positions succeeding information relating to a recording condition such as peak power or bias power 1 (information content 264 which can be set specific to each revision), the position following the common information 262 contained in the DVD family.

With respect to the specific contents of information relating to the borer zone start position information, the start position information on the border out area BRDO situated at the outside of the (current) bordered area BRDA currently used in byte 256 to byte 259 is described in PSN (Physical Sector Number); and border-in area BRDI start position information relating to the bordered area BRDA to be used next is described in the physical sector number (PSN) in byte 260 to byte 263.

The specific contents of information relating to the updated start position information indicate the latest border zone position information in the case where a bordered area BRDA has been newly set. The start position information on the border out area BRDO situated at the outside of the (current) bordered area BRDA currently used in byte 256 to byte 259 is described in PSN (Physical Sector Number); and the start position information on the border-in area BRDI relating to the bordered area BRDA to be used next is described in the sector number (PSN) in byte 260 to byte 263. In the case where recording cannot be carried out in the next bordered area BRDA, this area (ranging from byte 260 to byte 263) is padded with all "00h".

In contrast, the R-physical format information R_PFI contained in the write-once type information storage medium records the end position information on the recorded data contained in the corresponding bordered area BRDA.

Further, the read only type information storage medium records the end address information contained in "Layer 0" which is a front layer when seen from the reproduction optical system; and the rewritable-type information storage medium records information on a differential value of each item of start position information between a land area and a groove area.

As shown in FIG. 17D, the associated copy information exists in the border-out zone BRDO as copy information C_RMZ indicating the contents recorded in the recording management zone. This recording management zone RMZ records RMD (Recording Management Data) having the same data size as one physical segment block size, as shown in FIG. 15B, so that new recording management data RMD updated every time the contents of the recording management data RMD is updated can be sequentially added backwardly. The recording management data RMD is further divided into fine RMD field information RMDF of 2048 byte size. The first 2048 bytes in the recording management data are provided as a reserved area.

In the information reproducing apparatus or information recording/reproducing apparatus shown in FIG. 8, a wobble signal detecting section 135 is used for track shift detection using a push-pull signal. In the track shift detecting circuit (wobble signal detecting section 135), as a value of the above push-pull signal $(I1-I2)_{pp}/(I1+I2)_{DC}$, track shift detection can be stably carried out in the range of $0.1 \leq (I1-I2)_{pp}/(I1+I2)_{DC} \leq 0.8$. In particular, with respect to an "H-L" recording film, track shift detection can be carried out more stably in the range of $0.26 \leq (I1-I2)_{pp}/(I1+I2)_{DC} \leq 0.52$; and with respect to a "L-H" recording film, track shift detection can be carried out more stably in the range of $0.30 \leq (I1-I2)_{pp}/(I1+I2)_{DC} \leq 0.60$.

Therefore, in the present embodiment, information storage medium characteristics are defined so that a push-pull signal is included in the range of $0.1 \leq (I1-I2)_{pp}/(I1+I2)_{DC} \leq 0.8$ (preferably, in the range of $0.26 \leq (I1-I2)_{pp}/(I1+I2)_{DC} \leq 0.52$ with respect to the "H-L" recording film and in the range of $0.30 \leq (I1-I2)_{pp}/(I1+I2)_{DC} \leq 0.60$ with respect to the "L-H" recording film. The above range is defined so as to be established in both of a recorded location in data lead-in area DTLDI or data area DTA and data lead-out area DTLDO (location in which a recording mark exists) and an unrecorded location (location in which no recording mark exists). However, in the present embodiment, without being limited thereto, this range can be defined so as to be established in only the recorded location (location in which a recording mark exists) or in only the unrecorded location (location in which no recording mark exists). Further, in the present embodiment, as a ratio of amplitudes $(I1-I2)_{pp}$ after and $(I1-I2)_{pp}$ before of an $(I1-I2)$ signal in the recorded location and in the unrecorded location, the information storage medium characteristics are defined so as to meet $0.7 \leq (I1-I2)_{pp}$ after$/(I1-I2)_{pp}$ before$\leq 1.50$ regardless of the "H-L" recording film or the "L-H" recording film, whichever may be used. The values of the track shape and the push-pull signal amplitude described in the least significant 7 bits within the push-pull signal amplitude are displayed by percentage relevant to an actual push-pull signal amplitude value. For example, in the case where the amplitude of the push-pull signal is 0.70 (70%), 0.7=70/100 is obtained. Thus, as the data described in this field, information "0100 0110b" is described, the information expressing a decimal value of "70" in binary notation.

In the case of a write-once type information recording medium, tracking is carried out on a pre-groove area (a recording mark is formed on the pre-groove area). Thus, this on-track signal denotes a detection signal level when tracking is carried out on the pre-groove area. That is, the above-described on-track information denotes a signal level $(Iot)_{groove}$ of an unrecorded area when a track loop shown in FIG. 27B, for example is turned ON. The present invention allows the recording mark to be formed on an area between the pre-grooves. In this case, the "land" can be regarded as "groove."

In R physical format information R_PFI, a physical sector number (030000h) is recorded, the number representing the start position information contained in the data area DTA. In addition, a physical sector number is recorded, the number indicating a location in which last recording has been made in the last R zone included in the bordered area.

In updated physical format information U_PFI, there are recorded: a physical sector number (030000h) representing the start position information contained in the data area DTA; and a physical sector number indicating a location in which last recording has been made in the last R zone included in the bordered area.

These items of positional information can be described in ECC block address numbers according to another embodiment instead of being described in physical sector numbers.

As described later, in the present embodiment, one ECC block is composed of 32 sectors. Therefore, the least significant five bits of the physical sector number of a sector arranged at the beginning in a specific ECC block coincides with that of a sector arranged at the start position in the adjacent ECC block. In the case where a physical sector number has been assigned so that the least significant five bits of the physical sector of the sector arranged at the beginning in the ECC block is "00000", the values of the least significant six bits or more of the physical sector numbers of all the sectors existing in the same ECC block coincide with each other. Therefore, address information obtained by eliminating the least significant five bit data of the physical sector numbers of the sectors existing in the same ECC block as above and sampling only data of the least significant six bit and subsequent is defined as ECC block address information (or ECC block address number). As described later, the data segment address information (or physical segment block number information) recorded in advance by wobble modulation coincides with the above ECC block address. Thus, when the positional information contained in the recording management data RMD is described in the ECC block address numbers, there is attained advantageous effects described below:

1) An access to an unrecorded area is accelerated in particular:
   A differential calculation process is facilitated because a positional information unit of the recording management data RMD coincides with an information unit of data segment addresses recorded in advance by wobble modulation; and
2) A management data size in the recording management data RMD can be reduced:
   The number of bits required for describing address information can be reduced by 5 bits per address.

As described later, a single physical segment block length coincides with a one data segment length, and the user data for one ECC block is recorded in one data segment. Therefore, an address is expressed as an "ECC block address number"; an "ECC block address"; a "data segment address", a "data segment number", or a "physical segment block number" and the like. These expressions have the same meaning.

In the allocation position information on the recording management data RMD existing in RMD field 0, size information in that the recording management zone RMZ capable of sequentially additionally writing the recording management data RMD is recorded in ECC block units or in physical segment block units. As shown in FIG. 15B, one recording management zone RMD is recorded on one by one physical segment block basis, and thus, based on this information, it is possible to identify how many times the updated recording management data RMD can be additionally written in the recording management zone RMZ. Next, a current recording management data number is recorded in the recording management zone RMZ. This denotes number information on the recording management data RMD which has been already recorded in the recoding management zone RMZ. For example, assuming that this information corresponds to the information contained in the recording management data RMD#2 as an example shown in FIG. 15B, this information corresponds to the second recorded recording management data RMD in the recoding management zone RMZ, and thus, a value "2" is recorded in this field. Next, the residual amount information contained in the recording management zone RMZ is recorded. This information denotes information on the item number of the recording management data RMD which can be further added in the recording management zone RMZ, and is described in physical segment block units (=ECC block units=data segment units). Among the above three items of information, the following relationship is established.

[Size information having set RMZ therein]=[Current recording management data number]+[residual amount in RMZ]

The present embodiment is featured in that the use amount or the residual amount information on the recording management data RMD contained in the recording management zone RMZ is recorded in a recording area of the recording management data RMD.

For example, in the case where all information is recorded in one write-once type information storage medium once, the recording management data RMD may be recorded only once. However, in the case where an attempt is made to repeatedly record additional writing of the user data (additional writing of the user data in the user data additional writing enable range 205) very finely in one write-once type information storage medium, it is necessary to additionally write recording management data RMD updated every time additional writing is carried out. In this case, if the recording management data RMD is frequently additionally written, the reserved area 273 shown in FIG. 15B is eliminated, and the information recording/reproducing apparatus requires countermeasures against this elimination. Therefore, the use amount or residual amount information on the recording management data RMD contained in the recording management zone RMZ is recorded in a recording area of the recording management data RMD, thereby making it possible to identify in advance a state in which additional writing in the recording management zone RMZ cannot be carried out and to take action by the information recording/reproducing apparatus earlier.

A description will be given with respect to an example of a processing method for newly setting an extended drive test zone EDRTZ by the information recording/reproducing apparatus shown in FIG. 8 and carried out test writing in the zone.

1) A write-once type information storage medium is mounted on an information recording/reproducing apparatus.

2) Data formed in the burst cutting area BCA is reproduced by the information recording/reproducing unit 141; the recorded data is supplied to the control unit 143; and the information is decoded in the control unit 143, and it is determined whether or not processing can proceeds to a next step.

3) Information recorded in the control data zone CDZ in the system lead-in area SYLDI is reproduced by the information recording/reproducing unit 141, and the reproduced information is transferred to the control unit 143.

4) Values of rim intensities when a recommended recording condition has been identified in the control unit 143 are compared with a value of rim intensity of an optical head used at the information recording/reproducing unit 141; and an area size required for test writing is identified.

5) The information contained in recording management data is reproduced by the information recording/reproducing unit 141, and the reproduced information is transferred to the control unit 143. The control section decodes the information contained in the RMD field 4 and determines whether or not there is a margin of an area size required for test writing, the size being identified in step (4). In the case where the judgment result is affirmative, processing proceeds to step (6). Otherwise, processing proceeds to step (9).

6) A location for starting test writing is identified based on end position information on a location which has already been used for test writing in the drive test zone DRTZ or extended drive test zone EDRTZ used for test writing from the RMD field 4.

7) Test writing is executed by the size identified in step (4) from the location identified in step (6).

8) The number of locations used for test writing has been increased in accordance with the processing in step (7), and thus, recording management data RMD obtained by rewriting the end position information on the locations which has already been used for test writing is temporarily stored in the memory unit 175, and processing proceeds to step (12).

9) The information recording/reproducing unit 141 reads information on "end position of the latest user data recording enable range 205" recorded in the RMD field 0 or "end position information on the user data additional writing enable range" recorded in the allocation location information on the data area DTA contained in the physical; and the control unit 143 further internally sets the range of a newly set extended drive test zone EDRTZ.

10) Information on "end position of the latest used data recording enable range 205" recorded in the RMD field 0 based on the result described in step (9) is updated and additional setting count information on the extended drive test zone EDRTZ contained in the RMD field 4 is incremented by one (that is, the count is added by 1); and further, the memory unit 175 temporarily stores the recording management data RMD obtained by adding the start/end position information on the newly set extended drive test zone EDRTZ.

11) Processing moves from step (7) to (12).

12) Required user information additionally written into the user data additional writing enable range 205 under an optimal recording condition obtained as a result of test writing carried out in step (7).

13) The memory unit 175 temporarily stores the recording management data RMD updated by additionally writing the start/end position information contained in an R zone which has been newly generated in response to step (12).

14) The control unit 143 controls the information recording/reproducing unit 141 to additionally record the latest recording management data RMD temporarily stored in the memory unit 175, in the reserved area 273 (for example, FIG. 15B) contained in the recording management zone RMZ.

The information on the physical sector number or the physical segment number (PSN) indicating the lastly recorded position in the write-once information storage medium shown in the present embodiment can be obtained from the information contained in the "recording position management data RDM lastly recorded in the extended recording management zone RMZ that has been lastly set". That is, the recording position management data RMD includes end position information on an n-th "complete type R zone (Complete R zone)" described in RMD field 7 or later or information on "physical sector number LRA representing the last recording position in the n-th R zone" shown in, thereby reading the physical sector number or physical segment number (PSN) in the lastly recorded location from the inside of the recording position management data RMD (refer to RMD#3 shown in FIG. 15B, for example) that has been lastly recorded in the lastly set extended RMZ, and making it possible to know the lastly recorded location from a result of the reading.

The information reproducing apparatus uses a DPD (Differential Phase Detection) technique instead of a Push-Pull technique for track shift detection, and thus, tracking control can be carried out only in an area in which an emboss pit or a recording mark exists. Thus, the information reproducing apparatus cannot provide an access to an unrecorded area of the write-once type information storage medium, making it impossible to carry out reproduction in the RMD duplication zone RDZ that includes the unrecorded area. Thus, the recording position management data RMD recorded therein cannot be reproduced. Instead, the information reproducing apparatus can reproduce physical format information PFI, R physical information zone R-PFIZ, and updated physical format information UPFI. Thus, a search can be made for the lastly recorded location.

The information reproducing apparatus carries out information reproduction in a system lead-in area SYLDI, and then, reads the last positional information on the existing information data recorded in the R physical information zone R-PFIZ (information on "physical sector number indicating the lastly recorded location in the last R zone in the corresponding border-in area"). As a result, it is possible to know the last location of the bordered area BRDA #1. In addition, after checking a position of border-out BRDO allocated immediately after the last location, it is possible to read information on the updated physical format UPFI recorded in border-in BRDI recorded immediately after the checked position.

Instead of the foregoing method utilizing "physical sector number indicating the lastly recorded location in the last R zone in the corresponding border-in area" described in FIG. 19, an access may be provided to the start position of border-out BRDO by using information on "physical sector number PSN indicating a start position of a border zone" described in the 256th to 263rd bytes (this start position denotes the start position of border-out BRDO, as is evident from FIG. 16C).

Next, an access is provided to the last position of recorded data, thereby reading the last position information (FIG. 19) on the recorded data contained in updated physical format information UFPI. A processing operation of reading "information on the lastly recorded physical sector number or physical segment number (PSN)" recorded in the updated physical format information, and then, providing access to the lastly recorded physical sector number or physical segment number (PSN) based on the read information is repeated until the lastly recorded physical sector number PSN in the last R zone has been reached. That is, it is determined that a location of reading information, the location having been reached after access is really the lastly recorded position in the last R zone. In the case where the determination result is negative, the above-described access processing operation is repeated. As in R physical information zone R-PFIZ, in the present embodiment, a search may be made for recording position of the updated physical format information UPFI recorded in a border zone (border-in BRDI) by utilizing information on the updated physical sector number or physical segment number (PSN) indicating a start position of a border zone" in the updated physical format information UPFI.

When the position of the physical sector number (or physical segment number) lastly recorded in the last R zone is found, the information reproducing apparatus carries out reproduction from the immediately preceding position of border-out. Then, the lastly recorded position is reached while the inside of the last bordered area BRDA is serially reproduced from the start. Then, a check of the last border-out BRDO is made. In the write-once type information storage medium according to the present embodiment, at the outside of the above last border-out BRDO, an unrecorded area in which no recording mark is recorded follows up to the position of data lead-out DTLDO. In the information reproducing apparatus, no tracking is carried out in an unrecorded area on the write-once type information recording medium, and the information on the physical sector number PSN is not recorded, thus making it impossible to carry out reproduction at a position following the last border-out BRDO. Thus, when the last border-out position has been reached, an access processing operation and a continuous reproducing processing operation terminate.

Referring to FIG. 19, a description will be given with respect to a timing (updating condition) of updating the contents of information in the recording position management data RMD. There exist five types of conditions for updating information on the recording position management data RMD.

(Condition 1a) In the case where medium status information (Disc states) in RMD field "0" is changed:

An update processing operation of the recording position management data RMD is not carried out at the time of recording of a terminator ("end position information" recorded at the rear (outer periphery side) of the lastly recorded border-out BRDO).

(Condition 1b) In the case where an inner test zone address or an outer test zone address (Inner or outer test zone address) specified in RMD field "1" is changed:

(Condition 2) In the case where border-out BRDO start position information (Start Physical Sector Number of Border-out area) or open (write-once possible) recording management zone RMZ number (open Extended RMZ number), specified in RMD field "3" is changed:

(Condition 3) In the case where information on any one of the following items is changed in RMD filed "4":

1) A total number of unspecified R zone number, open type R zone number, and complete type R zone or invisible R zone number (Invisible R Zone number)

2) First open type R zone number information (First Open R Zone number)

3) Second open type R zone number information (Second R Zone Number)

In the present embodiment, during a period in which a series of information recording operations are made for a write-once type information storage medium such as HD DVD-R (by means of a disc drive), there is no need for updating RMD. For example, in the case of recording video image information, there is a need for continuous recording to be guaranteed. If access control of up to a position of recording management data RMD is made in order to update recording position management data RMD in the middle of video image information recording (image recording), continuous recording is not guaranteed because recording of video image information is interrupted. Therefore, the update of RMD is generally carried out after the video image recording is terminated. If a series of video image information recording operations continues for an excessively long period of time, the location lastly recorded on the write-once type information storage medium at the current time point and the last position information contained in the recording position management data RMD that has been already recorded in the write-once type information storage medium will be significantly shifted. At this time, in the case where an abnormal phenomenon in the middle of continuous recording occurs, and then, the information recording/reproducing apparatus (disc drive) is forcibly terminated, discrepancy between "the last position information contained in the recording position management data RMD" and a recording position immediately before forcible termination becomes excessively large. As a result, there occurs a danger that data recovery conforming to a recording position immediately before forcible termination with respect to the "last position information contained in the recording position management data RMD" becomes difficult. Therefore, in the present embodiment, the following update condition is further added.

(Condition 4) (Information on the recording position management data RMD is updated) in the case where discrepancy (a differential result of "PSN-LRA") between a "physical sector number LRA indicating the last recording position in an R zone" recorded in the latest recording position management data RMD and a "physical sector number PSN in the lastly recorded location in a R zone at the current time point" which serially changes during continuous recording exceeds 8192:

However, in the above-described "condition 1b)" or "(condition 4)", no updating is carried out in the case where the size of an unrecorded location in the recording management zone RMZ (reserved area 273) is equal to or smaller than 4 physical segment blocks (4×64 KB).

Now, a description will be given with respect to an extended recording management zone. As setting locations of the recording management zone, the present embodiment defines the following three types.

1) Recording Management Zone RMZ (L-RMZ) in Data Lead-In Area DTLDI

As is evident from FIG. 16B, in the present embodiment, part of the inside of the data lead-in area DTLDI is used for the border-in BRDI corresponding to the first bordered area. Therefore, the recoding position management zone RMZ to be recorded in the border-in BRDI that corresponds to the first bordered area is preset in the data lead-in area DTLDI, as shown in FIG. 15A. In the internal structure of this recording management zone RMZ, serial recording position management data RMD can be written once by 64 Kbytes (by 1 physical segment block size).

2) Recording Management Zone RMZ (B-RMZ) in Border-In BRDI

In the write-once type information storage medium according to the present embodiment, before reproducing recorded information by a reproduction only apparatus, there is a need for a border close processing operation. In the case where new information is recorded after a border has been closed once, there is a need for setting a new bordered area BRDA. The border-in BRDI is set at a position preceding this new bordered area BRDA. The unrecorded area in the latest recording management zone is closed at the stage of border close processing operation (reserved area 273 shown in FIG. 15B). Thus, there is a need for setting a new area (recording management zone RMZ) for recording the recording position management data RMD that indicates a position of the information recorded in a new bordered area BRDA. The present embodiment, as shown in FIG. 16D, is featured in that a recording management zone RMZ is set in the newly set border-in BRDI. The internal structure of the recording management zone RMZ in this border zone has a structure that is completely identical to the "recording management zone RMZ (L-RMZ) that corresponds to the first bordered area". In addition, the information contained in the recording position management data RMD recorded in this area is recorded together with recording position management information relating to the data recorded in the preceding bordered area BRDA as well as the recording position management data relating to the data recorded in the corresponding bordered area BRDA.

3) Recording Management Zone RMZ (U-RMZ) in Bordered Area BRDA

RMZ in border-in BRDI (B-RMZ), shown in the item (2) cannot be set unless a new bordered area BRDA is set. In addition, the size of the first bordered area management zone RMZ (L-RMZ) shown in the item (1) is finite, a reserved area 273 is depleted while additional-writing is repeated, and new recording position management data RMD cannot be written. In order to solve the above-described problem, in the present embodiment, an R zone for recoding a recording management zone RMZ is newly provided in a bordered area BRDA so as to enable further addition. That is, there exists a specific R zone in which the recording management zone RMZ (U-RMZ) in the bordered area BRDA" is set.

In addition, without being limited to a case of reducing the remaining size of an unrecorded area (reserved area 273) in the first bordered area management zone RMZ (L-RMZ), the present embodiment is featured in that, in the case of reducing the remaining size of the unrecorded area (reserved area 273) in the "recording management zone RMZ (B-RMZ) in the border-in BRDI" and in the "recording management zone RMZ (U-RMZ) in the bordered area BRDA" that has already been set, the above-described "recording management zone RMZ (U-RMZ) in the bordered area BRDA" can be set.

The contents of information recorded in the recording management zone RMZ (U-RMZ) in this bordered area BRDA have a structure that is completely identical to that in the recording management zone RMZ (L-RMZ) in the data lead-in area DTLDI shown in FIG. 15B. In addition, the information contained in the recoding position management data RMD recorded in this area is recorded together with recording position management information relating to the data recorded in the preceding bordered area BRDA as well as the recoding position management data relating to the data recorded in the corresponding bordered area BRDA.

Among the variety of recording management zones RMZ described above,

1) A position of the recording management zone RMZ (L-RMZ) in the data lead-in area DTLDI is preset before recording user data.

However, in the present embodiment,

2) A recording management zone RMZ (B-RMZ) in the border-in BRDI; and

3) A recording management zone RMZ (U-RMZ) in the bordered area BRDA are properly set (extensively provided) by the information recording/reproducing apparatus in accordance with a user data recording (additional write) state, and thus, these zones are referred to as "extended (type) recording management zones RMZ".

In the case where an unrecorded area in a currently used recording management zone RMZ (reserved area 273) is equal to or smaller than a physical sector block (15×64 KB), the setting of the recording management zone RMZ (U-RMZ) in the bordered area BRDA can be provided. The size of the recording management zone RMZ in the bordered area BRDA at the time of setting (U-RMZ) is defined as the size (128×64 KB) of 128 physical segment blocks, and this size is defined as an R zone used exclusively for the recording management zone RMZ.

In the write-once type information storage medium according to the present embodiment, it becomes possible to set the above-described three types of recording management zones RMZ, and thus, the presence of a very large number of recording management zones RMZ is allowed on one write-once type information recording/storage medium. Therefore, in the present embodiment, for the purpose of facilitating a search for the latest recording position management data RMD recording location, the following processing operations are made:

1) In the case of newly setting a recording management zone RMZ, the latest recording position management data RMD is overwritten in the recording management zone RMZ that has been used up to now so as not to allow an unrecorded area to exist in the recording management zone RMZ that has been used up to now. In this manner, it becomes possible to identify whether a recording management zone is currently used or is set in a new location.

2) Every time a recording management zone RMZ is newly set, copy information 48 on the latest recording position management data RMD is recorded in an RMD duplication zone RMZ. In this manner, a search is easily made for the currently used recording management zone RMZ location.

The presence of a large number of unrecorded areas is allowed in the write-once type information storage medium according to the present embodiment. However, in a reproduction only apparatus, a DPD (Differential Phase Detection) technique is used for track shift detection, thus disabling tracking in an unrecorded area. Therefore, before reproducing the above described write-once type information storage medium by the reproduction only apparatus, there is a need for carrying out a border close processing operation so that an unrecorded area does not exist.

A detailed description will be given with respect to the pattern contents of a reference code recorded in the reference code recording zone RCZ. In a current DVD standard, an "8/16 modulation" system for converting 8-bit data to 16-channel bits is employed as a modulation system. As a pattern of a reference code serving as a channel bit pattern recorded in an information storage medium after modulated, there is employed a repetition pattern "001000001000000100100000010000001". In comparison with this pattern, in the present embodiment, ETM modulation for modulating 8-bit data into 12-channel bits is used, providing an RLL (1, 10) run length restriction. In addition, the PRML technique is employed for signal reproduction from the data lead-in area DTLDI, data area DTA, data lead-out area DTLDO, and middle area MDA. Therefore, there is a need for setting the above described modulation rule and a pattern of a reference code optimal for PRML detection. In accordance with the RLL (1, 10) run length restriction, a minimum value of continuous "0" settings is "d=1", and is a repetition pattern of "10101010". Assuming that a distance from a code "0" to the next adjacent code is "T", a distance relevant to the adjacent "1" in the above pattern is obtained as "2T". In the present embodiment, in order to achieve high density of an information storage medium, as described previously, a reproduction signal from the repetition pattern ("10101010") of "2T" recorded on the information storage medium is close to a shutdown frequency of MTF (Modulation Transfer Function) characteristics of an objective lens in an optical head (exists in the information recording/reproducing unit 141 shown in FIG. 8); and thus, a degree of modulation (signal amplitude) is hardly obtained. Therefore, in the case where a reproduction signal from a repetition pattern ("10101010") of "2T" has been used as a reproduction signal used for circuit tuning of the information reproducing apparatus or the information recording/reproducing apparatus (for example, initialing and optimizing tap coefficients), noise effect is significant, and stabilization is poor. Therefore, with respect to a signal after modulated in accordance with RLL (1, 10) run length restriction, then, it is desirable to carry out circuit tuning by using a pattern of "3T" having high density.

In the case where a digital sum value (DSV) of the reproduction signal is considered, an absolute value of a DC (direct current) value increases in proportion to the number of continuous "0"s between "1" and next "1" that immediately follows it, and the increased value is added to the immediately preceding DSV value. The polarity of this added DC value is inverted every time "1" is reached. Therefore, as a method for setting the DSV value to "0" where a channel bit pattern having continuous reference code is followed, the DSV value is set to be "0" in 12 channel bit patterns after ETM-modulated, whereby the degree of freedom in reference code pattern design is increased more significantly by setting to an odd number the number of generated "1" appearing in 12 channel bit patterns after ETM-modulated; offsetting a DC component generated in one set of reference code cells consisting of a next set. Therefore, in the present embodiment, the number of "1" appearing in the reference code cells consisting of 12 channel bit patterns after ETM-modulated is set to an odd number.

In the present embodiment, in order to achieve high density, there is employed a mark edge recording technique in which a location of "1" coincides with a boundary position of a recording mark or an emboss pit. For example, in the case where a repetition pattern of "3T" ("100100100100100100100") is followed, there occurs a case in which a length of a recording mark or an emboss pit and a length of a space between the mark and pit are slightly different from each other depending on a recording condition or an original master producing condition. In the case where the PRML detecting technique has been employed, a level value of a reproduction signal becomes very important. As described previously, even in the case where the length of the recording mark or emboss pit and the length of the space between the mark and pit are different from each other, there occurs a necessity of correcting such slightly different component in a circuit manner so as to enable signal detection stably and precisely. Therefore, a reference code for tuning a circuit constant has a space with a length of "3T", like a recording mark or an emboss pit with a length of "3T", thereby improving the precision of tuning a circuit constant. Thus, if a pattern of "1001001" is included as a reference code pattern according to the present embodiment, the recording mark or emboss pit having the length "3T"; and a space are always arranged.

In addition, circuit tuning also requires a pattern in a non-dense state as well as a pattern ("1001001") having a high density. Therefore, in consideration of that fact that a non-dense state (pattern in which "0" is continuously and frequently generated) is generated at a portion at which a pattern of "1001001" has been excluded from among 12 channel bit patterns after ETM-modulated and the number of generated "1"s is set in an odd number, with respect to a reference code pattern, a repetition of "100100100000" is obtained as an optical condition, as shown in FIGS. 24A, 24B, 24C, and 24D. In order to ensure that the channel bit pattern after modulated is produced as the pattern, although not shown, there is a need for setting to "A4h" a data word before modulated, when utilizing a modulation table specified in an H format. This data on "A4h" (hexadecimal notation) corresponds to a data symbol "164" (decimal notation).

A description will be given below with respect to how to produce specific data in accordance with the above data conversion rule. First, data symbol "164" (="0A4h") is set to main data "D0 to D2047" in the data frame structure described previously. Next, a data frame 1 to a data frame 15 are pre-scrambled in advance by an initial preset number "0Eh", and a data frame 16 to a data frame 31 are pre-scrambled in advance by an initial preset number "0Fh". If pre-scrambling is applied in advance, when scrambling is applied in the data conversion rule described previously, scrambling is applied in duplicate, and a data symbol "164" (="0A4h") appears as it is (when scrambling is applied in duplicate, an original pattern is returned). When pre-scrambling is applied to all of the reference codes, each of which is formed of 32 physical sectors, DSV control cannot be made, and thus, pre-scrambling cannot be applied to only data frame 0 in advance. After the foregoing scrambling has been applied, if modulation is carried out, a pattern shown in FIGS. 24A, 24B, 24C, and 24D is recorded on the information storage medium.

In the invention, address information in a recording type (rewritable-type or write-once) information storage medium is recorded in advance by using wobble modulation. The present embodiment is featured in that phase modulation of ±90 degrees (180 degrees) is used as a wobble modulation system, and NRZ (Non Return to Zero) method is employed, recording address information in advance with respect to an information storage medium. A specific description will be given with reference to FIG. 21. In the present embodiment, with respect to address information, the 1-address bit (referred to as an address symbol) area 511 is expressed by a four-wobble cycle, and a frequency and an amplitude/a phase are matched everywhere in the 1-address bit area 511. In the case where the same values of address bits are continued, the same phase continuously lasts at the boundary section of the 1-address bit areas 511 (at a portion indicated by "triangular mark" shown in FIG. 21). In the case where an address bit is inverted, wobble pattern inversion (180-degree shift of phase) occurs.

In the wobble signal detector unit 135 of the information recording/reproducing apparatus shown in FIG. 8, a boundary position of the above address bit area 511 (location indicated by "triangular mark" shown in FIG. 21) and a slot position 412 which is a boundary position of a 1-wobble cycle are detected at the same time. Although not shown in the wobble signal detector unit 135, a PLL (Phase Lock Loop) circuit is incorporated, and PLL is applied in synchronism with both of the boundary position of the above address bit area 511 and the slot position 412. If the boundary position of this address bit area 511 or the slot position 412 is shifted, the wobble signal detector unit 135 is out of synchronization, disabling precise wobble signal reproduction (reading). A gap between the adjacent slot positions 412 is referred to as a slot gap 513. As this slot gap 513 is physically closer, synchronization with a PLL circuit can be easily obtained, enabling stable wobble signal reproduction (reading of contained information).

Figure 21:
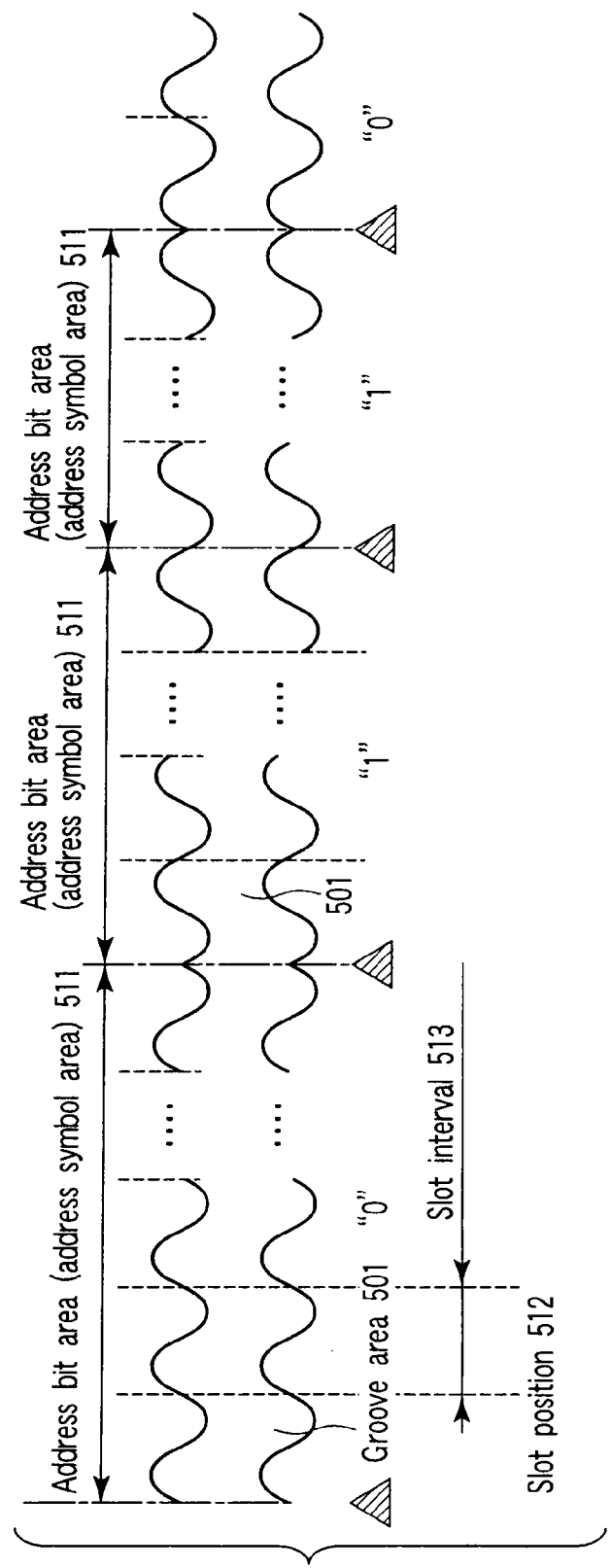
FIG. 21 is an exemplary view illustrating 180 degree phase modulation and an NRZ technique in wobble modulation.

As is evident from FIG. 21, this slot gap 513 coincides with a 1-wobble cycle if the phase modulation method of 180° is used in which the phase is shifted by 0° or 180°. As a wobble modulating method, although an AM (Amplitude Modulation) system for changing a wobble amplitude is easily affected by dust or scratch adhering to the information storage medium surface, the above phase modulation is hardly comparatively affected by dust or scratch adhering to the information storage medium surface because a change of a phase is detected instead of a signal amplitude in the above phase modulation. As another modulation system, in an FSK (Frequency Shift Keying) system for changing a frequency, a slot gap 513 is long with respect to a wobble cycle, and synchronization of a PLL circuit is relatively hardly obtained. Therefore, as in the present embodiment, when address information is recorded by wobble phase modulation, there is attained advantageous effect that a slot gap is narrow, and wobble signal synchronization is easily obtained.

Figure 22:
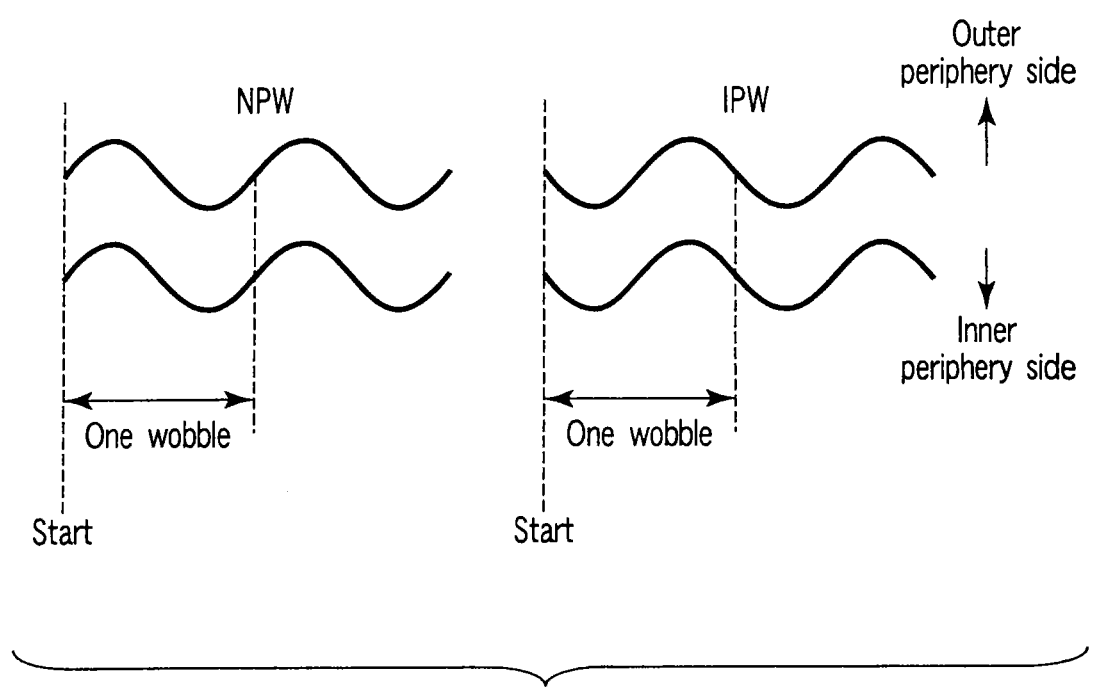
FIG. 22 is an exemplary view illustrating a relationship between a wobble shape and an address bit in an address bit area.

As shown in FIG. 21, although binary data "1" or "0" is assigned to the 1-address bit area 511, a method for allocating bits in the present embodiment is shown in FIG. 22. As shown on the left side of FIG. 22, a wobble pattern, which first wobbles from the start position of one wobble to the outer periphery side, is referred to as an NPW (Normal Phase Wobble), and data "0" is arranged. As shown at the right side, a wobble pattern which first wobbles from the start position of one wobble to the inner periphery side is referred to as an IPW (Invert Phase Wobble), and data "1" is arranged.

As shown in FIGS. 7B and 7C, the width Wg of the pre-groove region 11 is larger than the width W1 of the land region 12. Thus, a problem occurs in which the detection signal level of the wobble detection signal is lowered and the C/N ratio is lowered. Contrary to the prior art, a non-modulated area is wider than a modulated area so that the stability for detecting a wobble signal is improved.

Figure 30:
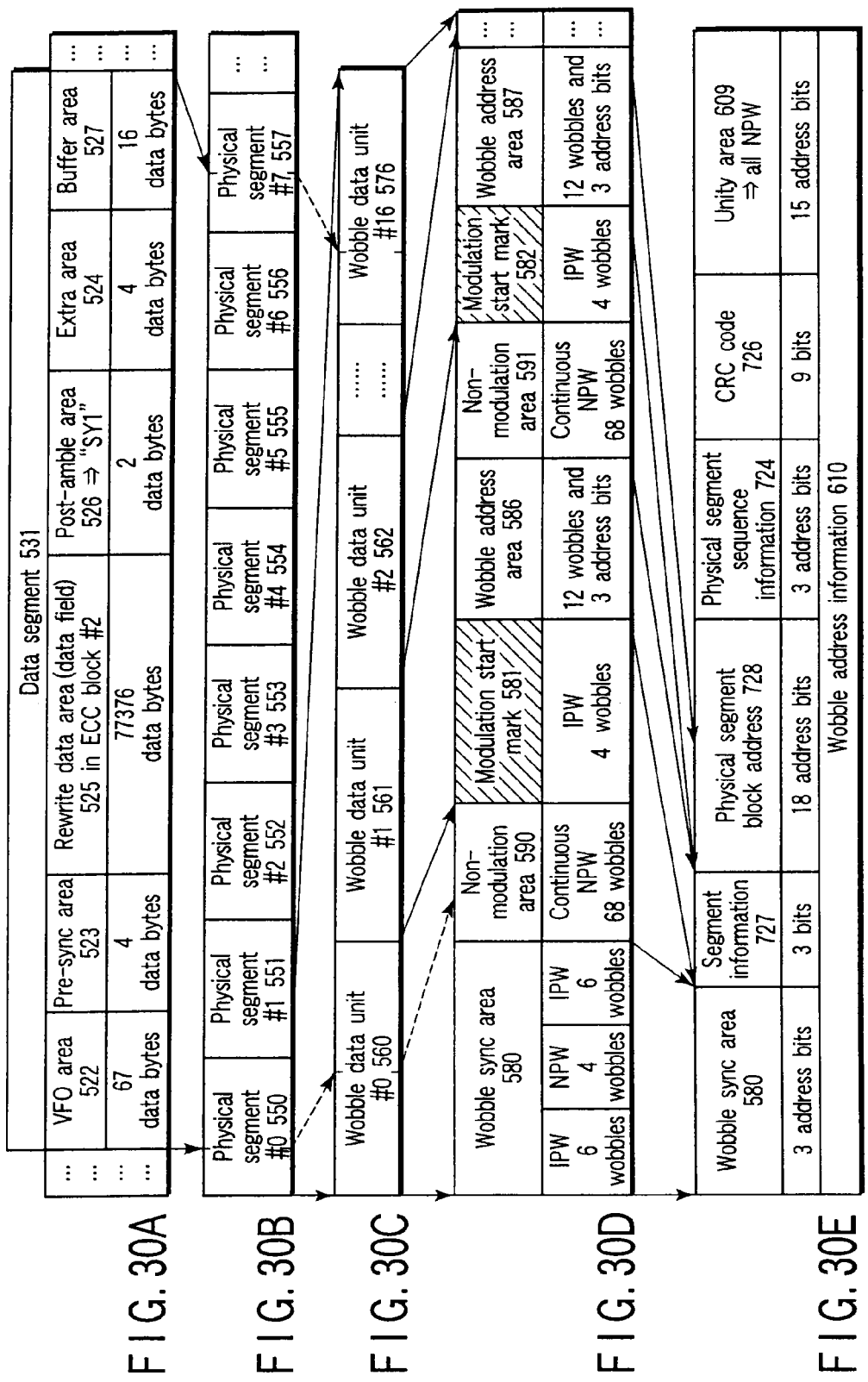
FIGS. 30A, 30B, 30C, 30D and 30E are exemplary views each illustrating a wobble address format in a write-once type information storage medium.

A description will be given with respect to a wobble address format in an H format of the embodiment with reference to FIGS. 30A to 106E. As shown in FIG. 30B, a physical segment block includes seven physical segments 550-556. As shown in FIG. 30C, each of the physical segments 550-556 includes seventeen wobble data units 560-576. Each of the wobble data units 560-576 includes a modulation area which includes one of a wobble sync area 580, modulation start marks 581, 582, wobble address areas 586, 587 and non-modulation areas 590, 591 which include continuous NPWs. FIGS. 23A to 23D show a ratio of the non-modulation area and the modulation area of each wobble data unit. In each of FIGS. 23A to 23D, the modulation area 598 includes 16 wobbles and the non-modulation area 593 includes 68 wobbles. According to the embodiment, the non-modulation area 593 is wider than the modulation area 598. Since the non-modulation area 593 is wide, it is possible to stably synchronize the wobble detection signal, write clock, or reproduction clock by the PLL circuit using the signal from the non-modulation area 593. In order to perform a stable synchronization, it is desirable set the width of the non-modulation area 593 at least double of that of the modulation area 598.

A description will be given with respect to an address information recording format using wobble modulation in an H format of a write-once type information storage medium according to the invention. An address information setting method using wobble modulation in the present embodiment is featured in that "allocation is carried out in units of the sync frame length 433". One sector is composed of 26 sync frames, and, one ECC block is formed of 32 physical sectors. Thus, one ECC block is composed of 32 physical sectors and is composed of 832 (=26×327) sync frames.

Wobble data is divided into 17 WDU (Wobble Data Units), respectively, on a physical segment by segment basis. From the above formula, it is evident that seven sync frames are arranged to a length of one wobble data unit, respectively. Thus, a physical segment is composed of 17 wobble data units, and seven physical segment lengths are adjusted to conform to a data segment length, thereby making it easy to allocate a sync frame boundary and detect a sync code in a range encompassing guard areas 442 to 468.

Each of the wobble data units #0 560 to #11 571 is composed of: a modulation area 598 for 16 wobbles; and non-modulation areas 592 and 593 for 68 wobbles, as shown in FIGS. 23A to 23D. The present embodiment is featured in that an occupying ratio of the non-modulation areas 592 and 593 with respect to a modulation area is significantly large. In the non-modulation areas 592 and 593, a group area or a land area always wobbles at a predetermined frequency, and thus, a PLL (Phase Locked Loop) is applied by utilizing the non-modulation areas 592 and 593, making it possible to stably sample (generate) a reference clock when reproducing a recording mark recorded in the information storage medium or a recording reference clock used at the time of new recording. Thus, in the present embodiment, an occupying ratio of the non-modulation areas 592 and 593 with respect to a modulation area 598 is significantly increased, thereby making it possible to remarkably improve the precision of sampling (generating) a recording reference clock and remarkably improving the stability of the sampling (generation). That is, in the case where phase modulation in wobbles has been carried out, if a reproduction signal is passed through a band path filter for the purpose of waveform shaping, there appears a phenomenon that a detection signal waveform amplitude after shaped is reduced before and after a phase change position. Therefore, there is a problem that, when the frequency of a phase change point due to phase modulation increases, a waveform amplitude change increases, and the above clock sampling precision drops; and, conversely, if the frequency of a phase change point in a modulation area is low, a bit shift at the time of wobble address information detection is likely to occur. Thus, in the present embodiment, there is attained advantageous effect that a modulation area and a non-modulation area due to phase modulation configured, and an occupying ratio of the non-modulation area is increased, thereby improving the above clock sampling precision.

In the present embodiment, a position of switching the modulation area and the non-modulation area can be predicted in advance. Thus, a reproduction signal is gated to obtain a signal from the non-modulation area, making it possible to carry out the above clock sampling from that detection signal. In addition, in the case where the recording layer 3-2 is composed of an organic dye recording material using a principle of recording according to the present embodiment, a wobble signal is comparatively hardly taken in the case of using the pre-groove shape/dimensions described in "3-2-D] Basic characteristics relevant to pre-groove shape/dimensions in the present embodiment" in "3-2) Description of basic characteristics common to organic dye film in the present embodiment". In consideration of this situation, the reliability of wobble signal detection is improved by significantly increasing an occupying ratio of the non-modulation areas 590 and 591 with respect to a modulation area, as described above.

At the boundary between the non-modulation areas 592 and 593 and the modulation area 598, an IPW area is set as a modulation start mark of the modulation area 598 by using four wobbles or six wobbles. At a wobble data section shown in FIGS. 23C and 23D, allocation is carried out so that wobble address areas (address bits #2 to #0) wobble-modulated immediately after detecting the IPW area which is this modulation start mark. FIGS. 23A and 23B each show the contents in a wobble data unit #0 560 which corresponds to a wobble sync area 580 shown in FIG. 24C described later; and FIGS. 23C and 23D each show the contents in a wobble data unit which corresponds to a wobble data section from segment information 727 to a CRC code 726 shown in FIG. 24C. FIGS. 23A and 71C each show a wobble data unit which corresponds to a primary position 701 in a modulation area described later; and FIGS. 23B and 23D each show a wobble data unit which corresponds to a secondary position 702 in a modulation area. As shown in FIGS. 23A and 23B, in a wobble sync area 580, six wobbles are allocated to the IPW area, and four wobbles are allocated to an NPW area surrounded by the IPW area. As shown in FIGS. 23C and 23D, four wobbles are allocated to a respective one of the IPW area and all of the address bit areas #2 to #0 in the wobble data section.

FIGS. 24A to 24D shows an embodiment relating to a data structure in wobble address information in a write-once type information storage medium. For the sake of comparison, FIG. 24A shows a data structure in wobble address information of a rewritable-type information storage medium. FIGS. 24A and 24C show two embodiments relating to a data structure in wobble address information in the write-once type information storage medium.

In a wobble address area 610, three address bits are set by 12 wobbles (referring to FIG. 21). Namely, one address bit is composed of four continuous wobbles. Thus, the present embodiment employs a structure in which address information is arranged to be distributed on three by three address bit basis. When the wobble address information 610 is intensively recorded at one site in an information storage medium, it becomes difficult to detect all information when dust or scratch adheres to the medium surface. As in the present embodiment, there is attained advantageous effect that: wobble address information 610 is arranged to be distributed on a three by three address bit (12 wobbles) basis included in one of the wobble data units 560 to 576; and a set of information is recorded on an integer multiple by multiple address bit basis of three address bits, enabling information detection of another item of information even in the case where it is difficult to detect information in one site due to dust or scratch.

As described above, the wobble address information 610 is arranged to be distributed, and the wobble address information 610 is completely arranged on a one by one physical segment basis, thereby making it possible to identify address information on a physical segment by segment basis, and thus, identify a current position in physical segment units every time an information recording/reproducing apparatus provides an access.

In the present embodiment, an NRZ technique is employed as shown in FIG. 21, and thus, a phase does not change in four continuous wobbles in the wobble address area 610. A wobble sync area 580 is set by utilizing this characteristic. That is, a wobble pattern which is hardly generated in the wobble address information 610 is set with respect to the wobble sync area 580, thereby facilitating allocation position identification of the wobble sync area 580. The present embodiment is featured in that, with respect to wobble address areas 586 and 587 in which one address bit is composed of four continuous wobbles, one address bit length is set at a length other than four wobbles at a position of the wobble sync area 580. That is, in the wobble sync area 580, as shown in FIGS. 23A and 23B, an area (IPW area) in which a wobble bit is set to "1" is set as a wobble pattern change which does not occur in the wobble data section as shown in FIGS. 23C and 23D such as "six wobbles→four wobbles→six wobbles". When a method for changing a wobble cycle as described above is utilized as a specific method for setting a wobble pattern which can be hardly generated in the wobble data section with respect to the wobble sync area 580, the following advantageous effects can be attained:

1) Wobble detection (wobble signal judgment) can be stably continued without distorting PLL relating to the slot position 512 (FIG. 21) of a wobble which is carried out in the wobble signal detector unit 135 shown in FIG. 8; and 2) A wobble sync area 580 and modulation start marks 561 and 562 can be easily detected due to a shift of an address bit boundary position generated in the wobble signal detector unit 135 shown in FIG. 8.

As shown in FIGS. 23A to 23D, the present embodiment is featured in that the wobble sync area 580 is formed in 12 wobble cycles, and a length of the wobble sync area 580 is made coincident with three address bit lengths. In this manner, all the modulation areas (for 16 wobbles) in one wobble data unit #0 560 are arranged to the wobble sync area 580, thereby improving detection easiness of the start position of wobble address information 610 (allocation position of wobble sync area 580). This wobble sync area 580 is arranged in the first wobble data unit in a physical segment. Thus, there is attained advantageous effect that the wobble sync area 580 is arranged to the start position in a physical segment, whereby a boundary position of the physical segment can be easily sampled merely by detecting a position of the wobble sync area 580.

As shown in FIGS. 23C and 23D, in wobble data units #1 561 to #11 571, the IPW area (refer to FIG. 22) is arranged as a modulation start mark at the start position, the area preceding address bits #2 to #0. The waveform of NPW is continuously formed in the non-modulation areas 592 and 593 arranged at the preceding position. Thus, the wobble signal detector unit 135 shown in FIG. 8 detects a turning point from NPW to IPW is detected, and samples the position of the modulation start mark.

As a reference, the contents of wobble address information 610 contained in a rewritable-type information storage medium shown in FIG. 24A are as follows:

1) Physical Segment Address 601
Information indicating a physical segment number in a track (within one cycle in an information storage medium 221);

2) Zone Address 602
This address indicates a zone number in the information storage medium 221; and 3) Parity Information 605
This information is set for error detection at the time of reproduction from the wobble address information 610; 14 address bits from reserved information 604 to the zone address 602 are individually added in units of address bits; and a display as to whether or not a result of the addition is an even number or an odd number is made. A value of the parity information 605 is set so that a result obtained by taking exclusive OR in units of address bits becomes "1" with respect to a total of 15 address bits including one address bit of this address parity information 605.

4) Unity Area 608
As described previously, each wobble data unit is set so as to be composed of a modulation area 598 for 16 wobbles and non-modulation areas 592 and 593 for 68 wobbles, and an occupying ratio of the non-modulation areas 592 and 593 with respect to the modulation area 598 is significantly increased. Further, the precision and stability of sampling (generation) of a reproducing reference clock or a recording reference clock is improved more remarkably by increasing the occupying ratio of the non-modulation areas 592 and 593. The NPW area is fully continuous in a unity area 608, and is obtained as a non-modulation area having its uniform phase.

FIG. 24A shows the number of address bits arranged to each item of the above described information. As described above, the wobble address information 610 is divided on a three by three address bits, and the divided items of the information are arranged to be distributed in each wobble data unit. Even if a burst error occurs due to the dust or scratch adhering to a surface of an information storage medium, there is a very low probability that such an error propagates across the wobble data units which are different from each other. Therefore, a contrivance is made so as to reduce to the minimum the count encompassing the different wobble data units as locations in which the same information is recorded and to match the turning point of each items of information with a boundary position of a wobble data unit. In this manner, even if a burst error occurs due to the dust or scratch adhering to a surface of an information storage medium, and then, specific information cannot be read, the reliability of reproducing of wobble address information is improved by enabling reading of another item of information recorded in another one of the wobble data units.

As shown in FIGS. 24A to 24D, the present embodiment is featured in that the unity areas 608 and 609 are arranged at the end in the wobble address information 610. As described above, in the unity areas 608 and 609, a wobble waveform is formed in the shape of NPW, and thus, the NPW continuously lasts in substantially three continuous wobble data units. There is attained advantageous effect that the wobble signal detector unit 135 shown in FIG. 8 makes a search for a location in which NPW continuously lasts in a length for three wobble data units 576 by utilizing this feature, thereby making it possible to easily sample a position of the unity area 608 arranged at the end of the wobble address information 610, and to detect the start position of the wobble address information 610 by utilizing the positional information.

From among a variety of address information shown in FIG. 24A, a physical segment address 601 and a zone address 602 indicate the same values between the adjacent tracks, whereas a value changes between the adjacent tracks in a groove track address 606 and a land track address 607. Therefore, an indefinite bit area 504 appears in an area in which the groove track address 606 and the land track address 607 are recorded. In order to reduce a frequency of this indefinite bit, in the present embodiment, an address (number) is displayed by using a gray code with respect to the groove track address 606 and the land track address 607. The gray code denotes a code in the case where a code after converted when an original value changes by "1" only changes by "one bit" anywhere. In this manner, the indefinite bit frequency is reduced, making it possible to detect and stabilize a reproduction signal from a recording mark as well as a wobble detecting signal.

As shown in FIGS. 24B and 24C, in a write-once type information storage medium as well, as in the rewritable-type information storage medium, a wobble sync area 580 is arranged at the start position of a physical segment, thereby making it easy to detect the start position of the physical segment or a boundary position between the adjacent segments. Type identification information 721 on the physical segment shown in FIG. 24B indicates an allocation position in the physical segment as in the wobble sync pattern contained in the above described wobble sync area 580, thereby making it possible to predict in advance an allocation location of another modulation area 598 in the same physical segment and to prepare for next modulation area detection. Thus, there is attained advantageous effect that the precision of signal detection (judgment) in a modulation area can be improved. Specifically, When type identification information 721 on a physical segment is set to "0", it denotes that all the items of information in the physical segment shown in FIG. 26B are arranged at a primary position or that a primary position and a secondary position shown in FIG. 26D are mixed; and When type identification information 721 of a physical segment is set to "1", all items of information in a physical segment are arranged at a secondary position, as shown in FIG. 26C.

According to another embodiment relevant to the above described embodiment, it is possible to indicate an allocation location of a modulation area in a physical segment by using a combination between a wobble sync pattern and type identification information 721 on a physical segment. By using the combination of the two types of information described previously, three or more types of allocation patterns of modulation areas shown in FIGS. 26B to 26D can be expressed, making it possible to provide a plurality of allocation patterns of the modulation areas. While the above described embodiment shows an allocation location of a modulation area in a physical segment which includes a wobble sync area 580 and type identification information 721 on a physical segment, the invention is not limited thereto. For example, as another embodiment, the wobble sync area 580 and the type identification information 721 on the physical segment may indicate an allocation location of a modulation area in a next physical segment. By doing this, in the case where tracking is carried out continuously along a groove area, there is attained advantageous effect that the allocation location of the modulation area in the next physical segment can be identified in advance, and a long preparation time for detecting a modulation area can be taken.

Layer number information 722 in a write-once type information storage medium shown in FIG. 24B indicates either of the recording layers from among a single-sided single-layer or a single-sided double-layer. This information denotes:

"L0 later" in the case of a single-sided single-layer medium or a single-sided double-layer medium when "0" is set (a front layer at the laser light beam incident side); and "L1 layer" of a single-sided double-layer when "1" is set (a rear layer in viewed from the laser light beam incident side).

Physical segment sequence information 724 indicates an allocation sequence of relative physical segments in the same physical segment block. As is evident as compared with FIG. 24A, the start position of the physical segment sequence information 724 contained in wobble address information 610 coincides with that of a physical segment address 601 contained in a rewritable-type information storage medium. The physical segment sequence information position is adjusted to conform with the rewritable-type medium, thereby making it possible to improve compatibility between medium types and to share or simplify an address detection control program using a wobble signal in an information recording/reproducing apparatus in which both of a rewritable-type information storage medium and a write-once type information storage medium can be used.

A data segment address 725 shown in FIG. 24B describes address information on a data segment in numbers. As has already been described, in the present embodiment, one ECC block is composed of 32 sectors. Therefore, the least significant five bits of a physical sector number of a sector arranged at the beginning in a specific ECC block coincides with that of a sector arranged at the start position in the adjacent ECC block. In the case where a physical sector number has beet set so that the least significant five bits of the physical sector number of a sector arranged in an ECC block are "00000", the values of the least significant six bits or more of the physical sector numbers of all the sectors which exist in the same ECC block coincide with each other. Therefore, the least significant five bit data of the physical sector number of the sectors which exist in the same ECC block is eliminated, and address information obtained by sampling only the least significant six bits or more is defined as an ECC block address (or ECC block address number). A data segment address 725 (or physical segment block number information) recorded in advance by wobble modulation coincides with the above ECC block address. Thus, when positional information on a physical segment block due to wobble modulation is indicated by a data segment address, there is advantageous effect that a data amount decreases on five by five bit basis as compared with when the address is displayed by a physical sector number, simplifying current position detection at the time of an access.

A CRC code 726 shown in FIGS. 24B and 24C is a CRC code (error correction code) arranged to 24 address bits from physical segment type identification information 721 to the data segment address 725 or a CRC code arranged to 24 address bits from segment information 727 to the physical segment sequence information 724. Even if a wobble modulation signal is partially mistakenly read, this signal can be partially corrected by this CRC code 726.

In a write-once type information storage medium, an area corresponding to 15 address bits is arranged to the unity area 609, and an NPW area is fully arranged in five wobble data units 12 to 16 (the modulation area 598 does not exist).

A physical segment block address 728 shown in FIG. 24C is an address set for each physical segment block which configure one unit from seven physical segments, and a physical segment block address relevant to the first segment block in the data lead-in area DTRDI is set to "1358h". The values of the physical segment block addresses are sequentially added one by one from the first physical segment block contained in the data lead-in area DTLDI to the last physical segment block contained in the data lead-out area DTLDO, including the data area DTA.

The physical segment sequence information 724 denotes the sequence of each of the physical segments in one physical segment block, and "0" is set to the first physical segment, and "6" is set to the last physical segment.

The embodiment shown in FIG. 24C is featured in that the physical segment block address 728 is arranged at a position which precedes the physical segment sequence information 724. For example, as in the RMD field 1, address information is often managed by this physical segment block address. In the case where an access is provided to a predetermined segment block address in accordance with these items of management information, first, the wobble signal detector unit 135 shown in FIG. 8 detects a location of the wobble sync area 580 shown in FIG. 24C, and then, sequentially decodes items of information recorded immediately after the wobble sync area 580. In the case where a physical segment block address exists at a position which precedes the physical segment sequence information 724, first, the physical segment block address is decoded, and it is possible to judge whether or not a predetermined physical segment block address exists without decoding the physical segment sequence information 724. Thus, there is advantageous effect that access capability using a wobble address is improved.

The segment information 727 is composed of type identification information 721 and a reserved area 723. The type identification information 721 denotes an allocation location of a modulation area in a physical segment. In the case where the value of this type identification information 721 is set to "0b", it denotes a state shown in FIG. 26B described layer. In the case where the information is set to "1b", it denotes a state shown in FIG. 26C or FIG. 26D described later.

The present embodiment is featured in that type information identification 721 is arranged immediately after the wobble sync area 580 in FIG. 24C. As described above, first, the wobble signal detector unit 135 shown in FIG. 8 detects a location of the wobble sync area 580 shown in FIG. 24C, and then, sequentially decodes the items of information recorded immediately after the wobble sync area 580. Therefore, the type identification information 721 is arranged immediately after the wobble sync area 580, thereby enabling an allocation location check of a modulation area in a physical segment immediately. Thus, high speed access processing using a wobble address can be achieved.

In the present embodiment, an H format is used, and thus, the predetermined value of the wobble signal is set to 697 kHz.

Now, a description will be given with respect to an example of measurement of a maximum value (Cwmax) and a minimum value (Cwmin) of a carrier level of a wobble detection signal.

In the write-once type storage medium according to the present embodiment, a CLV (Constant Linear Velocity) recording system is used, and thus, a wobble phase between the adjacent tracks changes depending on a track position. In the case where the wobble phases between the adjacent tracks coincide with each other, the carrier level of the wobble detection signal is maximized, and is obtained as the maximum value (Cwmax). In addition, when the wobble phase between the adjacent tracks is inverted, the wobble detection signal level is minimized due to the crosstalk of the adjacent tracks, and is obtained as the minimum value (Cwmin). Therefore, in the case where tracing is carried out along a track from its inner periphery to its outer periphery, the size of a carrier of a wobble detection signal to be detected fluctuates in a 4-track cycle.

In the present embodiment, a wobble carrier signal is detected on a 4×4 track basis, and the maximum value (Cwmax) and the minimum value (Cwmin) are measured on a 4×4 track basis. Then, at #03, 30 pairs or more of the maximum value (Cwmax) and the minimum value (Cwmin) are stored.

Next, utilizing the formula below, at #04, the maximum amplitude (Wppmax) and the minimum amplitude (Wppmin) are calculated from an average value of the maximum value (Cwmax) and the minimum value (Cwmin).

In the formula below, R represents a terminated resistance value of the spectrum analyzer. Now, a description will be given with respect to a formula for converting Wppmax and Wppmin from the values of Cwmax and Cwmin.

In a dBm unit system, 0 dBm=1 mW is defined as a reference. When power Wa=1 mW, a voltage amplitude Vo is obtained as follows:

$$Wao = Ivo = Vo \times Vo/R = 1/1000 \text{ W}.$$

Therefore, $Vo=(R/1000)^{1/2}$ is obtained.

Next, a relationship between a wobble amplitude Wpp [V] and a carrier level Cw [dMb] monitored by the spectrum analyzer is as follows. Here, Wpp denotes a sine wave, and thus, when an amplitude is converted to an actually effective value, it follows:

$$Wpp\text{-}rms = Wpp/(2 \times 2^{1/2})$$

$$Cw = 20 \times \log(Wpp\text{-}rms/Wo)[\text{dBm}]$$

Therefore, $Cw=10\times\log(Wpp\text{-}rms/Vo)^2$ is established.
When the log of the above formula is converted, it follows:

$$(Wpp - \text{rms}/Vo)^2 = 10^{(Cw/10)} \quad (61)$$
$$= \{[Wpp/(2 \times 2^{1/2})]/Vo\}^2$$
$$= \{Wpp/(2 \times 2^2)/(R/1000)^{1/2}\}^2$$
$$= (Wpp^2/8/(R/1000)$$

$$WPP2^2 = (8 \times R)/(1000 \times 10^{(Cw/10)})$$
$$= 8 \times R \times 10^{(-3)} \times 10^{(Cw/10)}$$
$$= 8 \times R \times 10^{(Cw/10)(-3)}$$

$$Wpp = \{8 \times R \times 10(Cw/10^{(-3)})\}^{1/2}$$

As described above, the present embodiment attains the following advantageous effects:

1) A ratio of a minimum value (Wppmin) of an amplitude of a wobble detection signal with respect to (I1−I2)pp that is a track shift detection signal is set to 0.1 or more, whereby a sufficiently large wobble detection signal is obtained as compared with a dynamic range of the track shift detection signal. As a result, the detection precision of the wobble detection signal can be taken significantly.

2) A ratio between a maximum value (Wppmax) of an amplitude of a wobble detection signal and a minimum value (Wppmin) of an amplitude of a wobble detection signal is set to 2.3 or less, whereby a wobble signal can be stably detected without being greatly affected by a crosstalk of a wobble from the adjacent track.

3) A value of NBSNR of a result obtained by squaring a wobble detection signal is allocated to be equal to or greater than 26 dB, whereby a stable wobble signal having a high C/N ratio can be allocated, and the detection precision of the wobble signal can be improved.

In the write-once type information storage medium according to the present embodiment, a recording mark is formed on a groove area, and a CLV recording system is employed. In this case, as described previously, a wobble slot position is shifted between the adjacent tracks, and thus, interference between the adjacent wobbles is likely to occur with a wobble reproduction signal. In order to eliminate this effect, in the present embodiment, a contrivance is made to shift a modulation area so that modulation areas do not overlap each other between the adjacent tracks.

Specifically, as shown in FIG. 25, a primary position 701 and a secondary position 702 can be set as an allocation location of a modulation area. Basically, assuming that after only the primary positions 701 are allocated, there occurs a location in which modulation areas partially overlap between the adjacent tracks, the part of the primary positions 701 are changed to the secondary positions 702. For example, in FIG. 25, when a modulation area of a groove area 505 is set as the primary position, a modulation area of the adjacent groove area 502 and a modulation area of a groove area 506 partially overlap on each other. Thus, the modulation area of the groove area 505 is set to the secondary position. In this manner, there is attained advantageous effect that a wobble address can be stably reproduced by preventing the interference between the modulation areas of the adjacent tracks in a reproduction signal from a wobble address.

The specific primary position and secondary position relating to a modulation area is set by switching an allocation location in the same wobble data unit. In the present embodiment, an occupying ratio of a non-modulation area is set to be higher than that of a modulation area so that, the primary position and the secondary position can be switched merely by making a mere allocation change in the same wobble data unit. Specifically, in the primary position 701, as shown in FIGS. 23A and 23C, the modulation area 598 is arranged at the start position in one wobble data unit. In the secondary position 702, as shown in FIGS. 23B and 23D, the modulation area 598 is arranged at the latter half position in one of the wobble data units 560 to 571.

A coverage of the primary position 701 and the secondary position 702 shown in FIGS. 23A to 23D, i.e., a range in which the primary position or the secondary position continuously lasts is defined in the range of physical segments in the present embodiment. That is, as shown in FIGS. 26B to 26D, there are provided three types (plural types) of allocation patterns of modulation areas in the same physical segment. When the wobble signal detector unit 135 shown in FIG. 8 identifies an allocation pattern of a modulation area in a physical segment based on the information contained in the type identification information 721 on a physical segment, the allocation location of another modulation area 598 in the same physical segment can be predicted in advance. As a result, there is attained advantageous effect that preparation for detecting a next modulation area can be made, thus making it possible to improve the precision of signal detection (judgment).

FIG. 26B shows allocation of wobble data units in a physical segment, wherein the number described in each frame indicates wobble data unit numbers in the same physical segment. A 0-th wobble data unit is referred to as a sync field 711 as indicated at the first row. A wobble sync area exists in a modulation area in this sync field 711. First to eleventh wobble data units are referred to as an address field 712. Address information is recorded in a modulation area included in this address field 712. Further, in twelfth to sixteenth wobble data units, all of the wobble patterns are formed in an NPW unity field 713.

A mark "P" described in FIGS. 26B, 26C and 26D indicates that a modulation area is set to a primary position in a wobble data unit; and a mark "S" indicates that a modulation area is set to a secondary position in a wobble data unit. A mark "U" indicates that a wobble data unit is included in the unity field 713, and a modulation area does not exist. An allocation pattern of a modulation area shown in FIG. 26B indicates that all the areas in a physical segment are set to the primary position; and an allocation pattern of a modulation area shown in FIG. 26C indicates all areas in a physical segment are set to the secondary position. In FIG. 26D, the primary position and the secondary position are mixed in the same physical segment; a modulation area is set to the primary position in each of 0-th to fifth wobble data units, and a modulation area is set to the secondary position in each of sixth to eleventh wobble data units. As shown in FIG. 26D, the primary positions and the secondary positions are half divided with respect to an area obtained by adding the sync field 711 and the address field 712, thereby making it possible to finely prevent an overlap of modulation areas between the adjacent tracks.

Now, a description will be given with respect to a method for recording the data segment data described previously with respect to the physical segment or the physical segment block in which address information is recorded in advance by wobble modulation as described above. Data is recorded in recording cluster units serving as units of continuously recording data in both of a rewritable-type information storage medium and a write-once type information storage medium. Since a recording cluster which is a rewriting unit is formed of one or more data segments, it is possible to facilitate a mixing recording process with respect to the same information storage medium. PC data (PC files) of which a small amount of data is often rewritten many times and AV data (AV files) of which a large amount of data is continuously recorded one time. That is, with respect to data used for a personal computer, a comparatively small amount of data is often rewritten many times. Therefore, a recording method suitable for PC data is obtained by minimally setting data units of rewriting or additional writing. In the present embodiment, an ECC block is composed of 32 physical sectors. This, a minimum unit for efficiently carrying out rewriting or additional writing is obtained by carrying out rewriting or additional writing in data segment units including only one ECC block. Therefore, a structure in the present embodiment in which one or more data segments are included in a recording cluster which is a rewriting unit or an additional writing unit is obtained as a recording structure suitable for PC data (PC files). In AV (Audio Video) data, it is necessary to continuously record a very large amount of video image information and voice information smoothly without any problem. In this case, continuously recorded data is collectively recorded as one recording cluster. At the time of AV data recording, when a random shift amount, a structure in a data segment, or a data segment attribute and the like is switched on a data segment by segment basis configuring one recording cluster, a large amount of time is required for such a switching process, making it difficult to carry out a continuous recording process. In the present embodiment, it is possible to provide a recording format suitable for AV data recording for continuously recording a large amount of data by configuring a recording cluster while data segments in the same format (without changing an attribute or a ransom shift amount and without inserting specific information between data segments) are continuously arranged. In addition, a simplified structure in a recording cluster is achieved, and simplified recording control circuit and reproduction detector circuit are achieved, making it possible to reduce the price of an information recording/reproducing apparatus or an information reproducing apparatus. A data structure in recording cluster 540 in which data segments (excluding the extended guard field 528) in the recording cluster are continuously arranged is completely identical to those of the read-only information storage medium and the write-once type information storage medium. In this way, a common data structure is provided among all of the information storage mediums regardless of the read-only type, the write-once type, or the rewritable-type, thus allocating medium compatibility. In addition, a detector circuit of the information recording/reproducing apparatus or the information reproducing apparatus whose compatibility has been arranged can be used in common; high reliability of reproduction can be arranged; and price reduction can be achieved.

In the guard zone of a rewritable medium, post amble areas 546 and 536; extra areas 544 and 534; buffer areas 547 and 537; VFO areas 532 and 522; and pre-sync areas 533 and 523, and an extended guard field 528 is arranged only in the guard zone in location in which continuous recording terminates. The present embodiment is featured in that rewriting or additional writing is carried out so that the extended guard area 528 and the succeeding VFO area 522 partially overlap each other at a duplicate site 591 at the time of rewriting. By rewriting or additional writing while partial duplication is maintained, it is possible to prevent a gap (area in which no recording mark is formed) from being produced between the recording clusters. In addition, a stable reproduction signal can be detected by eliminating inter-layer cross talk in an information storage medium capable of carrying out recording in a single-sided double recording layer.

The data size which can be rewritten in one data segment in the present embodiment is 67+4+77376+2+4+16=77469 (data bytes). One wobble data unit 560 is 6+4+6+68=84 (wobbles). One physical segment 550 is composed of 17 wobble data units, and a length of seven physical segments 550 to 556 coincides with that of one data segment 531. Thus, 84×17×7=9996 (wobbles) are arranged in the length of one data segment 531. Therefore, from the above formula, 77496/9996=7.75 (data bytes/wobble) corresponds to one wobble.

An overlap portion of the succeeding VFO area 522 and the extended guard field 528 follows 24 wobbles from the start position of a physical segment, and the starting 16 wobbles of a physical segment 550 are arranged in a wobble sync area 580, and the subsequent 68 wobbles are arranged in a non-modulation area 590. Therefore, an overlap portion of the VFO area 522 which follows 24 wobbles and the extended guard field 528 is included in the non-modulation area 590. In this way, the start position of a data segment follows the 24 wobbles from the start position of a physical segment, whereby the overlap portion is included in the non-modulation area 590. In addition, a detection time and a preparation time for recording process of the wobble sync area 580 can be sufficiently taken, and thus, a stable and precise recording process can be guaranteed.

A phase change recording film is used as a recording film of the rewritable-type information storage medium in the present embodiment. In the phase change recording film, degradation of the recording film starts in the vicinity of the rewriting start/end position. Thus, if recording start/recording end at the same position is repeated, there occurs a restriction on the number of rewritings due to the degradation of the recording film. In the present embodiment, in order to alleviate the above described problem, at the time of rewriting, $J_{M+1}/12$ data bytes are shifted, and the recording start position is shifted at random.

Although the start position of the extended guard field 528 coincides with that of the VFO area 522 in order to explain a basic concept, strictly, the start position of the VFO area 522 is shifted at random in the present embodiment.

A phase change recording film is used as a recording film in a DVD-RAM disc which is a current rewritable-type information storage medium as well, the start/end positions of recording is shifted at random for the purpose of improving the rewriting count. The maximum shift amount range when random shifting has been carried out in the current DVD-RAM disc is set to 8 data bytes. A channel bit length (as data after modulated, to be recorded in a disc) in the current DVD-RAM disc is set to 0.143 μm on average. In the rewritable-type information storage medium according to the present embodiment, an average length of channel bits is obtained as $(0.087+0.093)/2=0.090$ (μm). In the case where a length of a physical shift range is adjusted to conform with the current DVD-RAM disc, by using the above value, the required minimal length serving as a random shift range in the present embodiment is obtained as:

8 bytes×(0.143 μm/0.090 μm)=12.7 bytes

In the present embodiment, in order to allocate easiness of a reproduction signal detecting process, the unit of random shift amount has been adjusted to conform to "channel bits" after modulated. In the present embodiment, ETM modulation (Eight to Twelve modulation) for converting 8 bits to 12 bits is used, and thus, formula expression which indicates a random shift amount is designated by $J_m/12$ (data bytes) while a data byte is defined as a reference. Using the value of the above formula, a value which can be taken by $J_m$ is 12.7× 12=152.4, and thus, $J_m$ ranges 0 to 152. For the above described reason, in the range meeting the above formula, a length of the random shift range coincides with the current DVD-RAM disc, and the rewriting count similar to the current DVD-RAM disc can be guaranteed. In the present embodiment, a margin is slightly provided with respect to the required minimal length in order to allocate the current or more rewriting count, and the length of the random shift range has been set to 14 (data bytes). From these formulas, 14×12=168 is established, and thus, a value which can be taken by $J_m$ has been set in the range of 0 to 167. As described above, the random shift amount is defined in a range which is wider than $J_m/12$ ($0 \leq J_m \leq 154$), whereby a length of a physical range relevant to the random shift amount coincides with that of the current DVD-RAM. Thus, there is attained advantageous effect that the repetition recording count similar to that of the current DVD-RAM can be guaranteed.

The lengths of the buffer area 547 and the VFO area 532 in the recording cluster 540 become constant. The random shift amount $J_m$ of all the data segments 529 is obtained as the same value everywhere in the same recording cluster 540. In the case of continuously recording one recording cluster 540 which includes a large amount of data segments, a recording position is monitored from a wobble. That is, a position of the wobble sync area 580 shown in FIGS. 24A to 24D is detected, and, in the non-modulation areas 592 and 593 shown in FIGS. 23C and 23D, the check of the recording position on the information storage medium is made at the same time as recording while the number of wobbles is counted. At this time, a wobble slip (recording at a position shifted by one wobble cycle) occurs due to mistaken wobble count or rotation non-uniformity of a rotary motor which rotates the information storage medium, and the recording position on the information storage medium is rarely shifted. The information storage medium according to the present embodiment is featured in that, in the case where a recording position shift generated as described above has been detected, adjustment is made in the rewritable-type guard area 461, and recording timing correction is carried out in the guard area 461. Now, an H format will be described here. This basic concept is employed in a B format, described later. Although important information for which bit missing or bit duplication cannot be allowed is recorded in a postamble area 546, an extra area 544, and a pre-sync area 533, a specific pattern is repeated in the buffer area 547 and the VFO area 532. Thus, as long as this repetition boundary position is arranged, missing or duplication of only one pattern is allowed. Therefore, in the present embodiment, in particular, adjustment is made in the buffer area 547 or the VFO area 532, and recording timing correction is carried out.

In the present embodiment, an actual start point position defined as a reference of position setting is set so as to match a position of wobble amplitude "0" (wobble center). However, the position detecting precision of a wobble is low, and thus, in the present embodiment, the actual start point position allows a shift amount up to a maximum of ±1 data byte", as "±1 max" is described.

The random shift amount in the data segment 530 is defined as $J_m$ (as described above, the random shift amounts of all the data segments 529 coincide with each other in the recording cluster 540); and the random shift amount of the data segment 531 to be additionally written is defined as $J_{m+1}$. As a value which can be taken by $J_m$ and $J_{m+1}$ shown in the above formula, for example, when an intermediate value is taken, $J_m=J_{m+1}=84$ is obtained. In the case where the positional precision of an actual start point is sufficiently high, the start position of the extended guard field 528 coincides with that of the VFO area 522.

In contrast, after the data segment 530 is recorded at the maximum back position, in the case where the data segment 531 to be additionally written or rewritten has then been recorded in the maximum front position, the start position of the VFO area 522 may enter a maximum 15 data bytes in the buffer area 537. Specific important information is recorded in the extra area 534 that immediately precedes the buffer area 537. Therefore, in the present embodiment, a length of the buffer area 537 requires 16 data bytes or more. In the embodiment, a data size of the buffer area 537 is set to 15 data bytes in consideration of a margin of one data byte.

As a result of a random shift, if a gap occurs between the extended guard area 528 and the VFO area 522, in the case where a single-sided double recording layer structure has been employed, there occurs an inter-layer crosstalk at the time of reproduction due to that gap. Thus, even if a random shift is carried out, a contrivance is made such that the extended guard field 528 and the VFO area 522 partially overlap each other, and a gap is not produced. Therefore, in the present embodiment, it is necessary to set the length of the extended guard field 528 to be equal to or greater than 15 data bytes. The succeeding VFO area 522 sufficiently takes 71 data bytes. Thus, even if an overlap area of the extended guard field 528 and the VFO area 522 slightly widens, there is no obstacle at the time of signal reproduction (because a time for obtaining synchronization of reproduction reference clocks is sufficiently arranged in the VFO area 522 which does not overlap). Therefore, it is possible to set the value of the extended guard field 528 to be greater than 15 data bytes. As has already been described, a wobble slip rarely occurs at the time of continuous recording, and a recording position may be shifted by one wobble cycle. One wobble cycle corresponds to 7.75 (≅8) data bytes, and thus, in the present embodiment, a length of the extended guard field 528 is set to equal to or greater than 23 (=15+8) data bytes. In the embodiment, like the buffer area 537, the length of the extended guard field 528 is set to 24 data bytes in consideration of a margin of one data byte similarly.

It is necessary to precisely set the recording start position of the recording cluster 541. The information recording/reproducing apparatus according to the present embodiment detects this recording start position by using a wobble signal recorded in advance in the rewritable-type or write-once type information storage medium. As shown in FIGS. 23A to 23D, in all areas other than the wobble sync area 580, a pattern changes from NPW to IPW in units of four wobbles. In comparison, in the wobble sync area 580, wobble switching units are partially shifted from four wobbles, and thus, the wobble sync area 580 can detect a position most easily. Thus, the information recording/reproducing apparatus according to the present embodiment detects a position of the wobble sync area 580, and then, carries out preparation for a recording process, and starts recording. Thus, it is necessary to arrange a start position of a recording cluster 541 in a non-modulation area 590 immediately after the wobble sync area 580. The wobble sync area 580 is arranged immediately after switching position of a physical segment. The length of the wobble sync area 580 is defined by 16 wobble cycles. Further, after detecting the wobble sync area 580, eight wobble cycles are required for preparation for the recording process in consideration of a margin. Therefore, even in consideration of a ransom shift, it is necessary that the start position of the VFO area 522 which exists at the start position of the recording cluster 541 is arranged rearward by 24 wobbles or more from a switching position of a physical segment.

A recording process is carried out many times in a duplicate site 591 at the time of rewriting. When rewriting is repeated, a physical shape of a wobble groove or a wobble land changes (is degraded), and the wobble reproduction signal amount is lowered. In the present embodiment, a contrivance is made so that a duplicate site 591 at the rewriting or at the time of additional writing is recorded in the non-modulation area 590 instead of arriving in the wobble sync area 580 or wobble address area 586. In the non-modulation area 590, a predetermined wobble pattern (NPW) is merely repeated. Thus, even if a wobble reproduction signal amount is partially degraded, interpolation can be carried out by utilizing the preceding and succeeding wobble reproduction signals. In this way, the position of the duplicate site 591 at the rewriting or at the time of additional writing has been set so as to be included in the non-modulation area 590. Thus, there occurs advantageous effect that a stable wobble detection signal from the wobble address information 610 can be guaranteed while preventing degradation of the wobble reproduction signal amount due to the shape degradation in the wobble sync area 580 or wobble address area 586.

The above description mainly relates to a single-sided single-layer disc. The following description relates to a single-sided multi-layer (herein, dual layer) disc. The same portions as those of the above description will be indicated in the same reference numerals and their detailed description will be omitted.

Measurement Condition

The characteristics of a recording medium are determined in accordance with DVD specifications, and it is necessary to test whether the specifications are satisfied or not before selling the recording medium. For that purpose, a device for measuring characteristics of a recording medium is required, and measurement conditions of a measuring device are determined in the specifications. Characteristics of an optical head for measuring characteristics of a medium are regulated as follows.

Wavelength $\lambda$: 405±5 nm

Polarization: circularly polarized light

Polarizing Beam Splitter PBS: Shall be used.

Numerical aperture: 0.65±0.01

Light intensity at the rim of the pupil of the objective lens: 55% to 70% of the maximum intensity level Wave front aberration after passing through an ideal substrate: 0.033$\lambda$ max A Normalized detector size on a disc: 100<A/m2<144 µm, in which A: the central detector area of the optical head M: the transversal magnification from disc to detector Relative intensity noise (RIN)* of laser diode: −125 dB/Hz (max).

*: RIN (dB/Hz)=10 log [(AC power density/Hz)/DC power

Cross-Sectional Structure of Single-Sided Dual Layer Recordable Disc

FIG. 31 shows a cross-sectional view of a single-sided dual layer recordable disc (write-once disc). The single-sided dual layer disc has the first transparent substrate 2-3 made of polycarbonate at the side of an incident plane (read surface) of a laser beam 9 emitted from an objective lens. The first transparent substrate 2-3 has, transparency for a wavelength of a laser beam. A wavelength of the laser beam is 405 (±5) nm.

A first recording layer (Layer 0) 3-3 is provided on a plane opposite to the light incident plane of the first transparent substrate 2-3. Pits corresponding to recording information are provided to the first recording layer 3-3. An optical semi-transparent layer 4-3 is provided on the first recording layer 3-3.

A space layer 7 is provided on the optical semi-transparent layer 4-3. The space layer 7 serves as a transparent substrate with respect to Layer 1, and has transparency for a wavelength of a laser beam.

A second recording layer (Layer 1) 3-4 is provided on a plane opposite to the optical incident plane of the space layer 7. Pits corresponding to recording information are provided to the second recording layer 3-4. An optical reflection layer 4-4 is provided on the second recording layer 3-4. A substrate 8 is provided on the optical reflection layer 4-4.

Thickness of Space Layer 7

A thickness of the space layer 7 in the single-sided dual layer write-once disc is 25.0±5.0 µm. If it is thinner, interlayer crosstalk is made greater, which makes it difficult to manufacture, and therefore, a measure of thickness is regulated. In a single-sided dual layer read-only recording medium, a thickness of the space layer 7 is 20.0±5.0 µm. Because a write-once recording medium is under the influence of interlayer crosstalk greater than the case of a read-only recording medium, the single-sided dual layer write-once disc is made thicker to slight extent as compared with the read-only recording medium, and a center value of the thickness of the space layer 7 is regulated to be 25 μm or more.

Reflectivity Including Birefringence

Reflectivity in the system lead-in area and system lead-out area is 4.5 to 9.0% for High-to-Low disc and 4.2 to 8.4% for Low-to-High disc. Reflectivity in the data lead-in area, data area, middle area, and data lead-out area is 4.5 to 9.0% for Low-to-High disc.

The higher the reflectivity, the better. However, there are limits thereto, and those are determined such that the number of times of repeat reproduction and characteristics of a reproduction signal satisfy predetermined standards. Because the recording layer serving as Layer 0 must be semi-transparent, a refractivity thereof is lower than that of a single layer.

Interlayer Crosstalk

As described above, a single-sided multilayer recording medium has the problem (interlayer crosstalk) that reflected lights from other layers have an effect on a reproduction signal. To described in detail, when a recorded status of a signal of the other layer (for example, Layer 0) to be irradiated with the reproduction beam is changed during reproduction of one layer (for example, Layer 1), the problem that a signal of Layer 1 during reproduction is offset by the crosstalk is brought about. Further, when a signal is recorded on Layer 1, an optimum recording power varies depending on whether Layer 0 has been recorded or unrecorded. These problems result from, for example, the fact that the transmittance and the reflectivity of the recording medium with Layer 0 vary in accordance with a recorded status or an unrecorded status, or that a thickness of the space layer cannot be made much greater in order to reduce an optical aberration. However, it is extremely difficult to physically reduce such characteristics. Then, an optical disc of the present embodiment has a feature that no offset in a signal is brought about by providing clearance (areas in constant recorded status) to respective layers.

Definition of the Clearance

Figure 32:
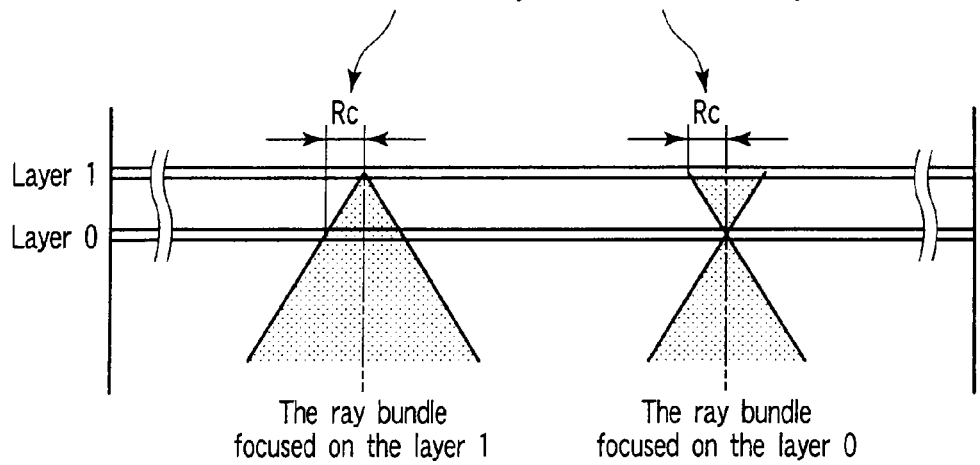
FIG. 32 shows an exemplary view showing the ray bundle on the other layer while reading and writing of a layer of the disc.
Figure 33:
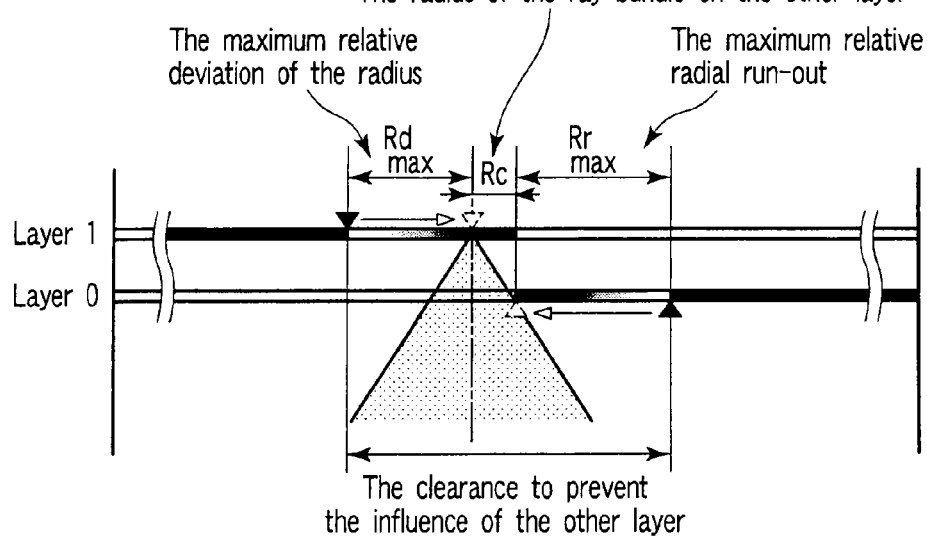
FIG. 33 shows an exemplary view showing the clearance to prevent the influence of the other layer at the worst case.

In a dual layer disc, the bundle of light that is focused onto a layer of the disc spreads out on the other layer of the disc and reflects at the other layer as well as the layer where the light focuses, as shown in FIG. 32. Thus, reading and writing of a layer are affected by the influence of the beam that is reflected at the other layer of the disc. To mitigate this influence, the status of the other layer of the disc should be uniform in terms of existence of recorded marks. The area that affects the quality of reading and writing of a layer is defined on the other layer of the disc taking the focused point as a reference. Then, reading and writing at a point on a layer should be qualified by keeping the area on the other layer of the disc uniform. The radial distance of the area is called "Clearance". Refer to FIG. 33.

The Clearance is calculated considering three elements, the maximum relative deviation of the radius between Layer 0 and Layer 1, the maximum relative radial run-out between Layer 0 and Layer 1 and the radius of the ray bundle on the other layer. These values are defined as follows;

Maximum relative deviation of the radius between Layer 0 and Layer 1:

$$Rd_{max}=40\ \mu m$$

Maximum relative radial run-out between Layer 0 and Layer 1:

$$Rr_{max}=(40+60)/2=50\ \mu m$$

The theoretical radius of the ray bundle on the other layer:

$$R_{C\_theoretical}=T_{s1}\times\tan(\sin^{-1}(NA/n))=14\ \mu m$$

where $T_{s1}$ the maximum thickness of the space layer 30 μm, NA is numerical aperture=0.65 and n is refractive index of the space layer 1.5.

The practical radius, $R_{C\_principal}$ can be supposed to be about 10 μm effectively, because the intensity of the ray bundle is highest in the center and lowest in the rim.

The Clearance Cl of the disc is calculated by the following equation:

$$Cl=Rd_{max}+Rr_{max}+R_{C\_practical}=100\ \mu m$$

The Information area format is constructed considering the clearance at the edges of the areas in the Information area.

Note: FIG. 33 illustrates a concept of the position shifts.

The relative deviation of the radius doesn't necessarily cause an outward shift in Layer 1, and the relative radial run-out doesn't necessarily cause a inward shift in Layer 0.

Example of the Clearance in the Number of Physical Sectors

It is useful to simplify the Clearance in the number of Physical sectors from a viewpoint of compatibility. $A_M$ in FIG. 35 should be used for the clearance in the number of Physical sectors at the location of M (Refer to FIG. 34).

Figures 34, 35:
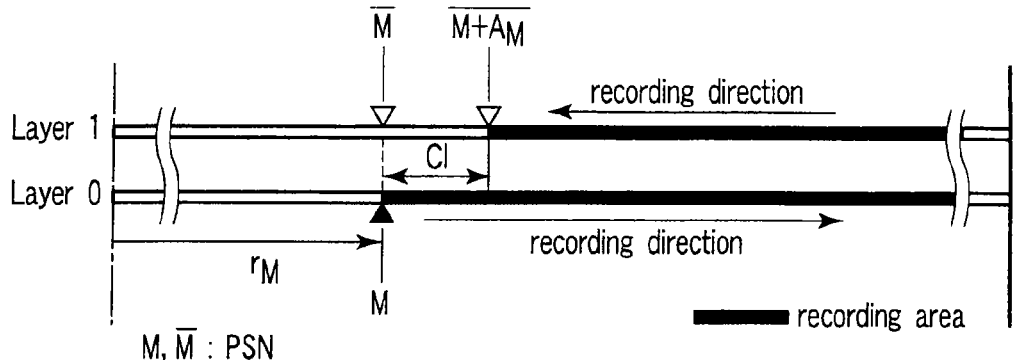
FIG. 34 shows an exemplary view showing a physical sector number on Layer 0 and the corresponding recordable physical sectors on Layer 1.
FIG. 35 shows an exemplary view showing the clearance in the number of physical sectors.

FIG. 34 shows a physical sector number PSN of Layer 0 and a recordable physical sector of Layer 1 corresponding to the physical sector number PSN. The physical sector numbers of Layer 0 and Layer 1 have a bit inverted relation.

General Parameters

General parameters of single-sided dual layer write-once disc is shown in FIG. 36. These parameters are similar to the general parameters of single-sided single layer write-once disc. Followings are different from those of those of single-sided single layer write-once disc; user data capacity (30 GB), data area inner radius (24.6 mm for Layer 0, 24.7 mm for Layer 1), and data area outer radius (58.1 mm for Layers 0 and 1).

Information Area Format

The information area is divided into 7 parts: the System Lead-in area, Connection area, Data Lead-in area, Data area, Middle area, Data Lead-out area, and System Lead-out area. There is only one information area extending over two layers. The Middle area on each layer allows the read-out beam to move from Layer 0 to Layer 1. Refer to FIG. 40. The Data area is intended for recording of the main data. The System Lead-in area contains the Control data and Reference code. The Data Lead-out area allows for a continuous smooth read-out.

Track Structure

The System Lead-in area and System Lead-out area contain tracks which consist of a series of embossed pits. A track in System Lead-in area and System Lead-out area forms a 360° turn of a continuous spiral. The center of the track is the center of the pits.

A track from Data Lead-in area to Middle area on Layer 0 and that from Middle area to Data Lead-out area on Layer 1 form a 360° turn of a continuous spiral.

The Data Lead-in area, Data area and Middle area on Layer 0, and the Middle area, Data area and Data Lead-out area on Layer 1 consist of a series of groove tracks. The groove tracks are continuous from the start of the Data Lead-in area to the end of the Middle area on Layer 0 and the start of the Middle area to the end of the Data Lead-out area on Layer 1. If two single-sided single layer discs are pasted on each other, a double-sided dual layer disc having two read-out surfaces is manufactured.

Layer is to be defined against the one read-out side of the disc. An HD DVD-R for dual layer disc has two layers identified as Layer 0 and Layer 1 per read-out side. Layer 0 is the layer nearest to the read-out surface and Layer 1 is the layer farthest to the read-out surface.

HD DVD-R for dual layer discs can be single-sided or double-sided. For double-sided discs there are four layers. Two layers of each side are accessed individually through the opposite sides of the disc.

Direction of Rotation

The disc rotates counterclockwise as viewed from the read-out side. The track spirals outward from the inner diameter to the outer diameter on Layer 0. The track spirals inward from the outer diameter to the inner diameter on Layer 1.

Track Layout

Each track in the System Lead-in area and System Lead-out area is divided into Data segments. Each track in the data Lead-in area, data area, data Lead-out area, and middle area is divided into PS (Physical Segment) blocks. Each PS block should be divided into seven physical segments. Each Physical segment comprises 11067 bytes.

Lead-In Area, Lead-Out Area and Middle Area

Figure 37:
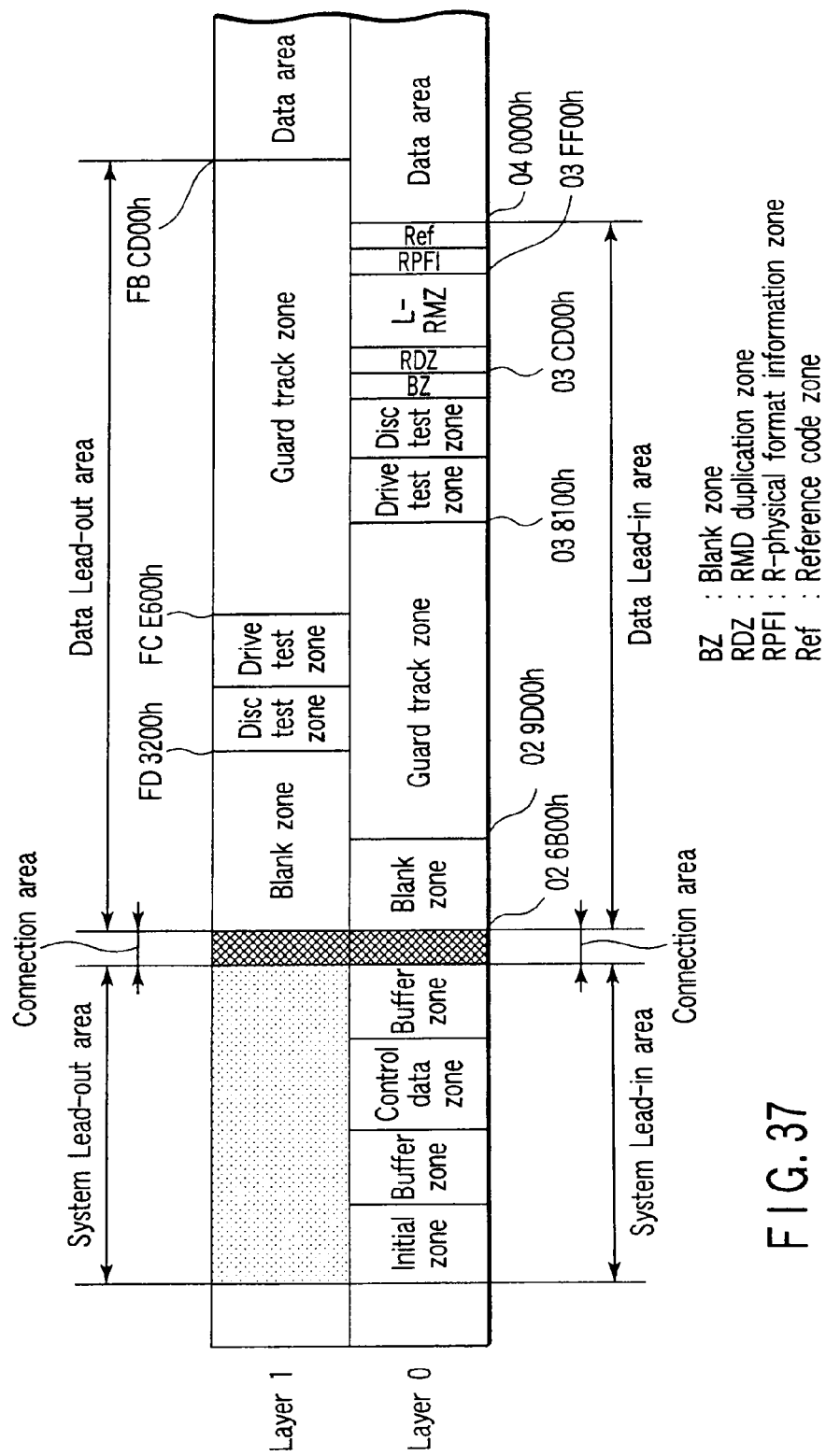
FIG. 37 shows an exemplary view showing the schematic of lead-in area and lead-out area.
Figure 38:
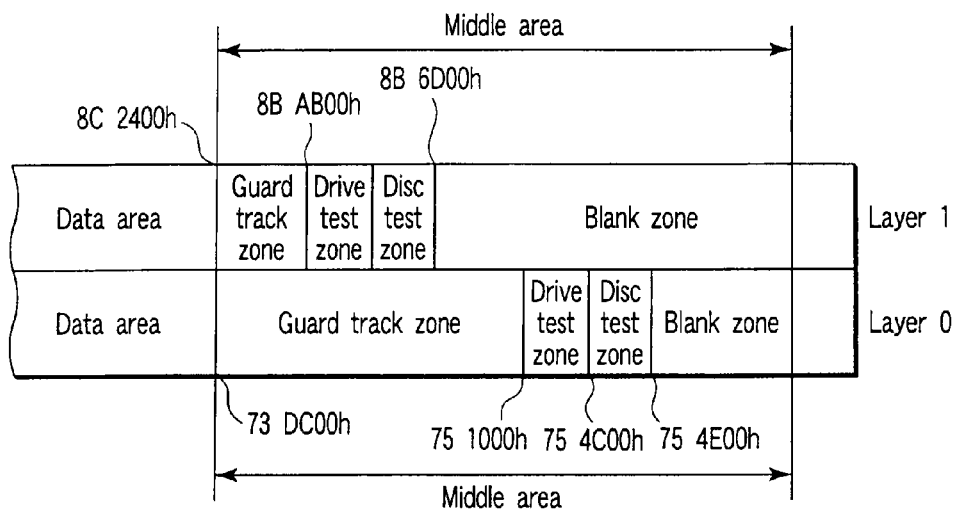
FIG. 38 shows an exemplary view showing the schematic of original middle area.

The schematic of the Lead-in area and the Lead-out area is shown in FIG. 37. The schematic of the original Middle area on Layer 0 and Layer 1 is shown in FIG. 38. The layout of the Middle area can be changed by Middle area expansion. FIG. 38 shows an original Middle area before expansion. The border of each zone and each area in Lead-in area, Lead-out area and Middle area coincides with the border of Data segments.

A system lead-in area, a connection area, a data lead-in area, and a data area are provided in sequence from the innermost periphery at the inner peripheral side of Layer 0. A system lead-out area, a connection area, a data lead-out area, and a data area are provided in sequence from the innermost periphery at the inner peripheral side of Layer 1. In this way, because the data lead-in area including a management area is provided to only Layer 0, information on the layer L1 are also written into the data lead-in area of the Layer 0 at the time of finalizing on Layer 1. As a consequence, all the management information can be obtained by merely reading Layer 0 on start-up, and there is the advantage that there is no need to read Layer 0 and Layer 1 one by one. Note that, in order to record data on Layer 1, the whole Layer 0 must be written. The management area is to be filled at the time of finalizing the disc.

The system lead-in area of Layer 0 is composed of an initial zone, a buffer zone, a control data zone, and a buffer zone in sequence from the inner peripheral side. The data lead-in area of Layer 0 is composed of a blank zone, a guard track zone, a drive test zone, a disc test zone, a blank zone, an RMD duplication zone, an L-RMD (recording management zone in Data Lead-in area), an R-physical format information zone, and a reference code zone in sequence from the inner peripheral side. A starting address (inner peripheral side) of the data area of Layer 0 and an ending address (inner peripheral side) of the data area of Layer 1 are shifted by a distance of a clearance, and the ending address (inner peripheral side) of the data area of Layer 1 is at a side outer than the starting address (inner peripheral side) of the data area of Layer 0.

The data lead-out area of Layer 1 is composed of a blank zone, a disc test zone, a drive test zone, and a guard track zone in sequence from the inner peripheral side.

The blank zone is a zone having grooves, but having no data recorded thereon. The guard track zone is a zone on which a specific pattern for a test is recorded, and unmodulated data "00" is recorded thereon. The guard track zone of Layer 0 is provided for recording onto the disc test zone and the drive test zone of Layer 1. Therefore, the guard track zone of Layer 0 corresponds to a range obtained by adding at least clearance to the disc test zone and the drive test zone of Layer 1. The guard track zone of Layer 1 is provided for recording onto the drive test zone, the disc test zone, the blank zone, the RMD duplication zone, the L-RMD, the R-physical format information zone, and the reference code zone of Layer 0. Therefore, the guard track zone of Layer 1 corresponds to a range obtained by adding at least clearance to the drive test zone, the disc test zone, the blank zone, the RMD duplication zone, the L-RMD, the R-physical format information zone, and the reference code zone of Layer 0.

As shown in FIG. 38, both the middle areas of Layer 0 and Layer 1 each are composed of the guard track zone, the drive test zone, the disc test zone, and the blank zone in sequence of the inner peripheral side. The guard track zone of Layer 0 is provided for recording onto the drive test zone and the disc test zone of Layer 1. Therefore, an ending position of the guard track zone of Layer 0 is positioned at an outer peripheral side by at least a distance of a clearance from a starting position of the disc test zone of Layer 1. The blank zone of Layer 1 is provided for recording onto the drive test zone and the disc test zone of Layer 0. Therefore, an ending position of the blank zone of Layer 1 is positioned at an inner peripheral side by at least a distance of a clearance from a starting position of the drive test zone of Layer 0.

Track Path

Figure 39:
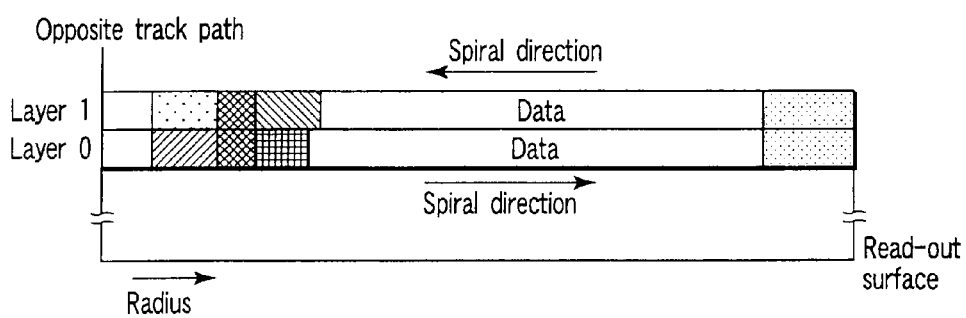
FIG. 39 shows an exemplary view showing the track path.

In the present embodiment, an opposite track path as shown in FIG. 39 is used in order to maintain the continuity of recording from Layer 0 to Layer 1. In sequential recording, the routine does not proceed to recording onto Layer 1 unless recording onto Layer 0 is completed.

(Physical Sector Layout)

Each PS block contains 32 Physical sectors. On an HD DVD-R for dual layer disc, Physical sector numbers (PSN) of the Layer 0 continuously increases in System Lead-in area and increases continuously from the beginning of the Data Lead-in area to the end of the Middle area, as shown in FIG. 40. However, PSN of the Layer 1 takes the bit-inverted value to that of the Layer 0 and continuously increases from the beginning of the Middle area (outside) to the end of the Data Lead-out area (inside) and increases continuously from the outer side of the System Lead-out area to the inner side of the System Lead-out area.

The bit-inverted number is calculated so that the bit value of ONE becomes that of ZERO and vice versa. Physical sectors on each layer with bit-inverted PSNs to each other are at almost the same distance from the center of the disc.

The Physical sector whose PSN is X is contained in the PS block whose PS block address is calculated by dividing X by 32, rounding off fractions.

The PSNs in the System Lead-in area are calculated by letting the Physical sector placed at the end of the System Lead-in area be "131071" (01 FFFFh).

The PSNs in the Layer 0 except for the System Lead-in area are calculated by letting the PSN of the Physical sector placed at the beginning of the Data area located after the Data Lead-in area be "262144" (04 0000h). The PSNs on the Layer 1 except for the System Lead-out area are calculated by letting the PSN of the Physical sector placed at the beginning of the Data area located after the Middle area be "9184256" (8C 2400h).

Physical Segment Structure

The Data Lead-in area, Data area, Middle area and Data Lead-out area comprise Physical segments. A Physical segment is specified with Physical segment order and PS block address.

WAP Layout

The Physical segment is aligned with Wobble Address in Periodic position (WAP) information modulated in the wobble. Each WAP information is indicated with 17 Wobble Data Unit (WDU). The length of Physical segment is equal to the length of 17 WDU. The layout of WAP is shown in FIG. 41 which corresponds to FIGS. 24C and 24D for the single-sided single layer disc. The numbers in a field of a WAP layout indicate the WDU number in Physical segment. The first WDU in the Physical segment is 0.

In the WAP, b0 to b8 describe CRC, and b9 to b11 describe physical segment orders, and b12 to b30 describe PS block addresses, and b31 to b32 describe segment information. Among the segment information, b31 describes a reserved area, and b32 describes a type. A type denotes a type of a physical segment (0b is type 1 (FIG. 26B), and 1b is type 2 (FIG. 26C) or type 3 (FIG. 26D). The PS block addresses are assigned to the respective PS blocks. With respect to the physical segment orders, 000b is set to the first physical segment in the PS block, and physical segment orders are assigned to the other six types of physical segments in the same way.

Wobble Data Unit

Wobble Data Unit (WDU) is consists of 84 wobbles. The period of wobbles is equal to 93T, where T denotes channel clock period. Primary WDU in SYNC field is shown in FIG. 42.

Primary WDU in Address field is shown in FIG. 43. 3 bits is recorded in the Address field with 0b as Normal Phase Wobble (NPW) and 1b as Invert Phase Wobble (IPW).

Secondary WDU in SYNC field is shown in FIG. 44.

Secondary WDU in Address field is specified in FIG. 45. 3 bits is recorded in the Address field with 0b as Normal Phase Wobble (NPW) and 1b as Invert Phase Wobble (IPW).

WDU in Unity field is shown in FIG. 46. WDU for Unity field is not modulated.

Modulation Rules of Bit

NPW and IPW are recorded on the track in the waveforms shown in FIG. 22. The start position of the physical segment coincides with the start position of the SYNC field.

There are two possible modulated wobble positions, Primary WDU and Secondary WDU are shown in FIGS. 42 to 45. Normally the Primary WDU is selected. However, during the mastering process it is possible that there will already be a modulated wobble in the adjacent track. In such a case, the Secondary WDU is selected to prevent from positioning the modulated wobble side by side, as shown in FIG. 25. Physical segments are categorized by the modulated wobble positions, called Type1, Type2 and Type3, as shown in FIGS. 26A to 26D.

Type of Physical segment is selected according to the following rules.

1) Type1 or Type2 Physical segment is repeated equal to or more than 10 times successively.

2) Type2 Physical segment is not repeated more than 28 times successively.

3) Type3 Physical segment is selectable once at the transferring position from Type1 Physical segment to Type2 Physical segment.

4) Modulated wobble positions is separated more than 2 wobble length from one of the adjacent track.

Lead-In Area, Lead-Out Area and Middle Area

Figure 47:
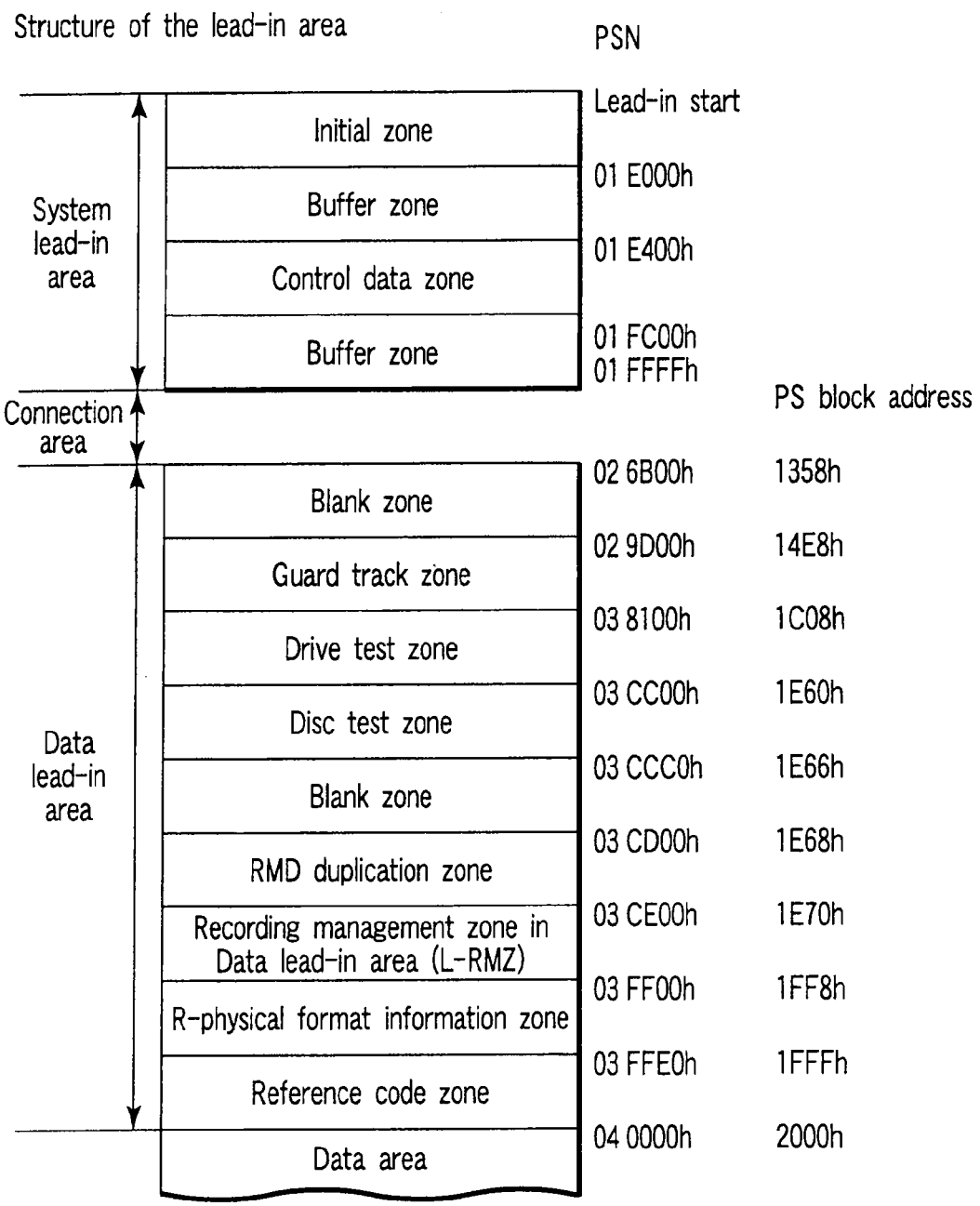
FIG. 47 shows an exemplary view showing the structure of the lead-in area.

The schematic of the Lead-in area and the Lead-out area is shown in FIG. 47. The system lead-in area is composed of an initial zone, a buffer zone, a control data zone, and a buffer zone in sequence from the inner peripheral side. The connection area is composed of a connection zone and a blank zone in sequence from the inner peripheral side. The data lead-in area is composed of a guard track zone, a drive test zone, a disc test zone, a blank zone, an RMD duplication zone, a recording management zone in the data lead-in area (L-RMD), an R-physical format information zone, and the reference code zone in sequence from the inner peripheral side.

The details of the system lead-in area will be described. The initial zone contains embossed data segments. The main data of the data frame recorded as the data segment of the initial zone is set to "00h."

The buffer zone consists of 1024 Physical sectors from 32 Data segments. The Main data of the Data frames eventually recorded as Data segments in this zone is set to "00h."

Figure 48:
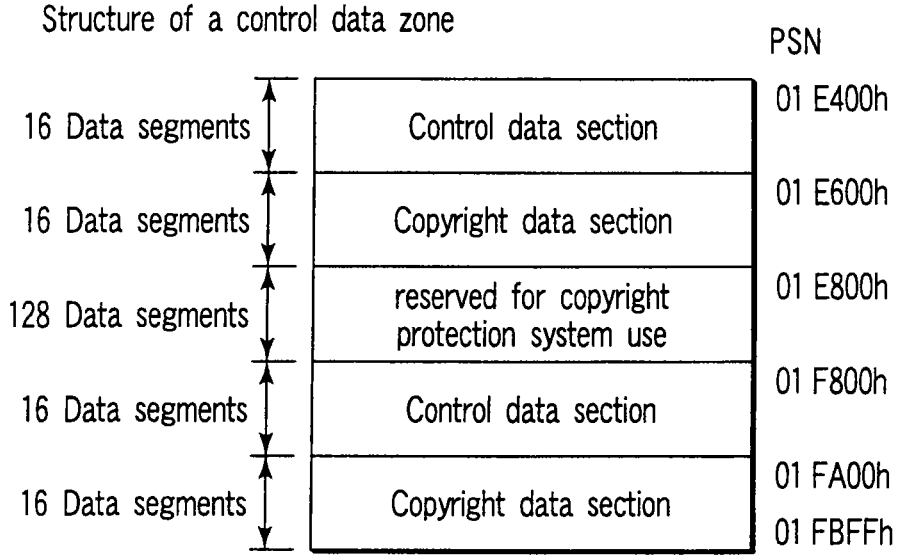
FIG. 48 shows an exemplary view showing the structure of a control data zone.

The Control data zone contains embossed Data segments. The Data segments contain embossed Control data. The Control data is comprised of 192 Data segments starting from PSN 123904 (01 E400h). The structure of a Control data zone is shown in FIG. 48.

Figure 49:
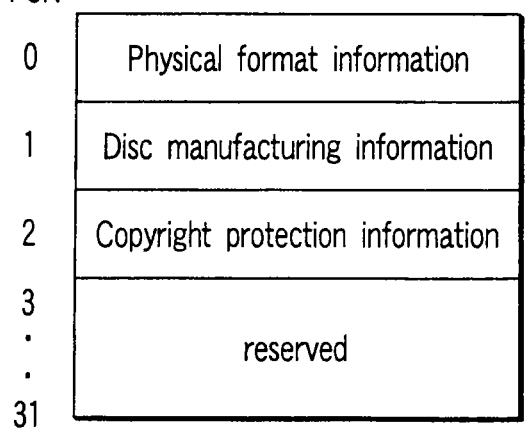
FIG. 49 shows an exemplary view showing a structure of a data segment in a control data section.

The structure of a Data segment in a Control data section is shown in FIG. 49. The contents of the first Data segment in a Control data section is repeated 16 times. The first Physical sector in each Data segment contains the physical format information. The second Physical sector in each Data segment contains the disc manufacturing information. The third Physical sector in each Data segment contains the copyright protection information. The contents of the other Physical sectors in each Data segment are reserved for system use.

The structure of the physical format information included in the control data section is shown in FIG. 50.

The explanation of the function of each Byte Position is described below. The value specified for the Read power, Recording speeds, Reflectivity of Data area, Push-pull signal and On track signal given in BP 132-154 is only for example. Their actual values are decided by the disc manufacture provided that the values are chosen within the values satisfying the emboss condition and the recorded user data characteristics.

The details of the data area allocation given in BP 4-15 are shown in FIG. 51. BP149 and BP152 specify reflectance ratios of the data areas of Layer 0 and Layer 1. For example, 0000 1010b denotes 5%. An actual reflectance ratio is specified by the following formula.

$$\text{Actual reflectance ratio} = \text{value} \times (1/2)$$

BP150 and BP153 specify push-pull signals of Layer 0 and Layer 1. Bit b7 specifies a track shape of the disc of each layer. Bits b6 to b0 specify amplitudes of the push-pull signals.

Track shape:
0b (track on a groove)
1b (track on a land)
Push-pull signal: for example, 010 1000b denotes 0.40.
An actual amplitude of a push-pull signal is specified by the following formula.

$$\text{Actual amplitude of push-pull signal} = \text{value} \times (1/100)$$

BP151 and BP154 specify amplitudes of on-track signals of Layer 0 and Layer 1.

On-track signal: for example, 0100 0110b denotes 0.70.
An actual amplitude of an on-track signal is specified by the following formula.

$$\text{Actual amplitude of on-track signal} = \text{value} \times (1/100)$$

Connection Area on Layer 0

The Connection area on Layer 0 is intended to connect the System Lead-in area and the Data Lead-in area. The distance between the centerlines of the end Physical sector of the System Lead-in area, of which PSN is 01 FFFFh, and the centerlines of the start Physical sector of the Data Lead-in area, of which PSN is 02 6B00h, is 1.36 µm to 5.10 µm. If the disc is a single layer disc, the upper limit of the distance is 10.20 µm. This is because the interlayer crosstalk is present in the dual layer. It is preferable for the dual layer disc that the distance is small. Connection area does not have any embossed pits or grooves.

Data Lead-in Area

The Data segments of the Blank zone do not contain data. The Data segments of the Guard track zone are filled with 00h before recording on Layer 1. The Disc test zone is intended for quality tests by the disc manufacture. The Drive test zone is intended for tests by a drive. This zone is recorded from the outer PS block to the inner PS block. All the Data segments of this zone are recorded before finalizing the disc.

RMD Duplication Zone

The RMD duplication zone consists of a RDZ Lead-in, as shown in FIG. 52. The RDZ Lead-in is recorded before recording the first RMD in the L-RMZ. The other fields of the RMD duplication zone are reserved and filled with 00h. The size of the RDZ Lead-in is 64 kB and consists of the System Reserved Field (48 kB) and the Unique Identifier (ID) Field (16 kB). The data in the System Reserved Field is set to 00h, and the Unique ID Field consists of eight units which have the same 2 kB size and contents. The byte assignment of each unit includes the drive manufacture ID, Serial number, Model number, and Unique Disc ID.

The Recording management zone in Data Lead-in area (L-RMZ) is recorded from PSN 03 CE00h to 03 FEFFh. The Recording management zone (RMZ) consists of Recording management data (RMD). The unrecorded part of L-RMZ is recorded with the current RMD before finalizing the disc.

The Recording Management Data (RMD) contains the information about the recording on the disc. The size of the RMD is 64 kB. The data structure of RMD is shown in FIG. 53. Each RMD is formed of the main data of 2048 bytes and recorded by a predetermined signal processing.

The RMD field 0 specifies general information of the disc, and the contents of this field are shown in FIG. 54.

As a disc status of BP2,

00h: denotes that the disc is empty.
02h: denotes that the disc is recorded and not finalized.
03h: denotes that the disc is finalized.
08h: denotes that the disc is in a recording mode U.
11h: denotes that format operation is in progress. The others are reserved.

The details of the layout of data area allocation of BP22 to BP33 are shown in FIG. 55.

The details of the layout of renewed data area allocation of BP34 to BP45 are shown in FIG. 56.

The respective bits in a padding status of BP46 to 47 show the followings.

b15 . . . 0b: denotes that the inner guard track zone on Layer 0 is not padded.
 . . . 1b: denotes that the inner guard track zone on Layer 0 is padded.
b14 . . . 0b: denotes that the inner drive test zone on Layer 0 is not padded.
 . . . 1b: denotes that the inner drive test zone on Layer 0 is padded.
b13 . . . 0b: denotes that the RMD duplication zone is not padded.
 . . . 1b: denotes that the RMD duplication zone is padded.
b12 . . . 0b: denotes that the reference code zone is not padded.
 . . . 1b: denotes that the reference code zone is padded.
b11 . . . 0b: denotes that the outer guard track zone on Layer 0 is not padded.
 . . . 1b: denotes that the outer guard track zone on Layer 0 is padded.
b10 . . . 0b: denotes that the outer drive test zone on Layer 0 is not padded.
 . . . 1b: denotes that the outer drive test zone on Layer 0 is padded.
b9 . . . 0b: denotes that the extra guard track zone on Layer 0 is not padded, or not assigned.
 . . . 1b: denotes that the extra guard track zone on Layer 0 is padded.
b8 . . . 0b: denotes that the extra drive test zone on Layer 0 is not padded, or not assigned.
 . . . 1b: denotes that the extra drive test zone on Layer 0 is padded. b7 . . . 0b: denotes that the outer guard track zone on Layer 1 is not padded.
 . . . 1b: denotes that the outer guard track zone on Layer 1 is padded.
b6 to b5 . . . 00b: denotes that the recording of Terminator is not started.
 . . . 01b: denotes that the recording of Terminator is in progress.
 . . . 10b: denotes reserved.
 . . . 11b: denotes that the recording of Terminator is finished.

The details of the layout of drive test zone of BP52 to BP99 are shown in FIG. 57. The RMD Field1 contains the OPC related information. In the RMD Field1 it is possible to record the OPC related information for up to 4 drives that may coexist in a system, as shown in FIGS. 58 and 59.

In the case of a single drive, the OPC related information is recorded in the field #1 and the other fields are set to 00h. In every case, the unused fields of the RMD Field1 are set to 00h. The OPC related information of the present drive is always recorded in the filed #1. If the field #1 of the current RMD does not contain the present drive information, which consists of Drive manufacturer ID, Serial number and Model number, the information in the field #1 to #3 of the current RMD is copied to the field #2 to #4 of the new RMD and the information in the field #4 of the current RMD is discarded. If the field #1 of the current RMD contains the present drive information, the information in the field #1 is updated and the information of the other fields is copied to the field #2 to #4 of the new RMD.

Inner Drive test zone address for Layer 0 of BP72 to BP75, BP328 to BP331, BP584 to BP587, and BP840 to BP843:

These fields specify minimum PS block address of the drive test zone in the data lead-in area onto which the most recent power calibration has been carried out. When a current drive does not carry out power calibration in the inner drive test zone of Layer 0, the inner drive test zone address of Layer 0 of the current RMD is copied to the inner drive test zone address of a new RMD. When these fields are set to "00h", this test zone is not used.

Outer Drive test zone address for Layer 0 of BP76 to BP79, BP332 to BP335, BP588 to BP591, and BP844 to BP847:

These fields specify minimum PS block address of the drive test zone in the middle area of Layer 0 onto which the most recent power calibration has been carried out. When a current drive does not carry out power calibration in the outer drive test zone of Layer 0, the outer drive test zone address of Layer 0 of the current RMD is copied to the outer drive test zone address of a new RMD. When these fields are set to "00h", this test zone is not used.

Test Zone Usage Descriptors of BP106, BP362, BP618, and BP874:

These fields specify descriptors for use of the four test zones. The respective bits are assigned as follows.

b7 to b6 . . . Reserved areas.

b5 . . . 0b: The drive did not use the Extra drive test zone on Layer 0.

. . . 1b: The drive used the Extra drive test zone on Layer 0.

b4 . . . 0b: The drive did not use the Extra drive test zone on Layer 1.

. . . 1b: The drive used the Extra drive test zone on Layer 1.

b3 . . . 0b: The drive did not use the inner drive test zone on Layer 0.

. . . 1b: The drive used the inner drive test zone on Layer 0.

b2 . . . 0b: The drive did not use the outer drive test zone of Layer 0.

. . . 1b: The drive used the outer drive test zone on Layer 0.

b1 . . . 0b: The drive did not use the inner drive test zone on Layer 1.

. . . 1b: The drive used the inner drive test zone on Layer 1.

b0 . . . 0b: The drive did not use the outer drive test zone on Layer 1.

. . . 1b: The drive used the outer drive test zone on Layer 1.

Inner Drive Test Zone Address of Layer 1 of BP108 to BP111, BP364 to BP367, BP620 to BP623, and BP876 to BP879:

These fields specify minimum PS block address of the drive test zone in the data lead-out area onto which the most recent power calibration has been carried out. When a current drive does not carry out power calibration in the inner drive test zone of Layer 1, the inner drive test zone address of Layer 1 of the current RMD is copied to the inner drive test zone address of a new RMD. When these fields are set to "00h", this test zone is not used.

Outer Drive Test Zone Address of Layer 1 of BP112 to BP115, BP368 to BP371, BP624 to BP627, and BP880 to BP883:

These fields specify minimum PS block address of the drive test zone in the middle area of Layer 1 onto which the most recent power calibration has been carried out. When a current drive does not carry out power calibration in the outer drive test zone of Layer 1, the outer drive test zone address of Layer 1 of the current RMD is copied to the outer drive test zone address of a new RMD. When these fields are set to "00h", this test zone is not used.

The RMD field 2 specifies data for user's exclusive use. When this field is not used, "00h" is set into the field. BP0 to BP2047 are fields which can be used for data for user's exclusive use.

All the bytes of the RMD field 3 are reserved, and are set to "00h".

The RMD field 4 specifies information of R zones. The contents of this field are shown in FIG. 60. A portion of the data area reserved in order to record user data is called R zone. R zone can be classified into two types in accordance with a recording condition. In an Open R zone, data can be added. In a Complete R zone, user data cannot be added. In a data area, three or more Open R zones cannot be provided. A portion of the data area which is not reserved for recording data is called Invisible R zone. An area following R zone can be reserved in the Invisible R zone. When data cannot be further added, there are no Invisible R zone.

The number of Invisible R zones of BP0 to BP1 is a total number of the Invisible R zones, the Open R zones, and the Complete R zones.

The RMD field 5 to the RMD field 21 specify information of R zones. The contents of these fields are shown in FIG. 61. When these fields are not used, all of those are set to "00h".

The R physical format information zone in the data lead-in area is structured from seven PS blocks (224 physical sectors) beginning at PSN 261888 (03 FF00h). The contents of the first PS block in the R physical format information zone are repeated seven times. The configuration of the PS block in the R physical format information zone is shown in FIG. 62.

Figures 64, 69, 70:
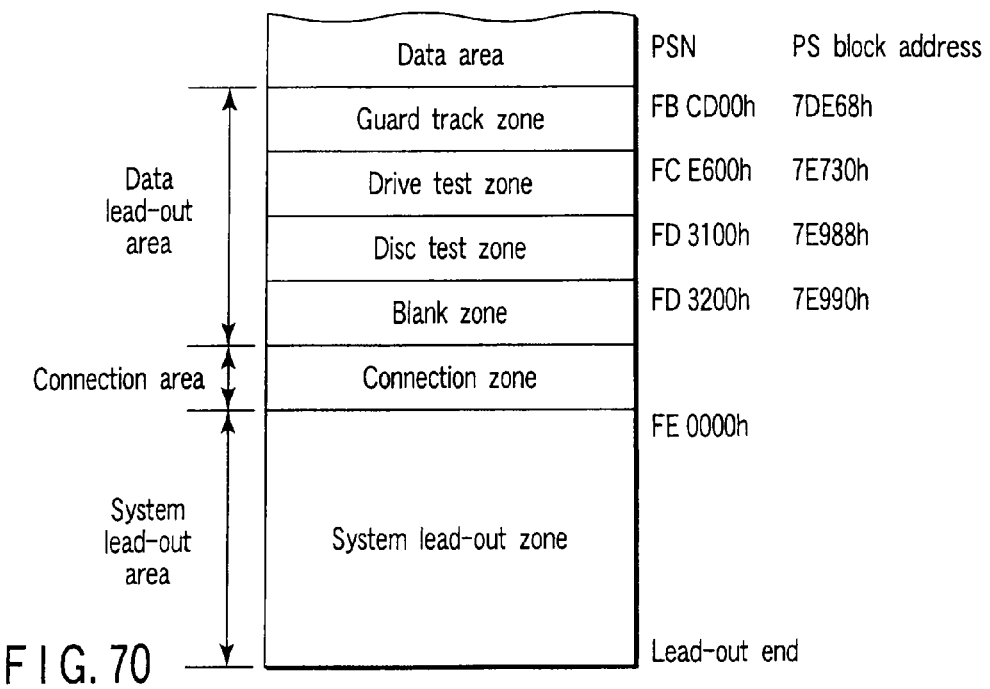
FIG. 64 shows an exemplary view showing the data area allocation.
FIG. 69 shows an exemplary view showing the number of physical sectors in guard track zone.
FIG. 70 shows an exemplary view showing the structure of the lead-out area.

The contents of the physical format information in the data lead-in area are shown in FIG. 63. FIG. 63 is the same as FIG. 50 showing the contents of the physical format information in the system lead-in area. BP0 to BP3 are copied from the physical format information in the system lead-in area. The layout of the data area allocation of BP4 to BP15 is different from that of FIG. 51, and is shown in FIG. 64. BP16 to BP2047 are copied from the physical format information in the system lead-in area.

(Middle Area)

Figure 65A:
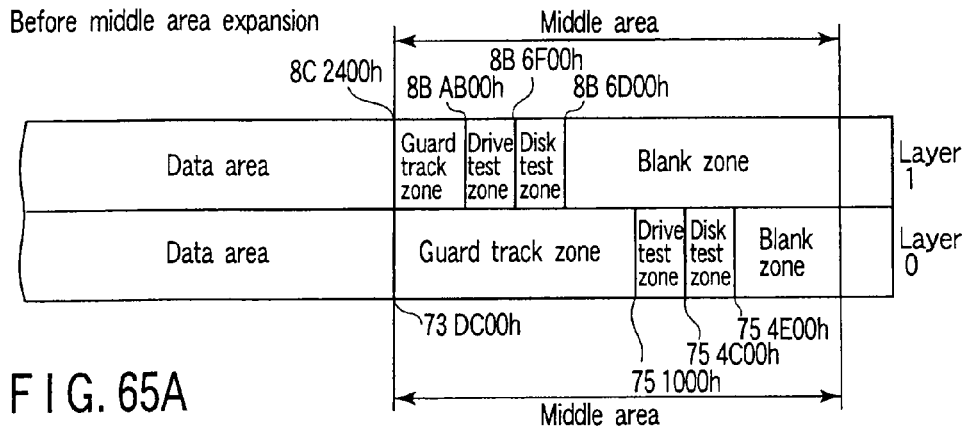
FIGS. 65A, 65B and 65C shows exemplary views showing the structure of the middle area before\after the expansion.
Figure 65B:
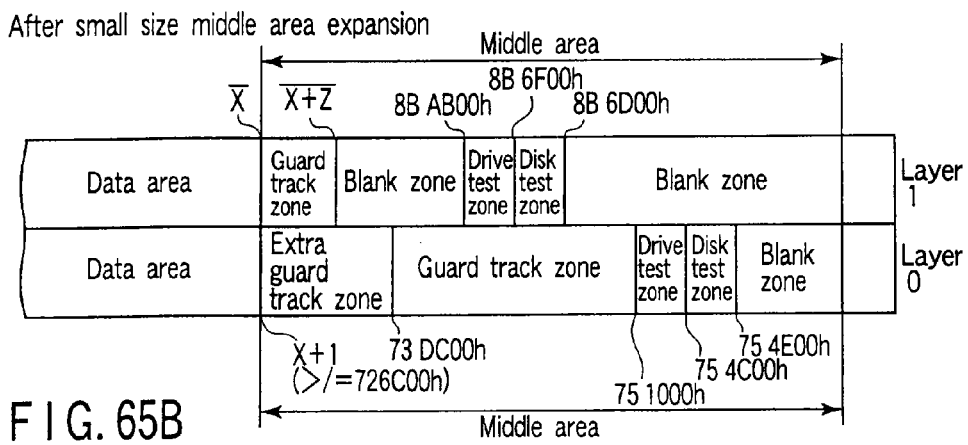
Figure 65C:
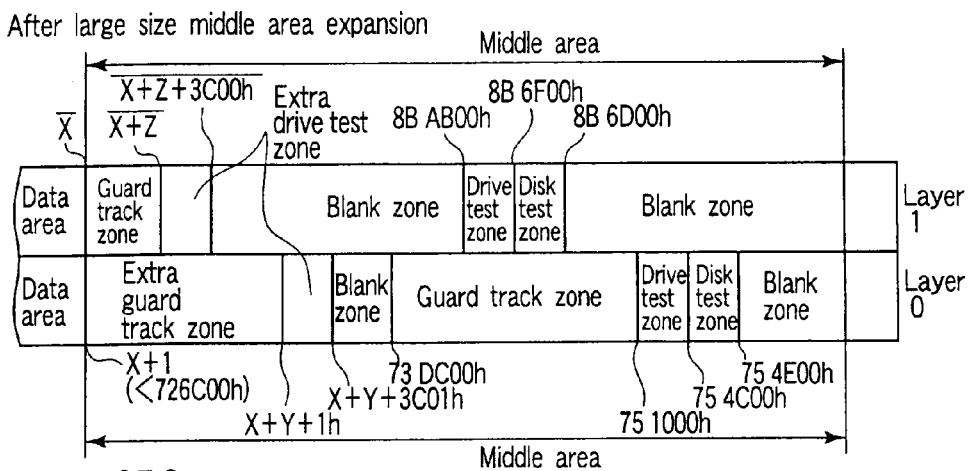
Figure 66:
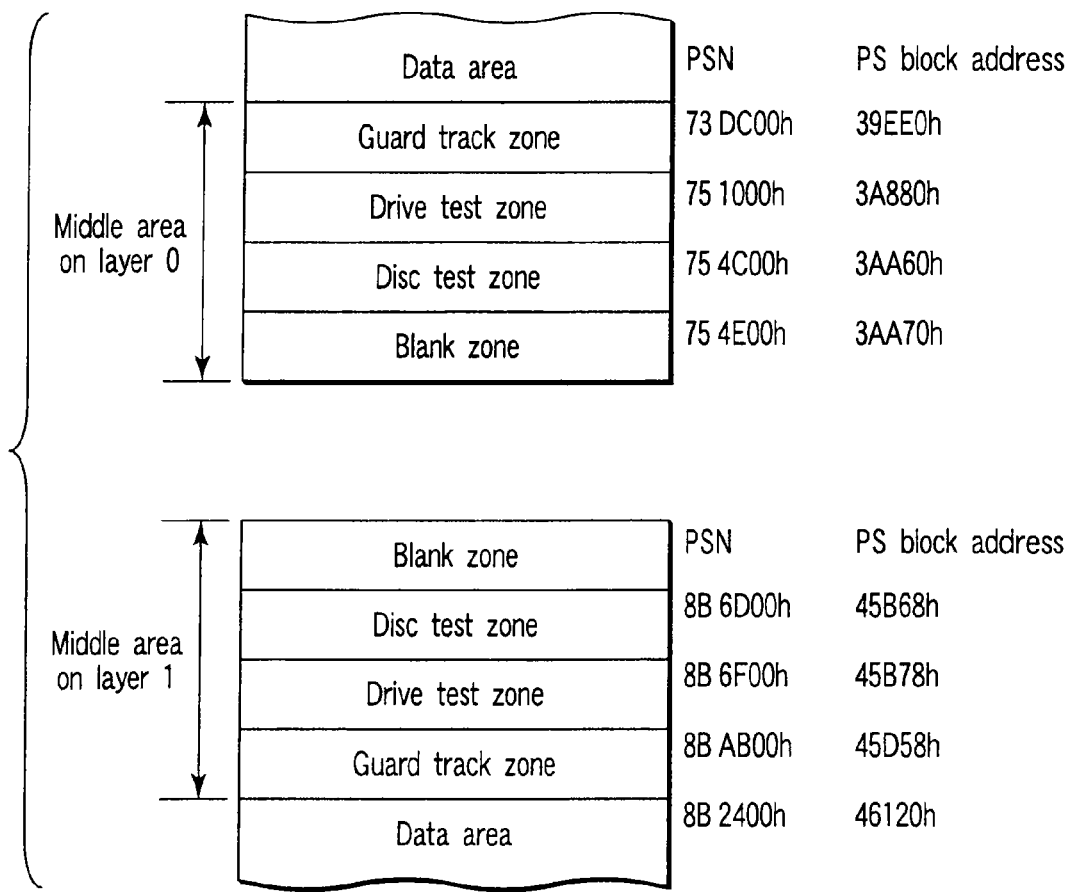
FIG. 66 shows an exemplary view showing the structure of the middle area before the expansion.
Figure 67:
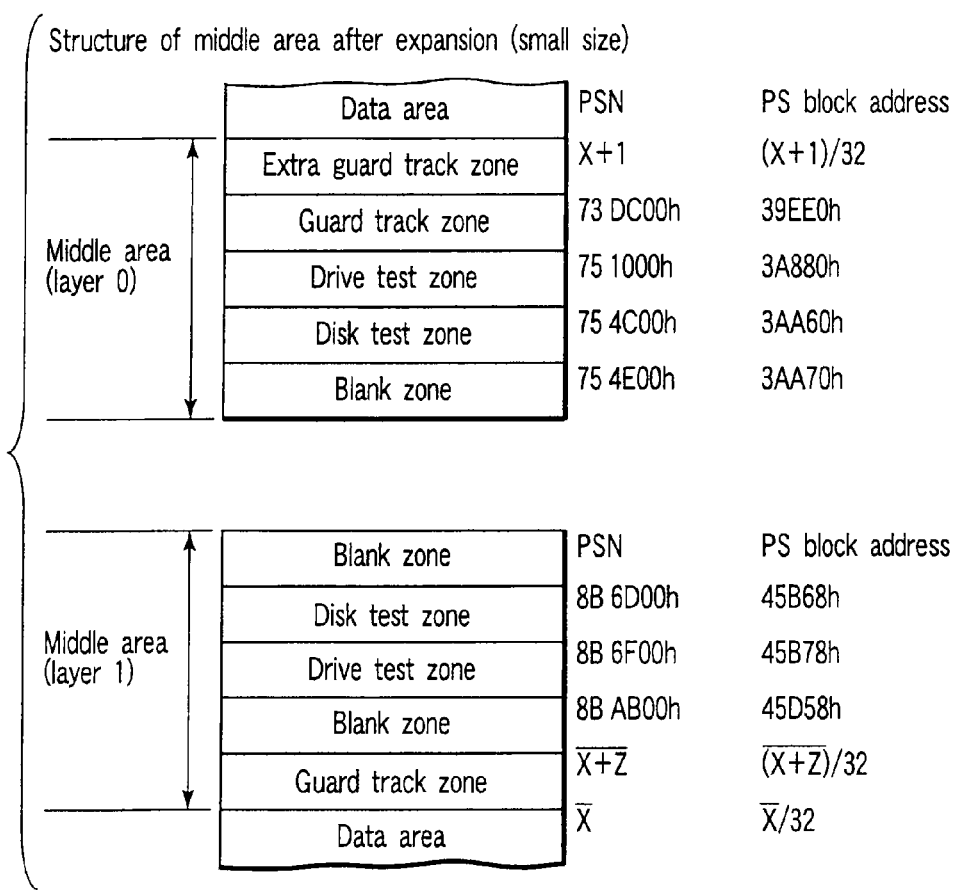
FIG. 67 shows an exemplary view showing the structure of the middle area after small size expansion.
Figure 68:
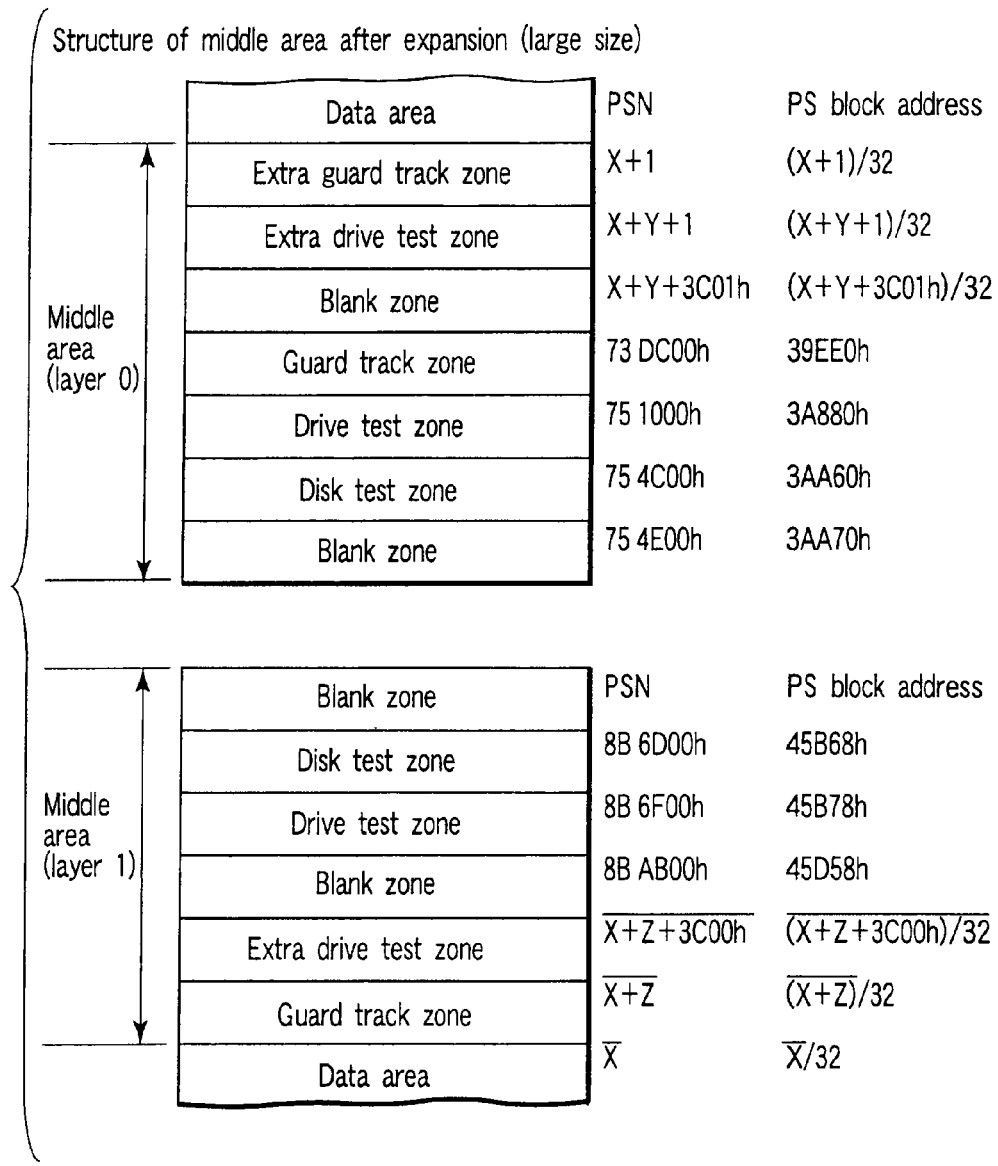
FIG. 68 shows an exemplary view showing the structure of the middle area after large size expansion.

The structure of the Middle area is changed by the Middle area expansion. The schematics of the Middle area before and after the expansion are shown in FIGS. 65A to 65C. The structure of the Middle area before the expansion is shown in FIG. 66. The size of the Guard track zone after the expansion and the creation of the Extra Guard track zone on Layer 0 and the Extra Drive test zone depend on the end PSN of the Data area on Layer 0. The values Y and Z, which are the numbers of Physical sectors in the Guard track zone, are specified in FIG. 69.

Guard Track Zone

The Data segments of the Guard track zone on Layer 0 are filled with 00h before recording on Layer 1. The Data segments of the Guard track zone on Layer 1 are filled with 00h before finalizing the disc.

Drive Test Zone

This zone is intended for tests by a drive. This zone on Layer 0 is recorded from the outer PS block to the inner PS block. All the Data segments of the Drive test zone on Layer 0 may be filled with 00h before recording on Layer 1.

Disc Test Zone

This zone is intended for tests by a disc manufacturer.

Blank Zone

The Data segments of the Blank zone do not contain data. The size of the outermost Blank zone on Layer 0 is more than 968 PS blocks. The size of the outermost Blank zone on Layer 1 is more than 2464 PS blocks.

Structure of the Lead-Out Area

The structure of the Lead-out area is shown in FIG. 70.

The Data lead-out area is composed of a guard track zone, a drive test zone, a disk test zone, and a blank zone, in sequence from the outer peripheral side. The system lead-out area is composed of a system lead-out zone.

Data segments of the guard track zone are filled with 00h before finalizing the disc.

The drive test zone is intended for tests by a drive. This zone is recorded from the outer PS block to the inner PS block. Data segments of the blank zone do not contain data.

Connection Area on Layer 1

The Connection area on Layer 1 is intended to connect the Data Lead-out area and the System Lead-out area. The distance between the centerlines of the end Physical sector of the Data Lead-out area and the centerlines of the start Physical sector of the System Lead-out area, of which PSN is FE 0000h, is 1.36 µm to 5.10 µm. Connection area does not have any embossed pits or grooves.

All the main data of the data frame recorded as the physical sectors in the System lead-out area are set to 00h.

Formatting

Formatting is a process applied when a disc is used and includes initialization, data area allocation (middle area expansion), padding and finalization.

Initialization

It is necessary to record information in the RDZ lead-in area in the RMD duplication zone and select a recording mode when the user data is recorded in the disc.

Middle Area Expansion

Before recording in the Data area on Layer 1, the Middle area expansion can be executed. The Middle area expansion enlarges the Middle area and shrinks the Data area at the same time. The structure of the Middle area is changed by Middle area expansion. The default end PSN of the Data area on Layer 0 is 73 DBFFh and the default start PSN of the Data area on Layer 1 is 8C 2400h. Before recording in the Data area on Layer 1, the drive can reassign a PSN, which is less than 73 DBFFh, to the new end PSN of the Data area on Layer 0. The RMD Field0 is updated by the Middle area expansion, and the new end PSN of the Data area on Layer 0 is recorded in the R-Physical format information zone, except the Data area is relocated at finalization.

When the Middle area expansion is executed and the end PSN of the Data area on Layer 0 becomes X (<73 DBFFh), the bit-inverted number of X is the start PSN of the Data area on Layer 1, an extra guard track zone on Layer 0 is formed, a blank zone on Layer 1 is formed, and a guard track zone on Layer 1 is relocated, as shown in FIGS. 65A to 65C. When X<72 6C00h, an extra drive test zone and a blank zone are formed on Layer 0 and an extra drive test zone on Layer 1 are formed.

Requirement Prior to Recording on Layer 1

Before recording on Layer 1 except for Terminator recording, some zones shall be filled with 00h in order to prevent the influence of the Layer 0.

In the case that the Middle area is not expanded, the Guard track zones on Layer 0, which are located in the Data Lead-in area and Middle area, shall be filled with 00h. The Drive test zone in the Middle area on Layer 0 may be filled with 00h.

In the case that the Middle area is expanded with small size, the Guard track zones on Layer 0, which are located in the Data Lead-in area and Middle area, and the Extra Guard track zone, which is located in the Middle area on Layer 0, shall be filled with 00h, as shown in FIG. 65B. The Drive test zone in the Middle area on Layer 0 may be filled with 00h.

In the case that the Middle area is expanded with large size, the Guard track zone which is located in the Data Lead-in area and the Extra Guard track zone, which is located in the Middle area on Layer 0, shall be filled with 00h, as shown in FIG. 65C. Before recording in the Drive test zone on Layer 1, the Guard track zone which is located in the Middle area on Layer 0 shall be filled with 00h. The Drive test zone and the Extra Drive test zone in the Middle area on Layer 0 may be filled with 00h.

When these zones are filled with ooh, then the information of the RMD Field0 shall be updated.

Finalization

When the Data area is finalized, the Terminator is recorded in the unrecorded Data area, as shown in FIG. 77. Main data of the Terminator is set to 00h, and the area type of it is the Data Lead-out attribute. In the case that user data are recorded on Layer 1, the Terminator is recorded on all the unrecorded Data area.

Figure 78:
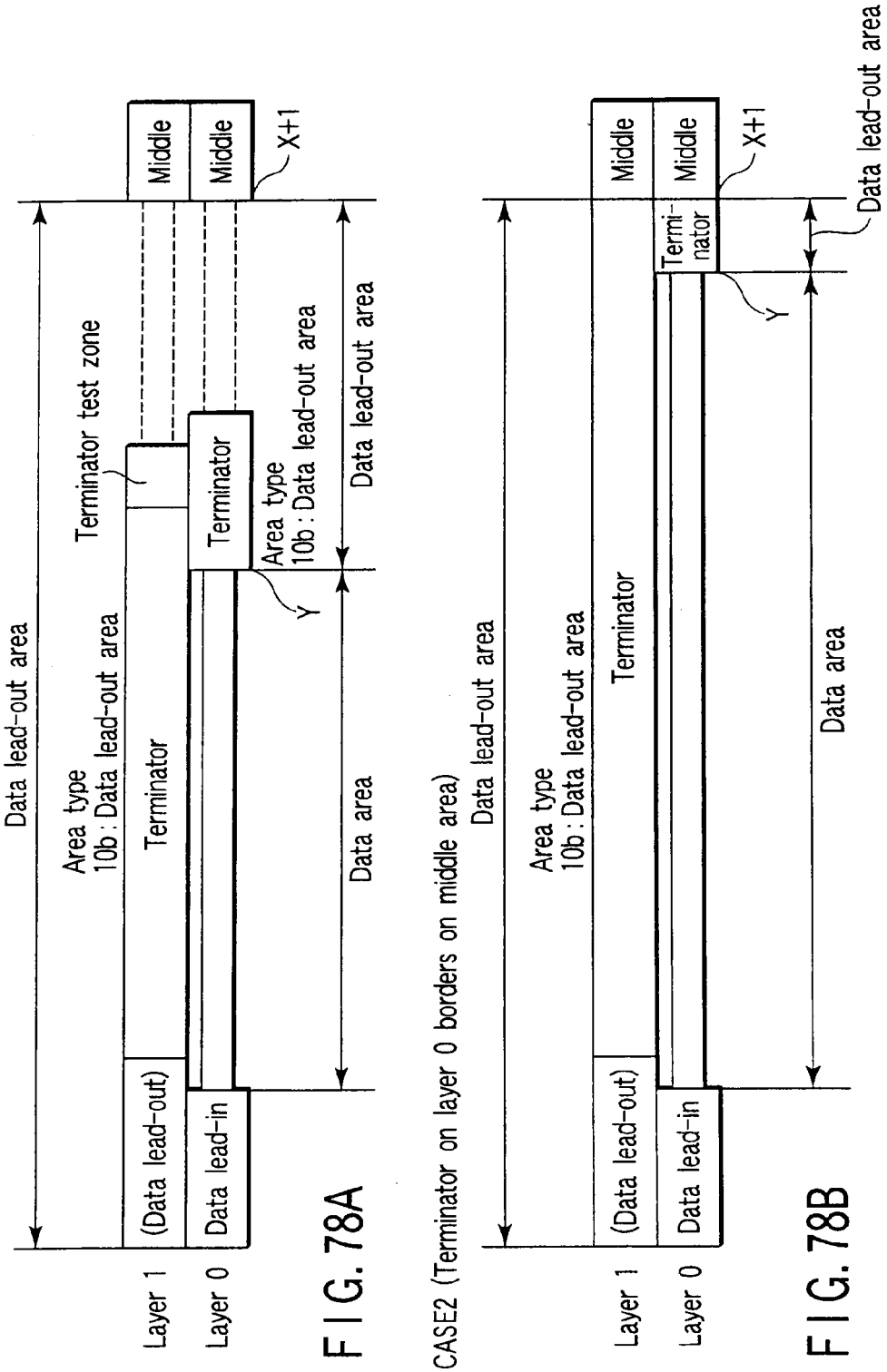
FIGS. 78A and 78B show exemplary views showing the example of final area structure for not recording user data on Layer 1.

In the case that user data are not recorded on Layer 1, the Terminator is recorded on Layer 0 and Layer 1, as shown in FIGS. 77A and 77B. The Terminator on Layer 0 is contiguously recorded from the end of the Data area. If there are amply unrecorded Data segments between the Data area and the Middle area, then it is not necessary to record the Terminator on all of them and it is permitted to create the Drive test zone on Layer 1, as shown in FIG. 78A. The size of the drive test zone is 480 PS blocks. The end PSN of the Terminator on Layer 0 and the start PSN of the Terminator on Layer 1 are specified in FIG. 72.

After recording the Terminator, the Guard track zones on Layer 1, which are located in the Data Lead-out area and Middle area are filled with 00h, if they are unrecorded. Before the Guard track zone which is located in the Data Lead-out area is filled, the Drive test zone, the unrecorded part of the L-RMZ, the R-physical format information zone and the Reference code zone which are located in the Data Lead-in area are recorded.

If unrecorded data segment is present between the end PSN of the Terminator and the Middle area on Layer 0 as shown in FIG. 78A, it is unnecessary to record the Guard track zones which are located in the Middle area on Layer 0 and Layer 1.

Conditions for measuring actuating signals of data lead-in area, data area, middle area, and data lead-out area An offset canceller bandwidth is made to spread as compared with a single layer as follows.

−3 dB closed-loop bandwidth: 20.0 kHz

The bandwidth is 5 kHz in a single layer. However, the bandwidth is made to spread in order to provide margin.

Burst Cutting Area Code (BCA-Code)

The BCA is an area for recording information after the completion of the disc manufacturing process. It is permitted to write the BCA-Code through the replication process using pre-pits, if the read-out signal satisfies the BCA-Code signal specification. The BCA exists on the Layer 1 of a single-sided dual layer disc. Since the BCA exists on Layer 1 of a single-sided dual layer read-only disc, the drive can be compatible with the recordable layer disc and the read-only disc.

Update Condition of RMD

RMD shall be update in at least one of the following conditions;

1) At least one of the contents specified in RMD Field0 is changed, or

2) Drive test zone address specified in RMD Field1 is changed, or

3) Invisible RZone number, First Open RZone number or Second RZone number specified in RMD Field4 is changed, or 4) The difference between the PSN of the least recorded Physical segment in RZone #i and "Least recorded PSN of RZone #i" registered in the least RMD becomes larger than 37888.

Updating RMD is not required in the above conditions 2) and 4) as long as the sequence of data recording operation is in process by an equal to or lee than 4 PS blocks.

Guideline to Select the Type of Physical Segment

As shown in FIG. 26, there are three types of allocation of a modulation area in the physical segments of recordable information storage medium. The details of setting an allocation type of a modulation area at respective diameters are described. The principle of the procedure is described as follows.

The purpose of the type selection is to prevent from overlapping the modulated area in adjacent tracks. FIGS. 73A, 73B and 74 show a type selection for tracks on Layer 0. For tracks on Layer 1, FIGS. 73A, 73B and 74 should be replaced with the figures for Layer 1 in the same way as FIG. 71A is replaced with FIG. 71B for Layer 1. The principle of the procedure is described as follows.

The purpose of the type selection is to prevent from positioning the modulated wobble side by side. A schematic of 2 adjacent tracks is shown in FIGS. 71A and 71B. The start point of the track #i is just the same as that of Physical segment #n, where i and n denote natural numbers. The track #i consists of j Physical segments, k WDUs and m wobbles, where j denotes a natural number and k and m denote non-negative integers. If both k and m are not zero, then the Physical segment #n+j locates in track #i and #i+1.

The relative position between the modulated wobbles in track #i and #i+1 depends on m. If m is equal to or more than 21 and less than 63, then Type1 Physical segments should be selected in the track #i+1, as shown in FIG. 73A. Otherwise, Type2 Physical segments should be selected in the track #i+1, as shown in FIG. 73B. For every case, Type1 Physical segments are selected in the track #i.

Type3 Physical segment is selectable once at the transferring position from Type1 Physical segment to Type2 Physical segment. The selection of Type3 Physical segment depends on not only m but also k. An example of the case that Type3 Physical segment should be selected is shown in FIG. 74. Type3 Physical segment should be selected in one of the following conditions;

1) k is equal to or more than 6 and less than 12, and m is equal to or more than 0 and less than 21, or 2) k is equal to or more than 5 and less than 11, and m is equal to or more than 63 and less than 84.

A procedure for selecting a type of a physical segment is the same as that of FIG. 75 according to the first embodiment. Repetitive processes in the procedure are executed for substantially two tracks. The respective processes are shown hereinafter.

A length of the repetitive processes depends on the number of physical segments selected in the third step.

1) Estimation of the Number of Wobbles on One Track (ST82)

Values of Decimals of Wobbles on a Current Track are estimated on the basis of values on a previous track.

An integral value of wobble $N_W$ can be obtained by rounding down the decimals to an approximate value of an integer.

2) Calculation of j, k, and m (ST83)

j, k, and m are calculated as follows.

$$j = N_W - (N_W \bmod 1428)/1428,$$

$$m = N_W \bmod 84,$$

$$k = ((N_W - m)/84) \bmod 17$$

Operation "x mod y" denotes a modulus after dividing x by y.

3) Selection of a Type (ST84)

A type of a physical segment is selected in accordance with the conditions of k and m as follows.

Condition 1: $21 < m < 63$ 2j physical segments of type 1 are selected.

Condition 2: $0 < k < 6$ and $0 < m < 21$, or $0 < k$ and $63 < m < 84$ j physical segments of type 1 and j physical segments of type 2 are selected.

Condition 3: $6 < k < 12$ and $0 < m < 21$, or $5 < k < 11$ and $63 < m < 84$ j physical segments of type 1, one physical segment of type 3, and j physical segments of type 2 are selected.

Condition 4: $12 < k < 17$ and $0 < m < 21$, or $11 < k < 17$ and $63 < m < 84$ j+1 physical segments of type 1 and j+1 physical segments of type 2 are selected.

A selection method for allocation type of a modulated area is shown in FIG. 75. When a selection procedure starts (ST 81), the number of wobbles $N_W$ for an inner track is estimated (ST 82). An integral number of wobbles $N_W$ is can be gotten by rounding off the decimal fractional number to the nearest whole number. Calculation of j, k and m is performed (ST 83). The operation "x mod y" represents the modulus after x divided by y. At ST 83, j, k and m are calculated as follows.

$$j = \{N_W - (N_W \bmod 1428)\}/1428, \qquad 1)$$

$$m = N_W \bmod 84 \qquad 2)$$

$$k = \{(N_W - m)/84\} \bmod 17 \qquad 3)$$

As shown in ST 84, the type (type1, type2, and type3) and the number of iterations (j, 2j, j+1) are selected.

A type of a physical segment is selected in accordance with the conditions of k and m as follows.

Condition 1: $21 \leq m < 63$ 2j physical segments of type 1 are selected, as shown in FIG. 26B.

Condition 2: $0 \leq k < 6$ and $0 m \leq 21$, or $0 \leq k$ and $63 \leq m < 84$ j physical segments of type 1 (FIG. 26B) and j physical segments of type 2 (FIG. 26C) are selected.

Condition 3: $6 \leq k < 12$ and $0 \leq m < 21$, or $5 \leq k < 11$ and $63 \leq m < 84$ j physical segments of type 1 (FIG. 26B), one physical segment of type 3 (FIG. 26B), and j physical segments of type 2 (FIG. 26C) are selected.

Condition 4: $12 \leq k < 17$ and $0 \leq m < 21$, or $11 \leq k < 17$ and $63 \leq m < 84$ j+1 physical segments of type 1 (FIG. 26B) and j+1 physical segments of type 2 (FIG. 26C) are selected.

Procedures of ST 82 to ST 84 are performed for all tracks. When the procedures of ST 82 to ST 84 for all tracks are performed (ST 85), the selection of the allocation type of the modulated area is ended (ST 86).

Light Fastness of the Disc

Light fastness of a disc is tested with an air-cooled Xenon lamp and test apparatus complying with ISO-105-B02.

Test Conditions

Black Panel Temperature: <40° C.

Relative humidity: 70 to 80%

Disc illumination:

Through the substrate, normal incident.

Write power

The write power has four levels, Peak power, Bias power1, Bias power2 and Bias power3. These are the optical powers incident on the read-out surface of the disc and used for writing marks and spaces.

Peak power, Bias power1, Bias power2 and Bias power3 are given in the Control data zone. The maximum Peak power does not exceed 13.0 mW. The maximum Bias power1, Bias power2 and Bias power3 do not exceed 6.5 mW.

Data Recording Procedure

Figure 76:
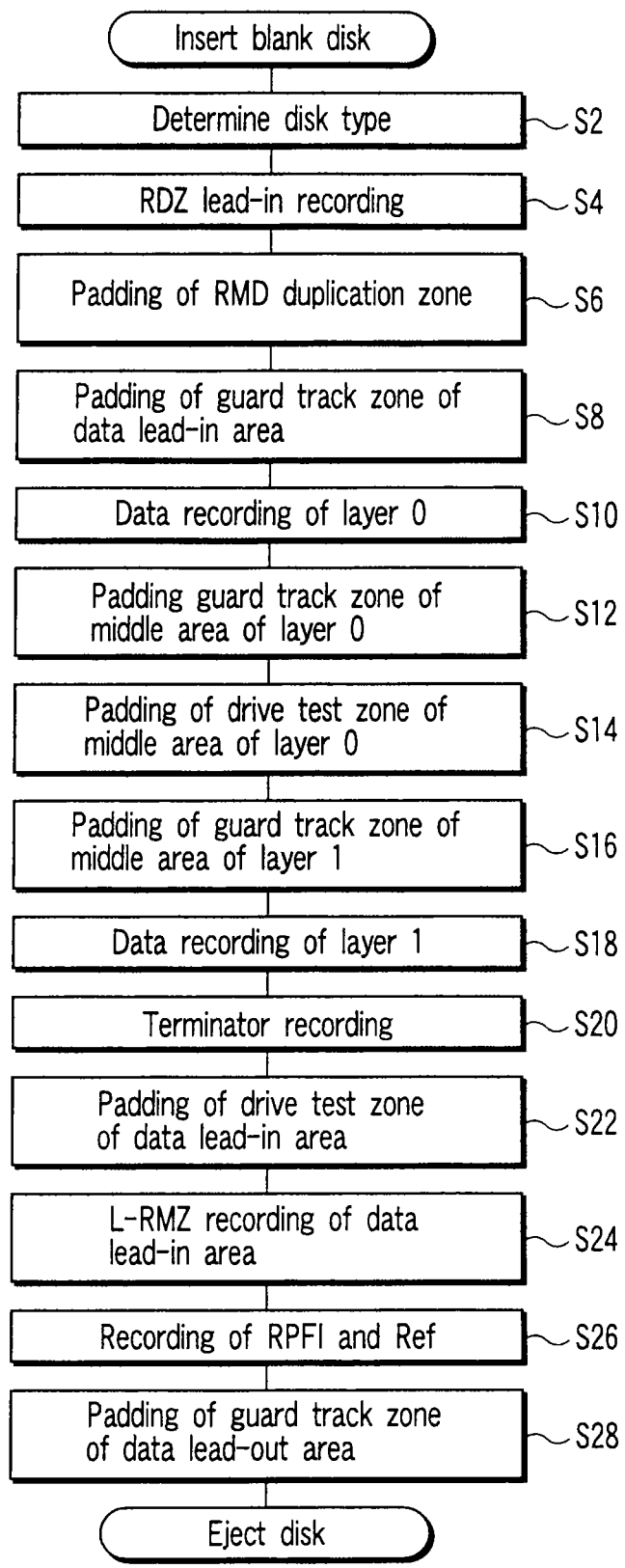
FIG. 76 shows an exemplary view showing a recording procedure of a blank disc.

FIG. 76 is a flow chart showing an operation performed when a non-used information storage medium having a structure shown in FIGS. 37 and 38 is inserted into a drive.

Insertion of a Non-Used Blank Disc Starts an Operation.

Data in a BCA area is read in step S2 to discriminate types of discs. As the types of the discs, there are single-sided/double-sided types, single layer/dual layer types, read-only/recordable/rewritable types, and the like. In this case, it is determined whether or not the inserted disc is a single-sided dual layer disc.

An RDZ lead-in in an RMD duplication zone (RZD) of a data lead-in area is recorded in step S4, the RZD except for the RDZ lead-in is filled (padded) with "00h" in step S6. The RMD duplication zone includes the RDZ lead-in as shown in FIG. 52. The RDZ lead-in is recorded before first recording management data RMD of a recording management zone L-RMZ is recorded. Other fields of the RMD duplication zone are reserved and padded with "00h".

A recording management zone in the data lead-in area (L-RMZ) is recorded from "03 CE00h" to "03 FFFFh" of PSN. The recording management zone in the data lead-in area L-RMZ includes recording position management data RMD. An unrecorded area of the L-RMZ is recorded with current recording position management data RMD before the disc is finalized.

The recording position management data RMD in the data lead-in area includes information about a recording position of the disc. The size of the RMD is 64 kB, and a data configuration of the recording position management data RMD is shown in FIG. 53.

A data segment of a guard track zone of the data lead-in area is padded in step S8.

Data is recorded in the data area of layer 0 in step S10. In this case, it is assumed that the size of the recorded data is equal to or larger than the recording capacity of the data area of layer 0 and that recording in the data area of layer 0 and recording in the data area of layer 1 are performed. Before the recording on layer 1, padding on layer 0 is performed to finalize the disc. The finalizing is performed to make it possible to read data by a player.

More specifically, a guard track zone of a middle area of layer 0 is padded in step S12.

A drive test zone of a middle area of layer 0 is padded in step S14. Note that step S14 can be omitted.

A guard track zone of a middle area of layer 1 is padded in step S16.

Data is recorded in the data area of layer 1 in step S18.

Finalization after data recording on layer 1 is performed as follows. When the recording data is ended on the way of the data area of layer 1, a terminator is recorded on all unrecorded areas of the data area as shown in FIG. 77 in step S20. Main data of the terminator is set to "00h", and the area type of the terminator is an attribute of a data lead-out area. When data is recorded in the entire data area of layer 1, the terminator is not recorded.

When no data area is recorded on layer 1, the terminator, as shown in FIGS. 78A and 78B, is recorded on both layer 0 and layer 1. The terminator on layer 0 is recorded to be in contact with the data area. Sufficient unrecorded data segments are present between the data area and a middle area, the terminator need not be recorded on all the data segments. A new drive test zone is allowed to be formed on layer 1 (see FIG. 78A). The size of the new drive test zone is 480 (PS block). An end PSN of the terminator of layer 0 and a start PSN of the terminator of layer 1 are described above in Table 23.

The drive test zone of the data lead-in area of layer 0 is padded in step S22.

In step S24, a recording management zone in the data lead-in area (L-RMZ) of layer 0 is recorded.

An R physical format information zone RPFI of the data lead-in area of layer 0 and a reference code zone Ref are recorded in step S26.

A guard track zone of a data lead-out area of layer 1 is padded in step S28. The process subsequent to the recording of the terminator is the finalizing process.

Thereafter, the disc is ejected.

Concrete orders of recording operations can be changed depending on the contents of recording data, methods of controlling a drive, and the like. A basic restriction about the recording orders are as follows.

When the guard track zone of the data lead-out area of layer 1 is padded (fill with "00h") and if recording states of corresponding areas of layer 0 are discontinuous (recorded area and unrecorded area coexist), stable recording cannot be performed because of the influence of interlayer crosstalk. All the corresponding areas of layer 0 must be in a recorded state. Therefore, before padding step S28 of the guard track zone, step S4 (recording of RDZ lead-in of RZD (RMD duplication zone)), step S6 (padding of RMD duplication zone), step S8 (padding of data segment of guard track zone of data lead-in area), step S22 (padding of drive test zone of data lead-in area), step S24 (recording of recording management zone in the data lead-in area (L-RMZ), and step S26 (recording of R physical format information zone R-PFI of data lead-in area and reference code zone Ref) must be performed. Furthermore, before step S24 (L-RMZ recording of data lead-in area), step S4 (recording of RDZ lead-in) must be executed. However, the orders of steps S6, S8, S22, and S26 can be appropriately changed.

For the same reason as described above, step S12 of padding the guard track zone of the middle area of layer 0 and step S14 of padding the drive test zone of the middle area of layer 0 must be performed before step S16 of padding the guard track zone of the middle area of layer 1. However, the orders of steps S12 and S14 can be appropriately changed. Before step S18 of recording data in the data area of layer 1, step S10 of recording data in the data area of layer 0 and step S12 of padding the guard track zone of the middle area of layer 0 must be performed. However, the orders of steps S10 and S12 can be appropriately changed.

A modification of the recording operation in FIG. 76 will be described below.

In shift from step S10 of recording data in the data area of layer 0 to step S18 of recording data in the data area of layer 1, the middle areas (layer 0 and layer 1) are padded. In order to shorten the shift time, the padding may be performed at another timing. When a stream the data size of which is not known in advance is to be recorded, data recording is interrupted for a period of padding time. Therefore, in order to perform step S12 of padding the guard track zone of the middle area of layer 0 at an earlier timing, step S12 may be executed before or after any one of steps S4, S6, and S8. In order to perform step S16 of padding the guard track zone of the middle area of layer 1 at a later timing, step S16 may be executed before or after any one of steps S22, S24, and S26.

Figure 79:
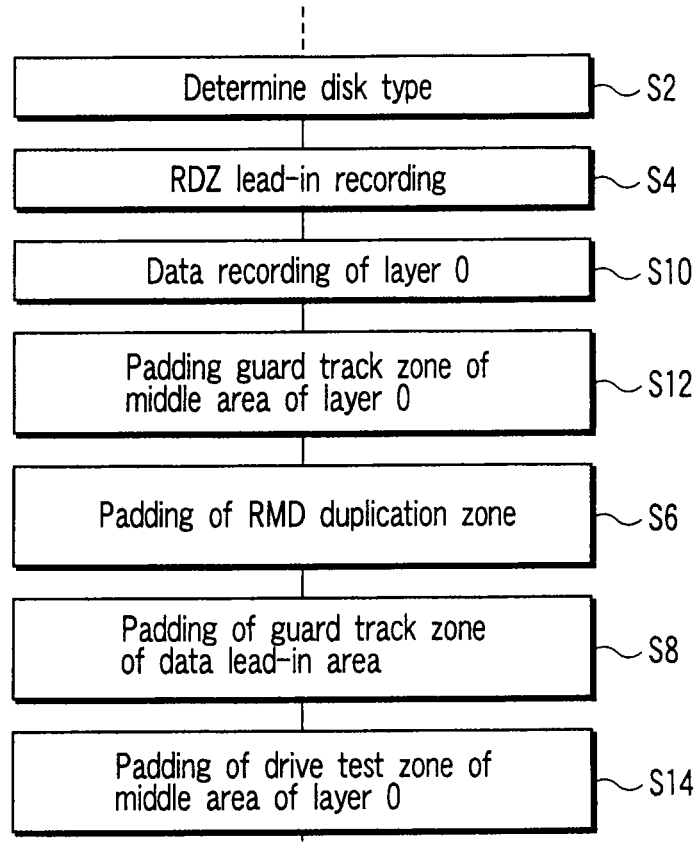
FIG. 79 shows an exemplary view showing another recording procedure of a blank disc.
Figure 80:
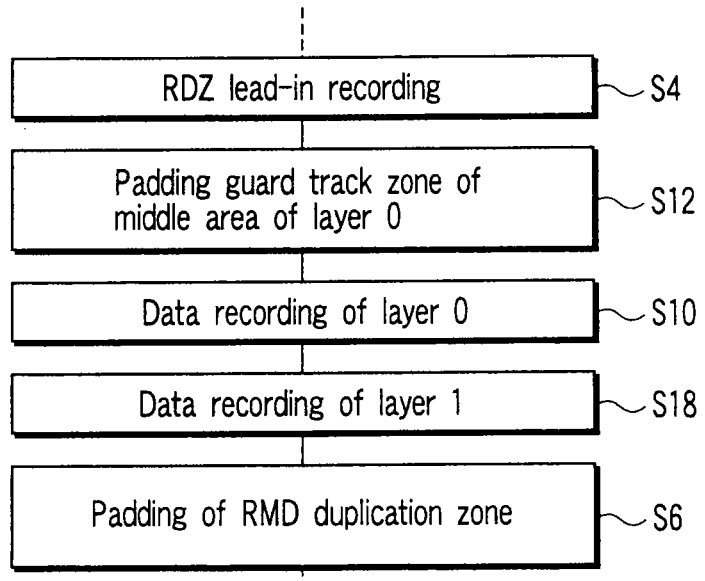
FIG. 80 shows an exemplary view showing still another recording procedure of a blank disc.

As another modification, in order to start data recording (step S10) in the data area of layer 0 at a timing as early as possible, step S10 may be executed immediately after step S4 (RDZ lead-in recording of RMD duplication zone), as shown in FIG. 79. In FIG. 79, the padding (step S14) of the drive test zone of the middle area of layer 0 may be omitted. However, when the size of the recording data is larger than the recording capacity of the data area of layer 0, and the data may be recorded on both layer 0 and layer 1, some inconvenience occurs. In this case, as shown in FIG. 80, after step S12 (padding of guard track zone of middle area of layer 0) is performed after step S4 (RDZ lead-in recording of RMD duplication zone), step S10 (data recording in data area of layer 0) and step S18 (data recording inn data area of layer 1) may be executed. When the guard track zone of the middle area of layer 0 is padded in step S12, recording on layer 1 can be started.

As a modification related to recording of a terminator, a case in which the terminator is recorded on only layer 0 and no terminator is recorded on layer 1 will be described below.

Figure 81:
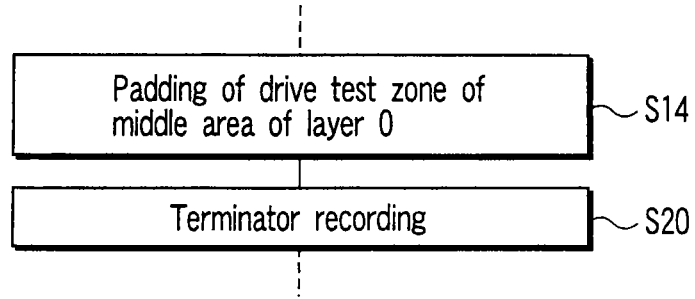
FIG. 81 shows an exemplary view showing a terminator recording procedure.

When the terminator is not connected to the middle area as shown in FIG. 78A, the terminator is recorded in step S20 after step S14 (padding of drive test zone of middle area of layer 0) as shown in FIG. 81.

Figure 82:
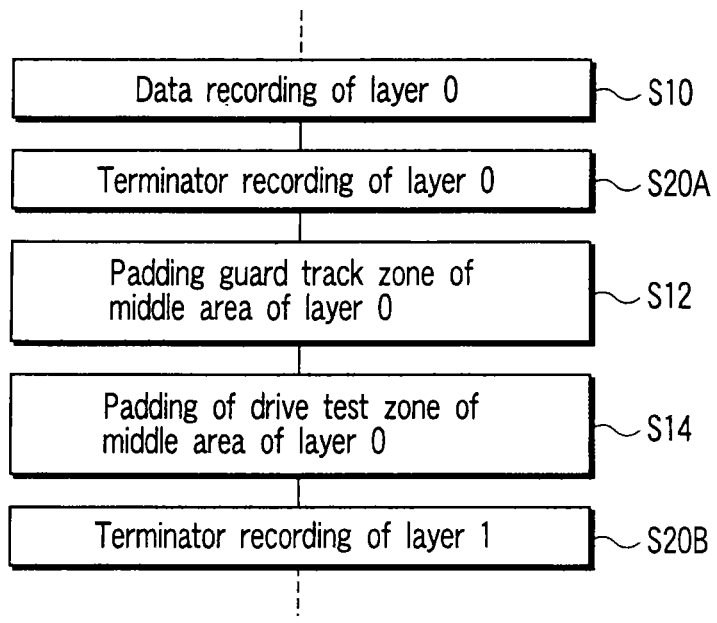
FIG. 82 shows an exemplary view showing another terminator recording procedure.

When the terminator is connected to the middle area as shown in FIG. 78B, the terminator is recorded on layer 0 in step S20A after step S10 (data recording step of layer 0), and the terminator is recorded on layer 1 in step S20B after step S12 (padding of guard track zone of middle area of layer 0) and step S14 (padding of drive test zone of middle area of layer 0) as shown in FIG. 82.

Expansion of the middle area causes a reduction in data area. When the middle area is extended, time for filling an unrecorded data area with the terminators in finalization can be shortened, and finalizing time can be shortened.

In the embodiment, the middle area can be extended even after the padding of the guard track zone of the middle area of layer 0 in step S12. The step of extending the middle area is executed immediately before step S16 (padding of guard track zone of middle area of layer 1) or step S18 (recording of data in data area of layer 1) in FIG. 76.

The present invention is not directly limited to the above embodiments. In an execution phase, the present invention can be embodied by modifying the constituent elements without departing from the spirit and scope of the invention. Various inventions can be formed by appropriately combining a plurality of constituent elements disclosed in the above embodiments. For example, several constituent elements may be omitted from all the constituent elements disclosed in the embodiments. Furthermore, the constituent elements used over the different embodiments may be appropriately combined to each other. For example, a structure in which two recording layers are used as shown in FIG. 1A may be applied to a pigment-based recording film as shown in FIG. 1B. More specifically, the present invention may be applied to a single-sided multilayer DH_DVD-R disc in which two or more pigment-based recording films are laminated.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information storage medium for storing modulated data, comprising:
    a burst cutting area including a first area;
    a system lead-in area located outward of the burst cutting area and including a second area; and
    a data lead-in area located outward of the system lead-in area and including a third area, wherein
    the system lead-in area comprises a read-only area,
    the data lead-in area comprises a recordable area,
    the first area, the second area, and the third area are configured to store same information relating to a recorded mark polarity flag,
    the recorded mark polarity flag is set to 0 or 1,
    the recorded mark polarity flag set to 0 indicates that recorded marks have a lower reflectivity than an unrecorded area,
    the recorded mark polarity flag set to 1 indicates that recorded marks have a higher reflectivity than an unrecorded area,
    the modulated data has a minimum inversion length and a maximum inversion length,
    the minimum inversion length corresponds to 2T, T being a channel bit length T of the modulated data,
    the modulated data is configured to be reproduced by a reproducing apparatus,
    the modulated data is configured to produce a reproduction signal when the reproducing apparatus reproduces the modulated data,
    a high level value of a reproduction signal amplitude is a highest value reproduced from an area regarding the maximum inversion length,
    a low level value of the reproduction signal amplitude is a lowest value reproduced from an area regarding the maximum inversion length,
    a differential value is defined as a difference between the high level value and the low level value, and
    ratio of the differential value to the high level value is more than 0.2.

2. A reproducing method for the information storage medium according to claim 1, wherein the method comprises:
    irradiating the information storage medium with light; and
    reproducing the modulated data from the information storage medium.

3. The reproducing apparatus for the information storage medium according to claim 1, wherein the apparatus comprises:
    an optical head configured to irradiate the information storage medium with light; and
    a reproducing module configured to reproduce the modulated data from the information storage medium.

4. A recording method for the information storage medium according to claim 1, wherein the method comprises:
    irradiating the information storage medium with light; and
    recording the modulated data on the information storage medium.

5. A recording apparatus for the information storage medium according to claim 1, wherein the apparatus comprises:
    a recording module configured to irradiate the information storage medium with light and to record the modulated data on the information storage medium.

* * * * *